United States Patent
Masaki et al.

(10) Patent No.: US 7,051,346 B2
(45) Date of Patent: May 23, 2006

(54) DISK DRIVE APPARATUS HAVING PARTICULAR CLAMPING DEVICE

(75) Inventors: Kiyoshi Masaki, Amagasaki (JP); Kazuhiro Mihara, Moriguchi (JP); Shuichi Yoshida, Osaka (JP); Teruyuki Naka, Isumi (JP); Sachio Fukuyama, Matsuyama (JP); Noriaki Urayama, Matsuyama (JP); Masaaki Kikugawa, Matsuyama (JP); Makoto Maruoka, Matsuyama (JP); Shinichiro Obayashi, Onsen-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/718,119

(22) Filed: Nov. 19, 2003

(65) Prior Publication Data

US 2004/0111737 A1 Jun. 10, 2004

Related U.S. Application Data

(63) Continuation of application No. 09/509,231, filed as application No. PCT/JP98/04253 on Sep. 21, 1998, now Pat. No. 6,741,544.

(30) Foreign Application Priority Data

| Sep. 25, 1997 | (JP) | ................... 9-260101 |
| Nov. 27, 1997 | (JP) | ................... 9-344160 |
| Sep. 3, 1998 | (JP) | ................... 10-267250 |

(51) Int. Cl.
   *G11B 17/28* (2006.01)
(52) U.S. Cl. .................. 720/706; 720/717; 720/712
(58) Field of Classification Search ........ 720/700–703, 720/706, 710, 712, 715–717
   See application file for complete search history.

(56) References Cited

U.S. PATENT DOCUMENTS

| 3,203,273 A | | 8/1965 | Favrot |
| 3,696,688 A | | 10/1972 | Goodrich et al. |
| 3,854,347 A | | 12/1974 | Hellerich |
| 4,754,448 A | * | 6/1988 | Ikedo et al. ............. 720/715 |
| 5,111,713 A | | 5/1992 | Cameron et al. |
| 5,806,349 A | | 9/1998 | Kim et al. |
| 5,809,002 A | | 9/1998 | Takahashi et al. |
| 5,857,360 A | | 1/1999 | Kim et al. |
| 5,872,681 A | | 2/1999 | Boutaghou |

(Continued)

FOREIGN PATENT DOCUMENTS

DE 4243972 A1 * 7/1993

(Continued)

OTHER PUBLICATIONS

Inoue, J., et al., "Autobalance Apparatus", Transactions of the Japan Society of Mechanical Engineers, No. 394(A), (Jun. 1979) pp. 646-652.

*Primary Examiner*—Brian E. Miller
(74) *Attorney, Agent, or Firm*—Akin Gump Strauss Hauer & Feld, LLP

(57) ABSTRACT

A disk drive includes a turntable and a clamper. The turntable and/or the clamper have four or more projections, each of which has predetermined height. The projections are arranged at positions for supporting/holding a mounted disk by using the four or more projections, wherein the projections are located at substantially equal intervals around a circumference of the turntable/clamper and the tips of the projections are substantially in the same plane.

2 Claims, 64 Drawing Sheets

U.S. PATENT DOCUMENTS

| | | | |
|---|---|---|---|
| 5,923,638 A | 7/1999 | Watanabe | |
| 6,005,749 A | 12/1999 | Ikuta et al. | |
| 6,061,325 A * | 5/2000 | Zaun | 369/264 |
| 6,160,780 A | 12/2000 | Furukawa et al. | |
| 6,198,715 B1 | 3/2001 | Kouno et al. | |
| 6,292,461 B1 | 9/2001 | Kikuchi et al. | |
| 6,295,269 B1 | 9/2001 | Takeuchi et al. | |
| 6,333,912 B1 | 12/2001 | Sohn | |
| 6,711,116 B1 * | 3/2004 | Masaki et al. | 720/702 |
| 6,741,544 B1 * | 5/2004 | Masaki et al. | 720/702 |

FOREIGN PATENT DOCUMENTS

| | | | |
|---|---|---|---|
| GB | 2316219 A * | 2/1998 | |
| JP | 61-90001 | 6/1986 | |
| JP | 62-135743 A | 6/1987 | |
| JP | 62-255636 A | 11/1987 | |
| JP | 63-259242 A | 10/1988 | |
| JP | 2-139758 A | 5/1990 | |
| JP | HEI 2-330958 | 11/1990 | |
| JP | 3-86968 A | 4/1991 | |
| JP | 4-187192 A | 7/1992 | |
| JP | 5-144245 A | 6/1993 | |
| JP | 5-73746 | 10/1993 | |
| JP | 6-26054 | 4/1994 | |
| JP | 8-50783 A | 2/1996 | |
| JP | 8-63848 A | 3/1996 | |
| JP | 8-135735 A | 5/1996 | |
| JP | 8-229287 A | 9/1996 | |
| JP | 8-335348 A | 12/1996 | |
| JP | 09073698 A * | 3/1997 | |
| JP | 9-190675 A | 7/1997 | |
| JP | 10-83622 A | 3/1998 | |
| JP | 10106093 A * | 4/1998 | |
| JP | 10-124990 | 5/1998 | |
| JP | 10-188465 | 7/1998 | |
| JP | 10-281227 | 10/1998 | |
| JP | 10-340528 | 12/1998 | |
| KR | 1993-0014275 A | 7/1993 | |
| KR | 1997-0063133 A | 9/1997 | |
| KR | 1998-032661 | 7/1998 | |

* cited by examiner

Offset amount (a)

(b)

⟨Two-division mode⟩

⟨Four-division mode⟩

⟨Six-division mode⟩

⟨Eight-division mode⟩

(a)

(b)

(a)

(b)

(a)

(b)

(a)

(b)

(a)

(b)

(a)

(b)

(c)

(d)

(a)

(b)

(a)

(b)

● : Turntable projection   ⊗ : Clamper projection (a)

(b)

● : Turntable projection    ⊗ : Clamper projection (a)

(b)

(a) (Rest)

(b) (Rotation)

(a)
(Rest state)

(Rotation)

Imbalance

No Imbalance (Rotation state)

(a)

(b)

(a)

(b)

(c)

(a)

(b)

(a)

(b)

(a)

(b)

(a)

(b)

(a)

(b)

PRIOR ART

DISK DRIVE APPARATUS HAVING PARTICULAR CLAMPING DEVICE

TECHNICAL FIELD

The present invention relates to a disk drive apparatus capable of carrying out stable recording and reproduction by suppressing undesirable vibration and noise caused by an imbalance on a disk used as a recording medium.

PRIOR ART

In recent years, in disk drive apparatuses for recording/reproducing data, high-speed disk rotation is being advanced to improve data transfer rate. For example, in a CD-ROM disk drive apparatus, its rotation speed has increased from a conventional value of the order of 5000 rpm to 6000 rpm or more. This tendency is similarly shown not only in the half-height disk drive apparatuses for desktop computers but also the low-profile disk drive apparatuses for notebook computers.

However, there are various disks; some disks have a mass imbalance due to nonuniform thickness, and other disks have a mass imbalance due to the paper seal stuck thereto to indicate the contents recorded thereon. The amount of the mass imbalance of the disk reaches about 1 gcm in the case when the amount is large. When this kind of disk is rotated at high speed, an eccentric centrifugal force (an imbalance force) acts on the rotation center of the disk, thereby causing a problem wherein the vibration due to the imbalance force is transmitted to the whole of the device. The magnitude of this imbalance force increases in proportion to the square of rotation frequency (Hz) (rotation frequency is the revolutions per unit time (revolutions/sec) of a disk 501). For example, when increasing the rotation speed of a disk having a mass imbalance of 1 gcm by only about 10%, from 5400 rpm to 600 rpm, the imbalance force increases about 1.2 times, and the vibration also increases significantly.

When the mass of the disk is M (g), and when the distance from the center of the disk to the center of gravity of the disk is L (cm), the mass imbalance amount A (gcm) is represented by $A = M \times L$.

When this kind of unbalanced disk is rotated at high speed, noise occurs due to its vibration, the bearings of the spindle motor for rotating the disk are damaged, thereby causing a problem wherein stable recording and reproduction cannot be attained.

Furthermore, when this kind of disk drive apparatus is built in an apparatus such as a computer, the vibration is transmitted to other devices inside the apparatus, thereby also causing a problem of adversely affecting the devices.

For these reasons, to improve data transfer rate by rotating the disk at high speed, it is necessary to accomplish a task of suppressing undesirable vibration due to the mass imbalance of the disk.

An example of a conventional disk drive apparatus will be described below referring to the drawings.

FIG. 72 is a perspective view showing the main unit of the conventional disk drive apparatus. Referring to FIG. 72, a disk 1 is rotated by a spindle motor 2; and a head 3 reads data recorded on the disk 1 or writes data on the disk 1. A head drive mechanism 5, comprising a rack, a pinion and the like, converts the rotation motion of a head drive motor 4 into a linear motion, and transmits it to the head 3. The head 3 is configured so as to be moved in the radial direction of the disk 1 by this head drive mechanism 5. The spindle motor 2, the head drive motor 4 and the head drive mechanism 5 are mounted on a sub-base 6. Vibration and impact transmitted from outside the device to the sub-base 6 are dampened by insulators 7 (elastic bodies), and the sub-base 6 is mounted on a main base 8 via these insulators 7. The main unit of the disk drive apparatus shown in FIG. 72 is configured so as to be built on a computer or the like via a frame (not shown) installed in the main base 8.

FIG. 73 is a side sectional view showing the vicinity of the spindle motor 2 of the conventional disk drive apparatus. A turntable 110 is secured to the shaft 21 of the spindle motor 2 and rotatably supports the clamp area 11 of the disk 1. Inside the boss 14 formed on the turntable 110, a positioning ball 116 making contact with the corner portion of the clamp hole 12 of the disk 1 by virtue of a pressing means 113, such as a coil spring, is built in. In this way, the disk 1 is disposed at a predetermined position by the pressing operation of the positioning ball 116.

In the conventional disk drive apparatus configured as describe above, in the condition wherein the disk 1 is disposed and clamped on the turntable 110, by making the positioning ball 116 contact with the corner portion of the clamp hole 12, the disk 1 is aligned and held on the turntable 110 by the pressing force of the pressing means 113. The disk 1 held in this way is rotated integrally with the turntable 110 by the spindle motor 2.

However, in the conventional disk drive apparatus having the above-mentioned configuration, if the disk 1 having a mass imbalance due to nonuniform thickness, a seal, etc. stuck thereon is mounted and rotated at high speed, a centrifugal force (an imbalance force) F acts on the center of gravity G1 of the disk 1 shown in FIG. 73. The direction of the action rotates as the disk 1 rotates. This imbalance force F is transmitted to the sub-base 6 via the turntable 110 and the spindle motor 2; however, since the sub-base 6 is supported by the insulators 7 used as elastic bodies, it is whirled significantly by the imbalance force F while the insulators 7 are deformed. Since the magnitude of the imbalance force F is proportional to the product of the mass imbalance amount (represented by the unit of gcm) and the square of the rotation frequency, the vibration acceleration of the sub-base 6 increases drastically in close proportion to the square of the rotation frequency of the disk 1. As a result, such problems occur that noise was caused due to the resonance of the sub-base 6 itself and the head drive mechanism 5 mounted on the sub-base 6, and stable recording and reproduction became impossible due to significant vibration of the disk 1 and the head 3.

To cope with the above-mentioned problems, in the conventional disk drive apparatus, the spring constant of the insulators 7 was raised, or an elastic material, such as a leaf spring, was provided between the sub-base 6 and the main base 8 as counter measures to suppress the vibration amplitude of the sub-base 6.

However, if the rigidity of the connection portion between the sub-base 6 and the main base 8 was raised in this way, when vibration and impact were applied reversely from outside the drive device to the disk drive apparatus, the vibration and impact were directly transmitted to the sub-base 6 on which the disk 1, the head 3 and the like were mounted, and stable recording and reproduction became impossible, thereby causing a problem of reducing the so-called vibration-resistant and impact-resistant characteristics.

Furthermore, the vibration of the sub-base 6 due to the imbalance force F was transmitted to the outside of the disk drive apparatus via the main base 8 and the like, thereby causing a problem of adversely affecting other devices in the computer in which this disk drive apparatus was built.

Moreover, a large side pressure was applied to the bearings of the spindle motor 2 by the imbalance force F, whereby the loss of the shaft torque increased, and the bearings were damaged, thereby to cause a problem of shortening the service life of the bearings.

DISCLOSURE OF THE INVENTION

In consideration of the above-mentioned problems, the present invention is intended to provide a disk drive apparatus capable of carrying out stable recording and reproduction even when an unbalanced disk is rotated at high speed, and also capable of carrying out high-rate transfer while having high reliability in preventing vibration and impact from outside the device.

In order to solve the above-mentioned problems, the disk drive apparatus of the present invention is a device wherein a balancer having a ring-shaped track portion accommodating balance members is provided so as to rotate integrally with a disk mounted on the disk drive apparatus; and concrete means thereof are described below.

A disk drive apparatus in accordance with the present invention comprises:

a balancer provided so as to be rotatable integrally with a mounted disk and having a ring-shaped track portion accommodating balance members, wherein
the balancer satisfies the relationship of:

$h \geq f^2 \times |A-Z|$, when the total mass of the above-mentioned balance members is M [g], the distance to the center of gravity of the total of the above-mentioned balance members from the center axis of the above-mentioned ring-shaped track portion is T [cm], a balance amount Z [gcm] is represented by:

$Z=M \times T$, when the maximum rotation frequency of the above-mentioned disk is f [Hz], the maximum of the mass imbalance amount of the above-mentioned disk is A [gcm], and a constant is h.

Therefore, in accordance with the disk drive apparatus of the present invention, even if the disk is rotated at high speed, vibration due to the mass imbalance of the disk can be suppressed securely, whereby it is possible to attain a disk drive apparatus capable of carrying out high-rate transfer.

A disk drive apparatus in accordance with the present invention from another point of view comprises:

a balancer provided so as to be rotatable integrally with a mounted disk and having a ring-shaped track portion accommodating spherical bodies, wherein
the balancer satisfies the relationship of:

$h \geq f^2 \times |A-Z|$, when the radius of the above-mentioned spherical body is r [cm], the radius of the inner wall face of the outer periphery of the above-mentioned ring-shaped portion is S [cm], the number of the above-mentioned spherical bodies is n, the specific gravity of the above-mentioned spherical body is ρ, and a balance amount Z [gcm] is represented by:

$Z=4/3\pi r^3 \rho (S-r)^2 \times \sin[n \sin^{-1}\{r/(S-r)\}]$, when the maximum rotation frequency of the above-mentioned disk is f [Hz], the maximum of the mass imbalance amount of the above-mentioned disk is A [gcm], and a constant is h.

Therefore, in accordance with the disk drive apparatus of the present invention, even if the disk is rotated at high speed, vibration due to the mass imbalance of the disk can be suppressed securely, whereby it is possible to attain a disk drive apparatus capable of carrying out high-rate transfer.

In a disk drive apparatus in accordance with the present invention, the above-mentioned constant h may be represented by:

$h=fo^2 \times Ao$, in the case when the maximum allowable rotation frequency wherein vibration becomes an allowable value or less is fo [Hz] at the time when a disk having a mass imbalance amount Ao [gcm] is rotated in a condition wherein the above-mentioned balance amount Z=0 [gcm].

Furthermore, in a disk drive apparatus in accordance with the present invention, it is preferable that the diameter of a disk to be mounted is 12 [cm] or less, and that the above-mentioned constant h is 8100.

A disk drive apparatus in accordance with the present invention from another point of view comprises:

a head for carrying out recording or reproduction on a mounted disk; and a balancer provided so as to be rotatable integrally with the above-mentioned disk and having a ring-shaped track portion accommodating balance members, wherein said balancer is disposed on the same side of the above-mentioned head with respect to the recording face of the above-mentioned disk used as a reference face.

Therefore, in accordance with the disk drive apparatus of the present invention, even if a mounted unbalanced disk is rotated at high speed, vibration can be suppressed sufficiently, whereby it is possible to attain a low-profile disk drive apparatus capable of carrying out high-rate transfer.

A disk drive apparatus in accordance with the present invention from another point of view comprises:

a head for carrying out recording or reproduction on a mounted disk; and a balancer provided so as to be rotatable integrally with the above-mentioned disk and having a ring-shaped track portion accommodating balance members, wherein the distance from the outer wall face of the outer periphery of the above-mentioned ring-shaped track portion to the center axis of the above-mentioned ring-shaped track portion is smaller than the distance from the end face of the inner peripheral side of the head being positioned at the innermost track to the center axis of the above-mentioned ring-shaped track portion.

Therefore, in accordance with the disk drive apparatus of the present invention, even if a mounted unbalanced disk is rotated at high speed, vibration can be suppressed sufficiently, whereby it is possible to attain a low-profile disk drive apparatus capable of carrying out high-rate transfer.

A disk drive apparatus in accordance with the present invention from another point of view comprises:

a motor base to which a spindle motor for rotating a disk is secured;

a sub-base over which the above-mentioned motor base is installed via elastic bodies, and on which a head for carrying out recording or reproduction on the above-mentioned disk is provided movably in the radial direction of the above-mentioned disk; and a balancer provided so as to be rotatable integrally with the above-mentioned disk and having a ring-shaped track portion accommodating balance members.

Therefore, in accordance with the disk drive apparatus of the present invention, the vibration of the disk can be suppressed securely regardless of the magnitude of the mass imbalance of the disk, whereby stable recording or reproduction can be attained, and it is possible to attain a disk drive apparatus capable of carrying out high-speed rotation.

A disk drive apparatus in accordance with the present invention from another point of view is configured so that the above-mentioned disk is rotated at a frequency higher than the primary resonance frequency of the whirling vibration of the above-mentioned motor base due to the deformation of the above-mentioned elastic bodies.

Therefore, in accordance with the disk drive apparatus of the present invention, the vibration of the disk can be suppressed securely regardless of the magnitude of the mass imbalance of the disk, whereby stable recording or reproduction can be attained, and it is possible to attain a disk drive apparatus capable of carrying out high-speed rotation.

A disk drive apparatus in accordance with the present invention from another point of view comprises:

a balancer provided so as to be rotatable integrally with a mounted disk and having a ring-shaped track portion accommodating spherical bodies, wherein the inner wall face of the outer periphery of the above-mentioned ring-shaped track portion is inclined with respect to the center axis of the above-mentioned ring-shaped track portion.

Therefore, in accordance with the disk drive apparatus of the present invention, even when the mass imbalance amount of the mounted disk is very large, it is possible to attain a disk drive apparatus having a high vibration suppression effect and being capable of reducing undesirable noise.

A disk drive apparatus in accordance with the present invention from another point of view comprises:

a balancer provided so as to be rotatable integrally with a mounted disk and having a ring-shaped track portion accommodating spherical bodies, wherein the sectional shape of the inner wall face of the outer periphery of the above-mentioned ring-shaped track portion is a wedge.

Therefore, in accordance with the disk drive apparatus of the present invention, vibration due to the mounted unbalanced disk can be suppressed, and undesirable noise caused from the balancer itself can be reduced.

A disk drive apparatus in accordance with the present invention from another point of view comprises:

a balancer provided so as to be rotatable integrally with a mounted disk and having a ring-shaped track portion accommodating spherical bodies, wherein the sectional shape of the inner wall face of the outer periphery of the above-mentioned ring-shaped track portion is a curve.

Therefore, in accordance with the disk drive apparatus of the present invention, even when a disk having a large mass imbalance is mounted, or even when a disk having a small mass imbalance is mounted, vibration can be suppressed securely, and undesirable noise can be reduced.

A balancer for a disk drive apparatus in accordance with the present invention from another point of view is:

provided so as to be rotatable integrally with a mounted disk and has a ring-shaped track portion accommodating spherical bodies, wherein the inner wall face of the outer periphery of the above-mentioned ring-shaped track portion is inclined with respect to the center axis of the above-mentioned ring-shaped track portion.

Therefore, in accordance with the balancer for the disk drive apparatus of the present invention, noise caused from the balancer itself can be suppressed.

A balancer for a disk drive apparatus in accordance with the present invention from another point of view is:

provided so as to be rotatable integrally with a mounted disk and has a ring-shaped track portion accommodating spherical bodies, wherein the sectional shape of the inner wall face of the outer periphery of the above-mentioned ring-shaped track portion is a wedge.

Therefore, in accordance with the disk drive apparatus of the present invention, noise caused from the balancer itself can be suppressed.

A balancer for a disk drive apparatus in accordance with the present invention from another point of view is:

provided so as to be rotatable integrally with amounted disk and has a ring-shaped track portion accommodating spherical bodies, wherein the sectional shape of the inner wall face of the outer periphery of the above-mentioned ring-shaped track portion is a curve.

Therefore, in accordance with the balancer for the disk drive apparatus of the present invention, even when a disk having a large mass imbalance is mounted, or even when a disk having a small mass imbalance is mounted, vibration can be suppressed securely, and undesirable noise caused from the balancer itself can be suppressed.

A balancer for a disk drive apparatus in accordance with the present invention from another point of view is:

provided so as to be rotatable integrally with a mounted disk and has a ring-shaped track portion accommodating balance members, wherein the balancer satisfies the relationship of:

$$h \geq f^2 \times |A - Z|,$$

when the total mass of the above-mentioned balance members is M [g], the distance to the center of gravity of the total of the above-mentioned balance members from the center axis of the above-mentioned ring-shaped track portion is T [cm], a balance amount Z [gcm] is represented by:

$$Z = M \times T,$$

when the maximum rotation frequency of the above-mentioned disk is f [Hz], the maximum of the mass imbalance amount of the above-mentioned disk is A [gcm], and a constant is h.

Therefore, in accordance with the balancer for the disk drive apparatus of the present invention, even if the disk is rotated at high speed, vibration due to the mass imbalance of the disk can be suppressed securely, whereby it is possible to attain a disk drive apparatus capable of carrying out high-rate transfer.

A balancer for a disk drive apparatus in accordance with the present invention from another point of view is:

provided so as to be rotatable integrally with a mounted disk and has a ring-shaped track portion accommodating spherical bodies, wherein the balancer satisfies the relationship of:

$$h \geq f^2 \times |A - Z|,$$

when the radius of the above-mentioned spherical body is r [cm], the radius of the inner wall face of the outer periphery of the above-mentioned ring-shaped portion is S [cm], the number of the above-mentioned spherical bodies is n, the specific gravity of the above-mentioned spherical body is ρ, and a balance amount Z [gcm] is represented by:

$$Z = \tfrac{4}{3}\pi r^2 \rho (S-r)^2 \times \sin[n \sin^{-1}\{r/(S-r)\}],$$

when the maximum rotation frequency of the above-mentioned disk is f [Hz], the maximum of the mass imbalance amount of the above-mentioned disk is A [gcm], and a constant is h.

In a balancer for a disk drive apparatus in accordance with the present invention, the above-mentioned constant h may be represented by:

$$h = fo^2 \times Ao,$$

in the case when the maximum allowable rotation frequency wherein vibration becomes an allowable value or less is fo [Hz] at the time when a disk having a mass imbalance amount Ao [gcm] is rotated in a condition wherein the above-mentioned balance amount Z=0 [gcm].

In a balancer for a disk drive apparatus in accordance with the present invention, it is preferable that the diameter of a disk to be mounted is 12 [cm] or less, and that the above-mentioned constant h is 8100.

Therefore, in accordance with the balancer for the disk drive apparatus of the present invention, even if the disk is rotated at high speed, vibration due to the mass imbalance of the disk can be suppressed securely, whereby it is possible to attain a disk drive apparatus capable of carrying out high-rate transfer.

Furthermore, in order to attain the above-mentioned objects, the disk drive apparatus of the present invention is a device wherein a balancer having a ring-shaped track divided into plural tracks and balance members movable along the divided tracks respectively is provided so as to be rotatable integrally with a disk; and concrete means thereof are described below.

A disk drive apparatus in accordance with the present invention comprises a balancer having a plurality of arc-shaped tracks and balance members provided so as to be movable on the above-mentioned arc-shaped tracks.

Therefore, in accordance with the disk drive apparatus of the present invention, the vibration of the sub-base can be suppressed securely regardless of the magnitude of the mass imbalance of the disk, whereby stable recording or reproduction can be attained, and it is possible to attain a disk drive apparatus capable of carrying out high-speed rotation without losing vibration-resistant and impact-resistant characteristics.

A disk drive apparatus in accordance with the present invention from another point of view comprises a balancer having division means for dividing a ring-shaped track into plural tracks, arc-shaped tracks formed by the above-mentioned division means, and balance members provided so as to be movable on the above-mentioned arc-shaped tracks.

Therefore, in accordance with the disk drive apparatus of the present invention, the vibration of the sub-base can be suppressed securely regardless of the magnitude of the mass imbalance of the disk, whereby stable recording or reproduction can be attained, and it is possible to attain a disk drive apparatus capable of carrying out high-speed rotation without losing vibration-resistant and impact-resistant characteristics.

In a disk drive apparatus in accordance with the present invention, the above-mentioned division means may be configured to absorb shock.

Therefore, in accordance with the disk drive apparatus of the present invention, noise caused from the balancer itself can be suppressed.

In a disk drive apparatus in accordance with the present invention, in at least portions of the above-mentioned arc-shaped tracks, the distance from the rotation axis of a disk to at least one track increases in the rotation direction of the above-mentioned disk.

Therefore, in accordance with the disk drive apparatus of the present invention, the vibration of the sub-base can be suppressed securely regardless of the magnitude of the mass imbalance of the disk, whereby stable recording or reproduction can be attained, and it is possible to attain a disk drive apparatus capable of carrying out high-speed rotation without losing vibration-resistant and impact-resistant characteristics.

In a disk drive apparatus in accordance with the present invention, the above-mentioned division means may be configured to be held so as to be rotatable with respect to the ring-shaped tracks.

Therefore, in accordance with the disk drive apparatus of the present invention, the vibration of the sub-base can be suppressed securely regardless of the magnitude of the mass imbalance of the disk, whereby stable recording or reproduction can be attained, and it is possible to attain a disk drive apparatus capable of carrying out high-speed rotation without losing vibration-resistant and impact-resistant characteristics.

In a disk drive apparatus in accordance with the present invention, the above-mentioned balance members may be formed of a magnetic material, and magnetic field generation means having magnetic poles may be disposed in the vicinity of the above-mentioned division means.

Therefore, in accordance with the disk drive apparatus of the present invention, noise caused from the balancer itself can be suppressed regardless of the high speed or low speed of disk rotation.

In a disk drive apparatus in accordance with the present invention, the above-mentioned balance members may be formed of a magnetic material, magnetic field generation means having magnetic poles may be disposed in the vicinity of the above-mentioned division means, and shock-absorbing members may be provided in the above-mentioned ring-shaped tracks at positions opposite to the positions of the magnet poles of the above-mentioned magnetic field generation means.

Therefore, in accordance with the disk drive apparatus of the present invention, noise caused from the balancer itself can be suppressed regardless of the high speed or low speed of disk rotation.

In a disk drive apparatus in accordance with the present invention, the above-mentioned balance members may be formed of a magnetic material, magnetic field generation means for magnetically attracting the above-mentioned balance members may be provided, and the connection portions between the above-mentioned division means and the above-mentioned ring-shaped tracks may be formed of curves.

Therefore, in accordance with the disk drive apparatus of the present invention, noise caused from the balancer itself can be suppressed regardless of the high speed or low speed of disk rotation.

In a disk drive apparatus in accordance with the present invention, the above-mentioned ring-shaped tracks may be plural in number.

Therefore, in accordance with the disk drive apparatus of the present invention, the vibration of the sub-base can be suppressed securely regardless of the magnitude of the mass imbalance of the disk.

A balancer for a disk drive apparatus in accordance with the present invention has a plurality of arc-shaped tracks and balance members provided so as to be movable on the above-mentioned arc-shaped tracks.

Therefore, in accordance with the balancer for the disk drive apparatus of the present invention, the vibration of the sub-base can be suppressed securely regardless of the magnitude of the mass imbalance of the disk, whereby vibration and noise from the balancer can be suppressed.

A balancer for a disk drive apparatus in accordance with the present invention from another point of view has division means for dividing a ring-shaped track into plural tracks, arc-shaped tracks formed by the above-mentioned division means and balance members provided so as to be movable on the above-mentioned arc-shaped tracks.

Therefore, in accordance with the balancer for the disk drive apparatus of the present invention, the vibration of the sub-base can be suppressed securely regardless of the magnitude of the mass imbalance of the disk, whereby vibration and noise from the balancer can be suppressed.

In a balancer for a disk drive apparatus in accordance with the present invention, the above-mentioned division means may be configured to absorb shock.

Therefore, in accordance with the balancer for the disk drive apparatus of the present invention, noise caused from the balancer itself can be suppressed.

In a balancer for a disk drive apparatus in accordance with the present invention, in at least portions of the above-mentioned arc-shaped tracks, the distance from the rotation axis of a disk to at least one track increases in the rotation direction of the disk.

Therefore, in accordance with the balancer for the disk drive apparatus of the present invention, the vibration of the sub-base can be suppressed securely regardless of the magnitude of the mass imbalance of the disk, whereby vibration and noise from the balancer can be suppressed.

In a balancer for a disk drive apparatus in accordance with the present invention, the above-mentioned division means may be configured to be held so as to be rotatable with respect to the above-mentioned ring-shaped tracks.

Therefore, in accordance with the balancer for the disk drive apparatus of the present invention, the vibration of the sub-base can be suppressed securely regardless of the magnitude of the mass imbalance of the disk, whereby vibration and noise from the balancer can be suppressed.

In a balancer for a disk drive apparatus in accordance with the present invention, the above-mentioned balance members maybe formed of a magnetic material, and magnetic field generation means for magnetically attracting the above-mentioned balance members may be provided.

Therefore, in accordance with the balancer for the disk drive apparatus of the present invention, noise caused from the balancer itself can be suppressed regardless of the high speed or low speed of disk rotation.

In a balancer for a disk drive apparatus in accordance with the present invention, the above-mentioned balance members may be formed of a magnetic material, magnetic field generation means for magnetically attracting the above-mentioned balance members may be provided, and the connection portions between the above-mentioned division means and the above-mentioned ring-shaped tracks may be formed of curves.

Therefore, in accordance with the balancer for the disk drive apparatus of the present invention, noise caused from the balancer itself can be suppressed regardless of the high speed or low speed of disk rotation.

A clamper for a disk drive apparatus in accordance with the present invention comprises a balancer having a plurality of arc-shaped tracks and balance members provided so as to be movable on the above-mentioned arc-shaped tracks, and is configured to rotatably hold a disk mounted on a turntable.

Therefore, in accordance with the clamper for the disk drive apparatus of the present invention, the vibration of the sub-base can be suppressed securely regardless of the magnitude of the mass imbalance of the disk, whereby vibration and noise from the balancer can be suppressed.

A spindle motor for a disk drive apparatus in accordance with the present invention comprises a balancer having a plurality of arc-shaped tracks and balance members provided so as to be movable on the above-mentioned arc-shaped tracks.

Therefore, in accordance with the spindle motor for the disk drive apparatus of the present invention, the vibration of the sub-base can be suppressed securely regardless of the magnitude of the mass imbalance of the disk, whereby vibration and noise from the balancer can be suppressed.

A spindle motor for a disk drive apparatus in accordance with the present invention from another point of view comprises a balancer having a plurality of arc-shaped tracks and balance members provided so as to be movable on the above-mentioned arc-shaped tracks, wherein said balancer is provided so as to be rotatable integrally with a rotor.

Therefore, in accordance with the spindle motor for the disk drive apparatus of the present invention, the vibration of the sub-base can be suppressed securely regardless of the magnitude of the mass imbalance of the disk, whereby vibration and noise from the balancer can be suppressed.

A spindle motor for a disk drive apparatus in accordance with the present invention from another point of view comprises a balancer having a plurality of arc-shaped tracks and balance members provided so as to be movable on the above-mentioned arc-shaped tracks, wherein said balancer is provided so as to be rotatable integrally with a spindle shaft.

Therefore, in accordance with the spindle motor for the disk drive apparatus of the present invention, the vibration of the sub-base can be suppressed securely regardless of the magnitude of the mass imbalance of the disk, whereby vibration and noise from the balancer can be suppressed.

A turntable for a disk drive apparatus in accordance with the present invention comprises a balancer having a plurality of arc-shaped tracks and balance members provided so as to be movable on the above-mentioned arc-shaped tracks, wherein a disk is mounted thereon and the above-mentioned disk is supported rotatably.

Therefore, in accordance with the spindle motor for the disk drive apparatus of the present invention, the vibration of the sub-base can be suppressed securely regardless of the magnitude of the mass imbalance of the disk, whereby vibration and noise from the balancer can be suppressed.

In order to solve the above-mentioned problems, the disk drive apparatus of the present invention relates to a turntable and a clamper used as means for holding a disk and rotating it integrally; and concrete means thereof are described below.

A disk drive apparatus in accordance with the present invention comprises disk support means for supporting at least one side of the above-mentioned disk by using four or more projections, wherein the tips of the above-mentioned projections are substantially on the same plane.

Therefore, in accordance with the disk drive apparatus of the present invention, the disk can be held securely; and in the case when the disk is rotated at high speed, vibration and noise due to the imbalance, such as a face deflection, of the disk can be reduced, whereby it is possible to attain a disk drive apparatus capable of carrying out high-rate data transfer.

A disk drive apparatus in accordance with the present invention from another point of view comprises:

a turntable on which a disk is mounted; and a clamper having four or more projections, the tips of which are substantially on the same plane, wherein the above-mentioned disk is held between the above-mentioned projections and the above-mentioned turntable.

Therefore, in accordance with the disk drive apparatus of the present invention, the disk can be held securely by using the clamper; and in the case when the disk is rotated at high speed, vibration and noise due to the imbalance, such as a face deflection, of the disk can be reduced, whereby stable recording/reproduction can be attained, and it is possible to attain a disk drive apparatus capable of carrying out high-rate data transfer.

A disk drive apparatus in accordance with the present invention from another point of view comprises:

a turntable for supporting a disk by using four or more projections, the tips of which are substantially on the same plane; and a clamper used with the above-mentioned turntable to hold the above-mentioned disk therebetween.

Therefore, in accordance with the disk drive apparatus of the present invention, the disk can be held securely by using the turntable, and vibration and noise in the case when the disk is rotated at high speed can be reduced.

A disk drive apparatus in accordance with the present invention from another point of view comprises:

a turntable for supporting a disk by using four or more projections, the tips of which are substantially on the same plane; and a clamper having four or more projections and holding the above-mentioned disk between the projections and the projections of the above-mentioned turntable.

Therefore, in accordance with the disk drive apparatus of the present invention, the disk can be held securely between the turntable and the clamper, and vibration and noise in the case when the disk is rotated at high speed can be reduced.

In the disk drive apparatus of the present invention, in addition to the means of the above-mentioned disk drive apparatus, the projections of the above-mentioned turntable and the projections of the above-mentioned clamper may be provided so as to be opposite to each other.

Therefore, in accordance with the disk drive apparatus of the present invention, the disk can be held more securely between the turntable and the clamper, and vibration and noise in the case when the disk is rotated at high speed can be reduced.

A disk drive apparatus of the present invention, in addition to the means of the above-mentioned disk drive apparatus, may comprise:

a sub-base to which a disk rotation drive motor is secured;

a main base over which the above-mentioned sub-base is installed via elastic bodies; and a balancer having a ring-shaped track portion accommodating plural spherical bodies therein and provided so as to be rotatable integrally with a disk.

Therefore, in accordance with the disk drive apparatus of the present invention, the balls of the balancer can be stabilized, whereby imbalance due to the eccentricity of the disk at the time of rotation can be reduced securely.

In the disk drive apparatus of the present invention, the above-mentioned projections may be disposed on a circumference being coaxial with the rotation center of a disk.

In the disk drive apparatus of the present invention, the above-mentioned projections may be disposed on circumferences having different diameters and being coaxial with the rotation center of a disk.

Therefore, in accordance with the disk drive apparatus of the present invention, vibration and noise in the case when the disk being held is rotated at high speed can be reduced further.

A disk drive apparatus in accordance with the present invention from another point of view comprises:

a turntable provided with an elastic body on a face thereof on which a disk used as a recording medium is mounted; and a clamper having four or more projections, the tips of which are substantially on the same plane, and holding the above-mentioned disk between the above-mentioned projections and the above-mentioned turntable.

Therefore, in accordance with the disk drive apparatus of the present invention, the unevenness on the disk mounting face of the turntable can be improved easily, and vibration and noise in the case when the disk is rotated at high speed can be reduced.

A disk drive apparatus in accordance with the present invention from another point of view comprises:

a turntable for supporting a disk by using four or more projections, the tips of which are substantially on the same plane; and a clamper provided with an elastic body on a face thereof for holding the above-mentioned disk to hold the above-mentioned disk between the above-mentioned elastic body and the above-mentioned turntable.

Therefore, in accordance with the disk drive apparatus of the present invention, the unevenness on the disk holding face of the clamper can be improved easily, and vibration and noise in the case when the disk is rotated at high speed can be reduced.

A disk drive apparatus in accordance with the present invention from another point of view comprises:

a turntable provided with an elastic body on a face thereof on which a disk used as a recording medium is mounted; and a clamper provided with an elastic body on a face thereof for holding the above-mentioned disk to hold the above-mentioned disk between the above-mentioned elastic body and the above-mentioned turntable.

Therefore, in accordance with the disk drive apparatus of the present invention, the unevenness on the disk mounting face of the turntable and the disk holding face of the clamper can be improved easily, and vibration and noise in the case when the disk is rotated at high speed can be reduced.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

BEST MODE FOR CARRYING OUT THE INVENTION

First Embodiment

A disk drive apparatus in accordance with a first embodiment of the present invention will be described below referring to the accompanying drawings.

Figure 1:
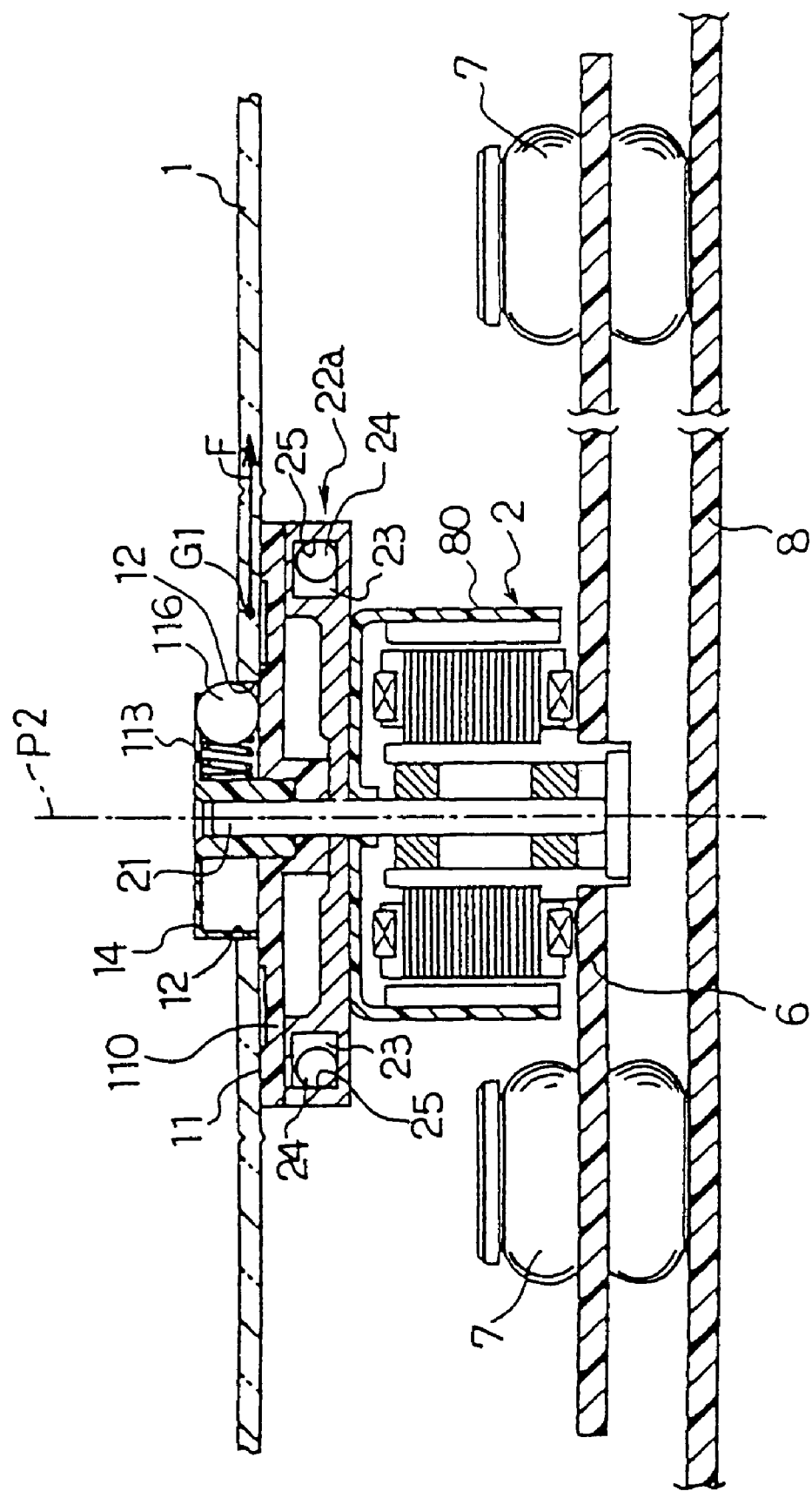
FIG. 1 is a side sectional view showing the vicinity of the spindle motor 2 of the disk drive apparatus in accordance with the first embodiment of the present invention.
Figure 2:
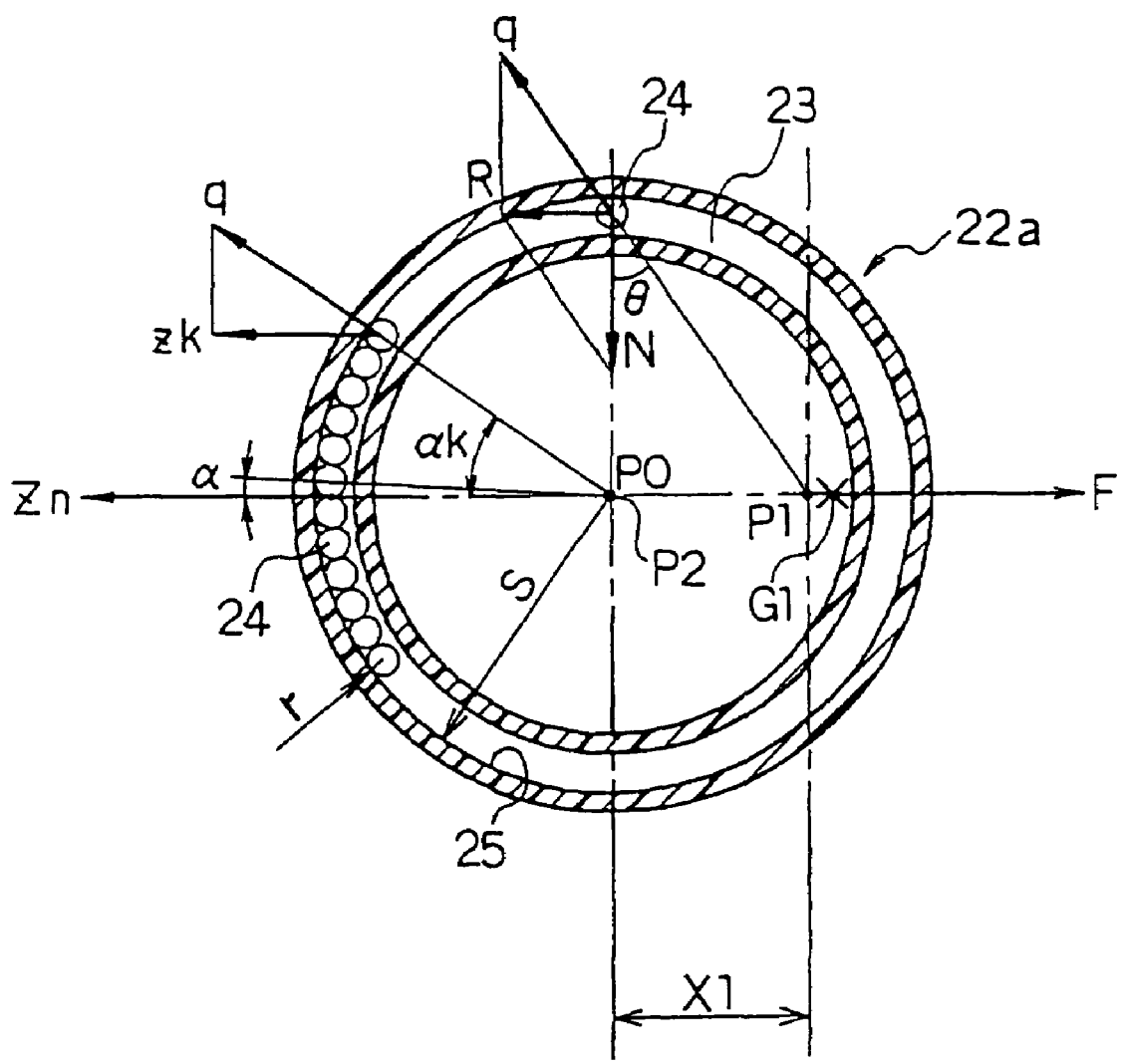
FIG. 2 is a plan sectional view showing only the spherical body balancer 22a provided integrally with the rotor 80 of the disk drive apparatus in accordance with the first embodiment of FIG. 1.
Figure 3:
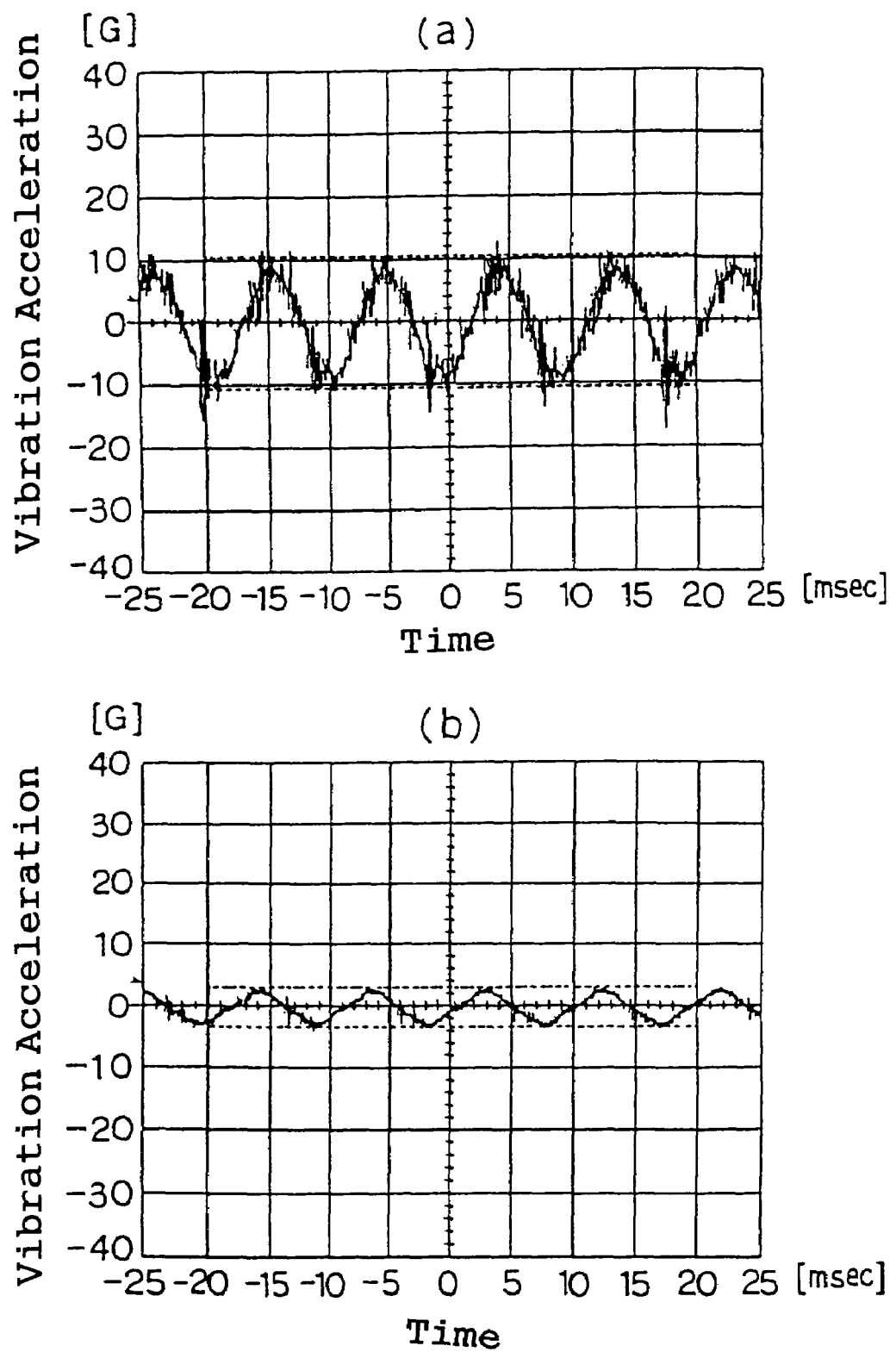
FIG. 3 is a graph showing the measured values of the vibration acceleration of a sub-base 6 in order to show the effects of the first embodiment of the present invention.

FIG. 1 is a side sectional view showing the vicinity of the spindle motor 2 of the disk drive apparatus in accordance with the first embodiment of the present invention. FIG. 2 is a plan sectional view showing only the hollow ring-shaped portion 23 used as a ring-shaped track portion provided so as to be rotatable integrally with the rotor 80 of the first embodiment of the present invention. FIG. 3 shows the measured values of the vibration acceleration of a sub-base 6 in order to show the effects of the disk drive apparatus of the first embodiment of the present invention.

Figure 72:
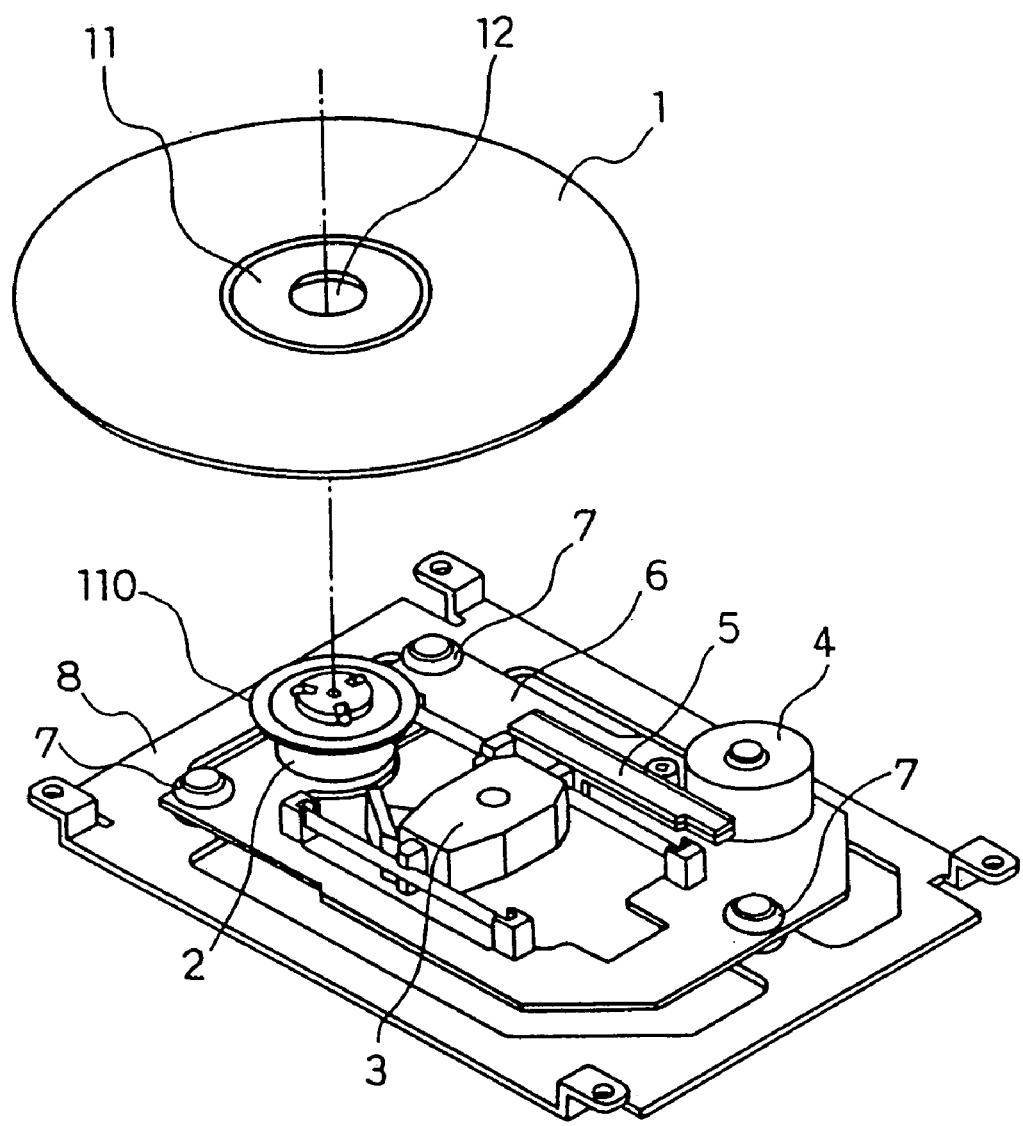
FIG. 72 is a perspective view showing the conventional disk drive apparatus.

In the disk drive apparatus of the first embodiment, the disk 1 mounted on a turntable 110 is configured so as to be rotated by the spindle motor 2, and a head (not shown) is used to read data or write data. In addition, in the disk drive apparatus of the first embodiment, a head drive mechanism comprising a rack, a pinion and the like, which converts a rotation motion into a linear motion, and a head drive motor are provided as shown in the above-mentioned FIG. 72. The head is configured so as to be moved in the radial direction of the disk 1 by this head drive mechanism. The spindle motor 2, the head drive motor, the head drive mechanism and the like are mounted on the sub-base 6. Vibration and impact transmitted from outside the device to the sub-base 6 are dampened by insulators 7 (elastic bodies). The sub-base 6 is mounted on a main base 8 via these insulators 7. The main unit of the disk drive apparatus shown in FIG. 1 is configured so as to be built in a computer or the like via a frame (not shown) installed on the main base 8.

In FIG. 1, the turntable 110 is secured to the shaft 21 of the spindle motor 2 and rotatably supports the clamp area 11 of the disk 1. Inside the boss 14 formed on the turntable 110, a positioning ball 116 making contact with the corner portion of the clamp hole 12 of the disk 1 by virtue of a pressing means 113, such as a coil spring, is built in. In this way, the disk 1 is securely disposed at a predetermined position on the turntable 110 by the pressing operation of the positioning ball 116.

As described above, in the disk drive apparatus of the first embodiment, the disk 1 on the turntable 110 is pressed and secured by the positioning ball 116, thereby being configured so as to be rotated coaxially together with the rotor 80 of the spindle motor 2.

As shown in FIG. 1, the disk drive apparatus of the first embodiment comprises a spherical body balancer 22a rotatable integrally with the rotor 80 of the spindle motor 2. FIG. 2 is a plan sectional view showing only the spherical body balancer 22a.

As shown in FIGS. 1 and 2, the spherical body balancer 22a of the first embodiment comprises a hollow ring-shaped portion 23 used as a ring-shaped track portion having a ring-shaped passage provided coaxially with the spindle shaft 21 of the spindle motor 2, and a plurality of spherical bodies 24 movably accommodated inside the passage of the hollow ring-shaped portion 23.

Figure 73:
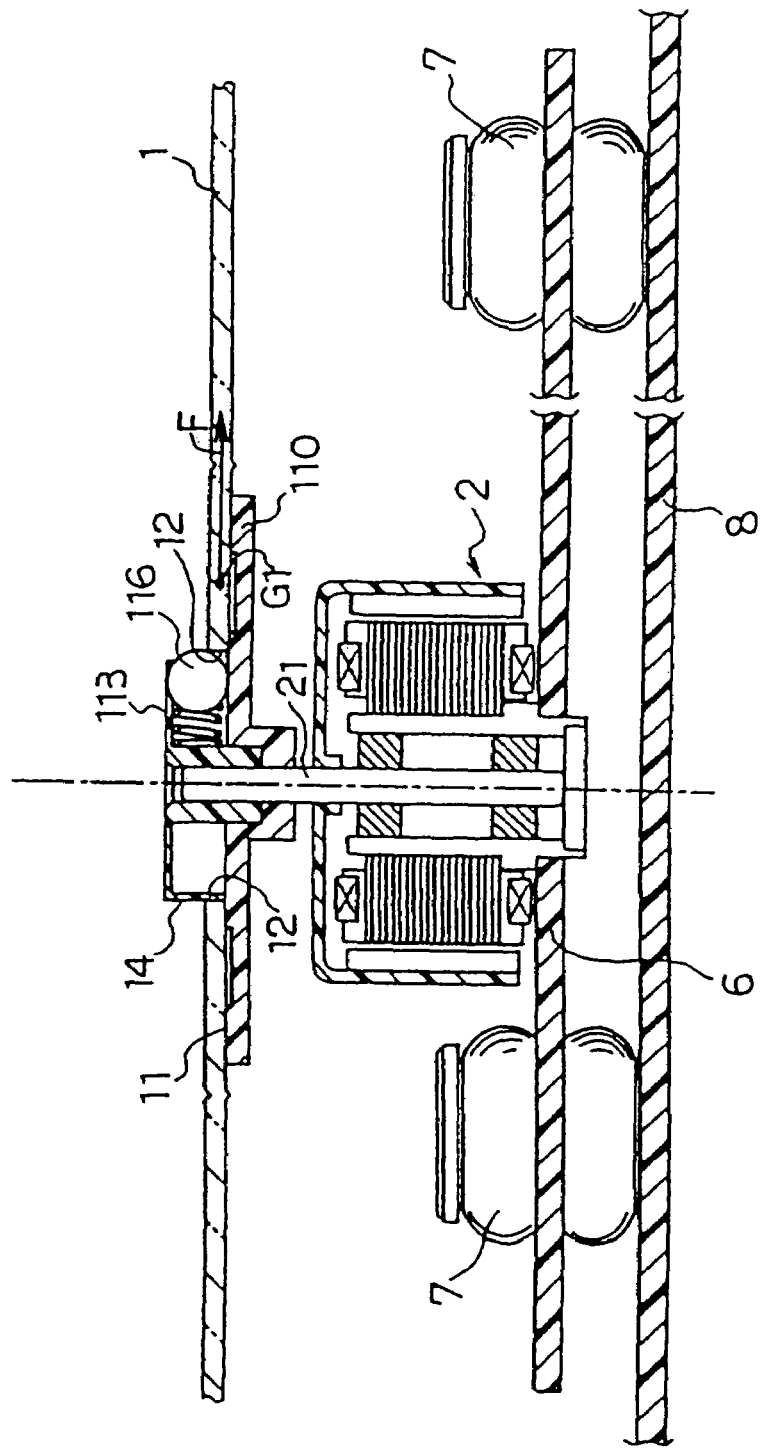
FIG. 73 is a side sectional view showing the vicinity of the spindle motor 502 of the conventional disk drive apparatus.

As described above, in the condition wherein the disk 1 is clamped on the turntable 110 by the positioning ball 116, by making the positioning ball 116 contact with the corner portion of the clamp hole 12, the disk 1 is positioned and disposed at the predetermined position, and held on the turntable 110 by the pressing force of the coil spring used as the pressing means 113, just as in the case of the conventional disk drive apparatus shown in the above-mentioned FIG. 73. The disk 1 held in this way is rotated integrally with the turntable 110, the rotor 80 and the spherical body balancer 22a by the spindle motor 2.

Furthermore, the disk drive apparatus of the first embodiment uses the insulators (elastic bodies) 7 having low rigidity to connect the sub-base 6 to the main base 8. In the disk drive apparatus of the first embodiment, the primary resonance frequency of the mechanical vibration of the sub-base 6 due to the deformation of the insulators 7, having the direction parallel to the recording face of the disk 1, is set lower than the rotation frequency of the disk 1. More specifically, in the first embodiment, the rotation frequency of the disk 1 is set at about 100 Hz, and both the primary resonance frequency of the vibration of the sub-base 6 in the direction (access direction) wherein the head is driven by the head drive mechanism and the primary resonance frequency of the vibration of the sub-base 6 in the direction perpendicular thereto are set at about 60 Hz.

In the disk drive apparatus of the first embodiment of the present invention configured as described above, operation in the case when the disk 1 having a large mass imbalance amount is rotated at 100 Hz will be described referring to FIGS. 1 and 2.

First, a centrifugal force F (referred to as an imbalance force) acts on the center of gravity G1 of the disk 1, and the direction of the action rotates as the disk 1 rotates. This imbalance force F deforms the insulators 7, and the sub-base 6 and the whole of the components mounted on the sub-base 6 whirl at the rotation frequency of the disk 1. In the first embodiment, the primary resonance frequency (about 60 Hz) of the sub-base 6 due to the deformation of the insulators 7 is set lower than the rotation frequency (about 100 Hz) of the disk 1. Therefore, the displacement direction of the sub-base 6 and the action direction of the imbalance force F are nearly opposite to each other at all times.

Therefore, as shown in FIG. 2, the whirling center axis P1 of the disk 1 rotating on the sub-base 6 is disposed between the center of gravity G1 of the disk 1 on which the imbalance force F acts and the rotation center axis P0 of the spindle motor.

In the above-mentioned condition, since the hollow ring-shaped portion 23 integrally provided with the rotor 80 is positioned so as to be coaxial with the rotation center axis P0 of the spindle motor 2, the center of the hollow ring-shaped portion 23, i.e., the center P2 of the inner wall face 25 of the outer periphery thereof, coincides with the rotation center axis P0 of the spindle motor 2. Therefore, the hollow ring-shaped portion 23 carries out whirling operation around the whirling center axis P1.

During this whirling operation, a centrifugal force q acts on the spherical body 24 (a spherical body positioned at the upper portion in FIG. 2, for example) accommodated in the hollow ring-shaped portion 23 in the direction of connecting the whirling center axis P1 to the center of gravity of the spherical body 24. In addition, since the movement of the spherical body 24 is restricted by the inner wall face 25 of the outer periphery of the hollow ring-shaped portion 23, a reaction N from the inner wall face 25 of the outer periphery acts on the spherical body 24. This reaction N from the inner wall face 25 of the outer periphery acts toward the center P2 of the inner wall face 25 of the outer periphery. Therefore, a movement force R, i.e., the resultant force of the centrifugal force q and the reaction N, acts on the spherical body 24 in the direction of the tangent of the circle centered at the center P2 of the inner wall face 25 of the outer periphery, passing through the center of gravity of the spherical body 24, and being away from the whirling center axis P1. By this movement force R, the spherical body 24 is moved along the inner wall face 25 of the outer periphery, that is, is moved in the direction nearly opposite to the center of gravity G1 of the disk 1 with respect to the whirling center axis P1, whereby the spherical body 24 and the other spherical bodies 24 gather together at the position nearly opposite to the center of gravity G1.

As a result, when the component of the centrifugal force q, acting on each of the spherical bodies 24 having gathered in the same direction of the imbalance force, is a balance force zk, the imbalance force F due to the rotation of the disk 1 is canceled by the resultant force Zn of these balance forces zk. As a result, the force acting on the sub-base 6 decreases. Therefore, the vibration of the sub-base 6 occurring in the case when an unbalanced disk 1 is rotated is suppressed securely.

In the first embodiment of the present invention, since the imbalance force F is canceled by the balance force Zn acting on the spherical bodies 24 having gathered as described above, the whirling radius X1 of the center P2 of the inner wall face 25 of the outer periphery around the center axis P1 becomes nearly zero, whereby the center P2 of the inner wall face 25 of the outer periphery and the whirling center axis P1 shown in FIG. 2 nearly coincide with each other.

As shown in FIG. 2, when the radius of the spherical body 24 is r [cm], the specific gravity thereof is $\rho$, the number of pieces thereof is n, the radius of the inner wall face 25 of the outer periphery of the hollow ring-shaped portion 23 is S [cm], and rotational angular velocity is $\omega$ [rad/sec], the centrifugal force q acting on each spherical body 24 is represented by:

$$q = \tfrac{4}{3}\pi r^3 \rho(S-r)\omega^2 \qquad (1).$$

At this time, when the line connecting the center of gravity G1 of the disk 1 to the center P2 of the inner wall face 25 of the outer periphery is defined as a reference line in FIG. 2, and the angle from the reference line of the spherical body 24 positioned first on the upper side of the reference line is $\alpha$ as shown in FIG. 2, it is represented by:

$$\alpha = \sin^{-1}\{r/(S-r)\} \qquad (2).$$

The angle $\alpha k$ between the reference line and the position of the spherical body 24 located at the kth position from the reference line is represented by:

$$\alpha k = (2k-1)\alpha \qquad (3).$$

And the balance force zk acting on the spherical body 24 located at the kth position from the reference line is represented by:

$$zk = q\cos(k) \qquad (4).$$

Therefore, when the number n of the spherical bodies is an even number, and $n=2v$, the resultant force Zn of the balance forces zk individually acting on the gathering spherical bodies 24 is represented by:

$$Zn = 2q\{\cos\alpha + \cos 3\alpha + \ldots + \cos(2v-1)\alpha\} \qquad (5).$$

When this expression is modified by using the above-mentioned expressions (2), (3) and (4):

$$Zn = q \times \tfrac{1}{2} \times \sin\{2v \sin^{-1}(r/S-r)\}/(r/S-r).$$

This expression is obtained. When the expression (1) is substituted into this expression, when v is replaced with n, and when the expression is arranged:

$$Zn = \tfrac{4}{3}\pi r_2 \rho(S-r)^2 \times \sin[n \sin^{-1}\{r/(S-r)\}]\omega^2.$$

This expression is obtained. When the ratio of the balance force Zn with respect to the square of the rotational angular velocity $\omega$ is a balance amount Z [gcm]:

$$Z = Zn/\omega^2.$$

This expression is obtained. As a result:

$$Z = \tfrac{4}{3}\pi r^2 \rho(S-r)^2 \times \sin[n \sin^{-1}\{r/(S-r)\}] \qquad (6).$$

This expression is obtained.

After all, an imbalance force in proportion to the product of the difference between the balance amount Z due to the spherical bodies 24 and the mass imbalance amount A of the disk 1, that is, the residual mass imbalance amount $|A-Z|$, and the square of the rotation frequency f [Hz] of the disk 1 acts on the sub-base 6. Therefore, the vibration of the sub-base 6 can be suppressed by making $f^2|A-Z|$ sufficiently small.

In the disk drive apparatus of the first embodiment of the present invention, h is used as a predetermined constant; the radius r [cm], the specific weight $\rho$ and the number of the spherical bodies 24, and the radius S [cm] of the inner wall face 25 of the outer periphery of the hollow ring-shaped portion 23 are set so that the balance amount Z represented by the expression (6) satisfies the following expression:

$$h \geq f^2 \times |A-Z| \qquad (7).$$

Herein, the constant h means the magnitude of $f^2 \times A$ at the time when the magnitude of the vibration of the sub-base 6 is limited to the maximum allowable amount wherein stable recording or reproduction can be attained. For example, the maximum mass imbalance amount A of a 12 cm diameter CD-ROM disk is about 1 gcm; in the conventional disk drive apparatus, when a disk having a mass imbalance amount A of 1 gcm is rotated, the limit rotation frequency thereof is about 90 Hz; when the disk was rotated at 100 Hz or more, stable reproduction was unable to be carried out, or noise increased to an undesirable level. In other words, in the case of a CD-ROM disk drive apparatus, the maximum allowable value hc represented by $f^2 \times A$ becomes:

$$hc = 90^2 \times 1 = 8100 \text{ gcm/sec}^2.$$

In the disk drive apparatus of the first embodiment of the present invention, in the case when a disk having a mass imbalance amount A of 1 gcm is rotated at 100 Hz or more for example, the following is obtained from the expression (7):

$$8100 \geq 100^2 \times (1-Z).$$

Eventually, the following is obtained:

$$Z \geq 0.19.$$

In other words, by setting the balance amount Z due to the spherical bodies 24 at 0.19 gcm or more, the vibration amount of the sub-base 6 can be suppressed to the allowable value or less even if a CD-ROM disk having a mass imbalance amount A of 1 gcm is rotated at 100 Hz. For this reason, by setting the radius r [cm], the specific weight $\rho$ and the number of the spherical bodies 24, and the radius S [cm] of the inner wall face 25 of the outer periphery of the hollow ring-shaped portion 23 on the basis of the expression (6) so that the balance amount Z due to the spherical bodies 24 is 0.19 gcm or more, it is possible to attain a disk drive apparatus having a sufficient vibration suppression effect even if a disk having a mass imbalance amount A of 1 gcm is rotated at 100 Hz.

The descriptions in the above-mentioned embodiment have been provided with respect to a 12 cm diameter CD-ROM disk; however, even when any 12 cm diameter disk is used as a general recording medium, by setting the balance amount Z so that the maximum allowable value hc is 8100 gcm/sec² or less, an excellent vibration suppression effect is obtained. Furthermore, even when a disk smaller than 12 cm in diameter is used, by setting the balance amount Z so that the maximum allowable value hc is 8100 gcm/sec$^2$ or less, a vibration suppression effect is obtained as a matter of course.

Moreover, according to the expression (7), in the case when the rotation frequency of the disk 1 is raised to 120 Hz, the balance amount Z of the spherical bodies 24 becomes:

$$Z \geq 0.43.$$

Therefore, the radius r [cm], the specific weight ρ and the number of the spherical bodies 24, and the radius S [cm] of the inner wall face 25 of the outer periphery of the hollow ring-shaped portion 23 should only be set on the basis of the expression (6) so that the balance amount Z becomes 0.43 gcm or more.

Furthermore, a similar effect is obtained even when disks other than CD-ROM disks are used. For example, in the case of a disk having a maximum mass imbalance amount A of 2 gcm, a rotation frequency f0 is obtained wherein the magnitude of the vibration of the sub-base 6 is suppressed to the maximum allowable amount so that stable recording or reproduction can be attained while the rotation frequency of the disk is changed in a condition without mounting the spherical body balancer 22a. Then, the maximum allowable value h, f0$^2$×A, is calculated, and the necessary balance amount Z due to the spherical bodies 24 at a target rotation frequency f (>f0) is obtained from the expression (7). In the end, by setting the radius r [cm], the specific weight ρ and the number of the spherical bodies 24, and the radius S [cm] of the inner wall face 25 of the outer periphery of the hollow ring-shaped portion 23 so that the necessary balance amount Z can be obtained from the expression (6), it is possible to attain a disk drive apparatus capable of carrying out stable recording or reproduction even if a disk having a mass imbalance amount A of 2 gcm is rotated at the target rotation frequency f.

Furthermore, in the first embodiment of the present invention, the radius r [cm] and the number of the spherical bodies 24, and the radius S [cm] of the inner wall face 25 of the outer periphery of the hollow ring-shaped portion 23 are set to satisfy the following expression.

$$r/(S-r) \leq \sin\{\pi/(2n)\} \quad (8).$$

This is used to optimize the number of the spherical bodies 24. By modifying the expression (8):

$$n \leq \pi/2/\sin^{-1}\{r/(S-r)\} \quad (9).$$

This expression is obtained.

This means that the maximum value of the number n of the spherical bodies 24 is represented by the expression (9) in the case when the radius r [cm] of the spherical bodies 24 and the radius S [cm] of the inner wall face 25 of the outer periphery of the hollow ring-shaped portion 23 have been determined.

Furthermore, the magnitude of the balance amount Z due to the spherical bodies 24 can be obtained from the above-mentioned expression (6). From the expression (6), the maximum value Zmax of the balance amount Z is represented by:

$$Zmax = \tfrac{4}{3}\pi r^2 \rho (S-r)^2 \quad (11),$$

at the time when $$n \sin^{-1}\{r/(S-r)\} = \pi/2, \text{ that is,}$$

$$n = \pi/2/\sin^{-1}\{r/(S-r)\} \quad (10).$$

The expression (6) shows that the balance amount Z becomes smaller than Zmax represented by the expression (11) when the number n of the spherical bodies 24 is made larger than the value calculated by the expression (10). In other words, it is desirable that the number n of the spherical bodies 24 should be set at a value satisfying the expression (9). By this setting, it is possible to prevent the number n of the spherical bodies 24 from being set more than necessary in the case when the radius r [cm] of the spherical bodies 24 and the radius S [cm] of the inner wall face 25 of the outer periphery of the hollow ring-shaped portion 23 have been determined, whereby a necessary balance amount Z can be obtained by using an optimum number of pieces.

In the first embodiment, the primary resonance frequency in the direction parallel to the recording face of the disk 1 in the mechanical vibration of the sub-base 6 due to the deformation of the insulators 7 is set lower than the rotation frequency of the disk 1. This is done so that the direction of the vibration displacement due to the imbalance force F is set nearly opposite to the action direction of the imbalance force F.

Generally, in a mechanical vibration system comprising a spring and a mass, the phase of the frequency of an external force acting on the mass near its resonance frequency begins to dislocate from the phase of the frequency of the displacement due to the external force. In addition, at a frequency sufficiently higher than the resonance frequency, the dislocation between the phases becomes an electrical angle of about 180 degrees, whereby the action direction of the external force becomes opposite to the direction of the displacement. In other words, by setting the resonance frequency of the sub-base 6 at a frequency lower than the rotation frequency of the disk 1, wherein the direction of the vibration displacement due to the imbalance force F becomes nearly opposite to the action direction of the imbalance force F, the spherical bodies 24 gather at the positions nearly opposite to the center of gravity G1 of the disk 1 as described above. In addition, when the component of the centrifugal force q, acting on each of the spherical bodies 24 in the same direction of the imbalance force F, is a balance force zk, the action direction of the resultant force Zn of the balance forces zk becomes nearly opposite to the action direction of the imbalance force. Therefore, it is desirable that the resonance frequency of the sub-base 6 should be set in consideration of the direction of the vibration displacement due to the imbalance force F at the rotation frequency of the disk 1.

FIG. 3 shows the measured values of the vibration acceleration of the sub-base 6, and shows the results of an experiment for examining effects by the disk drive apparatus of the first embodiment using a disk 1 having a mass imbalance amount A of about 1 gcm. In this experiment, an ACCELEROMETER, MODEL 2250A-10 made by ENDEVCO (California, USA) was used as an acceleration sensor, and an ISOTRON AMPLIFIER, MODEL 102 made by ENDEVCO was used as an amplifier for the acceleration sensor.

In this experiment, the vibration acceleration of the sub-base 6 was measured when the disk 1 was rotated at about 100 Hz. (a) of FIG. 3 corresponds to the case of the conventional disk drive apparatus with no spherical body balancer. As shown in (a) of FIG. 3, vibration occurs at an acceleration of about 8 G at the maximum in the conventional disk drive apparatus. (b) of FIG. 3 corresponds to the case of the disk drive apparatus of the first embodiment of the present invention, and the vibration acceleration thereof is suppressed to about 3 G.

As described above, in the disk drive apparatus of the first embodiment, the vibration acceleration is suppressed drastically; therefore, the side pressure caused by the imbalance force F and applied to the bearings of the spindle motor 2 decreases, thereby solving the problems of increased loss of the shaft torque, damaged bearings and shorter service lives of the bearings.

As described above, thanks to the configuration of the disk drive apparatus of the first embodiment, the vibration of the sub-base 6 can be suppressed securely regardless of the mass imbalance amount A of the mounted disk 1 and the rotation frequency of the disk 1. Therefore, the disk drive apparatus of the first embodiment can carry out stable recording or reproduction even if a disk 1 having a large imbalance is rotated at high speed, whereby a disk drive apparatus capable of rotating at high speed can be attained.

Second Embodiment

Figure 4:
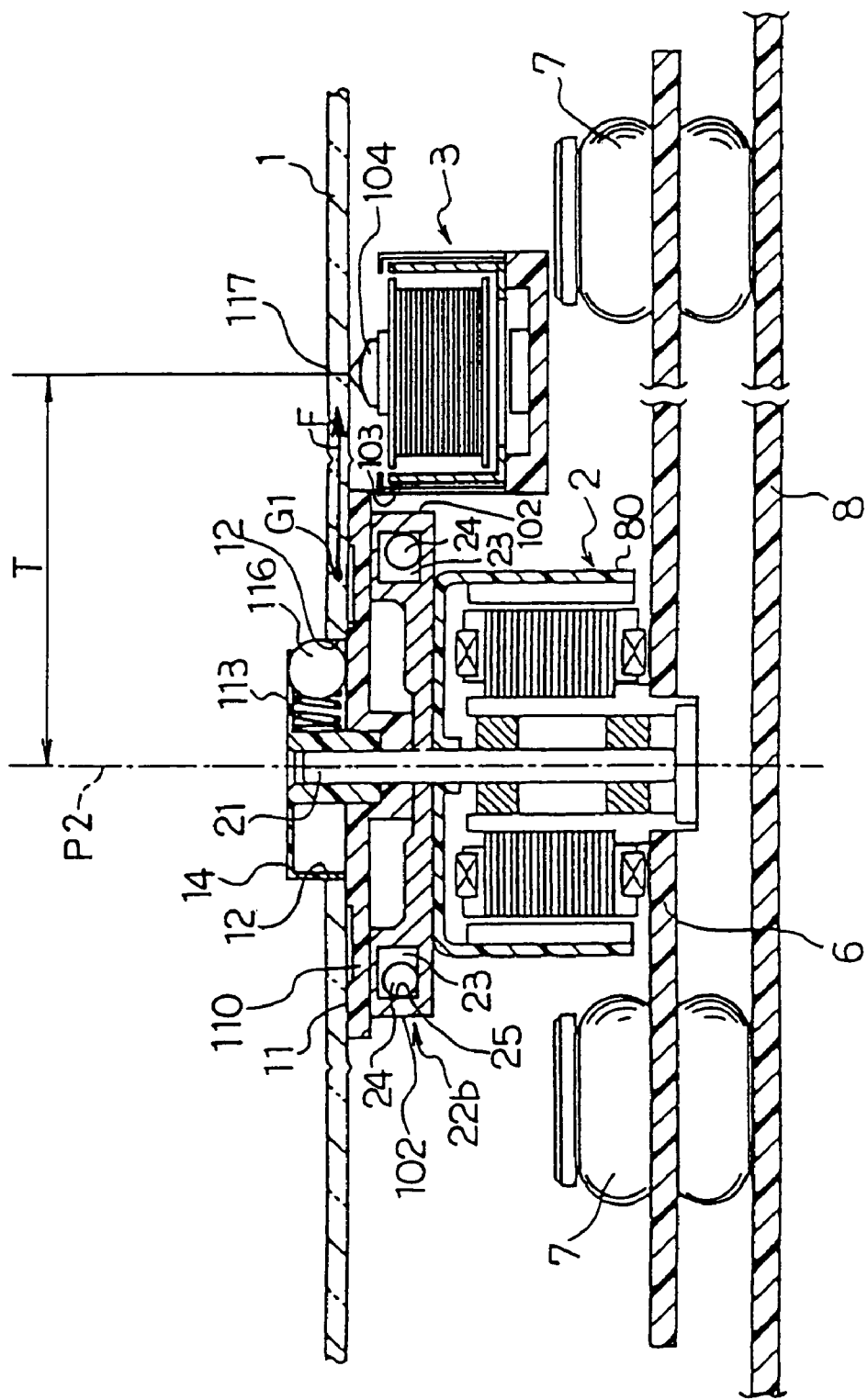
FIG. 4 is a side sectional view showing the vicinity of the spindle motor 2 of the disk drive apparatus in accordance with the second embodiment of the present invention.

Next, a disk drive apparatus in accordance with a second embodiment of the present invention will be described referring to the drawings. FIG. 4 is a side sectional view showing the vicinity of the spindle motor 2 of the disk drive apparatus in accordance with the second embodiment of the present invention. The elements substantially identical to those used for the disk drive apparatus of the first embodiment shown in the above-mentioned FIG. 1 are represented by the same numeral codes, and the descriptions for the preceding embodiment are applied, thereby omitting overlap descriptions.

The disk drive apparatus of the second embodiment of the present invention has a hollow ring-shaped portion 23, used as a ring-shaped track portion and having a ring-shaped passage accommodating spherical bodies 24 therein, just as in the case of the first embodiment. In the disk drive apparatus of the second embodiment, when the recording face of the disk 1 held on the turntable 110 is assumed to be a reference face, a spherical body balancer 22b provided rotatably and integrally with the rotor 80 is disposed on the same side of the head 3 with respect to this reference face.

As shown in FIG. 4, the radius of the outer wall face 102 of the outer periphery of the hollow ring-shaped portion 23 in the second embodiment is set smaller than the radius of the end face 103 of the inner peripheral side of the head 3 when the head 3 is positioned at the innermost track 117. The other configurations are the same as those of the above-mentioned first embodiment.

In the disk drive apparatus of the second embodiment configured as described above, the action of the spherical body balancer 22b is similar to that of the spherical body balancer 22a of the above-mentioned first embodiment, and the vibration of the sub-base 6 due to the mass imbalance of the disk 1 is suppressed securely by the above-mentioned configurations.

Furthermore, in the disk drive apparatus of the second embodiment of the present invention, when the recording face of the disk 1 held on the turntable 110 is assumed to be the reference face, the spherical body balancer 22b is disposed on the same side of the head 3 with respect to this reference face; therefore, the spherical body balancer 22b does not occupy any space above the disk 1, whereby the device can be made lower in profile.

Moreover, the radius of the outer wall face 102 of the outer periphery of the hollow ring-shaped portion 23 is set smaller than the radius of the end face 103 of the inner peripheral side of the head 3 when the head 3 is positioned at the innermost track 117, whereby the spherical body balancer 22b can be disposed in parallel with the head 3. Therefore, when the recording face of the disk 1 is assumed to be the reference face, the spherical body balancer 22b does not occupy any new space even in the space on the same side of the head 3 with respect to this reference face, whereby the device can be made lower in profile even if the spherical body balancer 22b is mounted.

In the disk drive apparatus of the second embodiment of the present invention, the radius S of the inner wall face 25 of the outer periphery of the hollow ring-shaped portion 23 is required to be made smaller; however, a sufficient vibration suppression effect can be obtained by setting the radius r [cm], the specific weight $\rho$ and the number of the spherical bodies 24, and the radius S [cm] of the inner wall face 25 of the outer periphery of the hollow ring-shaped portion 23 so as to satisfy the above-mentioned expressions (6), (7) and (8), just as in the case of the above-mentioned first embodiment. For example, in the case of a CD-ROM disk, the radius of its innermost track 117 is 2.3 cm, and the mass imbalance amount A of a 12 cm diameter CD-ROM disk is about 1 gcm at the maximum. As described above, in the conventional disk drive apparatus, when a disk having a mass imbalance amount A of 1 gcm is rotated, the limit rotation frequency thereof is about 90 Hz. Therefore, in the case of a CD-ROM disk drive apparatus, the maximum allowable value hc represented by $f^2 \times A$ becomes:

$$hc = 90^2 \times 1 = 8100 \text{ gcm/sec}^2.$$

In the case when a disk having a mass imbalance amount A of 1 gcm is rotated at 120 Hz or more for example even in the disk drive apparatus of the second embodiment of the present invention, the following is obtained from the expression (7):

$$8100 \geq 120^2 \times (1-Z).$$

Eventually, the following is obtained:

$$Z \geq 0.43.$$

In other words, by setting the balance amount Z due to the spherical bodies 24 at 0.43 gcm or more, the vibration amount of the sub-base 6 can be suppressed to the allowable value or less even if a CD-ROM disk having a mass imbalance amount A of 1 gcm is rotated at 120 Hz.

The distance from the center of the lens 104 of the head for reproduction on a CD-ROM disk to the end face 103 of the inner peripheral side of the head 3 is generally about 0.7 cm, and the clearance between the end face 103 of the inner peripheral side of the head 3 and the outer wall face 102 of the outer periphery of the hollow ring-shaped portion 23 is 0.1 cm. Furthermore, in the case when the outer peripheral wall of the hollow ring-shaped portion 23 is formed of a resin material, and when its thickness is set at 0.1 cm, the radius S [cm] the inner wall face 25 of the outer periphery of the hollow ring–shaped portion 23 is represented by:

$$S = 2.3 - 0.7 - 0.1 - 0.1 = 1.4 \text{ cm}.$$

When the head 3 is positioned at the innermost track 117, the distance from the center of the lens 104 of the head 3 to the center of the shaft of the spindle motor 2 is 2.3 cm.

In the second embodiment, when the spherical body 24 is formed of a steel ball having a specific weight $\rho$ of about 7.8 and a radius r [cm] of 0.1 cm, the maximum number n of the spherical bodies 24 is obtained from the expression (9), a modified expression of the above-mentioned expression (8), as follows:

$$n \leq 20 \text{ pieces},$$

from $n \leq \pi/2/\sin^{-1}\{0.1/(1.4-0.1)\}$. In the case when the maximum number of the spherical bodies 24 is 20, and when the radius r=0.1 cm, the specific weight ρ=7.8, n=13 and S=1.4 cm are substituted in the expression (6):

$$Z=0.55 \text{ gcm},$$

is obtained, and when the number n of the spherical bodies 24 is set the maximum value of 20, the balance amount Z due to the spherical bodies 24 satisfies the necessary value of 0.43 gcm or more.

Furthermore, a balance amount in the case when the number of the spherical bodies 24 is decreased is obtained by using the expression (6); when the number n is decreased to 12, the balance amount Z becomes 0.44 gcm. Therefore, by using the spherical bodies 24 formed of steel balls having a radius r [cm] of 0.1 cm and by setting the number n of the spherical bodies 24 in the range of 12 to 20, it is possible to attain a low-profile disk drive apparatus having a sufficient vibration suppression effect even if a disk having a mass imbalance amount A of 1 gcm is rotated at 120 Hz.

As described above, thanks to the configuration of the disk drive apparatus of the second embodiment, the vibration of the sub-base 6 can be suppressed securely without making the device thicker even in the case when the mass imbalance amount A of the mounted disk 1 is large. Therefore, the disk drive apparatus of the second embodiment can carry out stable recording or reproduction even if a disk 1 having a large mass imbalance is rotated at high speed, whereby it is possible to attain a disk drive apparatus being low in profile and capable of rotating at high speed.

Third Embodiment

Figure 5:
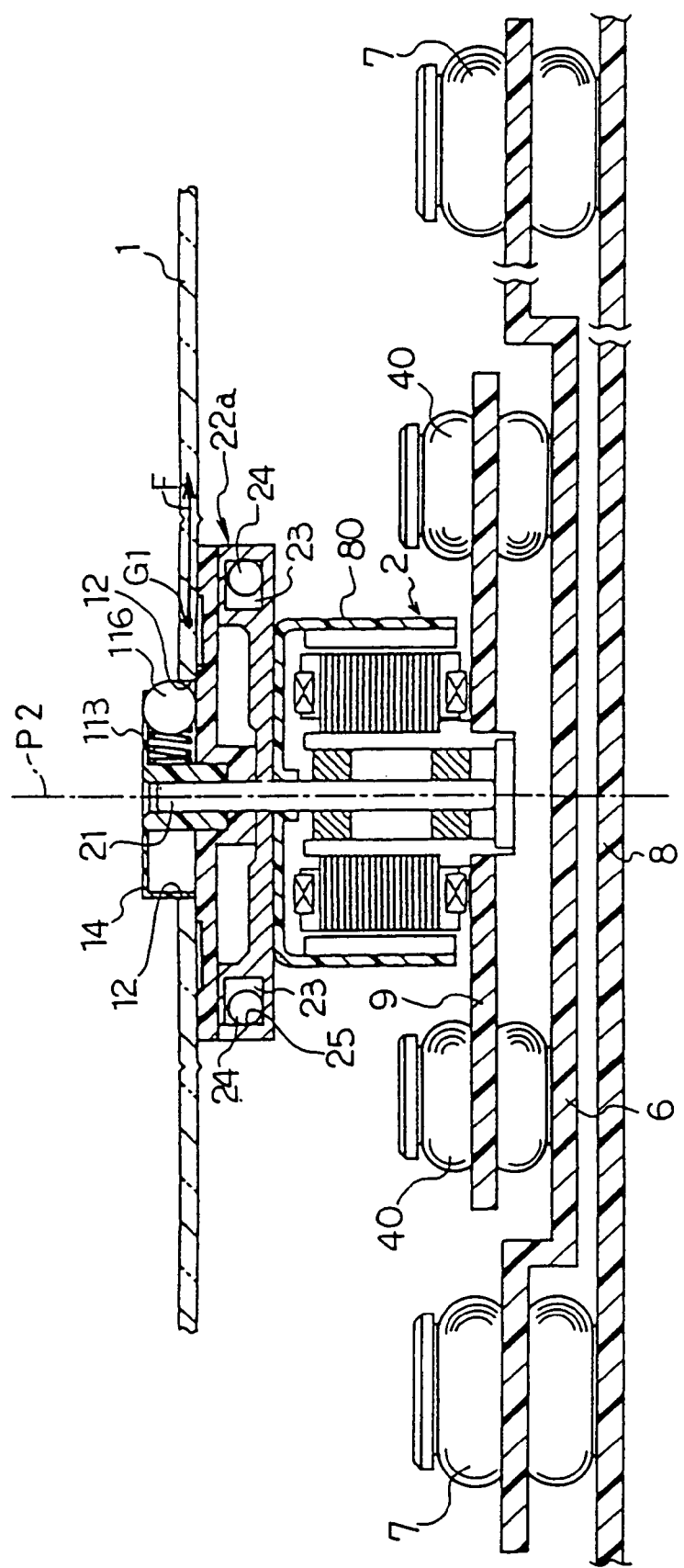
FIG. 5 is a side sectional view showing the vicinity of the spindle motor 2 of the disk drive apparatus in accordance with the third embodiment of the present invention.

Next, a disk drive apparatus in accordance with a third embodiment of the present invention will be described referring to the drawings. FIG. 5 is a side sectional view showing the vicinity of the spindle motor 2 of the disk drive apparatus in accordance with the third embodiment of the present invention. The elements substantially identical to those used for the disk drive apparatuses of the above-mentioned first and second embodiments are represented by the same numeral codes, and the descriptions for the preceding embodiments are applied, thereby omitting overlap descriptions.

In the disk drive apparatus of the third embodiment of the present invention, as shown in FIG. 5, just as in the case of the above-mentioned first embodiment, a spherical body balancer 22a is formed so as to be rotatable integrally with the rotor 80 of the spindle motor 2. The spherical body balancer 22a comprises a hollow ring-shaped portion 23 used as a ring-shaped track portion having a ring-shaped passage provided coaxially with the spindle shaft 21 of the spindle motor 2, and a plurality of spherical bodies 24 movably accommodated inside the passage of the hollow ring-shaped portion 23.

Furthermore, referring to FIG. 5, in the disk drive apparatus of the third embodiment, the disk 1 on the turntable 110 is pressed and secured by the positioning ball 116, thereby being configured so as to be rotated by the spindle motor 2. In this disk drive apparatus, a head (not shown) is used to read data recorded on the disk 1 or to write data on the disk 1. A motor base 9 to which the spindle motor 2 is secured is mounted on the sub-base 6 via elastic bodies 40. In addition, the head drive motor, the head drive mechanism and the like are mounted on the sub-base 6.

As shown in FIG. 5, the sub-base 6 is mounted on the main base 8 via the insulators 7, and vibration and impact transmitted from outside the device to the sub-base 6 are dampened by the insulators 7. The main unit of the disk drive apparatus shown in FIG. 5 is configured so as to be built in a computer or the like via a frame (not shown) installed on the main base 8.

The disk drive apparatus of the third embodiment uses the elastic bodies 40 having low rigidity to connect the motor base 9 to the sub-base 6. In the disk drive apparatus of the third embodiment, the primary resonance frequency of the mechanical vibration of the motor base 9 due to the deformation of the elastic bodies 40, in the direction parallel to the recording face of the disk 1, is set lower than the rotation frequency of the disk 1. More specifically, the rotation frequency of the disk 1 is about 100 Hz. In addition, both the primary resonance frequency of the vibration of the motor base 9 in the direction (tracking direction) wherein the head is driven by the head drive mechanism and the primary resonance frequency of the vibration of the motor base 9 in the direction perpendicular thereto are set at about 60 Hz.

In the disk drive apparatus of the third embodiment of the present invention configured as described above, operation in the case when the disk 1 having a large mass imbalance amount A is rotated at 100 Hz will be described referring to the above-mentioned FIGS. 2 and 5.

First, a centrifugal force F (referred to as an imbalance force) acts on the disk 1 at the center of gravity G1 thereof, and the direction of the action rotates as the disk 1 rotates. By the imbalance force F, the elastic bodies 40 are deformed, and the motor base 9 as well as the spindle motor 2, the spherical body balancer 22a and the disk 1 mounted on the motor base 9 whirl at the rotation frequency of the disk 1. In the disk drive apparatus of the third embodiment, the resonance frequency (about 60 Hz) of the motor base 9 due to the deformation of the elastic bodies 40 is set lower than the rotation frequency (about 100 Hz) of the disk 1. Therefore, the displacement direction of the motor base 9 and the action direction of the imbalance force F are nearly opposite to each other at all times. In other words, the motor base 9 whirls in a phase nearly opposite to that of the imbalance force F. Therefore, just as in the case of the above-mentioned first embodiment shown in FIG. 2, the whirling center axis P1 of the disk 1 rotating on the motor base 9 is disposed between the center of gravity G1 of the disk 1 on which the imbalance force F acts and the rotation center axis P0 of the spindle motor.

In the above-mentioned condition, since the hollow ring-shaped portion 23 integrally provided with the rotor 80 is positioned so as to be coaxial with the rotation center axis P0 of the spindle motor 2, the center of the hollow ring-shaped portion 23, i.e., the center P2 of the inner wall face 25 of the outer periphery thereof, coincides with the position of the rotation center axis P0 of the spindle motor 2. Therefore, the hollow ring-shaped portion 23 carries out whirling operation around the whirling center axis P1.

At this time, a centrifugal force q acts on the spherical body 24 accommodated in the hollow ring-shaped portion 23 in the direction of connecting the whirling center axis P1 to the center of gravity of the spherical body 24. In addition, the movement of the spherical body 24 is restricted by the inner wall face 25 of the outer periphery of the hollow ring-shaped portion 23. Therefore, a reaction N from the inner wall face 25 of the outer periphery acts on the spherical body 24. This reaction N from the inner wall face 25 of the outer periphery acts toward the center P2 of the inner wall face 25 of the outer periphery. Therefore, a movement force R, i.e., the resultant force of the centrifugal force q and the reaction N, acts on the spherical body 24 in the direction of the tangent of the circle centered at the center P2 of the inner wall face 25 of the outer periphery, passing through the center of gravity of the spherical body 24, and being away from the whirling center axis P1. By this movement force R, the spherical body 24 is moved along the inner wall face 25 of the outer periphery, whereby the spherical bodies 24 gather in the direction nearly opposite to the center of gravity G1 of the disk 1 with respect to the whirling center axis P1.

As a result, when the component of the centrifugal force q, acting on each of the spherical bodies 24 having gathered in the same direction of the imbalance force F, is a balance force zk, the imbalance force F due to the rotation of the disk 1 is canceled by the resultant force Zn of the balance forces zk, whereby the force acting on the motor base 9 decreases. Therefore, even if the unbalanced disk 1 is rotated, the vibration of the motor base 9 is suppressed, whereby the vibration of the disk 1 mounted on the motor base 9 is also suppressed. In addition, the vibration transmitted to the sub-base 6 connected to the motor base 9 via the elastic bodies 40 is reduced, and the vibration of the head 3 mounted on the sub-base 6 is also suppressed.

In the above-mentioned first embodiment, by setting the resonance frequency (about 60 Hz) of the sub-base 6 due to the deformation of the insulators 7 lower than the rotation frequency (about 100 Hz) of the disk 1, it is attained that the hollow ring-shaped portion 23 whirls in a phase nearly opposite to that of the imbalance force F. On the other hand, in the disk drive apparatus of the third embodiment of the present invention, by mounting the motor base 9 over the sub-base 6 via the elastic bodies 40 and by setting the resonance frequency (about 60 Hz) of the motor base 9 due to the deformation of the elastic bodies 40 lower than the rotation frequency (about 100 Hz) of the disk 1, it is attained that the hollow ring-shaped portion 23 whirls in a phase nearly opposite to that of the imbalance force F. With this configuration, just as in the case of the above-mentioned first embodiment, the spherical bodies 24 securely gather toward the position nearly opposite to the center of gravity G1 of the disk 1, whereby the mass imbalance of the disk 1 is securely canceled by the spherical bodies 24.

In order to raise the vibration suppression effect of the spherical body balancer of the present invention, it is desirable that the spherical bodies 24 gather accurately at position nearly opposite to the center of gravity G1 of the disk 1, that the action direction of the whirling of the hollow ring-shaped portion 23 and the action direction of the imbalance force F are nearly opposite to each other in phase as much as possible, and that the locus of the whirling of the center of the hollow ring-shaped portion 23 forms a condition of a nearly perfect circle. Therefore, in the third embodiment of the present invention, the elastic bodies 40 are newly provided to attain this optimum vibration condition. In addition, the third embodiment can easily attain a condition more optimal than the above-mentioned first embodiment wherein the insulators 7 are used both in attaining the above-mentioned vibration condition and in dampening the vibration and impact transmitted from outside the device to the sub-base 6. For example, by setting the shape of the motor base 9 so that the center of gravity of the whole of the motor base 9 and the spindle motor 2 mounted on the motor base 9 is disposed at the rotation center axis P0 of the spindle motor 2, and by disposing three or four elastic bodies 40 at equiangular pitches on the same radius from the rotation center axis P0, both the center of gravity of the whole of the components mounted on the whirling motor base 9 and the support center of the elastic bodies 40 can be positioned on the rotation center axis P0 of the spindle motor 2. Therefore, in accordance with the third embodiment, the locus of the whirling of the center of the hollow ring-shaped portion 23 can form a nearly perfect circle.

Furthermore, in the disk drive apparatus of the third embodiment, the rigidity of the elastic body 40 can be set easily at a desirable magnitude so that the whirling of the hollow ring-shaped portion 23 and the action direction of the imbalance force F are nearly opposite to each other in phase; and it is possible to carry out setting so that only the whirling vibration mode occurs by optimizing the rigidity of the elastic bodies 40 in the direction of the rotation center axis P0 and in the direction perpendicular thereto.

As described above, thanks to the configuration of the disk drive apparatus of the third embodiment, it is possible to easily attain the optimum vibration condition for further raising the vibration suppression effect of the spherical body balancer 22a; and even when the mass imbalance amount of the mounted disk 1 is large, the vibration of the motor base 9 and the sub-base 6 can be suppressed securely. Therefore, the disk drive apparatus of the third embodiment can carry out stable recording or reproduction even if a disk 1 having a large mass imbalance is rotated at high speed, whereby a disk drive apparatus capable of rotating at high speed can be attained.

Fourth Embodiment

Figure 6:
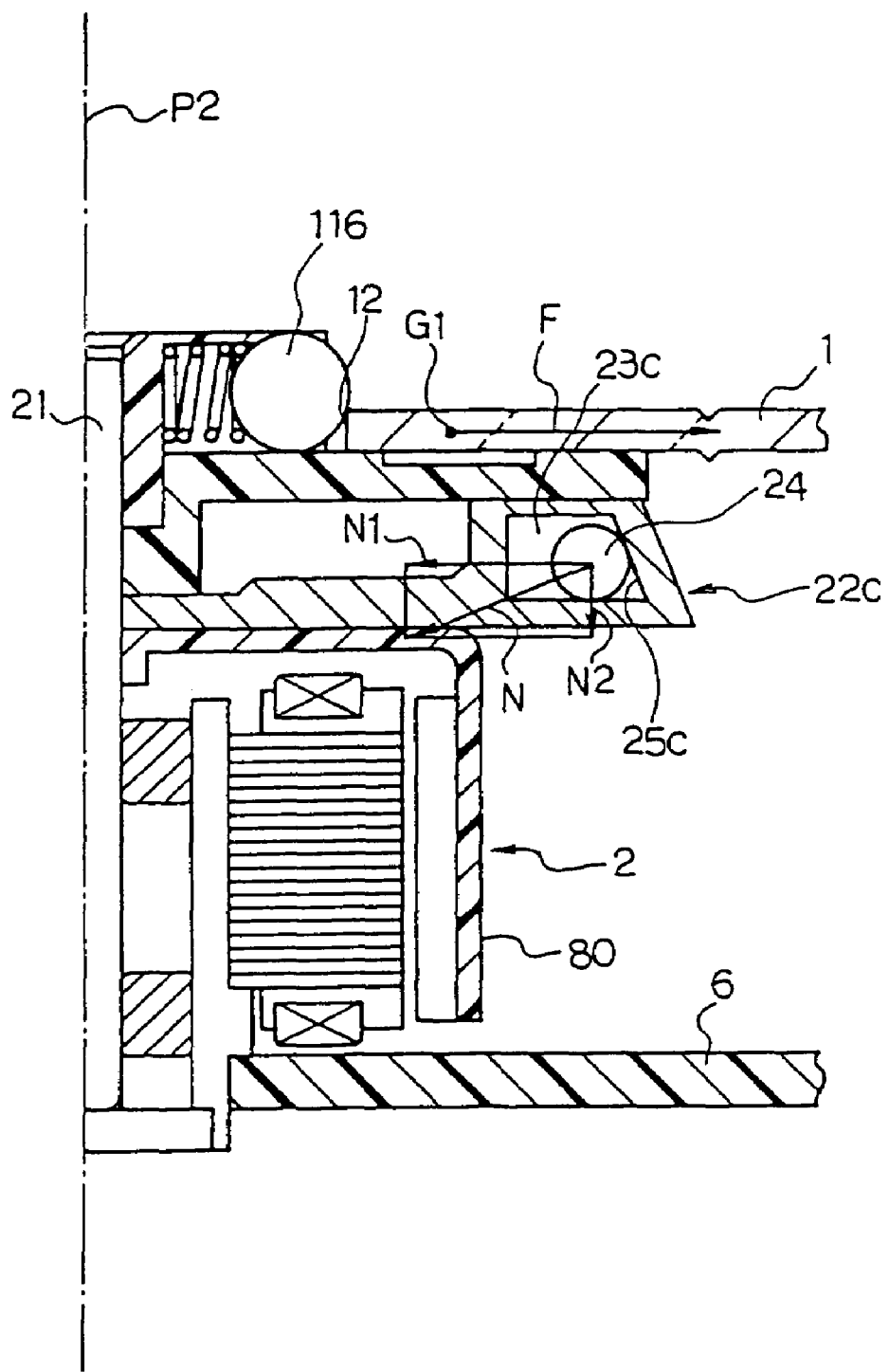
FIG. 6 is a sectional view showing the vicinity of the balancer 22c provided integrally with the rotor 80 of the disk drive apparatus in accordance with the fourth embodiment of the present invention.

Next, a disk drive apparatus in accordance with a fourth embodiment of the present invention will be described referring to the drawings. FIG. 6 is a plan sectional view showing a spherical body balancer 22c provided integrally with the rotor 80 in the disk drive apparatus of the fourth embodiment of the present invention. The elements substantially identical to those used for the disk drive apparatus of the above-mentioned first embodiment are represented by the same numeral codes, and the descriptions for the preceding embodiment are applied, thereby omitting overlap descriptions.

In the disk drive apparatus of the fourth embodiment of the present invention, as shown in FIG. 6, just as in the case of the above-mentioned first embodiment, the spherical body balancer 22c is formed so as to be rotatable integrally with the rotor 80 of the spindle motor 2. This spherical body balancer 22c comprises a hollow ring-shaped portion 23c used as a ring-shaped track portion provided coaxially with the spindle shaft 21 of the spindle motor 2, and a plurality of spherical bodies 24 movably accommodated inside this hollow ring-shaped portion 23c.

Furthermore, in the disk drive apparatus of the fourth embodiment of the present invention, the inner wall face 25c of the outer periphery of the hollow ring-shaped portion 23c of the spherical body balancer 22c is inclined with respect to the center axis (P2 of FIG. 6) of the hollow ring-shaped portion 23c. Except for the above, the configuration is the same as that of the above-mentioned first embodiment.

In the disk drive apparatus of the fourth embodiment configured as described above, in the case when the disk 1 having a large mass imbalance amount A is rotated, the hollow ring-shaped portion 23c performs whirling operation around the whirling center axis P1, just as in the case of the above-mentioned first embodiment shown in FIG. 2.

At this time, a centrifugal force q acts on the spherical body 24 accommodated in the hollow ring-shaped portion 23c in the direction of connecting the whirling center axis P1 to the center of gravity of the spherical body 24. In addition, since the movement of the spherical body 24 is restricted by the inner wall face 25c of the outer periphery of the hollow ring-shaped portion 23, a reaction N from the inner wall face 25c of the outer periphery acts on the spherical body 24. As shown in FIG. 6, this reaction N from the inner wall face 25c of the outer periphery acts perpendicular to the inner wall face 25c of the outer periphery; therefore, it has a component N1 in the direction toward the center P2 of the hollow ring-shaped portion 23c and a component N2 in the direction parallel with the center axis P2 of the hollow ring-shaped portion 23c. Therefore, as shown in FIG. 2, a movement force R, i.e., the resultant force of the centrifugal force q and the component N1 of the reaction N, acts on the spherical body 24 in the direction of the tangent of the circle centered at the center P2 of the inner wall face 25c of the outer periphery, passing through the center of gravity of the spherical body 24, and being away from the whirling center axis P1. By this movement force R, the spherical body 24 is moved along the inner wall face 25c of the outer periphery, whereby the spherical bodies 24 gather in the direction nearly opposite to the center of gravity G1 of the disk 1 with respect to the whirling center axis P1.

As a result, when the component of the centrifugal force q, acting on each of the spherical bodies 24 having gathered in the same direction of the imbalance force, is a balance force zk, the imbalance force F due to the rotation of the disk 1 is canceled by the resultant force Zn of the balance forces zk, whereby the force acting on the sub-base 6 decreases. Therefore, the vibration of the sub-base 6, occurring in the case when an unbalanced disk 1 is rotated, is suppressed.

Furthermore, the spherical body 24 is pressed against the bottom face of the hollow ring-shaped portion 23c by the component N2 of the reaction N. Therefore, even if vibration and impact are applied from outside the device in the direction of the center axis P2 of the hollow ring-shaped portion 23c, the spherical body 24 remains the condition of making contact with the bottom face of the hollow ring-shaped portion 23c by virtue of the component N2 of the reaction N. For this reason, in the fourth embodiment, the spherical body 24 does not freely move in the direction parallel with the center axis P2 of the hollow ring-shaped portion 23c inside the hollow ring-shaped portion 23c, whereby it is possible to avoid the problem of generating noise due to collisions of the spherical bodies 24 with the ceiling face and the bottom face of the hollow ring-shaped portion 23c.

As described above, in the configuration of the fourth embodiment of the present invention, thanks to the spherical body balancer 22c, it is possible to suppress the vibration of the sub-base 6, and it is possible to prevent undesirable noise from occurring from the spherical body balancer 22c itself.

Fifth Embodiment

Figure 7:
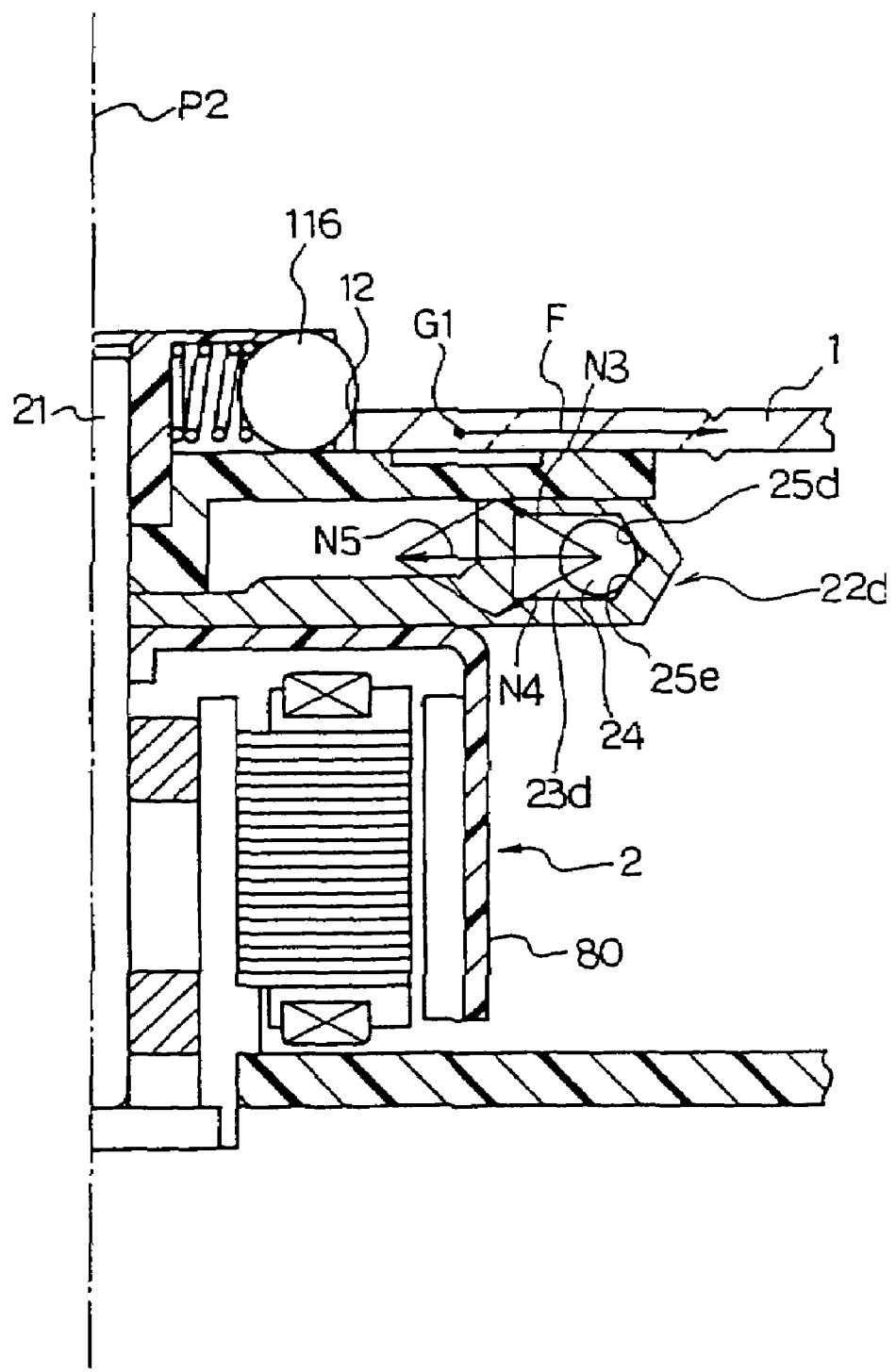
FIG. 7 is a sectional view showing the vicinity of the balancer 22d provided integrally with the rotor 80 of the disk drive apparatus in accordance with the fifth embodiment of the present invention.

Next, a disk drive apparatus in accordance with a fifth embodiment of the present invention will be described referring to the drawings. FIG. 7 is a plan sectional view showing a spherical body balancer 22d having a hollow ring-shaped portion 23d and provided integrally with the rotor 80 in the disk drive apparatus of the fifth embodiment of the present invention. The elements substantially identical to those used for the disk drive apparatus of the above-mentioned first embodiment are represented by the same numeral codes, and the descriptions for the preceding embodiment are applied, thereby omitting overlap descriptions.

The disk drive apparatus of the fifth embodiment of the present invention, just as in the case of the above-mentioned fourth embodiment, is intended to decrease the level of noise occurring from the balancer itself. As shown in FIG. 7, the spherical body balancer 22d is formed so as to be rotatable integrally with the rotor 80 of the spindle motor 2. This spherical body balancer 22d comprises a hollow ring-shaped portion 23d used as a ring-shaped track portion provided coaxially with the spindle shaft 21 of the spindle motor 2, and a plurality of spherical bodies 24 movably accommodated inside the hollow ring-shaped portion 23d.

As shown in FIG. 7, the cross-section of the inner wall of the outer periphery of the spherical body balancer 22d is formed in a wedge shape. Except for the above, the configuration is the same as that of the above-mentioned first embodiment.

In the disk drive apparatus of the fifth embodiment configured as described above, in the case when the disk 1 having a large mass imbalance amount A is rotated, the hollow ring-shaped portion 23d performs whirling operation around the whirling center axis P1, just as in the case of the above-mentioned first embodiment shown in FIG. 2.

At this time, a centrifugal force q acts on the spherical body 24 accommodated in the hollow ring-shaped portion 23d in the direction of connecting the whirling center axis P1 to the center of gravity of the spherical body 24. In this condition, in the disk drive apparatus of the fifth embodiment, the inner wall faces 25d and 25e of the outer periphery of the hollow ring-shaped portion 23d, having a wedge shape, are formed symmetrical with respect to the plane perpendicular to the center axis P2 of the hollow ring-shaped portion 23d and including the centers of the inner wall faces 25d and 25e of the outer periphery as shown in FIG. 7.

Therefore, the spherical body 24 is securely disposed at the centers of the inner wall faces 25d and 25e of the outer periphery, and the resultant force N5 of reactions N3 and N4 from the inner wall faces 25d and 25e of the outer periphery acts on the spherical body 24. Since the inner wall faces 25d and 25e of the outer periphery are formed symmetrical with respect to the plane perpendicular to the center axis P2 of the hollow ring-shaped portion 23d, the action direction of the reaction N5 is the direction toward the center P2 of the hollow ring-shaped portion 23d. Therefore, a movement force R, i.e., the resultant force of the centrifugal force q and the reaction N5, acts on the spherical body 24 in the direction of the tangent of the circle centered at the center P2 of the hollow ring-shaped portion 23d, passing through the center of gravity of the spherical body 24, and being away from the whirling center axis P1. By this movement force R, the spherical body 24 is moved along the inner wall faces 25d and 25e of the outer periphery, whereby the spherical bodies 24 gather in the direction nearly opposite to the center of gravity G1 of the disk 1 with respect to the whirling center axis P1.

As a result, when the component of the centrifugal force q, acting on each of the spherical bodies 24 having gathered in the same direction of the imbalance force, is a balance force zk, the imbalance force F due to the rotation of the disk 1 is canceled by the resultant force Zn of the balance forces zk, whereby the force acting on the sub-base 6 decreases. Therefore, the vibration of the sub-base 6, occurring in the case when the unbalanced disk 1 is rotated, is suppressed.

Furthermore, the spherical body 24 is held at the centers of the inner wall faces 25d and 25e of the outer periphery by the components of the two reactions N3 and N4 from the inner wall faces 25d and 25e of the outer periphery in the direction of the center axis P2 of the hollow ring-shaped portion 23d. Therefore, even if vibration and impact are applied from outside the device in the direction parallel to the center axis P2 of the hollow ring-shaped portion 23d, the spherical body 24 does not move around inside the hollow ting-shaped portion 23d in the direction parallel to the center axis P2 of the hollow ring-shaped portion 23d. For this reason, in the disk drive apparatus of the fifth embodiment, it is possible to avoid the problem of causing noise due to collisions of the spherical bodies 24 with the ceiling face and the bottom face of the hollow ring-shaped portion 23d.

As described above, in the configuration of the fifth embodiment of the present invention, thanks to the spherical body balancer 22d, it is possible to suppress the vibration of the sub-base 6, and it is also possible to prevent undesirable noise from occurring from the spherical body balancer 22d itself.

Sixth Embodiment

Figure 8:
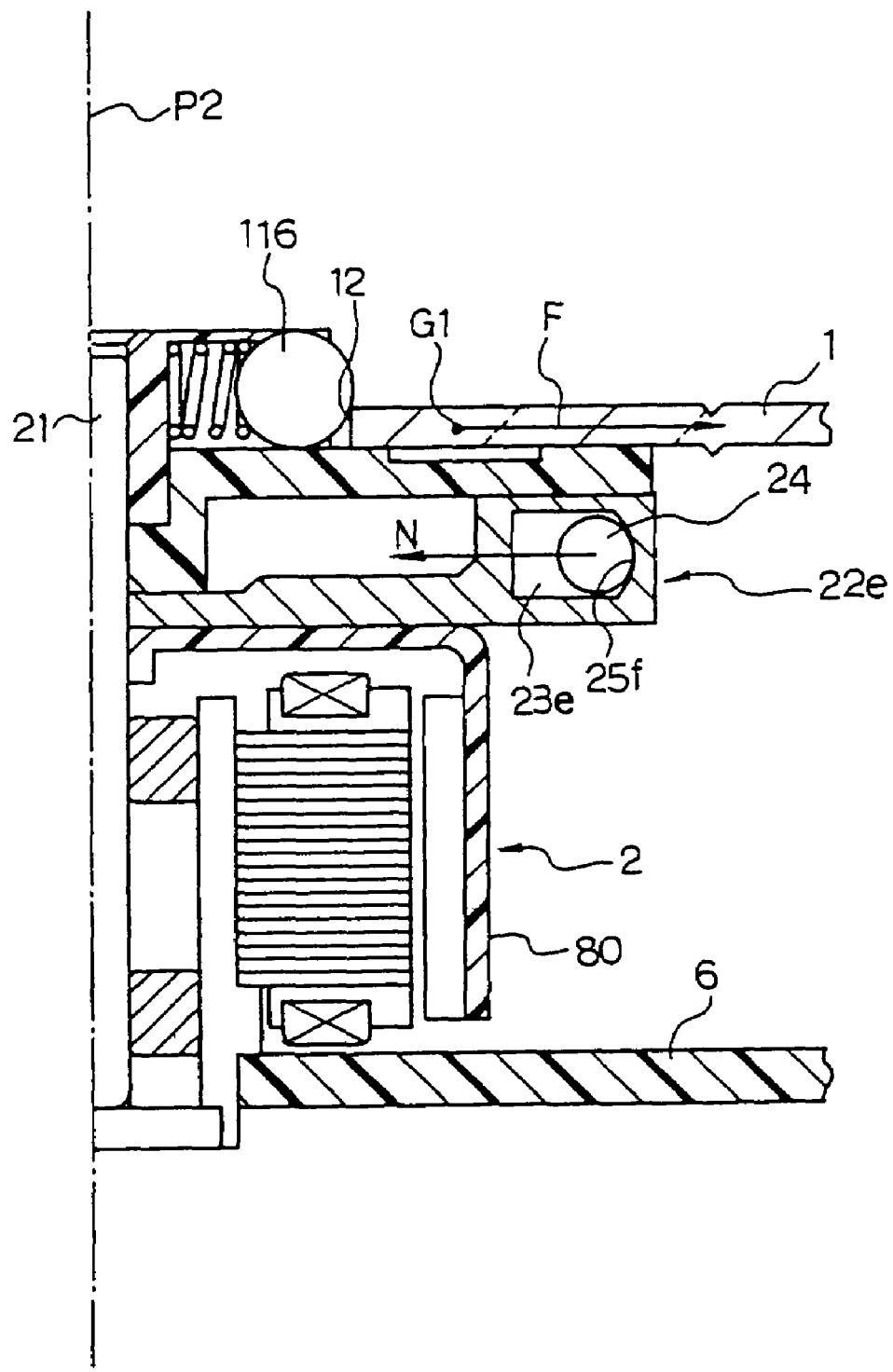
FIG. 8 is a sectional view showing the vicinity of the balancer 22e provided integrally with the rotor 80 of the disk drive apparatus in accordance with the sixth embodiment of the present invention.

Next, a disk drive apparatus in accordance with a sixth embodiment of the present invention will be described referring to the drawings. FIG. 8 is a plan sectional view showing a spherical body balancer 22e having a hollow ring-shaped portion 23e and provided integrally with the rotor 80 in the disk drive apparatus of the sixth embodiment of the present invention. The elements substantially identical to those used for the disk drive apparatus of the above-mentioned first embodiment are represented by the same numeral codes, and the descriptions for the preceding embodiment are applied, thereby omitting overlap descriptions.

The disk drive apparatus of the sixth embodiment of the present invention, just as in the cases of the above-mentioned fourth and fifth embodiments, is intended to decrease noise occurring from the balancer itself. As shown in FIG. 8, the spherical body balancer 22e is formed so as to be rotatable integrally with the rotor 80 of the spindle motor 2. This spherical body balancer 22e comprises a hollow ring-shaped portion 23e used as a ring-shaped track portion having a ring-shaped passage and provided coaxially with the spindle shaft 21 of the spindle motor 2, and a plurality of spherical bodies 24 movably accommodated inside the hollow ring-shaped portion 23e.

In the disk drive apparatus of the sixth embodiment of the present invention, the cross-section of the inner wall 25f of the outer periphery of the hollow ring-shaped portion 23e is formed in a curved shape (concave shape). Except for the above, the configuration is the same as that of the above-mentioned first embodiment.

In the disk drive apparatus of the sixth embodiment configured as described above, in the case when the disk 1 having a large mass imbalance amount A is rotated, the hollow ring-shaped portion 23e performs whirling operation around the whirling center axis P1, just as in the case of the above-mentioned first embodiment shown in FIG. 2.

At this time, a centrifugal force q acts on the spherical body 24 accommodated in the hollow ring-shaped portion 23e in the direction of connecting the whirling center axis P1 to the center of gravity of the spherical body 24. The inner wall face 25f of the outer periphery of the hollow ring-shaped portion 23e has the shape of a concave face in the cross-section on the plane including the center axis P2 of the hollow ring-shaped portion 23e as shown in FIG. 8; and the curvature of this concave face is set smaller than the curvature of the outer face of the spherical body 24. Therefore, the spherical body 24 is held at the position of the contact point of the tangent to the inner wall face 25f of the outer periphery and in parallel with the center axis P2 of the hollow ring-shaped portion 23e by the centrifugal force q and the reaction from the inner wall face 25f of the outer periphery. At this time, the reaction N acting on the spherical body 24 from the hollow ring-shaped portion 23e generates in the direction perpendicular to the center axis P2 of the hollow ring-shaped portion 23e and in the direction toward the center axis P2 of the hollow ring-shaped portion 23e. Therefore, a movement force R, i.e., the resultant force of the centrifugal force q and the reaction N, acts on the spherical body 24 in the direction of the tangent of the circle centered at the center P2 of the hollow ring-shaped portion 23e, passing through the center of gravity of the spherical body 24, and being away from the whirling center axis P1. By this movement force R, the spherical body 24 is moved in the circumferential direction of the inner wall face 25f of the outer periphery, whereby the spherical bodies 24 gather in the direction nearly opposite to the center of gravity G1 of the disk 1 with respect to the whirling center axis P1.

As a result, when the component of the centrifugal force q, acting on each of the spherical bodies 24 having gathered in the same direction of the imbalance force, is a balance force zk, the imbalance force F due to the rotation of the disk 1 is canceled by the resultant force Zn of the balance forces zk, whereby the force acting on the sub-base 6 decreases. Therefore, the vibration of the sub-base 6, occurring in the case when the unbalanced disk 1 is rotated, is suppressed securely.

As described above, in the disk drive apparatus of the sixth embodiment, the position of the spherical body 24 in the direction of the center axis P2 of the hollow ring-shaped portion 23e is held at the position of the contact point of the tangent to the inner wall face 25f of the outer periphery and in parallel with the center axis P2 of the hollow ring-shaped portion 23e by the centrifugal force q acting on the spherical body 24 and the reaction from the inner wall face 25f of the outer periphery. Therefore, even if vibration and impact are applied from outside the device in the direction parallel to the center axis P2 of the hollow ring-shaped portion 23d, the spherical body 24 does not move around inside the hollow ring-shaped portion 23e in the direction parallel to the center axis P2 of the hollow ring-shaped portion 23e. For this reason, in the disk drive apparatus of the sixth embodiment, it is possible to avoid the problem of causing noise due to collisions of the spherical bodies 24 with the ceiling face and the bottom face of the hollow ring-shaped portion 23e.

In addition, since the spherical body 24 makes point contact with only the inner wall face 25f of the outer periphery, it can easily move in the circumferential direction of the inner wall face 25f of the outer periphery, whereby the spherical body 24 can be positioned securely at the position opposite to the center of gravity G1 of the disk 1.

As described above, in the configuration of the sixth embodiment of the present invention, thanks to the spherical body balancer 22e, it is possible to suppress the vibration of the sub-base 6 more securely, and it is possible to prevent undesirable noise from occurring from the spherical body balancer 22e itself.

In the first to sixth embodiments of the present invention, the actions and effects in the case when the disk 1 has a mass imbalance have been described; however, even when one of the members to be rotated by the spindle motor 2, such as the turntable 110, the rotor 80 of the spindle motor 2 or the like, has a mass imbalance, an effect of suppressing the vibration due to the mass imbalance can be obtained in accordance with the present invention.

As described above, the disk drive apparatuses of the first to sixth embodiments of the present invention are intended to suppress the vibration due to the mass imbalance of the disk or the like, and are applicable to all disk drive apparatuses wherein data is recorded on the disk or data recorded on the disk is reproduced while the disk is rotated. By applying the technological concept of the present invention to optical disk drive apparatuses for only reproduction of CDs and CD-ROMs for example, and to recordable devices requiring more accurate relative distance control (tracking control) of an optical head to the tracks on a disk, an enormous effect of attaining devices having higher reliability can be obtained.

Furthermore, in the first to sixth embodiments of the present invention, not only a device for carrying out non-contact recording/reproduction using an optical head but also a device for carrying out recording/reproduction on a disk by using a contact magnetic head or a floating magnetic head can obtain an effect of suppressing undesirable vibration due to the mass imbalance of the disk.

In the disk drive apparatuses of the first to sixth embodiments of the present invention, a hollow ring-shaped portion having a closed ring-shaped space and used as a ring-shaped track portion has been described; however, the present invention is not limited to this kind of configuration, and a configuration having a ring-shaped track in which spherical bodies can roll, such as a configuration having a ring-shaped track formed of a wire or the like for example, can have the effect of the present invention.

As described above, in accordance with the disk drive apparatuses of the first to sixth embodiments of the present invention, by providing a balancer accommodating balance members so as to be rotatable integrally with a disk, the vibration of the sub-base due to the mass imbalance of the disk can be suppressed securely, and stable recording or reproduction can be attained.

Furthermore, in accordance with the disk drive apparatuses of the first to sixth embodiments of the present invention, an unbalanced disk can be rotated at high speed, whereby the rate of data transfer can be improved.

Furthermore, in accordance with the disk drive apparatuses of the first to sixth embodiments of the present invention, it is possible to attain disk drive apparatuses causing low noise and having high vibration-resistant and impact-resistant characteristics.

In accordance with the disk drive apparatuses of the first to sixth embodiments of the present invention, it is possible to attain disk drive apparatuses wherein the amount of vibration due to the mass imbalance of a disk is suppressed sufficiently even when the rotation frequency of the disk exceeds 100 Hz.

In accordance with the disk drive apparatuses of the first to sixth embodiments of the present invention, it is possible to attain a high speed rotation of 100 Hz or more even if the mass imbalance amount is 1 gcm or more.

In accordance with the disk drive apparatuses of the first to sixth embodiments of the present invention, vibration due to the mass imbalance of a mounted disk can be suppressed securely without increasing the number of the spherical bodies used as balance members accomodated in the ring-shaped track portion.

In accordance with the disk drive apparatuses of the first to sixth embodiments of the present invention, even if a mounted unbalanced disk is rotated at high speed, vibration can be suppressed sufficiently, whereby it is possible to attain low-profile disk drive apparatuses capable of carrying out high-rate transfer.

In accordance with the disk drive apparatuses of the first to sixth embodiments of the present invention, it is possible to attain disk drive apparatuses having a high vibration suppression effect and capable of reducing undesirable noise, even when the mass imbalance amount of a mounted disk is very large.

In accordance with the balancers for the disk drive apparatuses of the first to sixth embodiments of the present invention, it is possible to attain disk drive apparatuses capable of high speed rotation of 100 Hz or more even if the mass imbalance amount is 1 gcm or more.

In accordance with the balancers for the disk drive apparatuses of the first to sixth embodiments of the present invention, vibration due to the mass imbalance of a mounted disk can be suppressed securely without increasing the number of the spherical bodies used as balance members and accommodated in the ring-shaped track portion more than necessary.

The balancers for the disk drive apparatuses of the first to sixth embodiments of the present invention can suppress the occurrence of noise from the balancers themselves.

Problems to be Solved By Seventh to 13th Embodiments

In recent years, in disk drive apparatuses for recording/reproducing data, high-speed disk rotation has been advanced to improve data transfer rate. However, a disk has a mass imbalance due to nonuniform thickness, eccentricity and the like. When this kind of disk is rotated at high speed, an eccentric centrifugal force (an imbalance force) acts on the rotation center of the disk, thereby causing a problem wherein the vibration due to the imbalance force is transmitted to the whole of the device. The magnitude of this imbalance force increases in proportion to the square of rotation frequency; therefore, the vibration increases abruptly as the rotation speed of the disk is raised. For this reason, when the disk is rotated at high speed, it vibrates, and noise is caused by the vibration, and the bearings of the disk rotation drive spindle motor are damaged; in addition, the vibration of the disk vibrates the head for carrying out recording and reproduction, thereby causing a problem of being unable to carry out stable recording and reproduction. Furthermore, when this kind of disk drive apparatus is built in a computer or the like, the vibration of the disk is transmitted to other peripheral devices, thereby also causing a problem of adversely affecting the devices.

To solve these problems, the conventional disk drive apparatus is generally provided with a function of automatically reducing the rotation speed of the disk, judging that recording and reproduction cannot be carried out in the case when the chassis vibrates significantly. When the occurrence of large vibration is detected in the case when a disk having a large mass imbalance is rotated at high speed, the conventional disk drive apparatus having this kind of function is configured to automatically reduce the rotation speed of the disk until the vibration becomes relatively small, thereby to securely carry out recording/reproduction.

However, market demands for high-speed disk recording/reproduction are high regardless of the magnitude of the mass imbalance amount of the disk; therefore, suppressing undesirable vibration due to the mass imbalance of the disk has been the problem to be solved in this field. When the mass of the disk is M (g), and when the distance from the center of the disk to the center of gravity of the disk is L (cm), the imbalance amount A (gcm) is represented by $A = M \times L$.

To solve the above-mentioned problem, Japanese Laid-open Patent Application No. Hei 10-83622 has proposed a mechanism for canceling a mass imbalance referred to as a balancer.

An example of a conventional disk drive apparatus having a balancer will be described below referring to the drawings.

Figure 9:
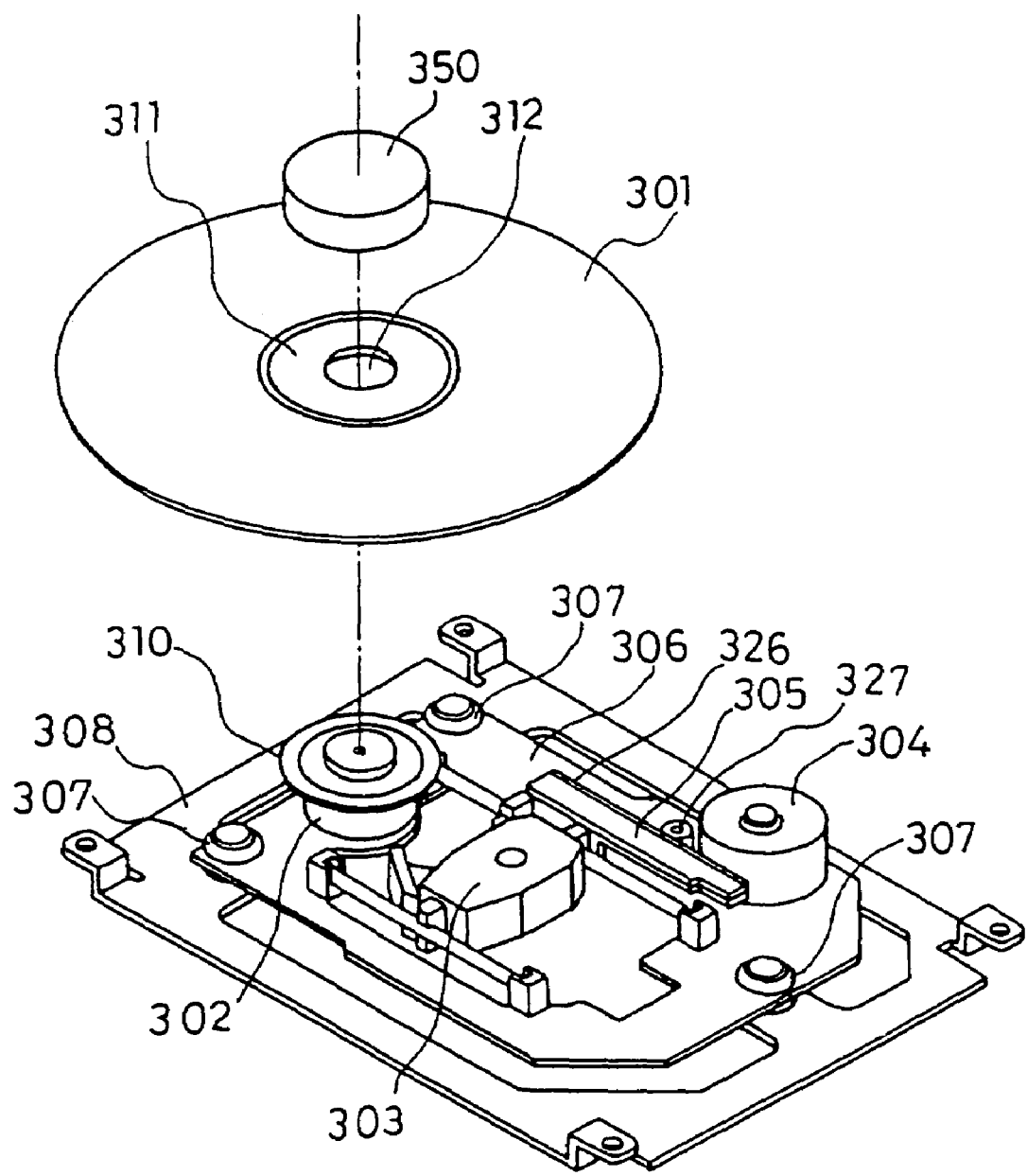
FIG. 9 is a perspective view showing a conventional disk drive apparatus.

FIG. 9 is a perspective view showing the conventional disk drive apparatus. Referring to FIG. 9, a disk 301 is rotated by a spindle motor 302. A head 303 reproduces (reads) data recorded on the disk 301 or records (writes) data on the disk 301.

A traverse mechanism 305 comprising a rack gear 326 and a pinion gear 327 is a mechanism for moving the head 303 from the inner periphery to the outer periphery or from the outer periphery to the inner periphery of the disk 301. The above-mentioned traverse mechanism 305 is configured so as to be driven when the traverse motor 304 rotates the pinion gear 327. The rotation operation of the pinion gear 327 is converted into a linear motion by the rack gear 326 and transmitted to the head 303. The spindle motor 302, the traverse motor 304 and the traverse mechanism 305 are mounted on a sub-base 306.

The sub-base 306 is mounted over a main base 308 via insulators 307 (elastic bodies). Vibration and impact transmitted from outside the device to the sub-base 306 are dampened by the insulators 307. The main unit of the disk drive apparatus is configured so as to be built in a computer or the like via a frame (not shown) installed on the main base 308.

Figure 10:
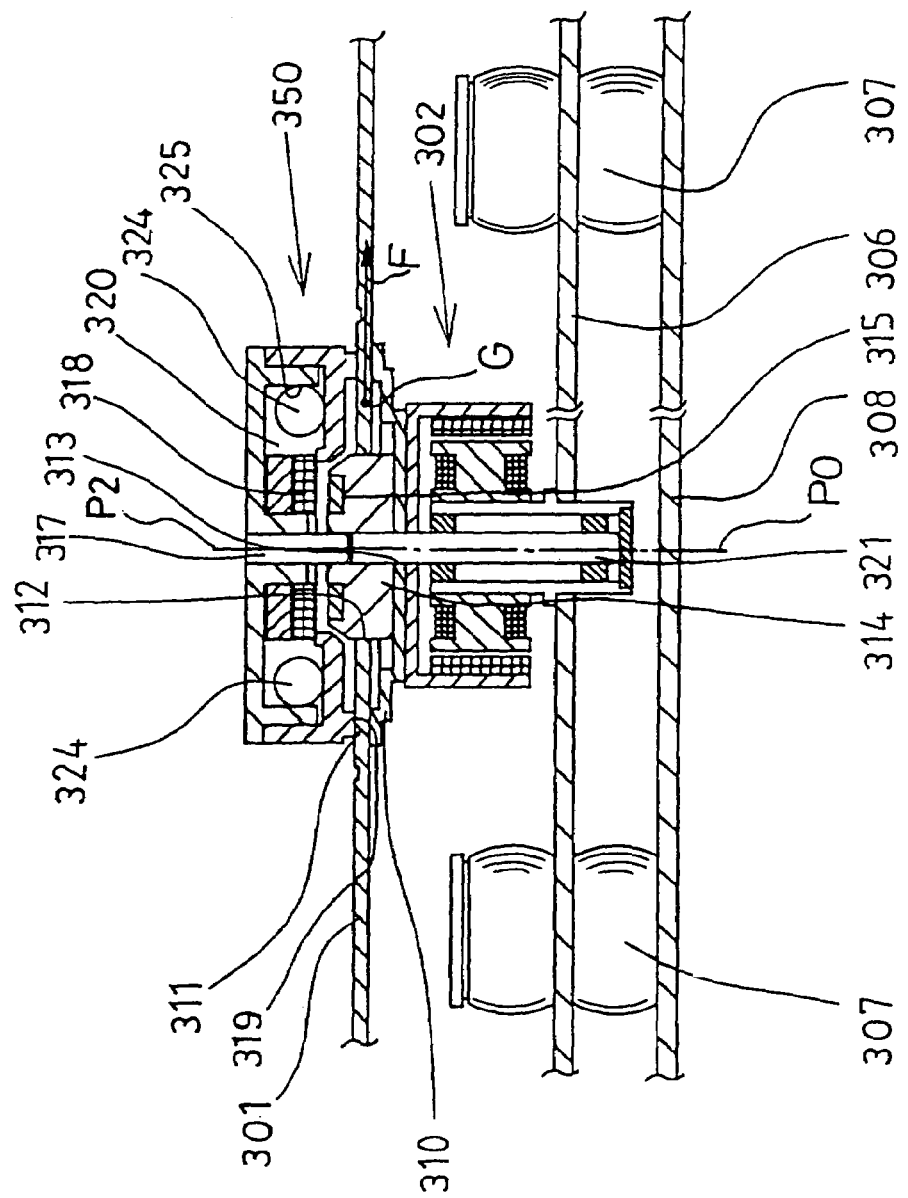
FIG. 10 is a side sectional view showing the vicinity of the spindle motor of the conventional disk drive apparatus.

FIG. 10 is a side sectional view showing the vicinity of the spindle motor 302 of the conventional disk drive apparatus. A turntable 310 is secured to the spindle shaft 321 of the spindle motor 302 and rotatably supports the clamp area 311 of the disk 301. On the turntable 310, a boss 314 to be fitted into the clamp hole 312 of the disk 301 is formed integrally. By fitting the disk 301 on the boss 314, the disk 301 is positioned. A positioning hole 313 is formed at the nearly central portion of the upper face of the boss 314. In addition, an opposed yoke 315 is embedded on the upper face of the boss 314.

A center projection 317 that carries out positioning by fitting into the positioning hole 313 provided in the turntable 310 is formed on a clamper 350. In addition, a ring-shaped magnet 318 is secured on the periphery of the center projection 317 of the clamper 350. A hollow ring-shaped portion 320 is provided on the outer periphery of the magnet 318, and six balls 324 having magnetism are disposed in the hollow ring-shaped portion 320.

In the case when the disk 301 is at rest, the balls 324 are attracted by the magnetic force of the magnet 318. The diameter and the number of the balls 324 are adjusted depending on the mass imbalance amount of the mounted disk 301. A flat contact portion 319 making contact with the disk 301 is formed on the lower face of the clamper 350.

In the conventional disk drive apparatus configured as describe above, in the condition wherein the disk 301 is clamped, the clamp hole 312 fits on the boss 314, whereby the disk 301 is mounted on the turntable 310. Furthermore, at this time, the disk 301 is held by the magnetic force acting between the magnet 318 built in the clamper 350 and the opposed yoke 315 secured to the turntable 310. The disk 301 held in this way is rotated integrally with the turntable 310 and the clamper 350 by the spindle motor 302.

At this time, if the disk 301 has a mass imbalance, a centrifugal force (an imbalance force) F acts on the center of gravity G1 of the disk 301 shown in FIG. 10. The direction of the action rotates as the disk 301 rotates. The vibration of this imbalance force F is transmitted to the sub-base 306 via the turntable 310 and the spindle motor 302. Since the sub-base 306 is supported by the main base 308 via the insulators 307 used as elastic bodies, it is whirled significantly by this imbalance force F while the insulators 7 are deformed. The magnitude of the imbalance force F is proportional to the product of the mass imbalance (represented by gcm) and the square of the rotation frequency. Therefore, the vibration acceleration of the sub-base 306 increases abruptly in close proportion to the square of the rotation frequency of the disk 301.

Figure 11:
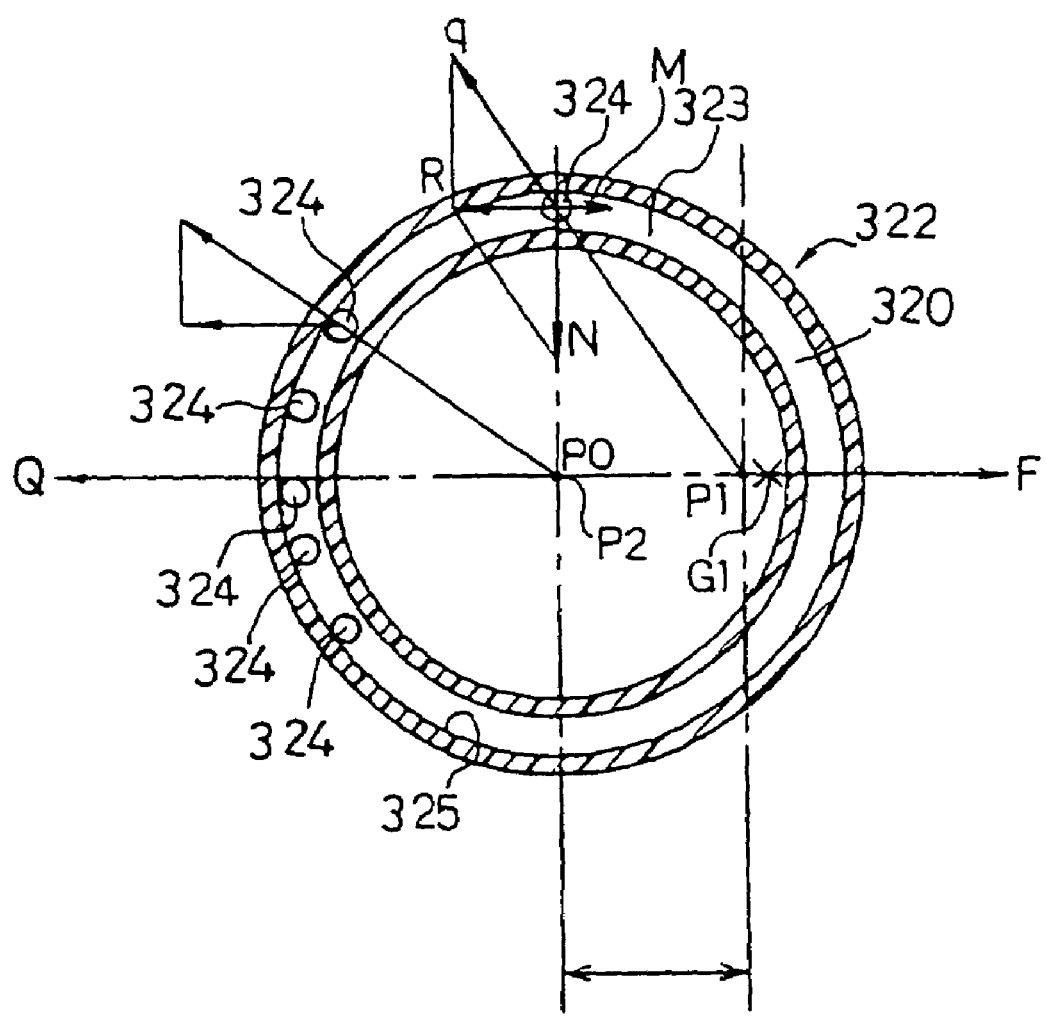
FIG. 11 is a view illustrating the movement of the balls of a balancer in the conventional disk drive apparatus.

FIG. 11 is a view illustrating the operation of a balancer 322 configured by the hollow ring-shaped portion or the like in the conventional disk drive apparatus. In the condition wherein the disk 301 having a mass imbalance is mounted on the disk drive apparatus as described above, the hollow ring-shaped portion 320 of the balancer 322 provided in the clamper 350 is positioned coaxially with the rotation center axis P0 of the spindle motor 302. As a result, the center of the hollow ring-shaped portion 320, i.e., the center P2 of the inner wall face 325 of the outer periphery of the hollow ring-shaped portion 320, is aligned with the position of the rotation center axis P0 of the spindle motor 302.

The centrifugal force (imbalance force) F acts on the center of gravity G1 of the disk 301, whereby the hollow ring-shaped portion 320 carries out whirling (turning) operation; the offset amount of the whirling center axis P1 from the rotation center axis P0 of the spindle motor 302 becomes larger as the mass imbalance of the disk 301 is larger. As a result, the vibration amplitude of the sub-base 306 supported by the insulators 307 becomes larger as the mass imbalance of the disk 301 is larger.

At this time, a centrifugal force q acts on the ball 324 accommodated in the hollow ring-shaped portion 320 in the direction of connecting the whirling center axis P1 to the center of gravity of the ball 324. In addition, since the movement of the ball 324 is restricted by the wall face 325 of the outer periphery of the hollow ring-shaped portion 320, a reaction N from the inner wall face 325 of the outer periphery acts on the ball 324. This reaction N from the inner wall face 325 of the outer periphery acts in the direction toward the center P2 of the inner wall face 325 of the outer periphery.

Therefore, a movement force R, i.e., the resultant force of the centrifugal force q and the reaction N, acts on the ball 324 in the direction of the tangent of the circle centered at the center P2 of the inner wall face 325 of the outer periphery, passing through the center of gravity of the ball 324, and being away from the whirling center axis P1. By this movement force R, the ball 324 is moved along the inner wall face 325 of the outer periphery, whereby the balls 324 gather at the position about 180 degrees rotated from the center of gravity G1 of the disk 301 with respect to the whirling center axis P1.

As a result, the centrifugal force Q acting on all of the six balls 324 having gathered acts in the direction opposite to the imbalance force F acting at the center of gravity G1 of the disk 301. The imbalance force F is canceled by this centrifugal force Q. Therefore, the force acting on the sub-base 306 via the spindle motor 302 becomes small. As a result, the offset amount from the whirling center axis P1 to the rotation center axis P0 of the spindle motor 302 becomes small, and the vibration amplitude of the sub-base 306 supported by the insulators 307 also becomes small. Therefore, the vibration of the sub-base 306, occurring in the case when the disk 301 having a large mass imbalance is rotated, is suppressed.

In the configuration of the above-mentioned conventional disk drive apparatus, the vibration reduction effect in the case when a disk having a mass imbalance is rotated at high speed is significant. However, in the case when a disk having a small mass imbalance was rotated at high speed, vibration became larger than that of the conventional disk drive apparatus having no balancer mechanism in some cases because of the following reason.

In the configuration of the disk drive mechanism having the conventional balancer mechanism, when the disk 301 having a mass imbalance is rotated at high speed, a centrifugal force (imbalance force) F acts at the center of gravity G1 of the disk 301 as shown in FIG. 11, and the magnetic balls 324 accommodated in the hollow ring-shaped portion 320 disposed in the clamper 350 gather in the direction opposite to the center of gravity G1 of the disk 301 and the whirling center P1. As a result, the above-mentioned imbalance force F is canceled by the centrifugal force Q of the balls 324, thereby solving the problem of the vibration of the sub-base 306 in the conventional device.

However, as forces acting on the ball 324, in addition to the centrifugal force q, the reaction N, i.e. a reaction from the inner wall face 325 of the outer periphery of the hollow ring-shaped portion 320, and the movement force R, i.e., the resultant force of the centrifugal force q and the reaction N, a friction force M becoming larger in proportion to the reaction N and the friction coefficient of the inner wall face 325 of the outer periphery and acting in the direction opposite to the movement force is present. Since this friction force M acts on the ball 324, the ball 324 starts moving when the movement force R is larger than the friction force M. Therefore, only when the mass imbalance of the disk 301 is a predetermined value or more, the balls 324 move in the direction of canceling the mass imbalance.

Conversely, in the case when a disk 301 having a mass imbalance of a predetermined value or less or a disk 301 having no mass imbalance is rotated at high speed, the offset amount of the whirling center P1 and the vibration amplitude of the disk 301 and the sub-base 306 become relatively smaller. In this case, since the movement force R of the ball 324 is smaller than the friction force M, it is impossible to move the ball 324 to the position wherein the mass imbalance is canceled. It is thus impossible to predict the position of the ball 324 after the rotation speed of the disk 301 is increased and the ball 324 is separated from the magnet 318 by the centrifugal force q.

As a result, when a disk 301 having no mass imbalance is rotated at high speed, the balls 324 concentrate in a place inside the hollow ring-shaped portion 320, whereby the overall imbalance sometimes becomes larger than the original mass imbalance of the disk 301.

As described above, the mechanism originally provided to prevent the vibration of the disk drive apparatus due to the mass imbalance of the disk 301 caused the problem of functioning reversely as described above.

Generally, in the case of disks 301 distributed in the market, disks 301 having few mass imbalances are predominant; therefore, the disk drive apparatus provided with the conventional balancer has a very high occurrence frequency of the problem of reversely causing larger vibration as described above; this has been a serious problem to be solved in the disk drive apparatus having the conventional balancer.

A seventh embodiment and eighth to 13th embodiments described later provide disk drive apparatuses that can solve the above-mentioned problem, can carry out stable recording or reproduction even in the case of high rotation speed regardless of the magnitude of the mass imbalance of the disk, and can have high data transfer rate.

Seventh Embodiment

A disk drive apparatus in accordance with a seventh embodiment of the present invention will be described below referring to the accompanying drawings.

Figure 12:
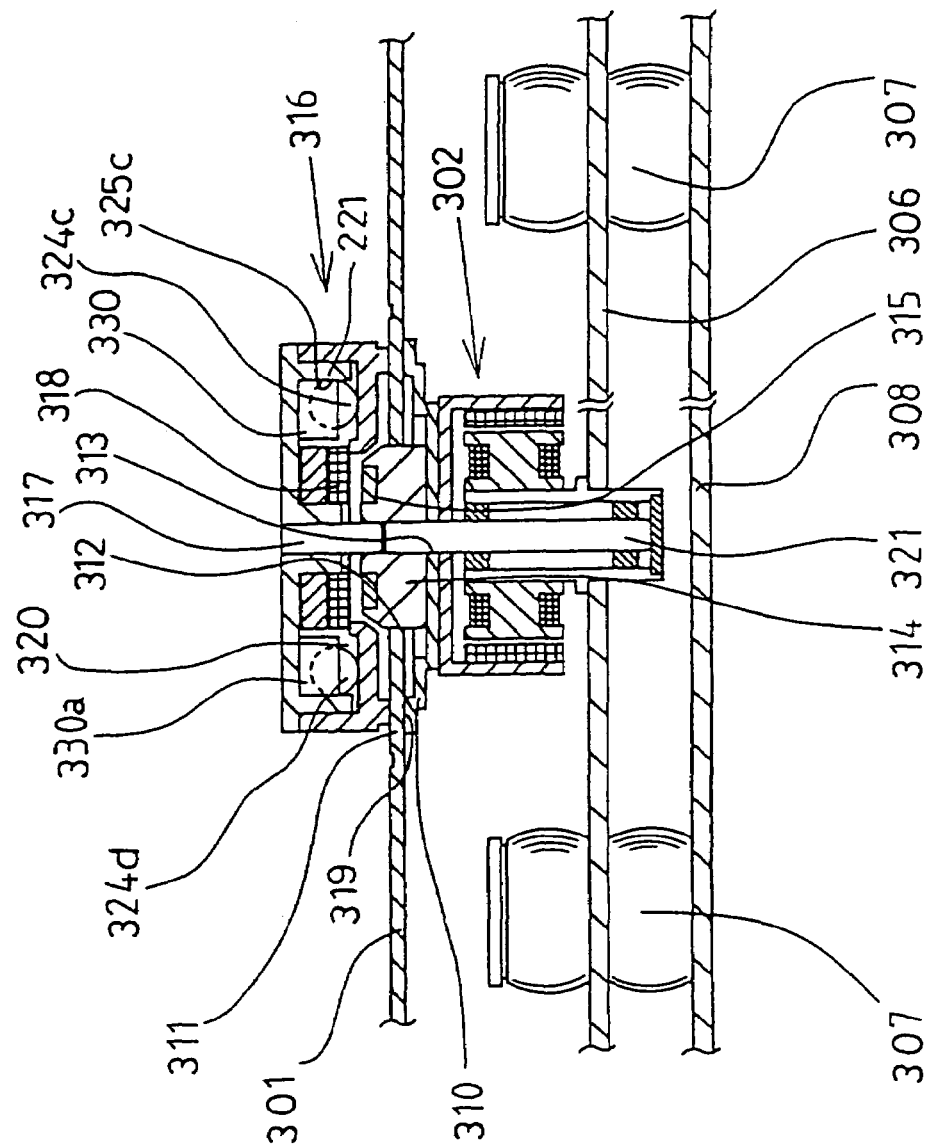
FIG. 12 is a side sectional view showing the vicinity of the spindle motor of the disk drive apparatus in accordance with the seventh embodiment of the present invention.
Figure 13:
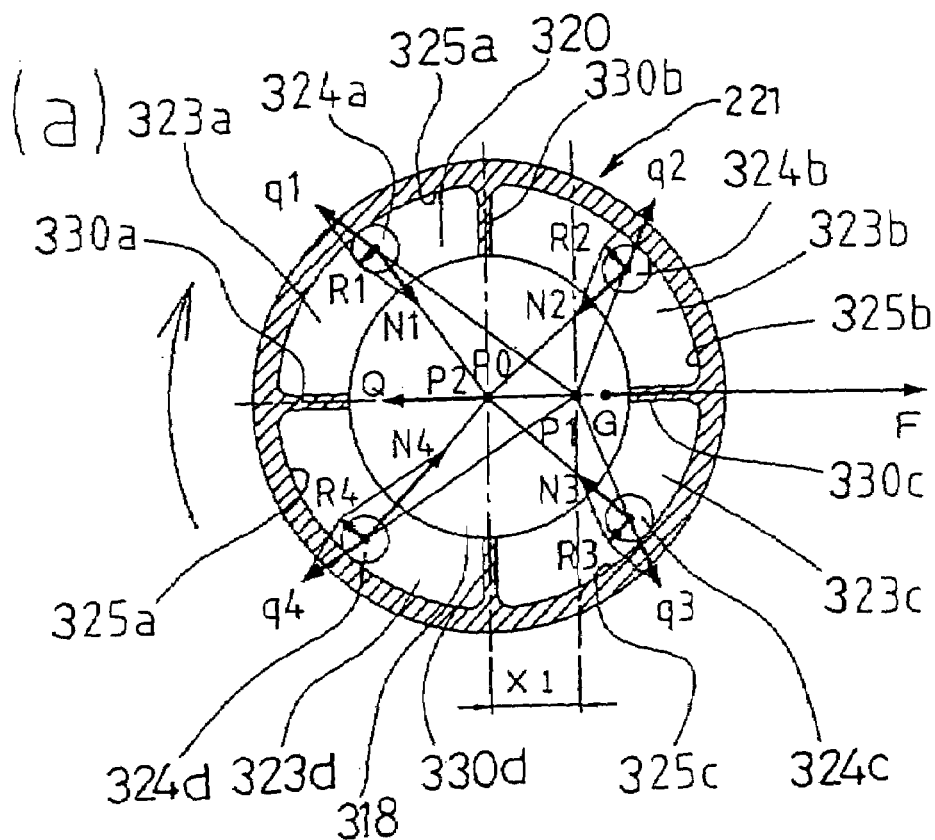
FIG. 13 is a plan sectional view illustrating forces acting on the balls of a balancer of the disk drive apparatus in accordance with the seventh embodiment of the present invention.
Figure 13:
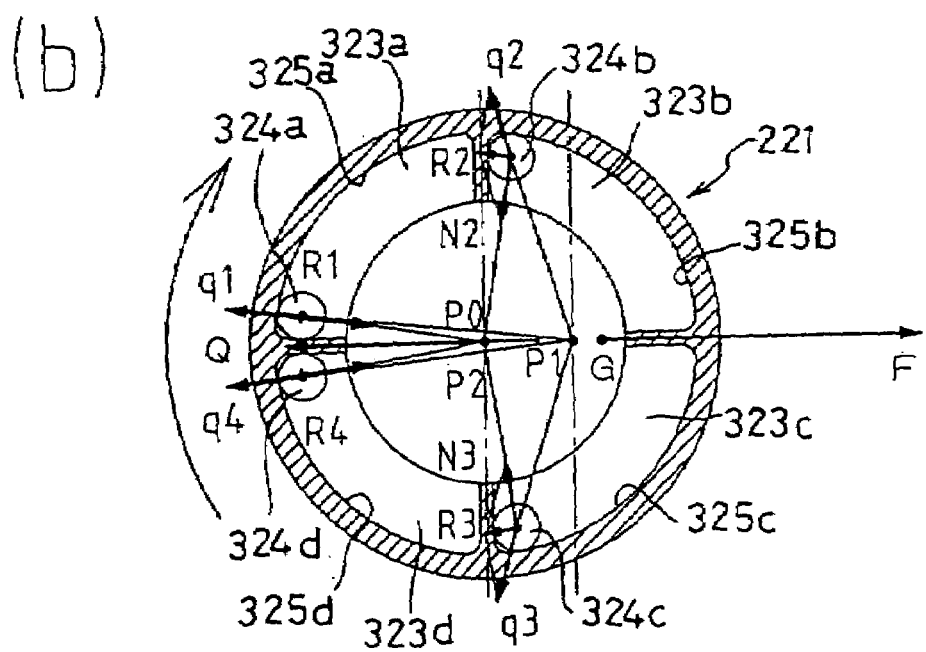

FIG. 12 is a side sectional view showing the vicinity of the spindle motor 302 of the disk drive apparatus of the seventh embodiment of the present invention. FIG. 13 is a plan sectional view illustrating forces acting on the balls of the balancer provided in the clamper of the disk drive apparatus of the seventh embodiment of the present invention.

Referring to FIG. 12, the disk drive apparatus of the seventh embodiment is configured so that a disk 301 on a turntable 310 is held with a clamper 316, and that the disk 301 is rotated by a spindle motor 302. In this disk drive apparatus, a head 303 is used to read data recorded on the disk 301 and to write data on the disk 301. The spindle motor 302, a traverse motor, a traverse mechanism and the like are mounted on a sub-base 306. The sub-base 306 is mounted over a main base 308 via insulators 307. Vibration and impact transmitted from outside the device to the sub-base 306 are dampened by the insulators 307. The disk drive apparatus is configured so as to be built in a computer or the like via a frame installed on the main base 308.

A turntable 310 is secured to the rotation shaft 21 of the spindle motor 302 and rotatably supports the clamp area 311 of the disk 301. On the turntable 310, a boss 314 to be fitted into the clamp hole 312 of the disk 301 is formed integrally. By fitting the disk 301 on the boss 314, the disk 301 is aligned. In addition, an opposed yoke 315 is embedded on the upper portion of the boss 314.

A center projection 317 that carries out alignment by fitting into the positioning hole 313 formed in the turntable 310 is provided on a clamper 316. A ring-shaped magnet 318 is secured on the periphery of the center projection 317 of the clamper 316.

In the disk drive apparatus of the seventh embodiment of the present invention, a balancer 221 is provided in the clamper 316. As shown in FIG. 12, the clamper 316 of the seventh embodiment is provided with a center projection (center axis) 317 for carrying out positioning with respect to the turntable 310 and a hollow ring-shaped portion 320 being coaxial therewith.

FIG. 13 is a view showing the inner configuration of the balancer 221 provided in the clamper 316 of the disk drive apparatus of the seventh embodiment, and is a plan sectional view illustrating the forces acting on plural balls 324a, 324b, 324c and 324d accommodated in the hollow ring-shaped portion 320 used as a ring-shaped track. As shown in FIG. 13, plural arc-shaped balance chambers 323a, 323b, 323c and 323d, divided in the circumferential direction by plural partition walls 330a, 330b, 330c and 330d, are formed inside the hollow ring-shaped portion 320. The balls 324a, 324b, 324c and 324d are movably accommodated in the arc-shaped balance chambers 323a, 323b, 323c and 323d respectively, one ball in each chamber. As described above, the balancer 221 comprises the plural arc-shaped balance chambers 323a, 323b, 323c and 323d and the balls 324a, 324b, 324c and 324d accommodated therein respectively; and this balancer 221 is formed integrally with the clamp 316. A flat contact portion 319 making contact with the disk 301 is formed on the lower face of the clamper 316.

As shown in FIG. 12, the positioning hole 313 passing through the turntable 310 is formed in the turntable 310; and this positioning hole 313 is fitted on the spindle shaft 321 used as the rotation center axis P0 of the spindle motor 302. Therefore, the turntable 310 is configured so as to be secured to the spindle shaft 321 and so as to be rotated integrally with the spindle motor 302.

Figure 32:
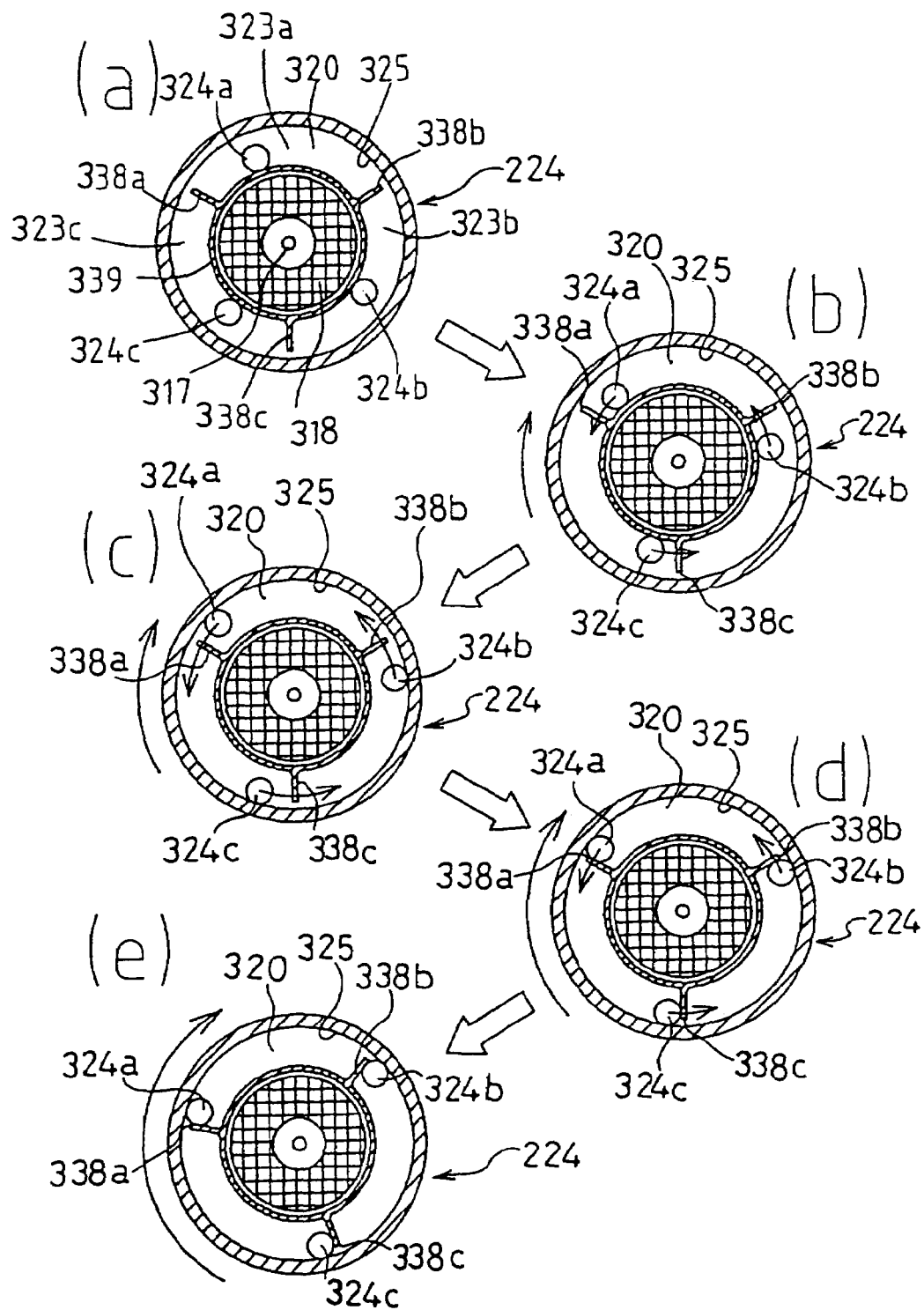
FIG. 32 is a view illustrating the movement of the balls of the balancer in the case when a uniform disk having no mass imbalance is rotated at high speed by the disk drive apparatus in accordance with the 10th embodiment of the present invention.
Figure 33:
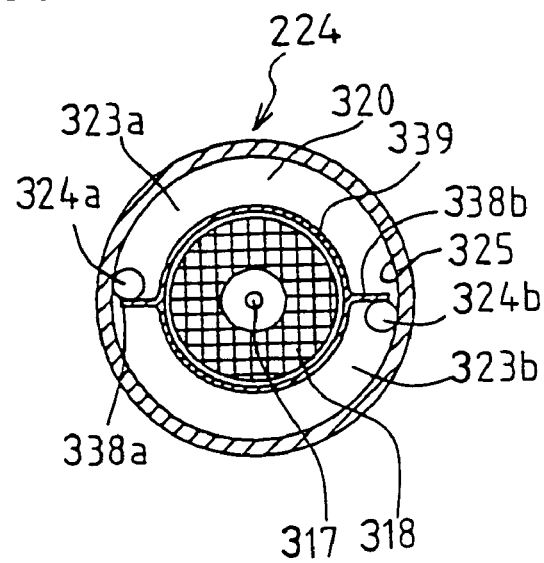
FIG. 33 is a plan sectional view showing the configuration of another balancer of the disk drive apparatus in accordance with the 10th embodiment of the present invention.
Figure 34:
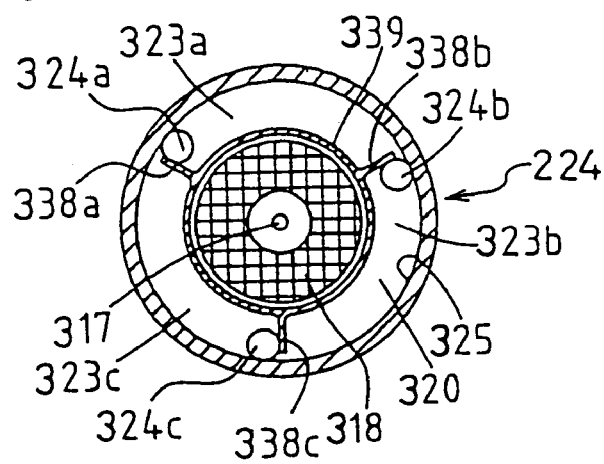
FIG. 34 is a plan sectional view showing the configuration of another balancer of the disk drive apparatus in accordance with the 10th embodiment of the present invention.
Figure 35:
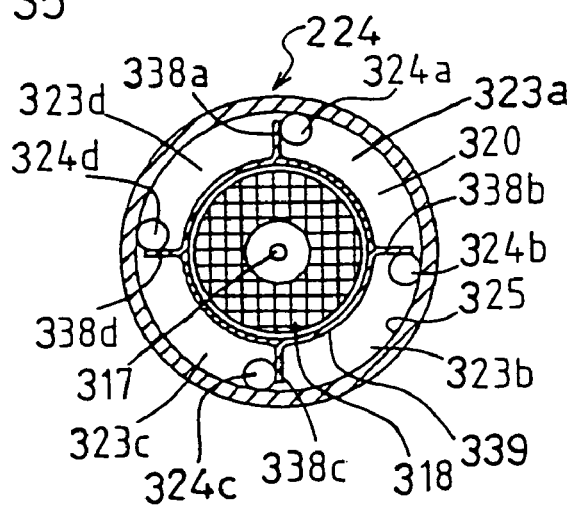
FIG. 35 is a plan sectional view showing the configuration of another balancer of the disk drive apparatus in accordance with the 10th embodiment of the present invention.
Figure 36:
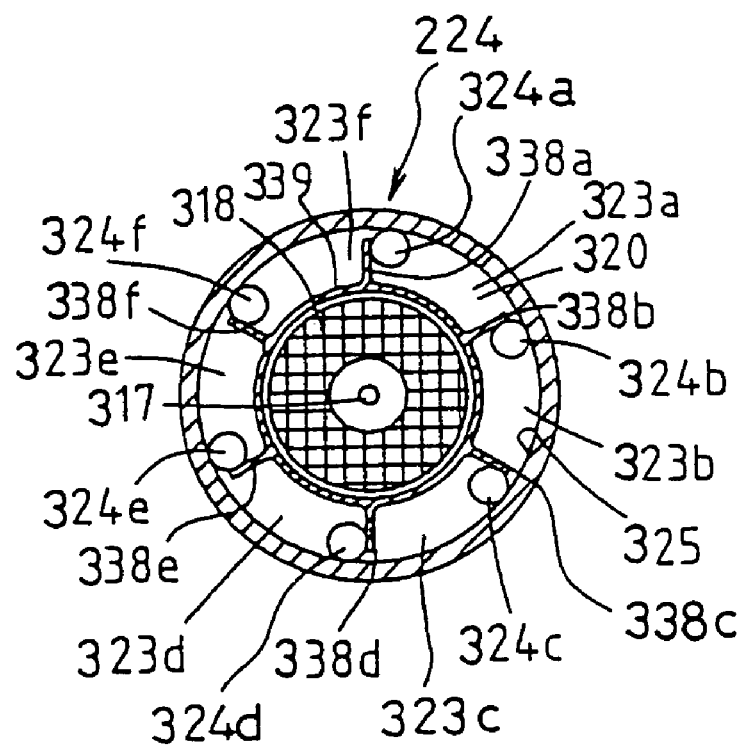
FIG. 36 is a plan sectional view showing the configuration of another balancer of the disk drive apparatus in accordance with the 10th embodiment of the present invention.
Figure 37:
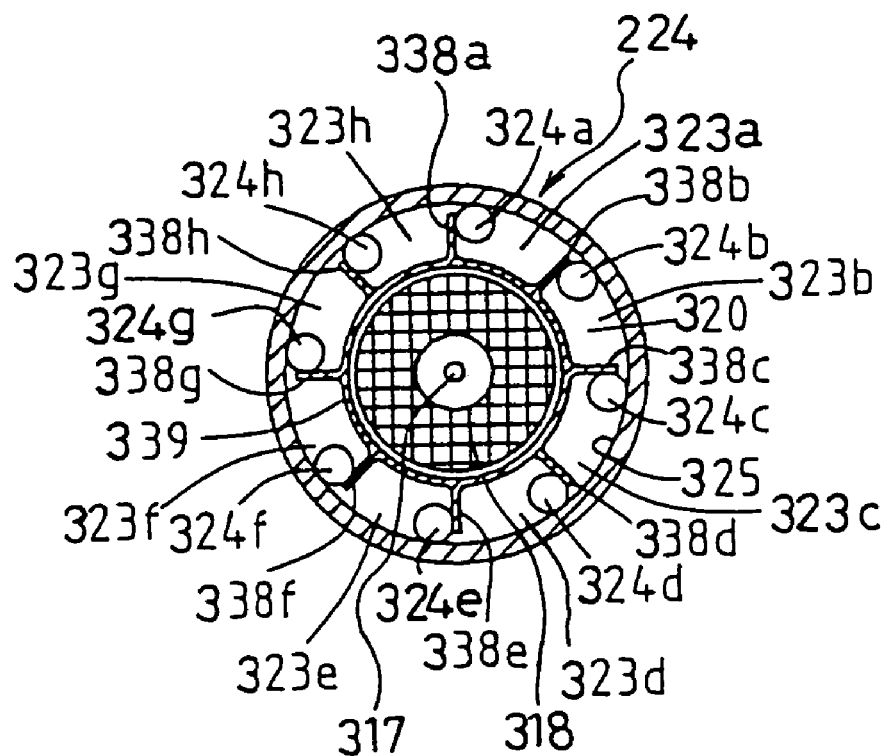
FIG. 37 is a plan sectional view showing the configuration of another balancer of the disk drive apparatus in accordance with the 10th embodiment of the present invention.

In the condition wherein the disk 301 is clamped by the above-mentioned clamper 316, just as in the case of the conventional disk drive apparatus shown in the above-mentioned FIG. 32, the clamp hole 312 is fitted on the boss 314, whereby the disk 301 is mounted on the turntable 310. Then, the disk 301 is held and clamped by the magnetic force acting between the magnet 318 provided in the clamper 316 and the opposed yoke 315 secured to the turntable 310. At this time, the center projection (center axis) 317 provided on the clamper 316 is fitted into the positioning hole 313 provided in the turntable 310 to carry out positioning. Therefore, the hollow ring-shaped portion 320, provided so as to be coaxial with the center projection (center axis), becomes coaxial with the rotation center axis P0 of the spindle motor 302. As a result, driven by the spindle motor 302, the clamper 316 is rotated integrally with the disk 301 and the turntable 310.

Furthermore, the disk drive apparatus of the seventh embodiment uses the insulators 307 formed of elastic bodies of urethane rubber or the like to connect the sub-base 306 to the main base 308. Thanks to these, the primary resonance frequency of the mechanical vibration of the sub-base 306 due to the deformation of the insulators 307, in the direction parallel to the recording face of the disk 301, is set lower than the rotation frequency of the disk 301. More specifically, in the case when the rotation frequency of the disk 301 has been set at about 100 Hz, both the primary resonance frequency of the vibration of the sub-base 306 in the direction (tracking direction) wherein the head is driven by the traverse drive mechanism and the primary resonance frequency of the vibration of the sub-base 306 in the direction perpendicular thereto are set at about 60 Hz.

In the disk drive apparatus of the seventh embodiment of the present invention configured as described above, operation in the case when the disk 301 having a large mass imbalance is rotated at 100 Hz will be described referring to FIGS. 12 and 13.

First, (a) of FIG. 13 shows an initial condition wherein the disk 301 is rotated at 100 Hz. As shown in (a) of FIG. 13, a centrifugal force (referred to as an imbalance force F) acts on the center of gravity G of the disk 301, and the direction of the action rotates as the disk 301 rotates. This imbalance force F deforms the insulators 307 (FIG. 12), and the sub-base 306 and the whole of the components mounted on the sub-base 306 whirl and vibrate at the rotation frequency of the disk 301. At this time, the resonance frequency (about 60 Hz) of the sub-base 306 due to the deformation of the insulators 307 is set lower than the rotation frequency (about 100 Hz) of the disk 301. Therefore, the displacement direction of the sub-base 306 and the action direction of the imbalance force F are nearly opposite to each other at all times. Therefore, the whirling center axis P1 of the disk 301 rotating over the sub-base 306 is offset between the center of gravity G of the disk 301 on which the imbalance force F acts and the rotation center axis P0 of the spindle motor 302.

In the above-mentioned condition, since the hollow ring-shaped portion 320 provided in the clamper 316 is positioned so as to be coaxial with the rotation center axis P0 of the spindle motor 302, the center of the hollow ring-shaped portion 320, i.e., the arc center P2 of the inner wall faces 325a, 325b, 325c and 325d of the outer peripheries of the arc-shaped balance chambers 323a, 323b, 323c and 323d coincides with the rotation center axis P0 of the spindle motion 302. Therefore, the hollow ring-shaped portion 320 carries out whirling operation around the whirling center axis P1.

At this time, a centrifugal force q1 acts on the ball 324a accommodated in the hollow ring-shaped portion 320 in the direction of connecting the whirling center axis P1 to the center of gravity of the ball 324a itself. In addition, since the movement of the ball 324a is restricted by the inner wall face 325a of the outer periphery of the hollow ring-shaped portion 320, a reaction N1 from the inner wall face 325a of the outer periphery acts on the ball 324a. This reaction N1 from the inner wall face 325a of the outer periphery acts toward the center P2 of the inner wall face 325a of the outer periphery. Therefore, a movement force R1, i.e., the resultant force of the centrifugal force q1 and the reaction N1, acts Q on the ball 324a in the direction of the tangent of the circle centered at the center P2 of the inner wall face 325a of the outer periphery, passing through the center of gravity of the ball 324a, and being away from the whirling center axis P1. By virtue of this movement force R1, the ball 324a moves along the inner wall face 325a of the outer periphery, moves up to the position wherein its movement is restricted by the partition wall 330a, and then stops.

At this time, just like the above-mentioned ball 324a, the other balls 324b, 324c and 324d move up to the positions wherein their movements are restricted by the partition walls 330b, 330c and 330d respectively, and then stop.

As a result, as shown in (b) of FIG. 13, the centrifugal force Q, the composite vector of the centrifugal forces q1, q2, q3 and q4 acting on the balls 324a, 324b, 324c and 324d respectively, acts in the direction nearly opposite to the imbalance force F acting at the center of gravity G of the disk 301. As a result, the imbalance force F is canceled by the centrifugal force Q, and the force acting on the sub-base 306 becomes small. Therefore, the vibration of the sub-base 306, occurring in the case when the disk 301 having a mass imbalance is rotated, is suppressed.

Next, in the disk drive apparatus of the seventh embodiment, the movement of the balls 324a, 324b, 324c and 324d in the case when the disk 301 having a mass imbalance is rotated will be described referring to FIG. 14.

Figure 14:
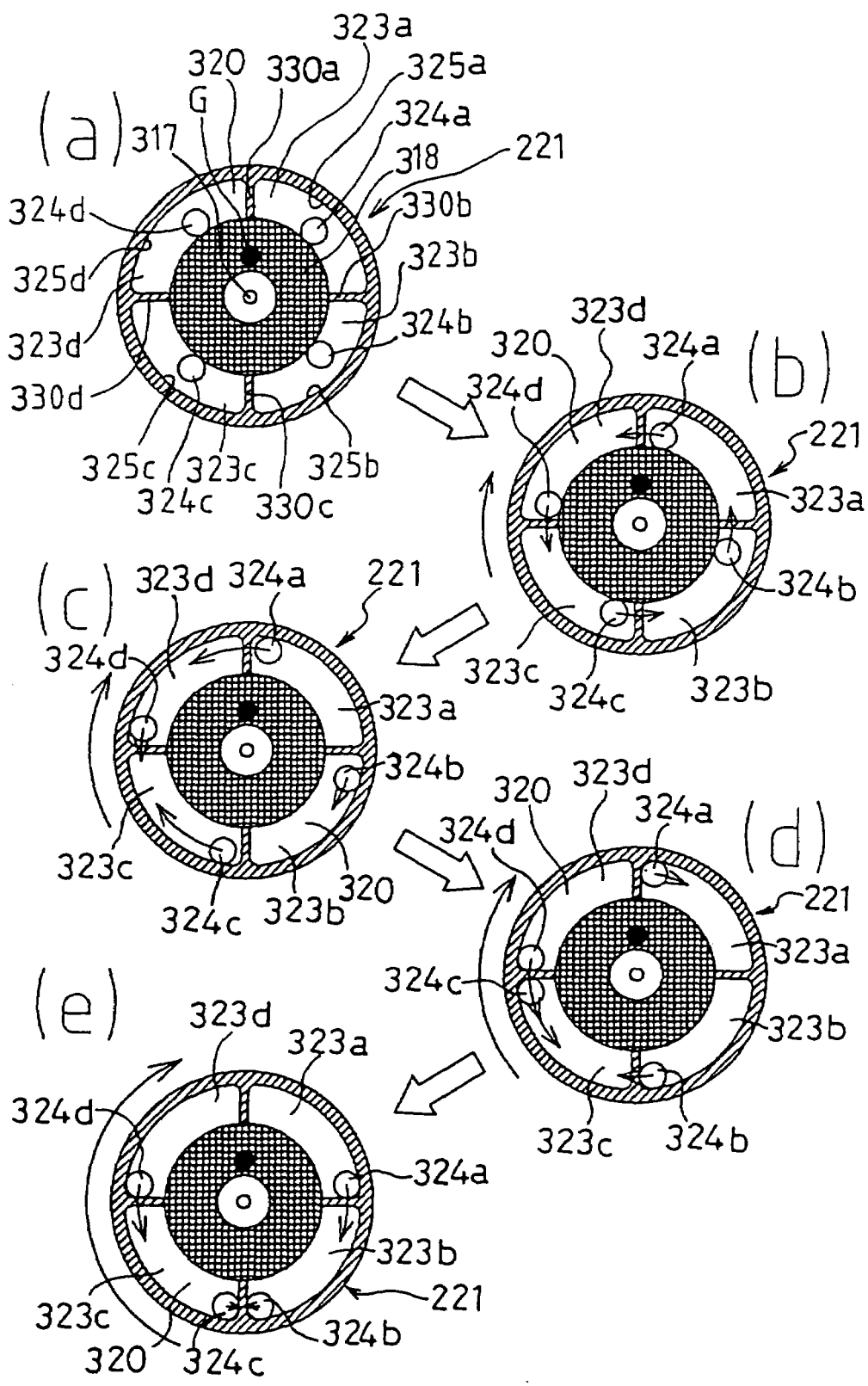
FIG. 14 is a view illustrating the movement of the balls of the balancer in the case when a disk having a mass imbalance is rotated at high speed by the disk drive apparatus in accordance with the seventh embodiment of the present invention.

FIG. 14 is a view showing the change of the positions of the balls 324a, 324b, 324c and 324d inside the clamper 316 with the passage of time in the case when the disk 301 having amass imbalance is mounted on the disk drive apparatus and rotated while being accelerated. The condition shown in FIG. 14 is a condition wherein the position of the center of gravity G of the disk 301 having the mass imbalance is on the extension line (in the radial direction) of the partition wall 330a, also showing a condition wherein the disk 301 is clamped in this condition. In FIG. 14, the condition of the balancer changes in the directions of the open arrows as the rotation speed of the disk 301 increases.

(a) of FIG. 14 shows a condition wherein the disk 301 is at rest, and the balls 324a, 324b, 324c and 324d are at rest while being attracted by the magnet 318.

(b) of FIG. 14 shows the initial condition of the acceleration of the disk 301; since the rotation speed of the disk 301 is low and the relationship of [centrifugal force]< [magnet force] is present at this time, the balls 324a, 324b, 324c and 324d move along the outer peripheral face of the magnet 318 while remaining attracted by the magnet 318. In (b) of FIG. 14, the disk 301 rotates rightward (clockwise), and the balls 324a, 324b, 324c and 324d move along the outer peripheral face of the magnet 318 while rotating leftward due to inertia forces, opposite to the rotation direction of the disk 301.

(c) of FIG. 14 shows the intermediate condition of the acceleration of the disk 301; since the rotation speed of the disk 301 is high, and the relationship of [centrifugal force]>[magnet force] is present at this time, the balls 324a, 324b, 324c and 324d separate from the magnet 318, and reach the inner wall faces 325a, 325b, 325c and 325d of the outer peripheries of the arc-shaped balance chambers 323a, 323b, 323c and 323d. At this time, the balls 324a, 324b, 324c and 324d still move in the direction opposite to the disk 301, and stops after making contact with the partition walls 330a, 330b, 330c and 330d respectively.

(d) of FIG. 14 shows the final condition of the acceleration of the disk 301, and shows the condition wherein the amplitude of the whirling vibration of the disk 301 increases. Due to the influence, the amplitude of the whirling vibration of the sub-frame 306 also increases. At this time, since the phase difference of the vibration between the tracking direction and the jitter direction of the whirling vibration of the sub-frame 306 is 90 degrees, the balls 324a, 324b, 324c and 324d move so that the composite force of the centrifugal forces of the balls 324a, 324b, 324c and 324d concentrates in the direction (on the left side of (d) of FIG. 14) 90 degrees dislocated from the center of gravity G of the disk 301.

(e) of FIG. 14 shows the end condition of the acceleration of the disk 301, and shows the condition wherein the rotation speed of the disk 301 has reached the maximum speed (maximum rotation frequency) of 100 Hz.

At this time, the phase difference of the vibration between the tracking direction (the head driving direction) and the jitter direction (the direction perpendicular to the tracking direction) of the whirling vibration of the sub-frame 306 is 180 degrees. Therefore, the balls 324a, 324b, 324c and 324d move so that the composite force of the centrifugal forces of the balls 324a, 324b, 324c and 324d concentrates in the direction (on the lower side of (e) of FIG. 14) 180 degrees dislocated from the center of gravity G of the disk 301. Therefore, the mass imbalance of the disk 301 is canceled sufficiently, and the whirling vibration of the sub-base 306 is suppressed.

Next, in the disk drive apparatus of the seventh embodiment, the movement condition of the balls 324a, 324b, 324c and 324d in the case when the disk 301 having no mass imbalance, i.e., having a uniform mass balance, is rotated at a high rotation frequency of 100 Hz will be described.

Figure 15:
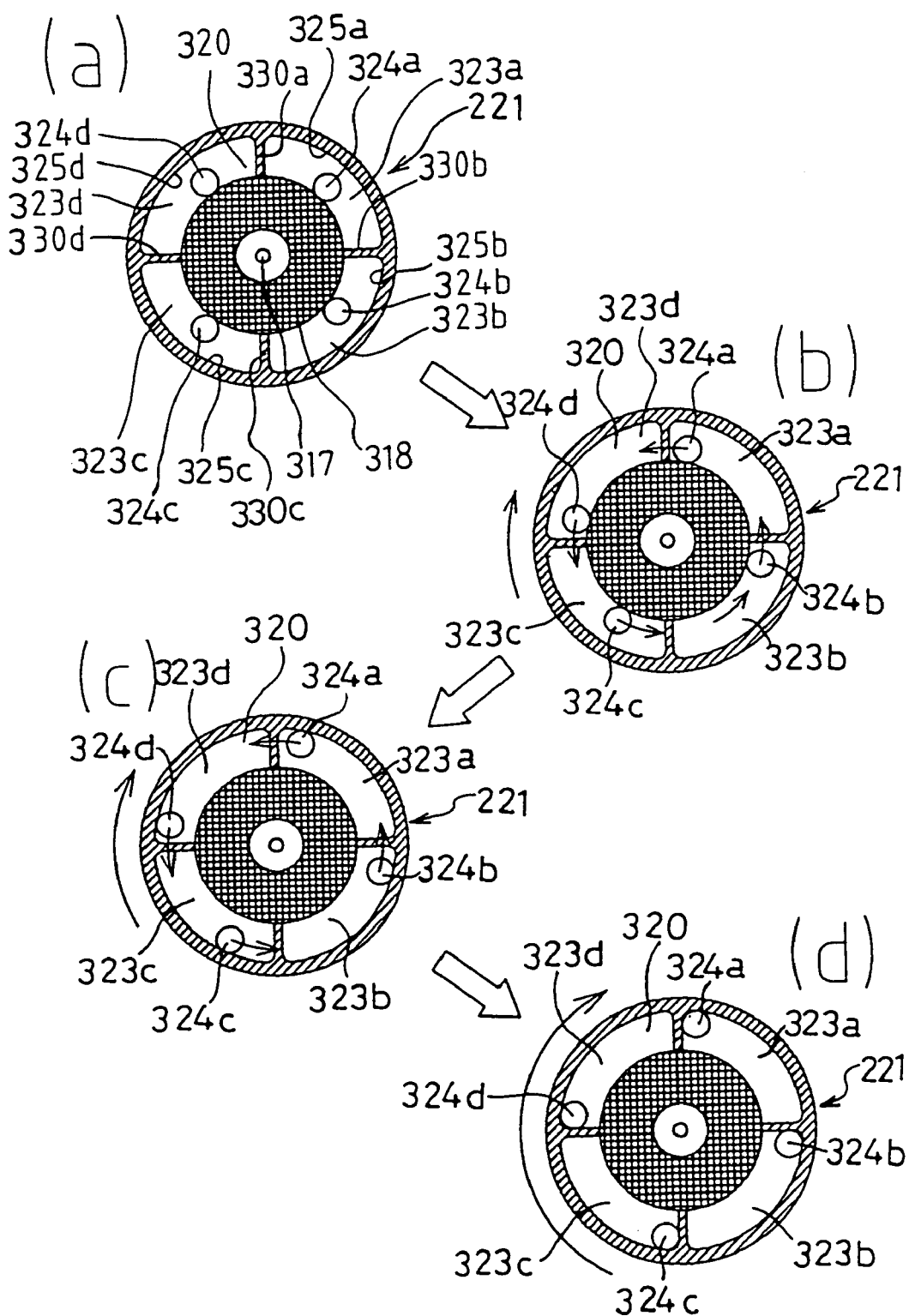
FIG. 15 is a view illustrating the movement of the balls of the balancer in the case when a uniform disk having no mass imbalance is rotated at high speed by the disk drive apparatus in accordance with the seventh embodiment of the present invention.
Figure 16:
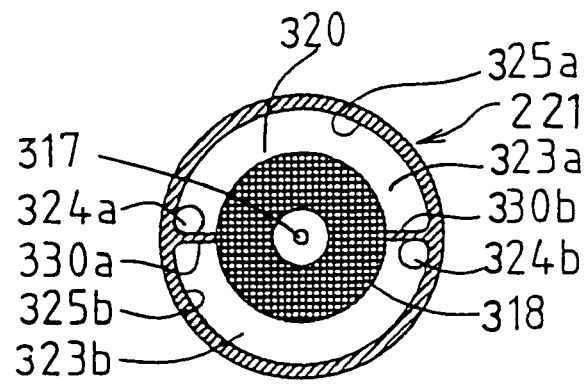
FIG. 16 is a plan sectional view showing the configuration of another balancer of the disk drive apparatus in accordance with the seventh embodiment of the present invention.
Figure 17:
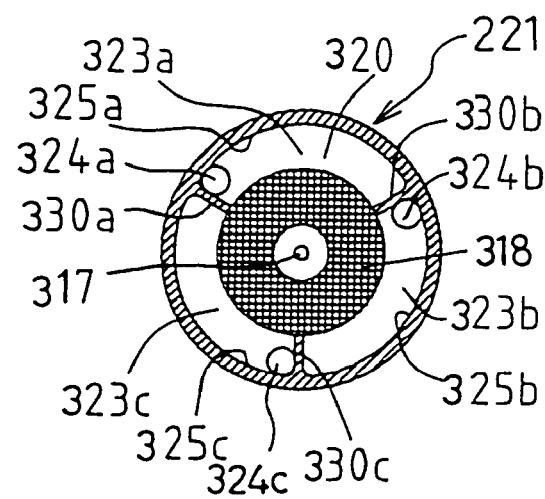
FIG. 17 is a plan sectional view showing the configuration of another balancer of the disk drive apparatus in accordance with the seventh embodiment of the present invention.
Figure 18:
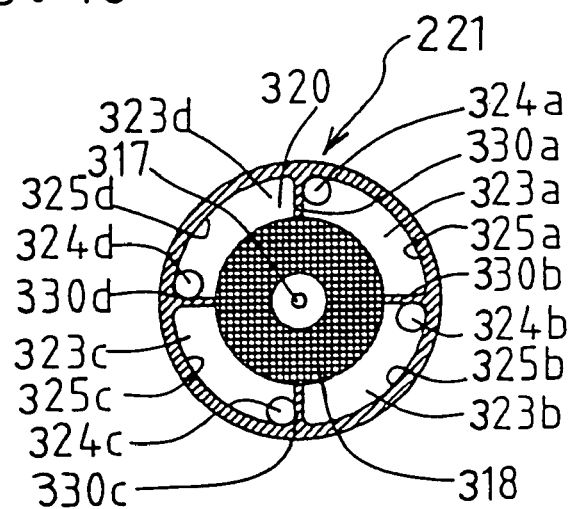
FIG. 18 is a plan sectional view showing the configuration of another balancer of the disk drive apparatus in accordance with the seventh embodiment of the present invention.
Figure 19:
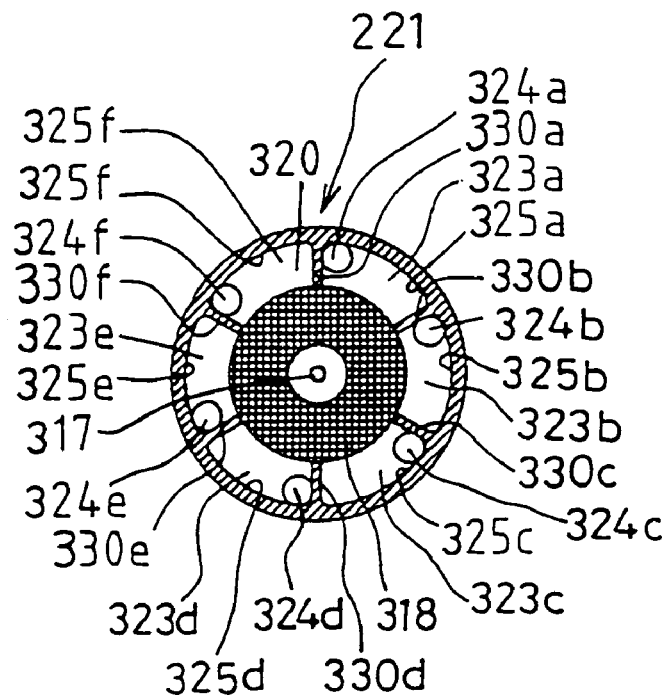
FIG. 19 is a plan sectional view showing the configuration of another balancer of the disk drive apparatus in accordance with the seventh embodiment of the present invention.
Figure 20:
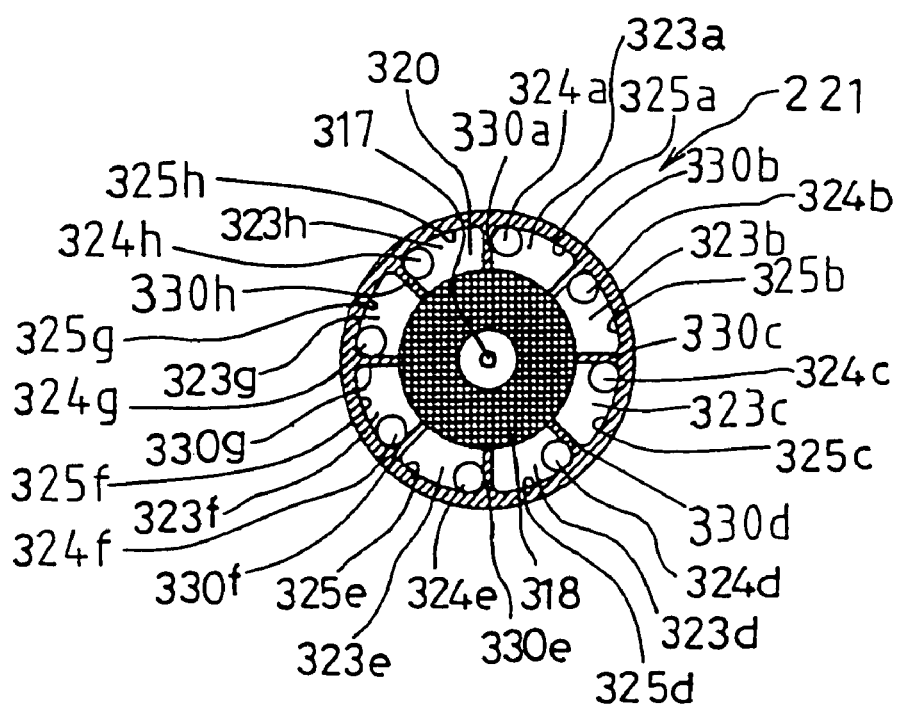
FIG. 20 is a plan sectional view showing the configuration of another balancer of the disk drive apparatus in accordance with the seventh embodiment of the present invention.

FIG. 15 is a view showing the change of the positions of the balls 324a, 324b, 324c and 324d inside the clamper 316 with the passage of time in the case when a uniform disk 301 having no mass imbalance is mounted on the disk drive apparatus and rotated while being accelerated. In FIG. 15, the condition of the balancer changes in the directions of the open arrows as the rotation speed of the disk 301 increases. In the case shown in FIG. 15, the indication of the center of gravity G is omitted since the disk 301 has no mass imbalance. In addition, the positional relationship between the center of gravity G of the disk 301 and the partition wall 330 is neglected since the disk 301 has no mass imbalance.

(a) of FIG. 15 shows a condition wherein the disk 301 is at rest, and the balls 324a, 324b, 324c and 324d having magnetism are attracted by the magnet 318.

(b) of FIG. 15 shows the initial condition of the acceleration of the disk 301; since the rotation speed of the disk 301 is low, the relationship of [centrifugal force]<[magnet force] is present at this time, and the balls 324a, 324b, 324c and 324d remain attracted by the magnet 318. At this time, the disk 301 rotates rightward (clockwise), and the balls 324a, 324b, 324c and 324d move along the outer peripheral face of the magnet 318 while rotating leftward (counterclockwise) due to inertia forces, opposite to the rotation direction of the disk 301.

(c) of FIG. 15 shows the intermediate condition of the acceleration of the disk 301; the rotation speed of the disk 301 is high, and the relationship of [centrifugal force]>[magnet force] is present at this time; the balls 324a, 324b, 324c and 324d separate from the magnet 318, and reach the inner wall faces 325a, 325b, 325c and 325d of the outer peripheries of the arc-shaped balance chambers 323a, 323b, 323c and 323d respectively. At this time, the balls 324a, 324b, 324c and 324d still move in the direction opposite to the rotation direction of the disk 301, and stops after making contact with the partition walls 330a, 330b, 330c and 330d respectively.

(d) of FIG. 15 shows the final condition of the acceleration of the disk 301; the balls 324a, 324b, 324c and 324d become stable at the positions wherein they make contact with the partition walls 330a, 330b, 330c and 330d respectively.

Since the partition walls 330a, 330b, 330c and 330d are provided at uniform intervals, that is, at angles of every 90 degrees (hereinafter simply referred to as center angles) around the rotation center of the disk 301 as described above, the balls 324a, 324b, 324c and 324d become stable at the positions wherein they make contact with the partition walls 330a, 330b, 330c and 330d. Therefore, the balls 324a, 324b, 324c and 324d are disposed at equal intervals, whereby any imbalance due to the dispositions of the balls 324a, 324b, 324c and 324d does not occur at all.

In the balancer 221 of the disk drive apparatus of the seventh embodiment of the present invention, the case wherein the four partition walls for dividing the hollow ring-shaped portion 320 used as a ring-shaped track are provided at uniform intervals, that is, at the center angles of every 90 degrees, has been described; however, as shown in FIGS. 16 to 20, the number of the partition walls for dividing the hollow ring-shaped portion 320 is not limited to four; even if the hollow ring-shaped portion 320 is divided by about 2, 3, 4, 6 or 8 partition walls, a similar effect can be obtained. In FIGS. 16 to 20, the same numeral codes are assigned to the elements having the same functions as those of the elements of the disk drive apparatus of the above-mentioned seventh embodiment; in the case when a plurality of identical elements are used, lower-case alphabetic characters (a, b, c, . . . ) are attached in order after the numeral code corresponding to the element. Even if the number of the partition walls is 5 or 7, although not shown in the drawings, an effect similar to that of the above-mentioned embodiment can be obtained.

Figure 21:
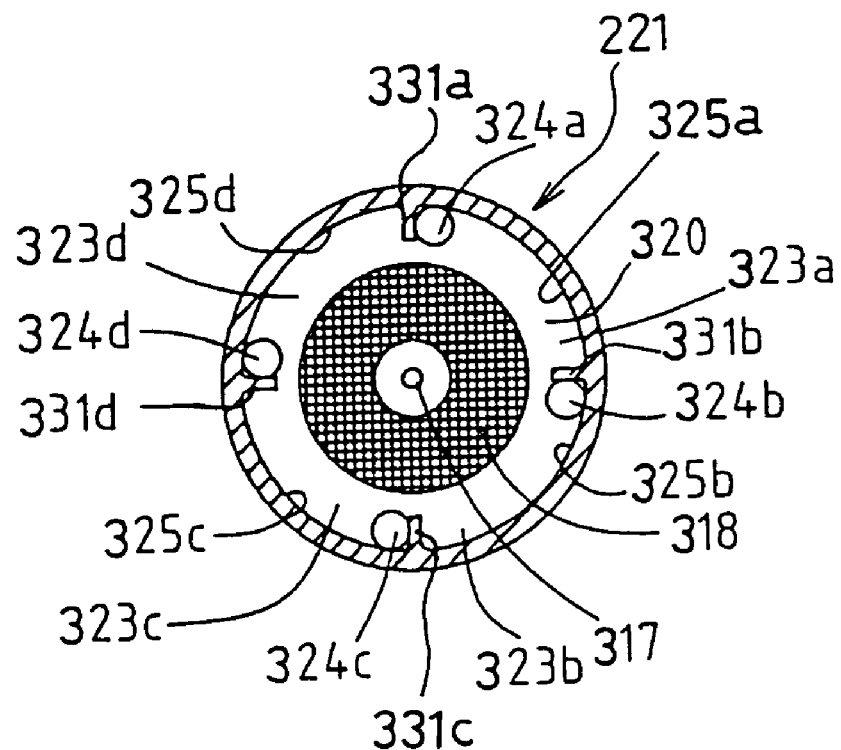
FIG. 21 is a plan sectional view showing the configuration of another balancer of the disk drive apparatus in accordance with the seventh embodiment of the present invention.
Figure 22:
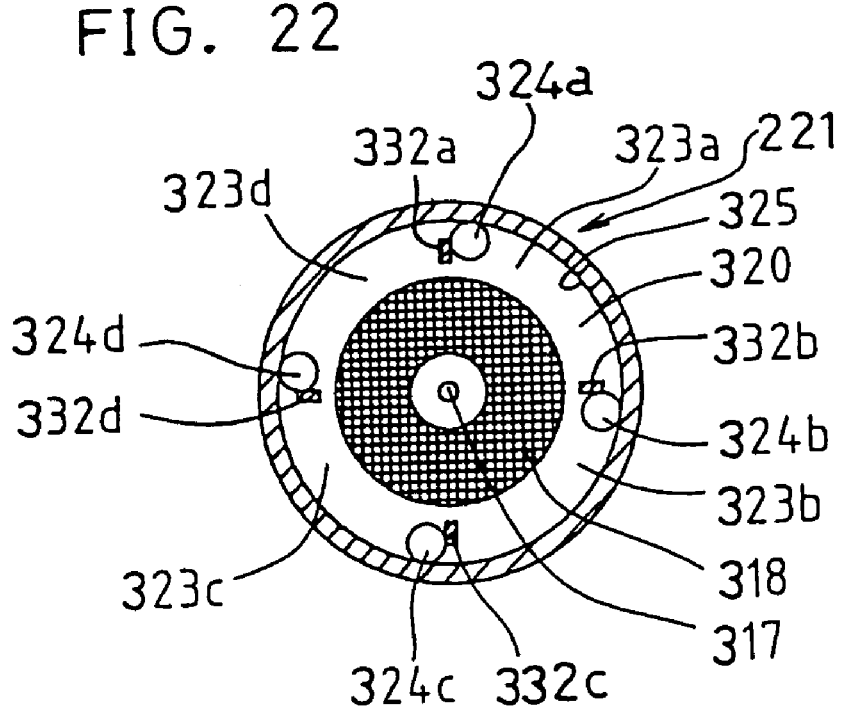
FIG. 22 is a plan sectional view showing the configuration of another balancer of the disk drive apparatus in accordance with the seventh embodiment of the present invention.

In the disk drive apparatus of the seventh embodiment of the present invention, a member having the shape of the partition wall shown in FIG. 13 was used for the explanation as a member for dividing the hollow ring-shaped portion 320; however, the member for dividing the hollow ring-shaped portion 320 is not required to be a member having the shape of the partition wall in the case when solid members such as balls, circular cylinders, cubes, disk-shaped members, plate-shaped members or the like are used as balance members to be accommodated in the hollow ring-shaped portion 320. For example, it may be configured that such projection-shaped members 331a, 331b, 331c and 331d as shown in FIG. 21, projecting inward from portions of the inner wall face 325 of the outer periphery of the hollow ring-shaped portion 320, are provided so that the above-mentioned balance members can move inside the arc-shaped balance chambers 323a, 323b, 323c and 323d respectively. In addition, it may be configured that such pillar-shaped members 332a, 332b, 332c and 332d as shown in FIG. 22 are formed at predetermined intervals inside the ring-shaped space of the hollow ring-shaped portion 320 so that the solid balance members, such as the balls 324a, 324b, 324c and 324d cannot move into the adjacent balance chambers 323a, 323b, 323c and 323d. By dividing the hollow ring-shaped portion 320 as described above, an effect similar to that obtained in the case when the hollow ring-shaped portion 320 is divided by the partition walls 330a, 330b, 330c and 330d can be obtained.

In the disk drive apparatus of the seventh embodiment of the present invention, the balls 324a, 324b, 324c and 324d are formed of a magnetic material; however, even if the balls are formed of a non-magnetic material, the disk drive apparatus of the seventh embodiment can suppress the vibration of the disk having a mass imbalance.

In the case when the balancer 221 is provided in the clamper 316 just as in the case of the seventh embodiment of the present invention, the other components use the small space above the disk 301; therefore, the diameter of the hollow ring-shaped portion 320 can be made larger, and the mass of each ball and the number of the balls can be increased. Consequently, by increasing the diameter of the hollow ring-shaped portion 320, or by increasing the mass of each ball and the number of the balls, vibration can be suppressed sufficiently, even if a disk having a larger mass imbalance is mounted.

In the disk drive apparatus of the seventh embodiment of the present invention, an example wherein the balancer 221 is provided in the clamper 316 has been described; however, an effect similar to that of the above-mentioned seventh embodiment can be obtained even if a different structure is used, provided that the hollow ring-shaped portion 320 is disposed coaxially with the rotation center of the disk 301 and rotatable integrally with the disk 301. An effect similar to that of the above-mentioned seventh embodiment can be obtained even if the hollow ring-shaped portion is disposed so as to be rotatable integrally with the spindle motor shaft 321 by providing the balancer on the turntable 310 on which the disk 301 is mounted, by providing the balancer on the rotor portion of the spindle motor 302, or by providing the balancer on the sub-base 306 on the opposite side of the spindle motor 302, for example.

Figure 23:
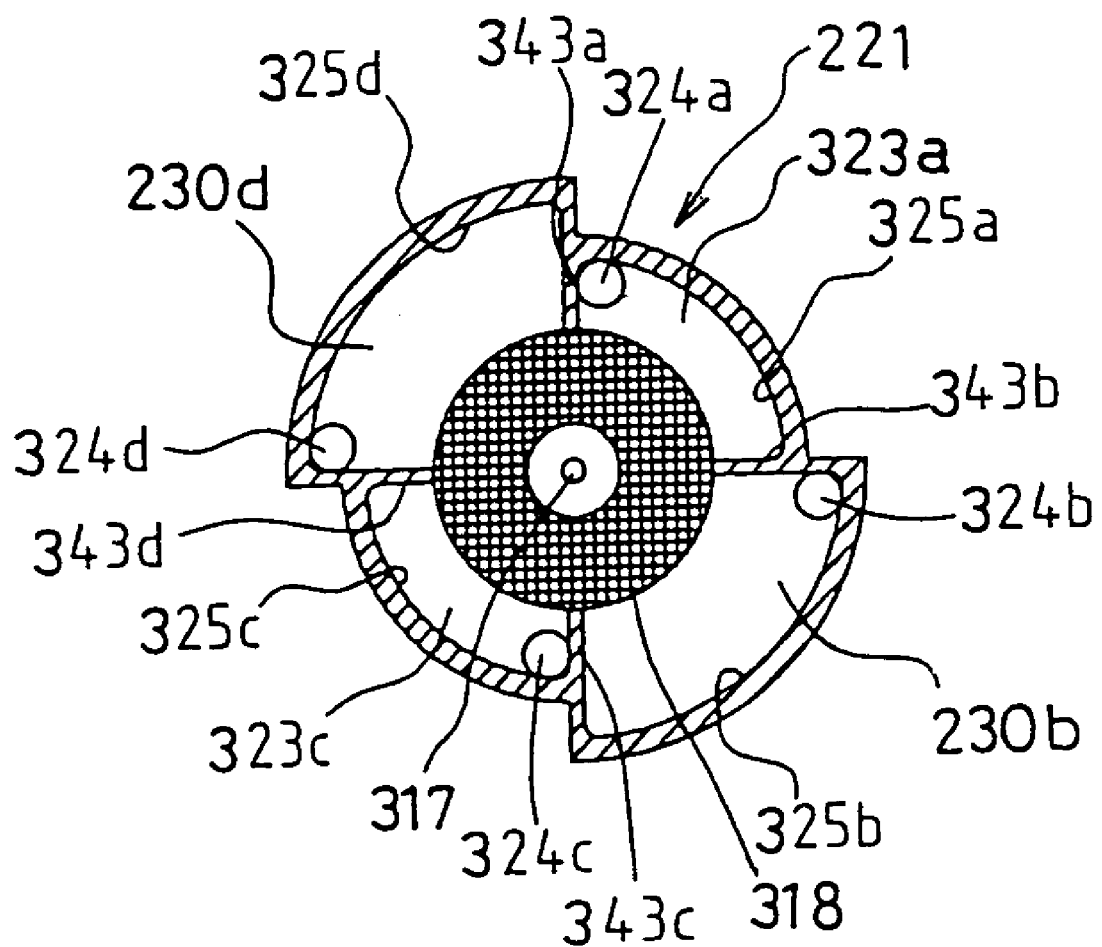
FIG. 23 is a plan sectional view showing the configuration of another balancer of the disk drive apparatus in accordance with the seventh embodiment of the present invention.

In the disk drive apparatus of the seventh embodiment of the present invention, the shape of the hollow ring-shaped portion 320 for accommodating the balls is a ring wherein the inner wall faces 325a, 325b, 325c and 325d of the outer periphery thereof have the same radius. However, in the disk drive apparatus of the present invention, the plural hollow ring-shaped portions are not always required to have the shape of a ring having the same radius. An effect similar to that of the above-mentioned seventh embodiment can be obtained even if two kinds of arc-shaped balance chambers 323a, 230b, 323c and 230d, formed of plural partition walls 343a, 343b, 343c and 343d and inner wall faces 325a, 325b, 325c and 325d of the outer periphery having different radii, are combined as shown in FIG. 23, for example.

Figure 24:
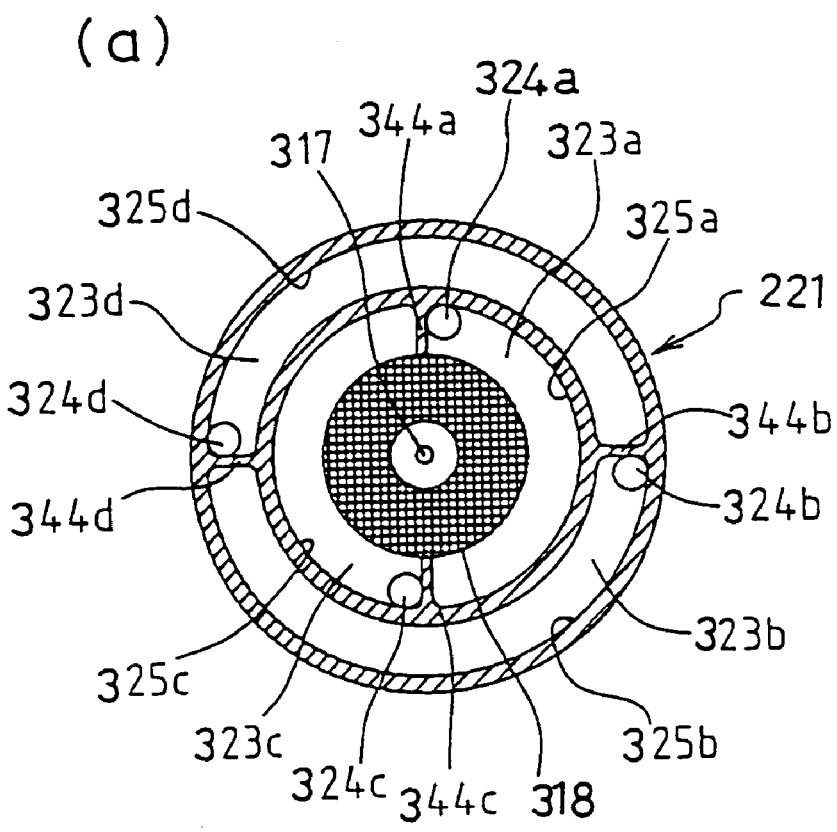
FIG. 24 shows a plan sectional view (a) and a vertical sectional view (b) showing the configurations of other two kinds of balancers of the disk drive apparatus in accordance with the seventh embodiment of the present invention.
Figure 24:
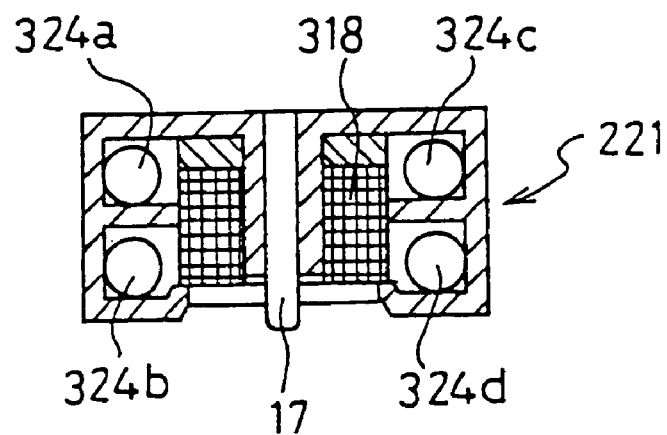

(a) of FIG. 24 is a plan sectional view showing an example of the configuration of another balancer of the seventh embodiment, and (b) of FIG. 24 is a vertical sectional view showing an example of the configuration of still another balancer. In the embodiment shown in (a) of FIG. 24, as the hollow ring-shaped portion 320 of the disk drive apparatus, arc-shaped balance chambers 323a, 323b, 323c and 323d having the center angles of about 180 degrees and being formed of plural partition walls 344a, 344b, 344c and 344d are disposed so as to overlap in the radial direction, i.e., so as to be double. Even in this structure an-effect similar to that of the above-mentioned seventh embodiment can be obtained. In the shape of the balancer 221 shown in (a) of FIG. 24, the inside and outside chambers of the arc-shaped balance chambers 323a, 323b, 323c and 323d are dislocated about 90 degrees from each other. (a) of FIG. 24 shows the structure of the balancer 221 wherein the arc-shaped balance chambers 323a, 323b, 323c and 323d are doubled in the radial direction. Even by using a structure wherein arc-shaped balance chambers having the same diameter are disposed in double in the direction of the rotation axis of the disk 301 and the positions of the partition walls thereof are dislocated about 90 degrees from each other, an effect similar to that of the above-mentioned seventh embodiment can be obtained.

Eighth Embodiment

Figure 25:
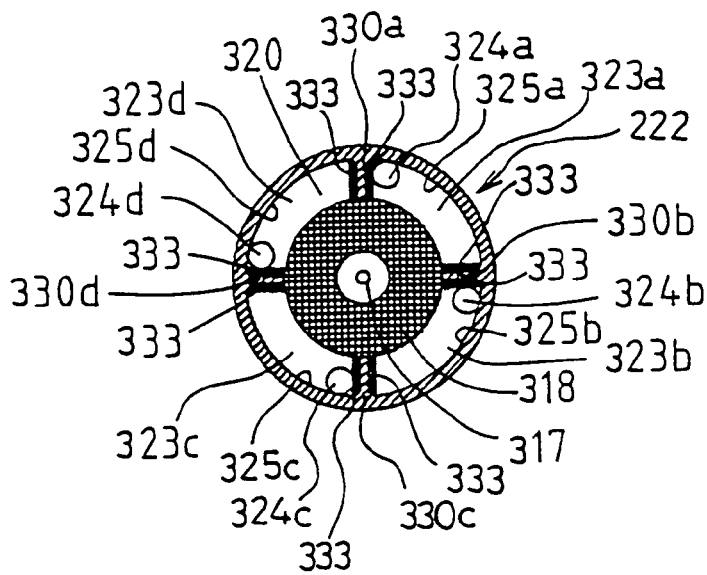
FIG. 25 is a plan sectional view showing the configuration of a balancer of the disk drive apparatus in accordance with the eighth embodiment of the present invention.
Figure 26:
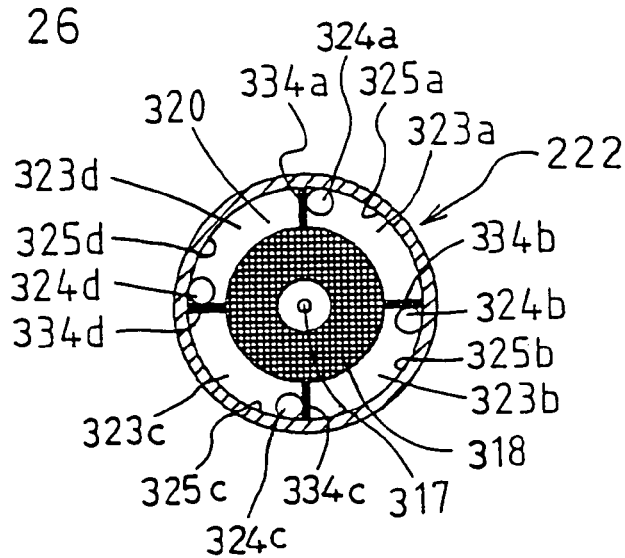
FIG. 26 is a plan sectional view showing the configuration of another balancer of the disk drive apparatus in accordance with the eighth embodiment of the present invention.
Figure 27:
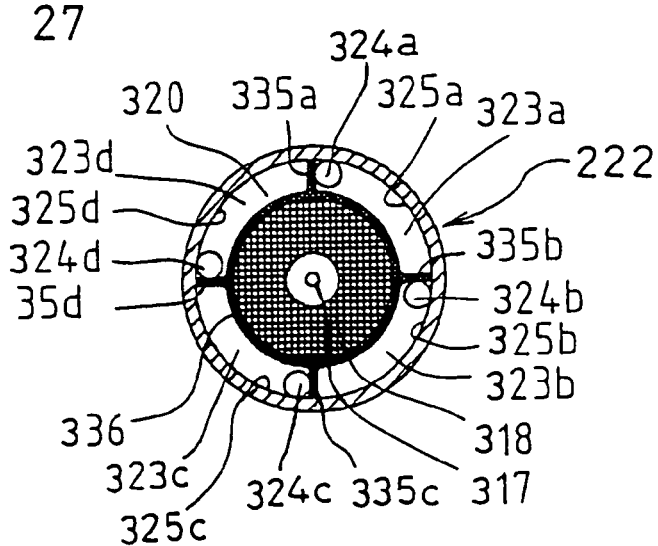
FIG. 27 is a plan sectional view showing the configuration of another balancer of the disk drive apparatus in accordance with the eighth embodiment of the present invention.

Next, a disk drive apparatus in accordance with an eighth embodiment of the present invention will be described referring to the drawings. FIGS. 25, 26 and 27 are plan sectional views showing the inner structures of balancers 222 provided in a clamper in accordance with the eighth embodiment of the present invention. The element shaving functions substantially identical to those of the elements of the disk drive apparatus of the above-mentioned seventh embodiment are represented by the same numeral codes, and the descriptions for the preceding embodiment are applied, thereby omitting overlap descriptions. In addition, since the balancer 222 of the eighth embodiment is shown similarly to the balancer 221 of the vertical sectional view shown in the above-mentioned FIG. 12, the vertical sectional view of the balancer 222 of the eighth embodiment is omitted.

In the eighth embodiment of the present invention, elastic bodies are provided for the hollow ring-shaped portion 320 provided in the clamper 316 (FIG. 12) of the above-mentioned seventh embodiment; the elastic bodies are stuck to the partition walls for dividing the hollow ring-shaped portion 320, or the partition walls themselves are formed of elastic bodies.

In the disk drive apparatus of the eighth embodiment, wherein the balancer 222 is provided with elastic bodies as described above, the case wherein the disk drive apparatus is driven in a vertical installation condition will be described.

In the case when the disk drive apparatus of the above-mentioned seventh embodiment shown in FIG. 12 is operated in a vertical installation condition, driving is carried out while the clamper 316 holds the disk 301 so that the recording face of the disk 301 becomes vertical. In the case when the disk 301 is rotated at high speed with the disk drive apparatus installed vertically, the balls 324a, 324b, 324c and 324d accommodated in the arc-shaped balance chambers 323a, 323b, 323c and 323d respectively of the hollow ring-shaped portion 320 of the clamper 316 are attached to the inner wall faces 325a, 325b, 325c and 325d of the outer periphery of the hollow ring-shaped portion 320 because the centrifugal forces become more dominant than the influence of gravity. In this condition, the balls 324a, 324b, 324c and 324d do not move easily.

However, in the case when the disk 301 is rotated at low speed, or at the time when it rotates at low speed immediately after the start of rotation, the centrifugal force acting on each of the balls 324a, 324b, 324c and 324d is small, and gravity becomes dominant; therefore, the balls 324a, 324b, 324c and 324d separating from the magnet 318 collide with the partition walls 330a, 330b, 330c and 330d, thereby causing noise.

As shown in FIG. 25, elastic bodies 333 are stuck to both faces of each of the partition walls 330a, 330b, 330c and 330d. This configuration drastically reduces the noise caused at the time when the balls 324a, 324b, 324c and 324d collide with the partition walls 330a, 330b, 330c and 330d in the case when the disk 301 is rotated at low speed. The material of the elastic body 333 should only be formed of a shock-absorbing material, such as natural rubber, synthetic rubber, sponge or the like, which can absorb a shock at the time of the collisions of the balls 324a, 324b, 324c and 324d with the partition walls 330.

FIG. 26 is a plan sectional view showing an example wherein the partition walls of the balancer 222 in accordance with the eighth embodiment are formed of elastic bodies. Since the partition walls 334a, 334b, 334c and 334d formed of elastic bodies are formed in the hollow ring-shaped portion 320 as shown in FIG. 26, an effect similar to that of the balancer 222 shown in the above-mentioned FIG. 25 can be obtained. To divide the hollow ring-shaped portion 320 by using the partition walls 334a, 334b, 334c and 334d formed of elastic bodies as described above, the partition walls 334a, 334b, 334c and 334d are firmly secured or stuck to the balancer 222 so that the partition walls 334a, 334b, 334c and 334d can sufficiently absorb shocks caused by the balls 324a, 324b, 324c and 324d and can function as partition walls. The material of the elastic body should only be a material capable of absorbing the shocks due to the collisions of the balls 324a, 324b, 324c and 324d, that is, a shock-absorbing material, such as natural rubber, synthetic rubber, sponge or the like.

However, since the partition walls 334a, 334b, 334c and 334d of the hollow ring-shaped portion 320 shown in FIG. 26 are formed of elastic bodies only, the rigidity of the partition walls may sometimes be insufficient. Therefore, it may be possible to provide a balancer 222 wherein the outer periphery of the magnet 18 is covered with a pipe-shaped partition wall holder 336 formed of an elastic material and partition walls 335a, 335b, 335c and 335d are integrally molded so as to radially project from the outer peripheral face of the partition wall holder 336. The partition walls 335a, 335b, 335c and 335d of the balancer 222 shown in FIG. 27 can secure the rigidity required as the partition walls, and can absorb shocks due to the collisions of the balls 324a, 324b, 324c and 324d with the partition walls 335a, 335b, 335c and 335d, thereby being capable of drastically reducing noise. The elastic bodies of the partition walls 335a, 335b, 335c and 335d should only be made of a shock-absorbing material, such as natural rubber, synthetic rubber or the like, which can be formed in the special shape of the partition-walls 335a, 335b, 335c and 335d shown in FIG. 27.

As described above, the disk drive apparatus of the eighth embodiment of the present invention is intended to reduce noise occurring due to the collisions of the balls with the partition walls at the time when the disk 301 is rotated at low speed in the case when the disk drive apparatus is installed vertically and operated.

In the above-mentioned disk drive apparatus of the seventh embodiment, to prevent noise occurring due to the collisions of the balls with the partition walls at the time when the disk 301 is rotated at low speed in the case when the disk drive apparatus is installed vertically, the balls are made of a magnetic material so that the balls are attracted by the magnet 318 at the time of low-speed rotation and so that the balls is separated from the magnet by centrifugal forces at the time of high-speed rotation.

However, in the disk drive apparatus of the eighth embodiment of the present invention, since the partition walls are formed of elastic bodies, noise due to the collisions of the balls with the partition walls is reduced significantly. Therefore, it is not necessary for the balls to remain attracted by the magnet at the time of low-speed rotation in the eighth embodiment, whereby noise occurrence can be suppressed significantly even if either a magnetic or non-magnetic material is used as the material of the balls.

In the above-mentioned eighth embodiment, the case wherein the number of the partition walls is four has been described; however, in the disk drive apparatus of the present invention, the number of the partition walls is not limited to four; even if the hollow ring-shaped portion is divided by about two to eight partition walls, an effect similar to that of the above-mentioned eighth embodiment can be obtained.

The partition walls of the eighth embodiment have the shape of a partition wall for completely dividing the hollow ring-shaped portion; however, the present invention is not limited to this kind of configuration; it may be possible to use a configuration in which spaces for allowing balance members to move therein can be formed. For example, as shown in the above-mentioned FIG. 21, the partition walls may be provided by sticking elastic bodies to the projections extending inward from the portions of the inner wall faces of the outer periphery of the hollow ring-shaped portion; in addition, as shown in the above-mentioned FIG. 22, the partition walls may be formed by sticking elastic bodies to the pillar-shaped portions provided in the ring-shaped space of the hollow ring-shaped portion. With this kind of configuration, the noise due to the collisions of the balls or the like used as balance members with the partition walls is reduced, whereby an effect similar to that in the case of the partition walls can be obtained.

In the above-mentioned disk drive apparatus of the eighth embodiment of the present invention, the configuration wherein the balancer 222 is provided in the clamper 316 is shown. However, even if a configuration different from that is used, an effect similar to that of the above-mentioned eighth embodiment can be obtained, provided that the hollow ring-shaped portion is coaxial with the rotation center of the disk 301 and rotatable integrally with the disk 301. For example, by providing the balancer on the turntable 310 on which the disk 301 is mounted, by providing the balancer in the rotor portion of the spindle motor 302, or by providing the balancer on the sub-base 306 on the opposite side of the spindle motor 302 so that the balancer is made rotatable integrally with the spindle motor shaft 321, an effect similar to that of the above-mentioned eighth embodiment can be obtained.

Ninth Embodiment

Figure 28:
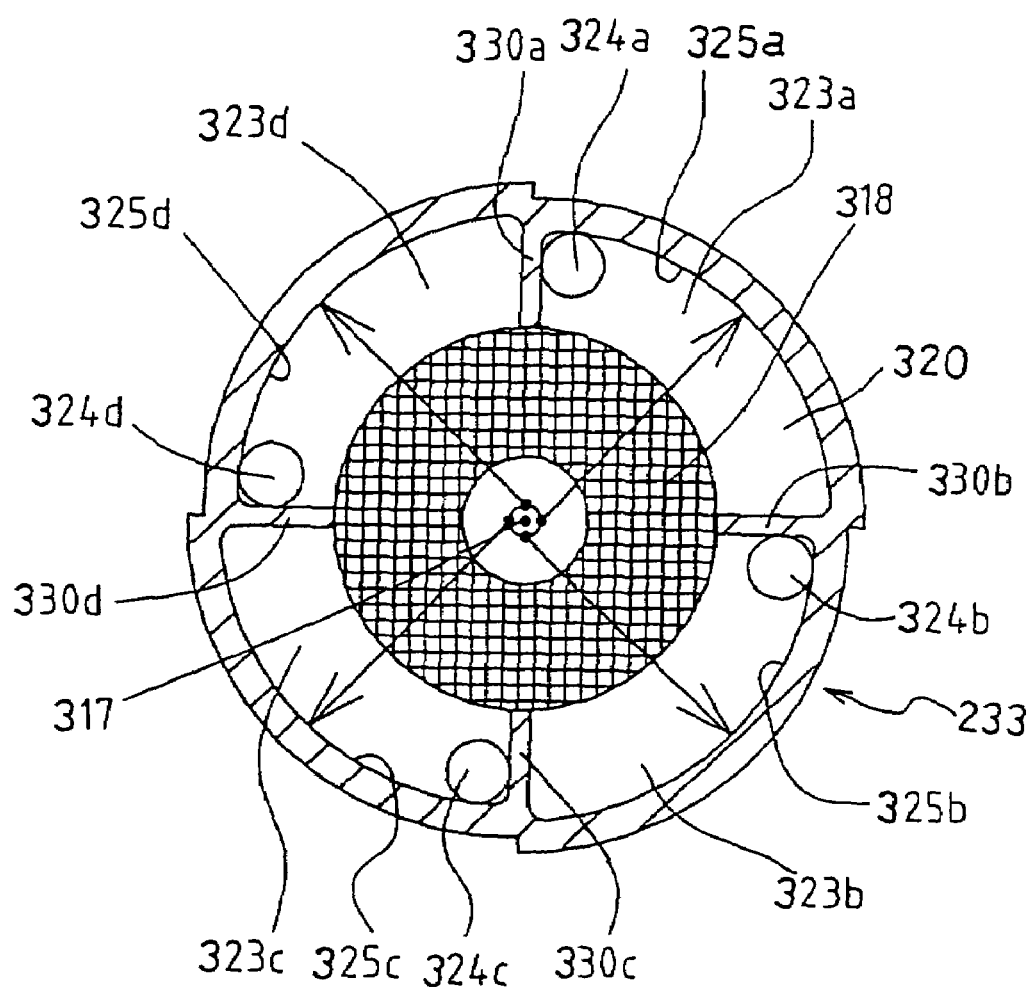
FIG. 28 is a plan sectional view showing the configuration of a balancer of the disk drive apparatus in accordance with the ninth embodiment of the present invention.

Next, a disk drive apparatus in accordance with a ninth embodiment of the present invention will be described referring to the drawings. FIG. 28 is a plan sectional view showing the inner structure of a balancer 223 provided in a clamper in accordance with the ninth embodiment of the present invention. The elements having functions substantially identical to those of the elements of the disk drive apparatuses described in the above-mentioned seventh and eighth embodiments are represented by the same numeral codes, and the descriptions for the preceding embodiments are applied, thereby omitting overlap descriptions. In addition, since the balancer 223 of the ninth embodiment is shown similarly to the balancer 221 of the vertical sectional view shown in the above-mentioned FIG. 12, the vertical sectional view of the balancer 223 of the ninth embodiment is omitted.

The disk drive apparatus of the ninth embodiment is intended to solve a rarely occurring problem wherein balls 324 do not move to their optimum positions in the disk drive apparatuses of the above-mentioned seventh and eighth embodiments, although the occurrence frequency of the problem is; counter measures for solving the problem will be described below.

In the disk drive apparatus of the ninth embodiment, attention is paid to the movement forces R of the balls 324a, 324b, 324c and 324d used as balance members. The forces R1, R2, R3 and R4 acting on the balls 324a, 324b, 324c and 324d accommodated in the hollow ring-shaped portion 320 of the clamper 316 in the case when the disk 301 is rotated at the maximum speed generate as shown by the arrows shown in the above-mentioned FIGS. 13(a) and (b). In particular, (b) of FIG. 13 clearly showing the relationship between the positions of the balls 324a, 324b, 324c and 324d and the movement forces R1, R2, R3 and R4 is used for the following description.

When the movement forces R1, R2, R3 and R4 acting on the balls 324a, 324b, 324c and 324d respectively are compared in magnitude, the movement forces R2 and R3 acting on the balls 324b and 324c dislocated about 90 degrees from the center of gravity G of the disk 301 having a mass imbalance are far lager than the movement forces R1 and R4 acting on the balls 324a and 324d dislocated about 180 degrees. As described above, the movement forces R1, R2, R3 and R4 become significantly different depending on the angles of the balls 324a, 324b, 324c and 324d with respect to the center of gravity G of the disk 301. When the movement force R is sought in the range from 0 to 180 degrees, the movement force R has the minimum value at the positions of 0 and 180 degrees, and the maximum value at the position of 90 degrees.

Because of this kind of relationship between the ball positions and the movement force R, in the seventh and eighth embodiments, a problem is caused wherein the balls are left on the side of the center of gravity G of the disk 301 and the imbalance cannot be improved sufficiently in some rare cases.

Next, the mechanism of causing the problem wherein the balls of the balancer do not move to the optimum positions in the above-mentioned seventh embodiment will be described by taking a concrete example.

Figure 29:
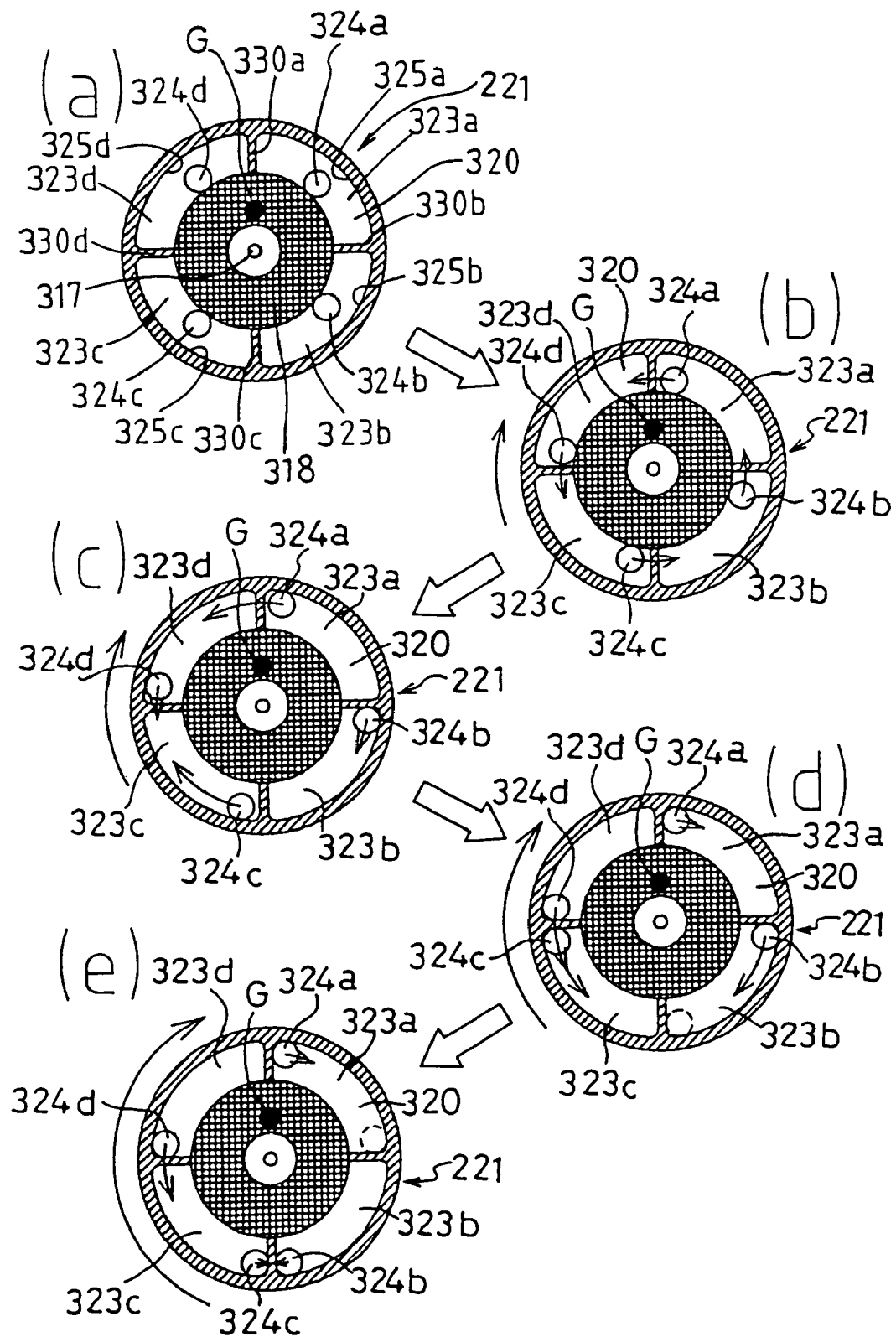
FIG. 29 is a view illustrating a problem in the balancers of the disk drive apparatuses in accordance with the seventh embodiment of the present invention.

FIG. 29 is a view illustrating the case wherein the balls of the balancer do not move to the optimum positions, that is, the problem occurring in the seventh embodiment. The conditions shown in FIGS. 29(a) to (c) are the same as those shown in the above-mentioned FIGS. 14(a) to (c) showing the changes of the balls moving inside the hollow ring-shaped portion with the passage of time. In FIG. 29, the condition of the balancer changes in the directions of the open arrows as the rotation speed of the disk 301 increases.

As shown in FIG. 29(e), the ball 324a is left at the position having about 0 degrees with respect to the center of gravity G of the disk 301, that is, on the imbalance side. By investigating the cause of this problem, the inventors have found an occurrence mechanism described below.

Up to the FIGS. 29(a) to (c), the balls 324a, 324b, 324c and 324d are located at the same positions as those shown in the above-mentioned FIG. 14. However, in the condition shown in (d) of FIG. 29, the composite force of the centrifugal forces of the balls 324a, 324b, 324c and 324d concentrates on the left side; however, since the movement force R acting on the ball 324b located at the lower right position is small, the ball 324b is left on the right side.

In addition, in the condition shown in FIG. 29(e) in the case when the disk 301 rotates at the maximum speed, the composite force of the centrifugal forces of the balls 324a, 324b, 324c and 324d concentrates on the lower side; however, since its movement force R is small, the ball 324a is left on the upper side. At this time, the ball 324b moves to the lower side since its movement force R increases. For this reason, in the above-mentioned seventh embodiment, when the disk 301 has reached the maximum speed, at least one of the plural balls 324a, 324b, 324c and 324d may be left on the imbalance side of the disk 301, thereby not disposed at the optimum position; therefore; therefore, a problem occurs wherein the effect of canceling the mass imbalance of the disk 301 by optimally disposing the balls 324a, 324b, 324c and 324d is reduced significantly in some cases.

In order to solve the above-mentioned problem, in the disk drive apparatus of the ninth embodiment of the present invention, the centers of the arcs of the inner wall faces 325a, 325b, 325c and 325d of the outer peripheries of the arc-shaped balance chambers 323a, 323b, 323c and 323d are slightly dislocated from the rotation center of the disk 301 as shown in FIG. 28. In FIG. 28, the radii from the centers of the arcs to the inner wall faces 325a, 325b, 325c and 325d of the outer peripheries are indicated by arrows. If the rotation center of the disk 301 coincides with the centers of the arcs of the inner wall faces 325a, 325b, 325c and 325d of the outer periphery, the centrifugal forces Q of the balls 324a, 324b, 324c and 324d generating at the rotation time of the disk 301 and the reactions N received from the inner wall faces 325a, 325b, 325c and 325d of the outer periphery act on the balls 324a, 324b, 324c and 324d on one straight line. As a result, the movement forces R for moving the balls 324a, 324b, 324c and 324d are not generated.

However, in the case when the centers of the arcs of the inner wall faces 325a, 325b, 325c and 325d of the outer periphery of the hollow ring-shaped portion 320 are dislocated from the rotation center of the disk 301 as shown in FIG. 28, when the centrifugal forces Q are generated at the balls 324a, 324b, 324c and 324d by the rotation of the disk 301, the reactions N received from the inner wall faces 325a, 325b, 325c and 325d of the outer periphery and the centrifugal forces Q do not act on the balls 324a, 324b, 324c and 324d on the same straight line.

As a result, the composite forces of the centrifugal forces Q and the reactions N are generated, and these composite forces act on the balls 324a, 324b, 324c and 324d. Since the action directions of these composite forces are the right rotation directions (the clockwise direction in FIG. 28), movement forces R are generated to act on the balls 324a, 324b, 324c and 324d. Therefore, the disk drive apparatus of the ninth embodiment has a structure wherein the balls 324a, 324b, 324c and 324d are easily movable toward areas having larger radii from the rotation center of the disk 301.

The following describes a case wherein the disk 301 having a mass imbalance is mounted on the disk drive apparatus of the ninth embodiment in which the balancer 223 having the inner wall faces 325a, 325b, 325c and 325d of the outer periphery and shown in FIG. 28 are mounted on the clamper 316, and the disk 301 is rotated at high speed.

In the condition shown in FIG. 29(e), a movement force R, although slight, acts on the ball 324a in the right rotation direction, and the ball 324a located on the upper side moves to the right position indicated in a broken line.

In the ninth embodiment, the eccentricity distance for dislocating the centers of the arcs of the inner wall faces 325a, 325b, 325c and 325d of the outer periphery from the rotation center of the disk 301 is about 10 to 100 μm. If this eccentricity distance is made larger than necessary, the movement forces R due to the dislocation of the arc centers become larger than the movement forces R caused by whirling vibration due to the mass imbalance of the disk 301, and all the balls 324a, 324b, 324c and 324d move in the right rotation direction (the clockwise direction), thereby making it impossible to cancel the mass imbalance of the disk 301.

Figure 30:
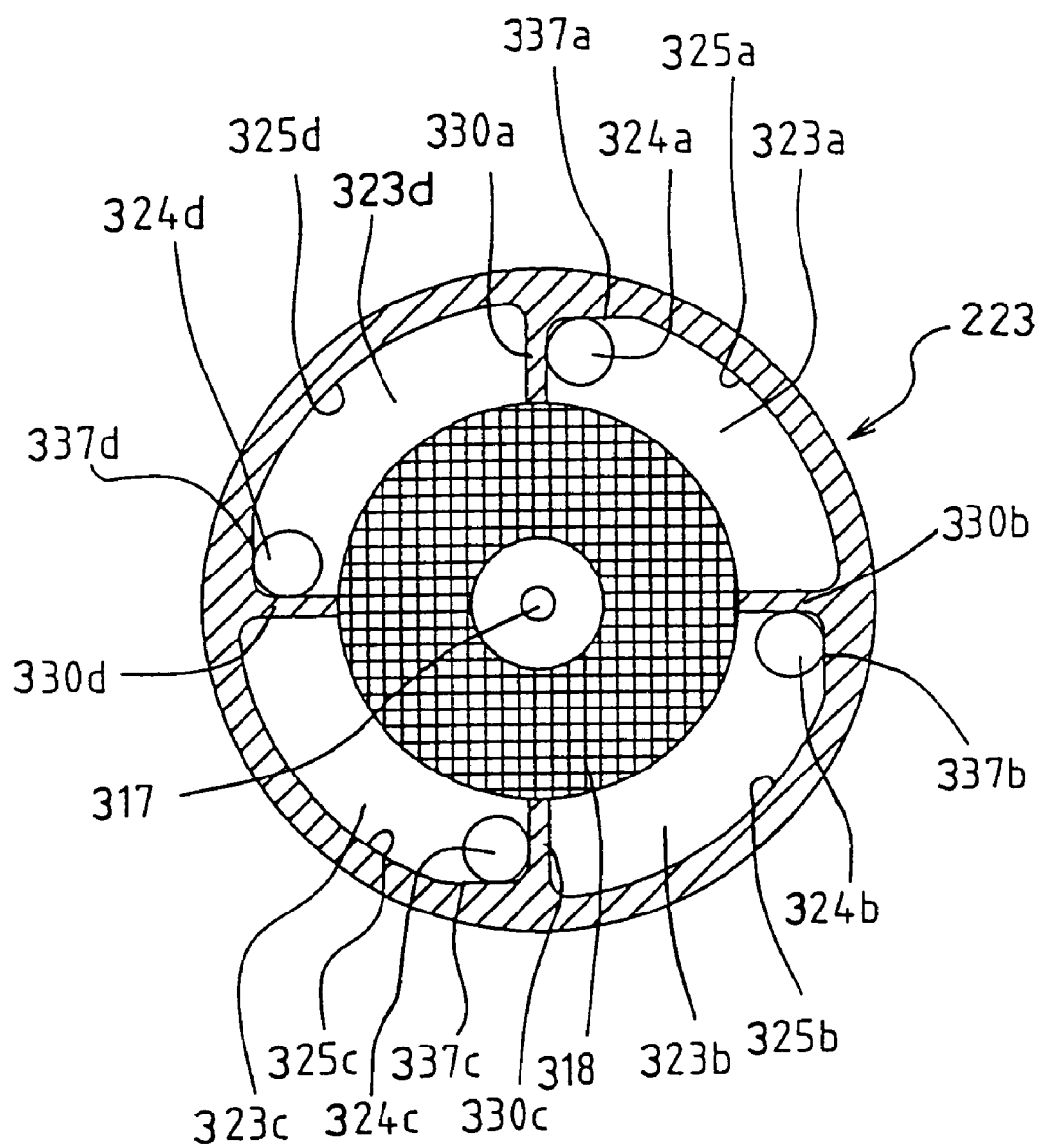
FIG. 30 is a plan sectional view showing the configuration of another balancer of the disk drive apparatus in accordance with the ninth embodiment of the present invention.

FIG. 30 is a plan sectional view showing the inner structure of another balancer 233 in the disk drive apparatus of the ninth embodiment of the present invention. As shown in FIG. 30, in the ninth embodiment of the present invention, flat portions 337a, 337b, 337c and 337d are provided at the portions of the inner wall faces 325a, 325b, 325c and 325d of the outer periphery in the vicinities of the partition walls 330a, 330b, 330c and 330d respectively. These flat portions 337a, 337b, 337c and 337d are provided at positions wherein the ball 324a is apt to be left as shown in FIG. 29(e). By providing the flat portions 337a, 337b, 337c and 337d at the portions of the inner wall faces 325a, 325b, 325c and 325d of the outer periphery in the vicinities of the partition walls 330a, 330b, 330c and 330d as described above, 324a, 324b.

The same effect as that obtained in the case when the centers of the arcs of the inner wall faces 325a, 325b, 325c and 325d of the outer periphery are slightly dislocated from the rotation center of the disk 301 can be obtained. This is because the distances to the flat portions 337a, 337b, 337c and 337d from the rotation centers of the disk 301 become longer as the movement advances in the right rotation direction, thereby having a configuration similar to that obtained in the case when the centers of the arcs of the inner wall faces 325a, 325b, 325c and 325d of the outer periphery are dislocated.

When resin mold products are mass-produced, the accuracy control in processing a metal mold can be made easier in the case when the balancer is configured by providing the flat portions at the portions in the vicinities of the partition walls as shown in FIG. 30 than in the case when the balancer is configured by making the centers of the arcs of the inner wall faces of the outer periphery eccentric as shown in FIG. 28, whereby drastic reduction can be attained in processing time and cost.

In the disk drive apparatus of the ninth embodiment of the present invention, the balls used as balance members and made of a magnetic material have been taken as an example; however, an effect similar to that of the ninth embodiment can also be obtained even if balls formed of a non-magnetic material are used.

Furthermore, in the ninth embodiment of the present invention, the case wherein the number of the partition walls is four has been described; however, in the present invention, the number is not limited to this; even if the hollow ring-shaped portion is divided by about two to eight partition walls, an effect similar to that of the ninth embodiment can be obtained.

Furthermore, in the disk drive apparatus of the ninth embodiment of the present invention, the balancer 223 provided in the clamper 316 has been taken as an example and explained; however, an effect similar to that of the ninth embodiment can be obtained, provided that the balancer is installed so as to be coaxial with the rotation center of the disk 301 and rotatable integrally with the disk 301. For example, it is possible to have a configuration wherein the balancer is provided on the turntable 310 on which the disk 301 is mounted, or in the rotor portion of the spindle motor, or on the sub-base 306 on the opposite side of the spindle motor 302 so that the balancer is rotatable integrally with the spindle motor shaft 321.

Furthermore, in the ninth embodiment, an example wherein the shape of the inner wall face of the outer periphery of the arc-shaped balance chamber is the portion of the arc of a perfect circle has been taken and explained; however, the present invention is not limited to this, and a similar effect can be obtained even if the shape is the portion of the arc of an ellipse.

10th Embodiment

Next, a disk drive apparatus in accordance with a 10th embodiment of the present invention will be described referring to the drawings.

Figure 31:
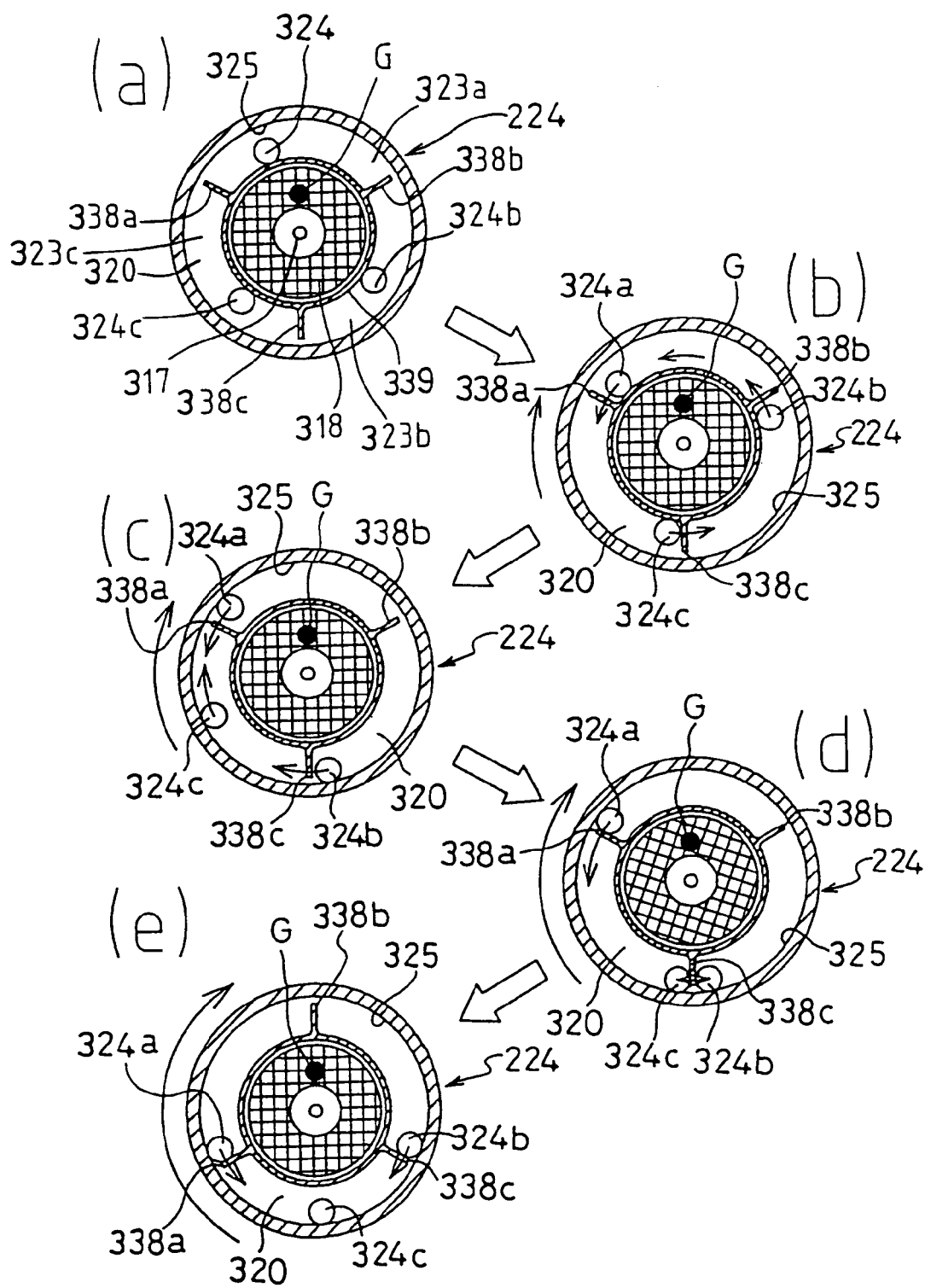
FIG. 31 is a view illustrating the movement of the balls of the balancer in the case when a disk having a mass imbalance is rotated at high speed by the disk drive apparatus in accordance with the 10th embodiment of the present invention.

FIGS. 31 and 32 are plan sectional views showing the inner structure of a balancer 224 provided in a clamper in accordance with the 10th embodiment of the present invention, and indicating the movements of the balls inside the balancer 224. The elements having functions substantially identical to those of the elements of the disk drive apparatuses of the above-mentioned seventh, eighth and ninth embodiments are represented by the same numeral codes, and the descriptions for the preceding embodiments are applied, thereby omitting overlap descriptions. In addition, since the balancer 224 of the 10th embodiment is shown similarly to the balancer 221 in the vertical sectional view shown in the above-mentioned FIG. 12, the vertical sectional view of the balancer 224 of the 10th embodiment is omitted.

In the disk drive apparatus of the 10th embodiment of the present invention, the partition walls for dividing the hollow ring-shaped portion 320 of the balancer 224 provided in the clamper 316 are configured so as to be held rotatably.

In the disk drive apparatus of the 10th embodiment, partition walls 338a, 338b and 338c are provided so as to divide the hollow ring-shaped portion 320. The partition walls 338a, 338b and 338c are formed integrally with a ring-shaped partition wall holder 339 that is held rotatably around the outer periphery of the magnet 318. Therefore, the partition walls 338a, 338b and 338c can rotate inside the hollow ring-shaped portion 320 while maintaining intervals of 120 degrees. In addition, magnetic metal balls 324a, 324b and 324c are accommodated inside the arc-shaped balance chambers 323a, 323b and 323c of the hollow ring-shaped portion 320 partitioned by the partition walls 338a, 338b and 338c respectively.

In the disk drive apparatus of the 10th embodiment configured as described above, the movement-conditions of the balls 324a, 324b and 324c in the case when the disk 301 having a mass imbalance is rotated at a high speed of 100 Hz will be described.

FIG. 31 is a view showing the change of the positions of the balls 324a, 324b and 324c inside the clamper 316 with the passage of time in the case when the disk 301 having a mass imbalance is mounted on the disk drive apparatus of the 10th embodiment and rotated while being accelerated. The conditions shown in FIG. 31 are conditions wherein the position of the center of gravity G of the disk 301 having a mass imbalance is located on the upper side of the center projection 317 in the area of the magnet 318, also showing that the disk 301 is clamped in the conditions. In FIG. 31, the condition of the balancer changes in the directions of the open arrows as the rotation speed of the disk 301 increases.

(a) of FIG. 31 shows a condition wherein the disk 301 is at rest, and the balls 324*a*, 324*b* and 324*c* are attracted by the magnet 318.

(b) of FIG. 31 shows the initial condition of the acceleration of the disk 301; since the rotation speed of the disk 301 is low, and the relationship of [centrifugal force]< [magnet force] is present at this time, the balls 324*a*, 324*b* and 324*c* still remain attracted by the magnetic force of the magnet 318 with the partition wall holder 339 disposed therebetween. At this time, the disk 301 rotates rightward (rotates in the clockwise direction in (b) of FIG. 31), and the balls 324 move along the outer peripheral face of the partition wall holder 339 while rotating leftward (rotating in the counterclockwise direction in (b) of FIG. 31) due to inertia forces, opposite to the rotation direction of the disk 301.

(c) of FIG. 31 shows the intermediate condition of the acceleration of the disk 301; since the rotation speed of the disk 301 is high, and the relationship of [centrifugal force] >[magnet force] is present at this time, the balls 324*a*, 324*b* and 324*c* separate from the magnetic force of the magnet 318, and reach the inner wall face 325 of the outer periphery of the hollow ring-shaped portion 320.

In the condition shown in (c) of FIG. 31, the amplitude of the whirling vibration of the disk 301 increases, and due to the influence, the amplitude of the whirling vibration of the sub-frame 306 also increases. At this time, since the phase difference of the vibration between the tracking direction (the movement direction of the head) and the jitter direction (the direction perpendicular to the tracking direction) of the whirling vibration of the sub-frame 306 is 90 degrees, the composite force of the centrifugal forces of the balls 324*a*, 324*b* and 324*c* concentrates in the direction (on the left side of (c) of FIG. 31) 90 degrees dislocated from the center of gravity G of the disk 301, and the balls 324*a*, 324*b* and 324*c* move in the direction.

(d) of FIG. 31 shows the final condition of the acceleration of the disk 301; the phase difference of the vibration between the tracking direction and the jitter direction of the whirling vibration of the sub-frame 306 becomes close to 180 degrees; therefore, the movement force R for pressing the left ball against the partition wall 38 in the left rotation direction increases. As a result, the composite force of the centrifugal forces of the balls 324*a*, 324*b* and 324*c* concentrates in the direction (on the lower side) about 180 degrees dislocated from the center of gravity G of the disk 301, and the balls 324*a*, 324*b* and 324*c* and the partition walls 338*a*, 338*b* and 338*c* rotate and move. However, in the condition shown in (d) of FIG. 31, the composite force of the centrifugal forces of the balls 324*a*, 324*b* and 324*c* is still in the slightly lower left direction, whereby the centrifugal force due to the mass imbalance of the disk 301 is not canceled by the centrifugal forces of the balls 324*a*, 324*b* and 324*c*, and the composite force of the centrifugal forces thereof is present.

(e) of FIG. 31 shows the end condition of the acceleration of the disk 301, and the rotation speed of the disk 301 has reached the maximum speed of 100 Hz. At this time, the three balls 324*a*, 324*b* and 324*c* gather at positions 180 degrees away from the center of gravity G of the disk 301 having a mass imbalance, whereby the mass imbalance of the disk 301 is canceled sufficiently. Therefore, the whirling vibration of the sub-base 306 in the disk drive apparatus of the fourth embodiment is suppressed.

In the disk drive apparatus of the 10th embodiment, the partition walls 338*a*, 338*b* and 338*c* are provided at uniform intervals of about 120 degrees, and the partition walls 338*a*, 338*b* and 338*c* are held rotatably as described above; therefore, the 10th embodiment does not cause the problem described by using FIG. 29 in the above-mentioned embodiment 3, that is, the problem of leaving the balls at positions wherein the imbalance of the disk 301 increases because of the fixed partition walls.

Next, in the disk drive apparatus of the 10th embodiment, the movement conditions of the balls in the case when a disk 301 having no mass imbalance is mounted on the disk drive apparatus and the disk 301 is rotated at a high speed of 100 Hz will be described by using FIG. 32.

In FIG. 32, the condition of the balancer changes in the directions of the open arrows as the rotation speed of the disk 301 increases. In FIG. 32, since the disk 301 has no mass imbalance, the indication of its center of gravity G is omitted. In addition, it is not necessary to consider the positional relationship between the center of gravity of the disk 301 and the partition walls, since the disk 301 has no mass imbalance.

(a) of FIG. 32 shows a condition wherein the disk 301 is at rest, and the balls 324*a*, 324*b* and 324*c* are attracted by the magnet 318.

(b) of FIG. 32 shows the initial condition of the acceleration of the disk 301. Since the rotation speed of the disk 301 is low, and the relationship of [centrifugal force]< [magnet force] is present at this time, the balls 324*a*, 324*b*and 324*c* still remain attracted by the magnetic force of the magnet 318 via the partition wall holder 339. At this time, the disk 301 rotates rightward, and the balls 324*a*, 324*b* and 324*c* move along the outer peripheral face of the partition wall holder 339 while rotating leftward due to inertia forces, opposite to the rotation direction of the disk 301.

(c) of FIG. 32 shows the intermediate condition of the acceleration of the disk 301. Since the rotation speed of the disk 301 is high, and the relationship of [centrifugal force] >[magnet force] is present at this time, the balls 324*a*, 324*b* and 324*c* separate from the magnetic force of the magnet 318, and reach the inner wall face 325 of the outer periphery of the hollow ring-shaped portion 320. At this time, the balls 324*a*, 324*b* and 324*c* still move in the direction (leftward rotation), opposite to the rotation direction of the disk 301.

(d) of FIG. 32 shows the final condition of the acceleration of the disk 301; the balls 324*a*, 324*b* and 324*c* make contact with the partition walls 338*a*, 338*b* and 338*c*. However, since the partition walls 338*a*, 338*b* and 338*c* are held rotatably, the balls 324*a*, 324*b* and 324*c* and the partition walls 338*a*, 338*b* and 338*c* rotate integrally in the leftward direction (the counterclockwise direction) due to the inertia forces of the balls 324*a*, 324*b* and 324*c*.

(e) of FIG. 32 shows the end condition of the acceleration of the disk 301. In this condition, the rotation speed of the disk 301 has reached the maximum speed of 100 Hz. At this time, the inertia forces of the balls 324*a*, 324*b* and 324*c* are low, whereby the balls 324*a*, 324*b* and 324*c* and the partition walls 338*a*, 338*b* and 338*c* stop rotating in their contact conditions.

In the disk drive apparatus of the 10th embodiment, the partition walls 338*a*, 338*b* and 338*c* are provided at uniform intervals of 120 degrees as described above; therefore, when the balls 324*a*, 324*b* and 324*c* become stable at the positions wherein they make contact with the partition walls 338*a*, 338*b* and 338*c*, any imbalance due to the dispositions of the balls 324*a*, 324*b* and 324*c* does not occur at all.

Furthermore, the problem described in the above-mentioned eighth embodiment, that is, the problem of causing noise due to the collisions of the balls with the partition walls because the partition walls are fixed at the time when the disk drive apparatus is installed vertically and the disk 301 is rotated at low speed has been solved since the partition walls in the 10th embodiment are structured so as to be held rotatably. Even if the balls collide with the partition walls for example, the impacts at the time of the collisions of the balls are absorbed by the rotation of the partition walls in the 10th embodiment, whereby noise due to the collisions of the balls with the partition walls does not occur.

In the disk drive apparatus of the 10th embodiment of the present invention, the balls formed of a magnetic material have been used for the description; however, since noise due to the collisions of the balls with the partition walls does not occur in the 10th embodiment, it is not necessary to attract the balls by using magnetic force. Therefore, even if the balls formed of a non-magnetic material are used, an effect similar to that of the above-mentioned 10th embodiment can be obtained.

In the disk drive apparatus of the 10th embodiment of the present invention, with respect to the number of the partition walls for dividing the hollow ring-shaped portion 320, the case wherein three partition walls provided at uniform intervals of the center angle of 120 degrees has been described. However, as shown in the plan sectional views of the balancers in FIGS. 33 to 37, the number of the partition walls for dividing the hollow ring-shaped portion 320 is not limited to three; an effect similar to that of the above-mentioned 10th embodiment can be obtained even if the hollow ring-shaped portion 320 is divided by two, three, four, six or eight partition walls.

In FIGS. 33 to 37, the same numeral codes are assigned to the elements having the same functions as those of the above-mentioned elements; in the case of a plurality of elements, lower-case alphabetic characters (a, b, c, . . . ) are attached in order after the numeral code. Even if the number of the partition walls is 5 or 7, although not shown in the drawings, it is not necessary to say that a similar effect can be obtained.

In the disk drive apparatus of the 10th embodiment of the present invention, the balancer provided in the clamper 316 has been taken as an example and explained; however, the present invention is not limited to this; an effect similar to that of the above-mentioned 10th embodiment can be obtained, provided that the hollow ring-shaped portion is installed so as to be coaxial with the rotation center of the disk 301 and rotatable integrally with the disk 301. For example, it is possible to have a configuration wherein the balancer is provided on the turntable 310 on which the disk 301 is mounted, or in the rotor portion of the spindle motor 302, or on the sub-base 306 on the opposite side of the spindle motor 302 so that the balancer is rotatable integrally with the spindle motor shaft 321.

11th Embodiment

Figure 38:
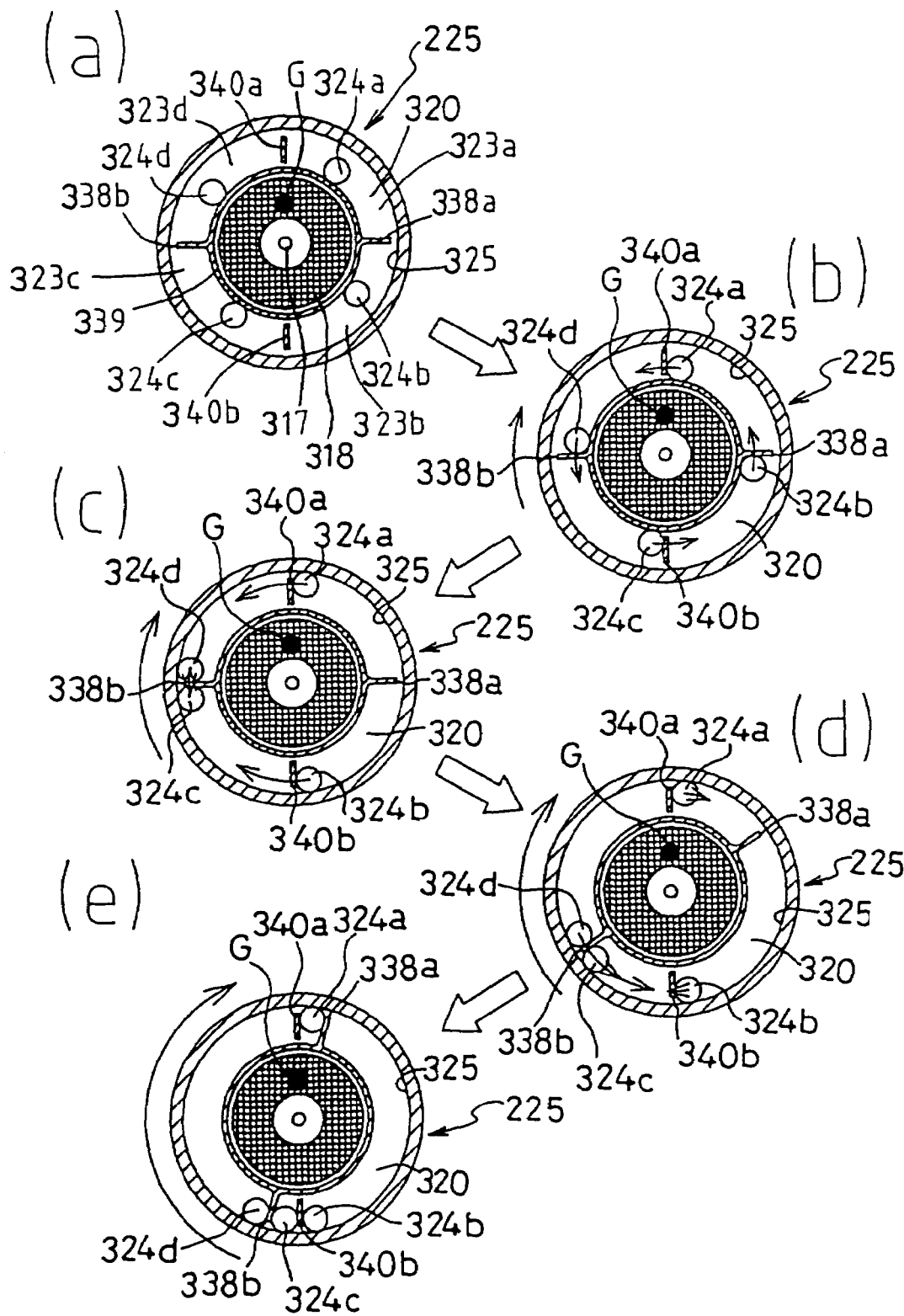
FIG. 38 is a view illustrating the movement of the balls of the balancer in the case when a disk having a mass imbalance is rotated at high speed by the disk drive apparatus in accordance with the 11th embodiment of the present invention.
Figure 39:
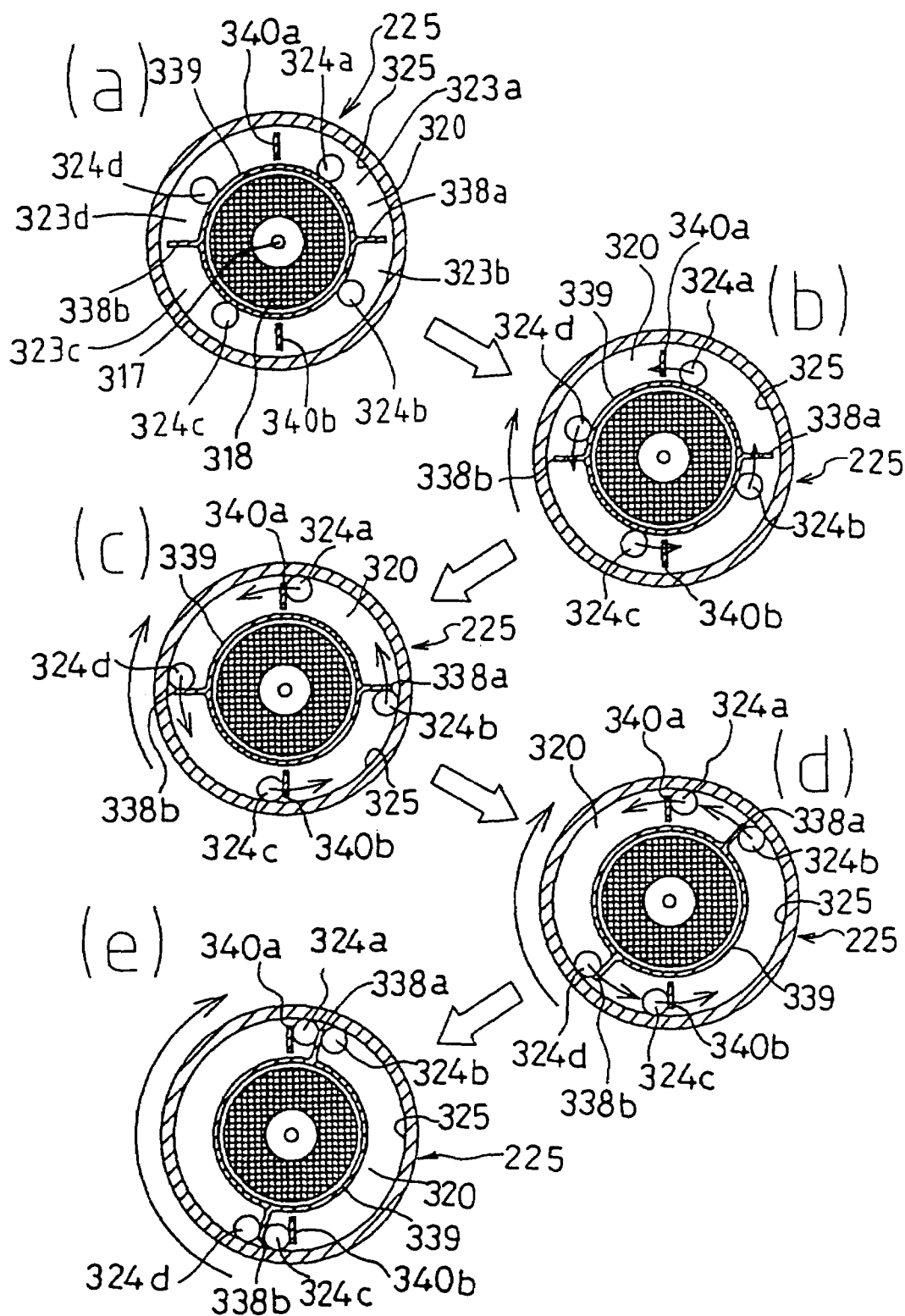
FIG. 39 is a view illustrating the movement of the balls of the balancer in the case when a disk having a mass imbalance is rotated at high speed by the disk drive apparatus in accordance with the 11th embodiment of the present invention.

Next, a disk drive apparatus in accordance with an 11th embodiment of the present invention will be described referring to the drawings. FIGS. 38 and 39 are plan sectional views showing the inner structure of a balancers 225 provided in a clamper in accordance with the 11th embodiment of the present invention. In FIGS. 38 and 39, the elements having functions substantially identical to those of the elements of the disk drive apparatuses of the above-mentioned seventh, eighth, ninth and 10th embodiments are represented by the same numeral codes, and the descriptions for the preceding embodiments are applied, thereby omitting overlap descriptions. In addition, since the balancer 225 of the 11th embodiment is shown similarly to the balancer 221 in the vertical sectional view shown in the above-mentioned FIG. 12, the vertical sectional view of the balancer 225 of the 11th embodiment is omitted.

The disk drive apparatus of the 11th embodiment of the present invention is configured such that the partition walls for dividing the hollow ring-shaped portion 320 of the balancer 225 are a mixture of two types of partition walls, a fixed type and a rotation type. Fixed-type partition walls 340a and 340b are fixed to the balancer 225 so as to divide the hollow ring-shaped portion 320 into two portions, and the rotation-type partition walls 338a and 338b are held so as to be rotatable around the outer periphery of the magnet 318. The rotation-type partition walls 338a and 338b provided to divide the hollow ring-shaped portion 320 into two portions are formed integrally with a ring-shaped partition wall holder 339 that is held rotatably around the outer periphery of the magnet 318.

Balls 324a, 324b, 324c and 324d each formed of a magnetic material are accommodated in the arc-shaped balance chambers 323a, 323b, 323c and 323d divided by the four partition walls 338a, 338b, 340a and 340b respectively. Therefore, the balls 324a, 324b, 324c and 324d are accommodated in the arc-shaped balance chambers 323a, 323b, 323c and 323d enclosed by the rotation-type partition walls 338a and 338b and the fixed-type partition walls 340a and 340b, whereby the sizes of the balance chambers 323a, 323b, 323c and 323d, in which the balls 324a, 324b, 324c and 324d are movable, are variable.

Next, in the disk drive apparatus of the 11th embodiment, the movement conditions of the balls in the case when the disk 301 having a mass imbalance is rotated will be described by using FIG. 38.

In the disk drive apparatus of the 11th embodiment of the present invention configured as described above, the case when the disk 301 having a mass imbalance is mounted on the disk drive apparatus and the disk 301 is rotated at a high speed of 100 Hz will be described. In FIG. 38, the condition of the balancer changes in the directions of the open arrows as the rotation speed of the disk increases.

(a) of FIG. 38 shows a condition wherein the disk 301 is at rest, and the balls 324a, 324b, 324c and 324d are attracted by the magnet 318.

(b) of FIG. 38 shows the initial condition of the acceleration of the disk 301. Since the rotation speed of the disk 301 is low, and the relationship of [centrifugal force]< [magnet force] is present at this time, the balls 324a, 324b, 324c and 324d still remain attracted by the magnetic force of the magnet 318 with the partition wall holder 339 disposed therebetween. At this time, the disk 301 rotates rightward (in the clockwise direction), and the balls.324a, 324b, 324c and 324d move along the outer peripheral face of the partition wall holder 339 while rotating leftward (in the counterclockwise direction) due to inertia forces, opposite to the rotation direction of the disk 301.

(c) of FIG. 38 shows the intermediate condition of the acceleration of the disk 301. Since the rotation speed of the disk 301 is high, and the relationship of [centrifugal force] >[magnet force] is present at this time, the balls 324a, 324b, 324c and 324d separate from the magnetic force of the magnet 318, and reach the inner wall face 325 of the outer periphery of the hollow ring-shaped portion 320. At this time, the amplitude of the whirling vibration of the disk 301 increases, and due to the influence, the amplitude of the whirling vibration of the sub-frame 306 also increases. At this time, since the phase difference of the vibration between the tracking direction (the movement direction of the head) and the jitter direction (the direction perpendicular to the tracking direction) of the whirling vibration of the sub-frame 306 is 90 degrees, the composite force of the centrifugal forces of the balls 324a, 324b, 324c and 324d concentrates in the direction (on the left side of (c) of FIG. 38) 90 degrees dislocated from the center of gravity G of the disk 301, and the balls 324a, 324b, 324c and 324d move in the direction.

(d) of FIG. 38 shows the final condition of the acceleration of the disk 301. At this time, the phase difference of the vibration between the tracking direction and the jitter direction of the whirling vibration of the sub-frame 306 becomes close to 180 degrees; therefore, the composite force of the centrifugal forces of the balls 324a, 324b, 324c and 324d concentrates in the direction (on the lower side) about 180 degrees dislocated from the center of gravity G of the disk 301, and the balls 324a, 324b, 324c and 324d move. However, in the condition shown in (d) of FIG. 38, the composite force of the centrifugal forces of the balls 324a, 324b, 324c and 324d is still in the slightly lower left direction, whereby the direction of the centrifugal force due to the mass imbalance of the disk 301 does not become opposite to the direction of the centrifugal forces of the balls, and the composite force of the centrifugal forces thereof is present.

(e) of FIG. 38 shows the end condition of the acceleration of the disk 301; at this time, the rotation frequency of the disk 301 has reached the maximum speed of 100 Hz. In (e) of FIG. 38, the ball 324d on the left side has a large movement force R for pressing the partition wall 338b in the leftward direction (the counterclockwise direction), whereby the ball 324d applies pressure to rotate the other three balls 324a, 324b and 324c and the partition wall. As a result, the composite force of the centrifugal forces of the balls 324a, 324b, 324c and 324d is dislocated about 180 degrees from the mass imbalance of the disk 301, whereby the mass imbalance of the disk 301 is canceled sufficiently. Therefore, the whirling vibration of the sub-base 306 in the disk drive apparatus of the 11th embodiment is suppressed.

By the rotation partition walls 338a and 338b and the fixed partition walls 340a and 340b, the hollow ring-shaped portion 320 is divided into the plural arc-shaped balance chambers 323a, 323b, 323c and 323d, the sizes of which are variable, as described above; therefore, the movable ranges of the balls 324a, 324b, 324c and 324d of the 11th embodiment are expanded drastically in comparison with the case wherein only the fixed partition walls are used just as in the case of the above-mentioned seventh embodiment, or in comparison with the case wherein only the rotation partition walls are used just as in the case of the above-mentioned 10th embodiment. For this reason, the balls 324a, 324b, 324c and 324d in the 11th embodiment can easily concentrate on the 180-degree opposite side from the center of gravity G of the mass imbalance of the disk. As a result, in the disk drive apparatus of the 11th embodiment, the weight and the number of the balls 324a, 324b, 324c and 324d and the diameter of the hollow ring-shaped portion can be set at relatively small values.

Next, in the disk drive apparatus of the 11th embodiment, the movement conditions of the balls 324a, 324b, 324c and 324d in the case when a uniform disk 301 having no mass imbalance is mounted and the disk 301 is rotated at high speed, i.e., at a rotation frequency of 100 Hz, will be described by using FIG. 39. In FIG. 39, the condition of the balancer changes in the directions of the open arrows as the rotation speed of the disk 301 increases. In FIG. 39, since the disk 301 has no mass imbalance, the indication of its center,of gravity G is omitted.

(a) of FIG. 39 shows a condition wherein the disk 301 is at rest, and the balls 324a, 324b, 324c and 324d are attracted by the magnet 318.

(b) of FIG. 39 shows the initial condition of the acceleration of the disk 301. Since the rotation speed of the disk 301 is low, and the relationship of [centrifugal force]< [magnet force] is present at this time, the balls 324a, 324b, 324c and 325d still remain attracted by the magnetic force of the magnet 318 with the partition wall holder 339 disposed therebetween. In the condition shown in (b) of FIG. 39, the disk 301 rotates rightward (the clockwise direction), and the balls 324a, 324b, 324c and 325d move along the outer peripheral face of the partition wall holder 339 while rotating leftward (the counterclockwise direction) due to inertia forces, opposite to the rotation direction of the disk 301.

(c) of FIG. 39 shows the intermediate condition of the acceleration of the disk 301. Since the rotation speed of the disk 301 is high, and the relationship of [centrifugal force] >[magnet force] is present at this time, the balls 324a, 324b, 324c and 325d separate from the magnetic force of the magnet 318, and reach the inner wall face 325 of the outer periphery of the hollow ring-shaped portion 320. At this time, the balls 324a, 324b, 324c and 325d still move in the direction (the counterclockwise direction), opposite to the rotation direction of the disk 301.

(d) of FIG. 39 shows the final condition of the acceleration of the disk 301; the balls 324a, 324b, 324c and 325d make contact with the partition walls 338a, 338b, 340a and 340b. However, since the two partition walls 338a and 338b are held rotatably with respect to the magnet 318, the balls 324b and 324d and the partition walls 338a and 338b rotate integrally in the leftward direction (rotate in the counterclockwise direction) due to the inertia forces of the balls 324b and 324d. The balls 324a and 324c making contact with the fixed partition walls 340a and 340b stop at the positions.

(e) of FIG. 39 shows the end condition of the acceleration of the disk 301, and the rotation speed of the disk 301 has reached the maximum speed of 100 Hz. Until this time, the balls 324b and 324d push the two rotation-type partition walls 338a and 338b, and they make contact with the balls 324a and 324c, which have made contact with the two fixed-type partition walls 340a and 340b and stopped, and then stop. After that, the inertia forces of the balls 324a and 324d decrease, and the balls 324a, 324b, 324c and 324d and the partition walls 338a, 338b, 340a and 340b stop rotating in the contact condition.

Since the rotation-type partition walls 338a and 338b and the fixed-type partition walls 340a and 340b are positioned 180 degrees apart from one another as described above; therefore, when the balls 324a, 324b, 324c and 324d become stable at the positions wherein they make contact with the partition walls 338a, 338b, 340a and 340b, any imbalance due to the weights of the balls 324a, 324b, 324c and 324d does not occur at all.

In the disk drive apparatus of the 11th embodiment of the present invention, the hollow ring-shaped portion divided by a total of four partition walls, i.e., the two rotation-type partition walls and the two fixed-type partition walls, has been taken as an example and explained; however, the number of the partition walls for dividing the hollow ring-shaped portion in the present invention is not limited to four;

even if it is divided by about four to eight partition walls, a similar effect can be obtained. However, in the case of a uniform disk having no mass imbalance, the number of the rotation-type partition walls should preferably be the same as that of the two fixed-type partition walls to ensure the uniformity of the dispositions of the balls.

Furthermore, in the disk drive apparatus of the 11th embodiment of the present invention, the balancer provided in the clamper has been taken as an example; however, an effect similar to that of the above-mentioned 11th embodiment can be obtained, provided that the balancer of the present invention is installed so as to be coaxial with the rotation center of the disk and rotatable integrally with the disk. For example, it is possible to have a configuration wherein the balancer is provided on the turntable on which the disk is mounted, or in the rotor portion of the spindle motor, or on the sub-base on the opposite side of the spindle motor so that the balancer is rotatable integrally with the spindle motor shaft.

As described in the above-mentioned embodiment 2, attaching the elastic bodies to the partition walls, or using the partition walls themselves formed of elastic bodies can also be attained in the above-mentioned 11th embodiment; by the attainment, it is possible to improve noise being apt to occur due to the collisions of the balls with the partition walls in the case when the disk is rotated at low speed.

In addition, in the disk drive apparatus of the 11th embodiment of the present invention, the case of using the balls having magnetism has been described; however, even if a non-magnetic material is used as the material of the balls, it is possible to obtain a result similar to that obtained when the balls having magnetism are used.

12th Embodiment

Figure 40:
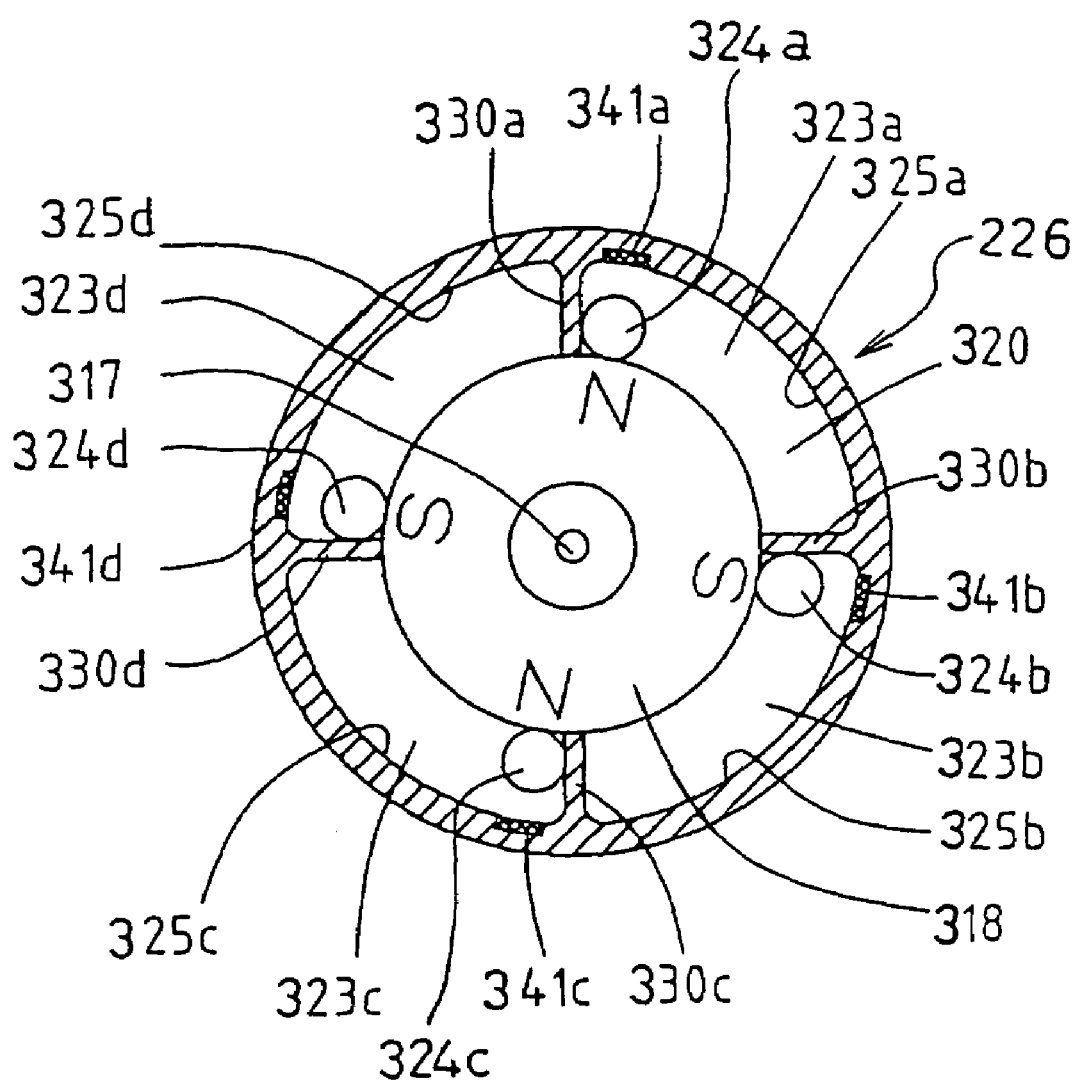
FIG. 40 is a plan sectional view showing the configuration of a balancer of the disk drive apparatus in accordance with the 12th embodiment of the present invention.

Next, a disk drive apparatus in accordance with a 12th embodiment of the present invention will be described referring to the drawings. FIG. 40 is a plan sectional view showing the inner structure of a balancer 226 provided in a clamper in accordance with the 11th embodiment of the present invention. In FIG. 40, the elements having functions substantially identical to those of the elements of the disk drive apparatuses in the descriptions of the above-mentioned seventh, eighth, ninth, 10th and 11th embodiments are represented by the same numeral codes, and the descriptions for the preceding embodiments are applied, thereby omitting overlap descriptions. In addition, since the balancer 226 of the 12th embodiment is shown similarly to the balancer 221 of the vertical sectional view shown in the above-mentioned FIG. 12, the vertical sectional view of the balancer 226 of the 12th embodiment is omitted.

The balancer 226 in the disk drive apparatus of the 12th embodiment of the present invention is provided in the clamper 316, and the hollow ring-shaped portion 320 is divided into four partition walls 330a, 330b, 330c and 330d, thereby having arc-shaped balance chambers 323a, 323b, 323c and 323d. A magnet 318 is provided at the center of the balancer 226, and the magnetic poles (the magnetic poles are indicated by N and S in FIG. 40) of the magnet 318 are disposed so as to have a predetermined phase relationship with respect to the partition walls 330a, 330b, 330c and 330d. The above-mentioned predetermined positional relationship is described below in detail; the magnetic poles of the magnet 318 are disposed in the vicinities of the partition walls 330a, 330b, 330c and 330d; in the case when the disk 301 stops rotating or rotates at low speed, it is configured that the balls 324a, 324b, 324c and 324d used as magnetic bodies remain attracted at the magnetic pole positions of the magnet 318.

FIG. 40 shows the positional relationship among the partition walls 330a, 330b, 330c and 330d, the balls 324a, 324b, 324c and 324d used as magnetic bodies and the magnet 318 in the case when the disk 301 stops rotating or rotates at low speed in the disk drive apparatus of the 12th embodiment. As shown in FIG. 40, elastic bodies 341a, 341b, 341c and 341d are embedded in the inner walls 325a, 325b, 325c and 325dof the outer periphery of the hollow ring-shaped portion 320 respectively at positions opposite to the positions of the magnetic poles (the N and S poles) of the magnet 318.

In the balancer 226 shown in FIG. 40, the disk 301 mounted on the disk drive apparatus, not shown, rotates in the rightward rotation direction (the clockwise direction). Therefore, just as in the cases of the above-mentioned seventh to 11th embodiments, at the time of acceleration in the case of rotating the disk 301, the balls 324a, 324b, 324c and 324d are moved by inertia forces; the magnetic poles of the magnet 318 are disposed at the positions wherein the balls make contact with the partition walls 330a, 330b, 330c and 330d. By disposing the magnetic poles of the magnet 318 as described above, the balls 324a, 324b, 324c and 324d are always attracted and stopped at the positions wherein they make contact with the partition walls 330a, 330b, 330c and 330d at the time when the disk 301 is at rest or rotates at low speed. When the disk 301 is rotated at high speed in this kind of condition, and when the centrifugal forces acting on the balls 324a, 324b, 324c and 324d become larger than the magnetic force of the magnet 318, the balls 324a, 324b, 324c and 324d are separated from the magnet 318 along the partition walls 330a, 330b, 330c and 330d. At the time when the disk 301 rotates at low speed, the balls 324a, 324b, 324c and 324d have been attracted by the magnetic force so as not to be separated from the magnet 318; therefore, the speed of the balls 324 after the separation increases abruptly.

However, in the vicinities of the partition walls 330a, 330b, 330c and 330d, the inner wall faces 325a, 325b, 325c and 325d of the outer periphery are provided with the elastic bodies 341a, 341b, 341c and 341d on the faces to be collided with the balls 324a, 324b, 324c and 324d, whereby the balancer 226 of the 12th embodiment is configured to absorb the shock caused at the time of the collisions. With this configuration, in the disk drive apparatus of the 12th embodiment, noise occurring at the time of the collisions of the balls 324a, 324b, 324c and 324d with the inner wall faces 325a, 325b, 325c and 325d of the outer periphery has been improved.

The material of the elastic bodies 341a, 341b, 341c and 341d should only be formed of a shock-absorbing material, such as natural rubber, synthetic rubber, sponge or the like, and also should only be a material capable of absorbing the shock occurring at the time of the collisions of the balls 324a, 324b, 324c and 324d with the inner wall faces 325a, 325b, 325c and 325d of the outer periphery. Elastic bodies can be provided on the entire faces of the inner wall faces 325a, 325b, 325c and 325d of the outer periphery; however, in order that the balls 324a, 324b, 324c and 324d can easily move on the inner wall faces 325a, 325b, 325c and 325d of the outer periphery, the inner wall faces 325a, 325b, 325c and 325d of the outer periphery are required to have smoothness and sufficient rigidity so as not to be deformed by the centrifugal forces of the balls 324a, 324b, 324c and 324d. To meet these requirements, the material of the inner wall faces 325a, 325b, 325c and 325d of the outer periphery should preferably be ABS, polycarbonate, polyacetal or the like having high molding accuracy, a resin capable of ensuring rigidity, or a metallic material, such as aluminum, brass or the like.

In the disk drive apparatuses in the above-mentioned seventh to 11th embodiments, since the positions of the magnet poles of the magnet are not specified, the positions wherein the balls separate from the magnet cannot be specified. For this reason, in the seventh to 11th embodiments, it is difficult to prevent the noise occurring at the time of the collisions of the balls with the inner wall faces of the outer periphery. However, in the disk drive apparatus of the 12th embodiment, the positions wherein the balls 324a, 324b, 324c and 324d separate from the magnet 318 can be specified, whereby the occurrence of the noise due to the collisions of the balls 324a, 324b, 324c and 324d with the inner wall faces 325a, 325b, 325c and 325d of the outer periphery, occurring when the balls 324a, 324b, 324c and 324d separate from the magnet 318, can be suppressed significantly.

In the above-mentioned seventh to 11th embodiments, in the case when the magnetic force of the magnet is large, and when the balls separate from the magnet by centrifugal forces, the rotation speed of the disk at the time of the separation becomes high, and the separation speed of the balls increases. In the case when the magnetic force of the magnet is large as described above and when the disk is rotated at high speed, large impact noise may occur in some cases because of the collisions of the balls with the inner wall faces of the outer periphery, when the balls separate from the magnet, delayed from the intended rotation speed of the disk during acceleration.

On the other hand, in the case when the magnetic force of the magnet is small, the rotation speed of the disk at the time when the balls separate from the magnet becomes low, and the speed of the disk at the time when the ball separate decreases. In the case when the magnetic force of the magnet is small as described above, and when the disk drive apparatus is installed vertically and the disk is rotated at low speed, the balls may separate due to interference caused by the vibration of the sub-base or the like before the disk reaches its intended rotation speed, whereby impact noise due to the collisions of the balls with the partition walls may occur.

In the disk drive apparatuses of the seventh to 11th embodiments, noise problems are apt to occur even if the magnetic force of the magnet is too large or too small; therefore, the magnet requires a strict magnetizing work so that the magnet can generate optimum magnetic force.

In the case of the disk drive apparatus of the 12th embodiment of the present invention, the magnetizing work for the magnet does not require such strictness as required by the above-mentioned embodiments. This is because the positions wherein the balls 324a, 324b, 324c and 324d separate from the magnet 318 can be specified, whereby it is possible to take countermeasures for the noise occurring at the time when the balls 324a, 324b, 324c and 324d separate from the magnet 318 and collide with the inner wall faces 325a, 325b, 325c and 325d of the outer periphery. Therefore, in the 12th embodiment, magnetization can be carried out so that the magnetic force of the magnet 318 can be sufficiently large with an allowance, whereby an excellent effect of not requiring any high-precision magnetizing work can be attained.

In the disk drive apparatus of the 12th embodiment of the present invention, the case wherein the number of the partition walls for dividing the hollow ring-shaped portion is four has been described; however, in the present invention, the number of the partition walls is not limited to four; an effect similar to that of the 12th embodiment can be obtained even if the hollow ring-shaped portion is divided into about two to eight partition walls.

Furthermore, in the disk drive apparatus of the 12th embodiment of the present invention, the balancer provided in the clamper has been taken as an example and explained; however, an effect similar to that of the 12th embodiment can be obtained, provided that the balancer is installed so as to be coaxial with the rotation center of the disk and rotatable integrally with the disk. For example, it is possible to have a configuration wherein the balancer is provided on the turntable on which the disk is mounted, or in the rotor portion of the spindle motor, or on the sub-base on the opposite side of the spindle motor so that the balancer is rotatable integrally with the spindle motor shaft.

13th Embodiment

Figure 41:
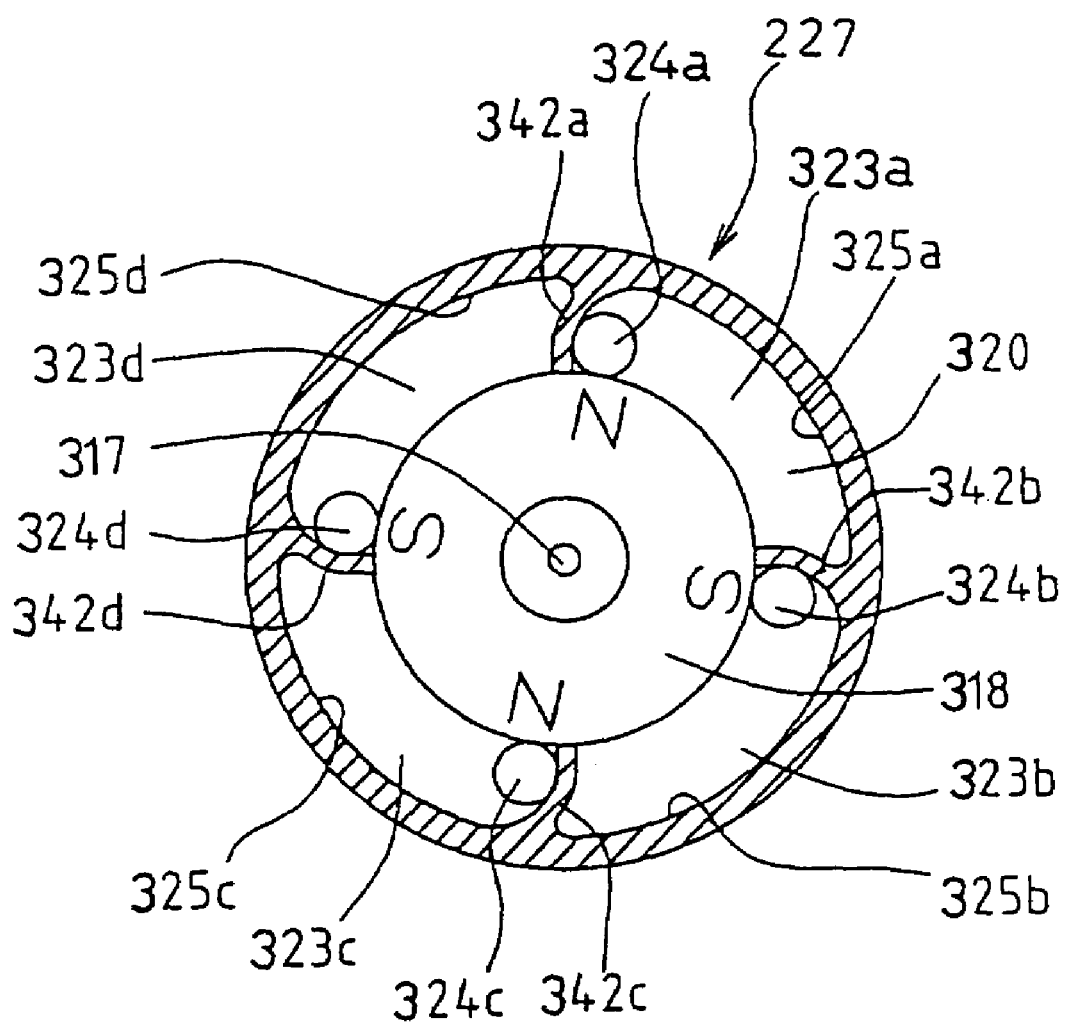
FIG. 41 is a plan sectional view showing the configuration of a balancer of the disk drive apparatus in accordance with the 13th embodiment of the present invention.

Next, a disk drive apparatus in accordance with a 13th embodiment of the present invention will be described referring to the drawings. FIG. 41 is a plan sectional view showing the inner structure of a balancer 227 provided in a clamper in accordance with the 13th embodiment of the present invention. In FIG. 41, the elements having functions substantially identical to those of the elements of the disk drive apparatuses of the above-mentioned seventh, eighth, ninth, 10th, 11th and 12th embodiments are represented by the same numeral codes, and the descriptions for the preceding embodiments are applied, thereby omitting overlap descriptions. In addition, since the balancer 227 of the 13th embodiment is shown similarly to the balancer 221 in the vertical sectional view shown in the above-mentioned FIG. 12, the vertical sectional view of the balancer 227 of the 13th embodiment is omitted.

In the disk drive apparatus of the 13th embodiment of the present invention, the hollow ring-shaped portion 320 of the balancer provided in the clamper 316 is divided by partition walls 342a, 342b, 342c and 342d having a special shape, whereby it is configured that the positions of the magnetic poles (the N and S poles) of the magnet 318 with respect to the partition walls 342a, 342b, 342c and 342d have a predetermined relationship.

FIG. 41 shows the positional relationship among the partition walls 342a, 342b, 342c and 342d, the balls 324a, 324b, 324c and 324d used as magnetic bodies and the magnetic poles of the magnet 318. As shown in FIG. 41, the magnetic poles of the magnet 318 are disposed in the vicinities of the partition walls 342a, 342b, 342c and 342d; in the case when the disk 301 stops rotating or rotates at low speed, it is configured that the balls 324a, 324b, 324c and 324d used as magnetic bodies remain attracted at the magnetic pole positions of the magnet 318. In addition, the partition walls 342a, 342b, 342c and 342d have the shape of a curve so as to be connected to the inner wall faces 325a, 325b, 325c and 325d of the outer periphery.

As shown in FIG. 41, in the balancer 227 in the 13th embodiment, at the time of acceleration in the case of rotating the disk 301, the magnetic poles (the N and S poles) of the magnet 318 are disposed at positions wherein the balls 324a, 324b, 324c and 324d are intended to make contact with the partition walls 342a, 342b, 342c and 342d after being moved by inertia forces. Therefore, when the disk 301 is at rest or rotates at low speed, the balls 324a, 324b, 324c and 324d are always attracted at the positions wherein they make contact with the partition walls 342a, 342b, 342c and

342*d*. In this condition, if the disk 301 is rotated at high speed, when the centrifugal forces acting on the balls 324*a*, 324*b*, 324*c* and 324*d* become larger than the magnetic force of the magnet 318, the balls 324*a*, 324*b*, 324*c* and 324*d* move along the partition walls 342*a*, 342*b*, 342*c* and 342*d* and separate from the magnet 318.

In the 13th embodiment, the ball contact faces of the partition walls 342*a*, 342*b*, 342*c* and 342*d* have the shape of a curve, instead of the shape in parallel with the straight line extending from the center of the balancer 227 in the radial direction. Therefore, when the balls 324*a*, 324*b*, 324*c* and 324*d* separate from the magnet 318, they reach the inner wall faces 325*a*, 325*b*, 325*c* and 325*d* of the outer periphery of the hollow ring-shaped portion 320 while rolling along the curves of the partition walls 342*a*, 342*b*, 342*c* and 342*d*.

As shown in FIG. 41, the shape of the curve continuously connected from the partition walls 342*a*, 342*b*, 342*c* and 342*d* to the inner wall faces 325*a*, 325*b*, 325*c* and 325*d* of the outer periphery respectively is formed to have a curvature smaller than the curvature of the balls 324*a*, 324*b*, 324*c* and 324*d*. Therefore, when the balls 324*a*, 324*b*, 324*c* and 324*d* reach the inner wall faces 325*a*, 325*b*, 325*c* and 325*d* of the outer periphery, the centrifugal forces of the balls 324*a*, 324*b*, 324*c* and 324*d* are converted to have directions so that rolling occurs along the inner wall faces 325*a*, 325*b*, 325*c* and 325*d* of the outer periphery. Therefore, in the 13th embodiment, after the separation of the balls 324*a*, 324*b*, 324*c* and 324*d* from the magnet 318, the balls 324*a*, 324*b*, 324*c* and 324*d* do not collide with the inner wall faces 325*a*, 325*b*, 325*c* and 325*d* of the outer periphery, whereby noise at the time of collisions is prevented.

As described above, the disk drive apparatus of the 13th embodiment of the present invention is configured so that the positions wherein the balls separate from the magnet can be specified just as in the case of the above-mentioned 12th embodiment and so that the balls do not collide with the inner wall faces of the outer periphery, whereby magnetization can be carried out so that the magnetic force of the magnet can be sufficiently large with an allowance.

In the disk drive apparatus of the 13th embodiment of the present invention, the case wherein the number of the partition walls for dividing the hollow ring-shaped portion is four has been described; however, in the present invention, the number of the partition walls is not limited to four; an effect similar to that of the 13th embodiment can be obtained even if the hollow ring-shaped portion is divided into about two to eight partition walls.

Furthermore, in the disk drive apparatus of the 13th embodiment of the present invention, the balancer provided in the clamper is taken as an example and explained; however, an effect similar to that of the 13th embodiment can be obtained, provided that the balancer is installed so as to be coaxial with the rotation center of the disk and rotatable integrally with the disk. For example, it is possible to have a configuration wherein the balancer is provided on the turntable on which the disk is mounted, or in the rotor portion of the spindle motor, or on the sub-base on the opposite side of the spindle motor so that the balancer is rotatable integrally with the spindle motor shaft.

As described above, in the disk drive apparatuses of the seventh to 13th embodiments of the present invention, a ring-shaped track indicated by a hollow ring-shaped portion is divided into plural arc-shaped tracks by partition walls, and a balancer comprising balance members moving in the tracks is provided so as to be rotatable integrally with the disk, thereby attaining an effect of securely suppressing vibration being apt to occur when the disk is rotated at high speed, regardless of the mass imbalance of the disk.

With this effect, in the present invention, stable recording or reproduction can be carried out even if the disk is rotated at high speed, whereby it is possible to attain a disk drive apparatus causing low noise, having high vibration-resistant and impact-resistant characteristics, and being capable of carrying out high-rate data transfer.

Problems to be Solved By the 14th to 19th Embodiments

In recent years, in disk drive apparatuses for recording/reproducing data, raising the rotation speed of the disk used as a recording medium to higher speed has been advanced to improve data transfer rate. However, the vibration of the disk increases abruptly as the rotation speed of the disk is raised.

In data recording/reproduction, the vibration of the disk is transmitted to the spindle motor, chassis, traverse rail, traverse arm and the like; eventually, the head for reading and writing signals on the disk vibrates. For this reason, in a disk drive apparatus having a structure similar to a conventional structure, it is difficult to attain stable recording/reproduction. In other words, in order to carry out stable recording/reproduction, the rotation speed of the disk mustbe selected so as to be lower than the value required theoretically to suppress the vibration of the disk Therefore, in the conventional disk drive apparatus, its actual data transfer rate is insufficient, thereby causing a problem of insufficient recording/reproducing speed.

On the other hand, in personal computers and the like, vibration occurring from a disk device may induce malfunction of another disk device external to one disk device. In addition, noise caused by the vibration of the disk device results in hindrance to office activities, reduction in the value of home use entertainment software and the like.

Furthermore, wear and deterioration at the bearings and the spindle shaft of the spindle motor are accelerated by the vibration of the disk, thereby further increasing the vibration of the disk. Therefore, suppressing the vibration of the disk has been an important task to be attained in order to improve data transfer rate by increasing the rotation speed of the disk.

An example of a conventional disk drive apparatus will be described below referring to the drawings.

Figure 42:
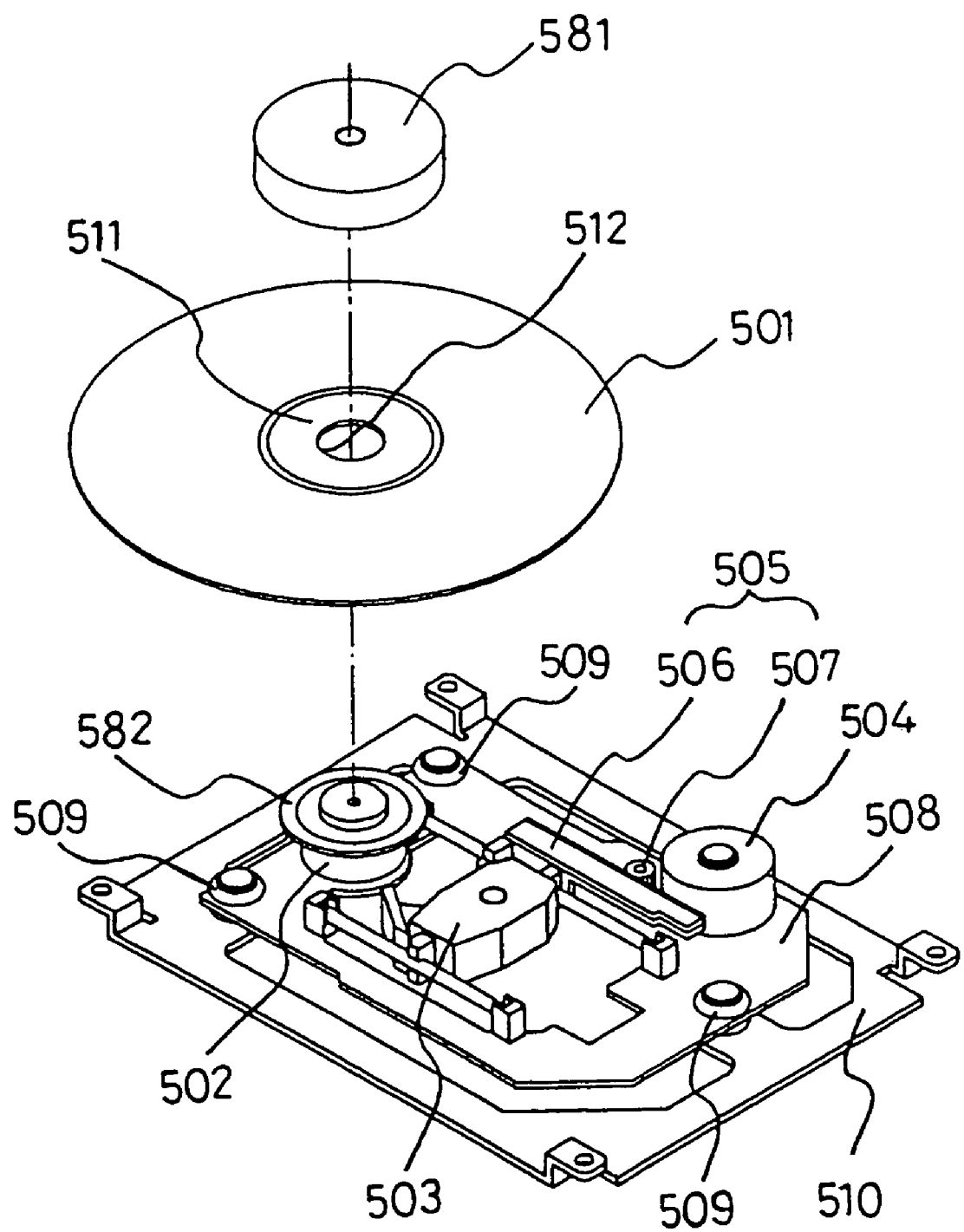
FIG. 42 is a perspective view showing a condition wherein a disk 501 is mounted on the conventional disk drive apparatus and secured by a clamper 581.

FIG. 42 is a perspective view showing the conventional disk drive apparatus. Referring to FIG. 42, a disk 501 is mounted on a turntable 582 and secured with a clamper 581, and then rotated by a spindle motor 502. A head 503 reads data recorded on the disk 501 or writes data on the disk 501. A traverse mechanism 505, comprising a rack 506, a pinion 507 and the like, converts the rotation motion of a traverse motor 504 into a linear motion, and transmits it to the head 503. The head 503 is moved in the radial direction of the disk 501 by this traverse mechanism 505. The spindle motor 502, the traverse motor 504 and the traverse mechanism 505 are mounted on a sub-base 508. Vibration and impact transmitted from outside the device to the sub-base 508 are dampened by insulators 509 (elastic bodies), and the sub-base 508 is mounted on a main base 510 via these insulators 508.

The above-mentioned disk drive apparatus is configured so as to be built in a computer or the like via a frame (not shown) installed on the main base 510.

Figure 43:
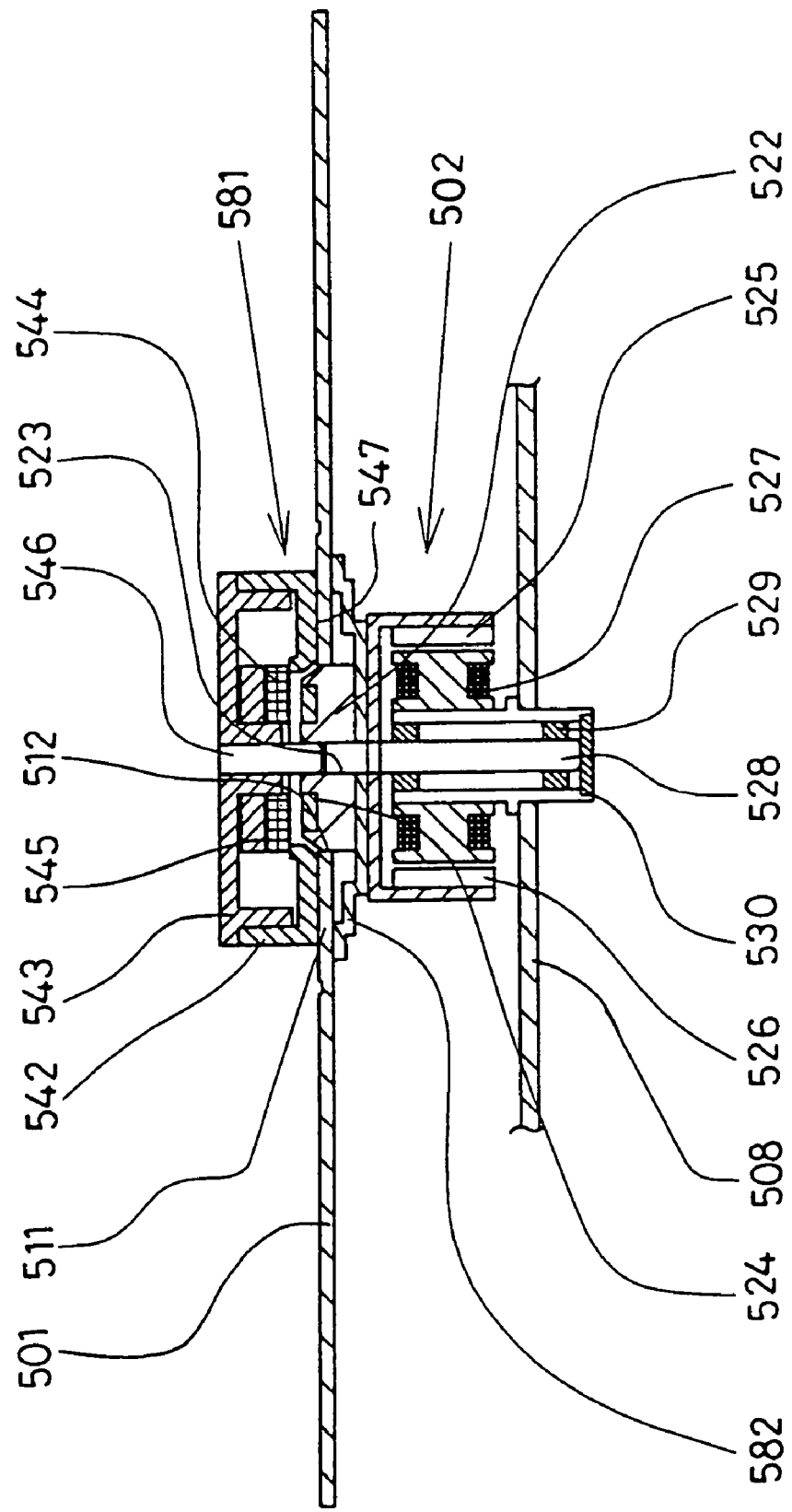
FIG. 43 is a side sectional view showing the vicinity of the spindle motor 502 of the conventional disk drive apparatus.

FIG. 43 is a side sectional view showing the vicinity of the spindle motor 502 of the conventional disk drive apparatus.

A turntable 582 is secured to a spindle motor shaft 528 and rotatably supports the clamp area 511 of the disk 501. On the turntable 582, a boss 522 to be fitted into the clamp hole 512 of the disk 501 is formed integrally. By fitting the clamp hole 512 of the disk 501 on the boss 522, the disk 501 is positioned.

In the face (the upper face in FIG. 43) of the boss 522, opposite to the clamper 581, a positioning hole 523 is formed. In addition, a ring-shaped opposed yoke 524 is embedded and secured onto the upper face of the boss 522.

As shown in FIG. 43, the clamper. 581 has a disk holder 542 making contact with the upper face of the mounted disk 501 and a magnet holder 543. A flat face making contact with the disk 501 is formed on the lower face of the disk holder 542. A center projection 546, which engages the positioning hole 523 provided in the boss 522 of the turntable 582 so that the turntable 582 and the clamper 581 have the same center position, is secured to the magnet holder 543. In addition, a magnet 544 and a back yoke 545 are secured inside the magnet holder 543.

In the conventional disk drive apparatus configured as describe above, in the condition wherein the disk 501 is clamped, the clamp hole 512 fits on the boss 522, whereby the disk 501 is mounted on the turntable 582. At this time, the disk 501 is held by the magnetic attraction acting between the magnet 544 accommodated in the clamper 581 and the opposed yoke 524 secured to the boss of the turntable 582. The disk 501 held between the clamper 581 and the turntable 582 in this way is rotated integrally with the turntable 582 and the clamper 581 by the rotation of the spindle motor 502.

However, in the conventional disk drive apparatus configured as described above, if the disk 501 is rotated at high speed, the disk 501 vibrates vigorously due to an imbalance caused by the nonuniform thickness of the disk 501, the face deflection of the turntable 582 and the like.

Figure 44:
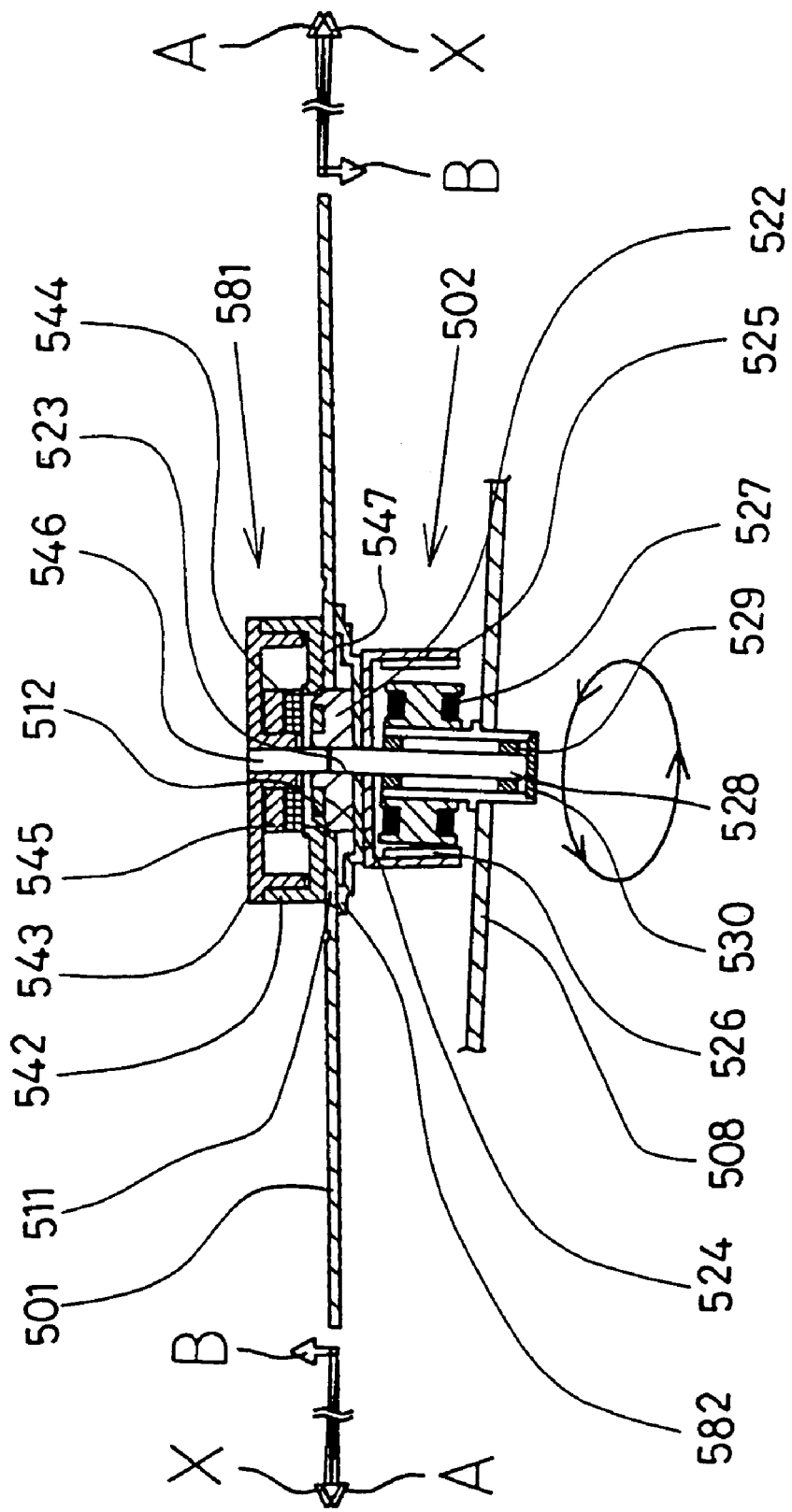
FIG. 44 is a side sectional view showing the vibration of the disk 501 in the case when the disk 501 is mounted on the turntable 582 of the conventional disk drive apparatus and rotated.

FIG. 44 is a side sectional view showing the vibration condition of the disk 501 in the case when the disk 501 is mounted on the turntable 582 of the conventional disk drive apparatus and the disk 501 is rotated.

The turntable 582 in the conventional disk drive apparatus shown in FIG. 44 is installed so as to be tilted with respect to the spindle shaft 528. In the case when the disk 501 is mounted on this turntable 582 and rotated at high speed, a centrifugal force X acts on the disk 501 in the radial direction around the spindle shaft 528 on the plane perpendicular to the spindle shaft 528. This centrifugal force X causes a tension force A on the disk 501 in the radial direction of the disk 501 and a bending force B for attempting to bend the disk 501 in the direction perpendicular to the recording face of the disk 501. The tension force A and the bending force B increase in nearly proportional to the square of the rotation frequency of the disk 501.

Among the forces generated by the centrifugal force X, the bending force B acting nearly perpendicularly on the recording face of the disk 501 elastically deforms the disk 501. In the case when the disk 501 is rotated in this condition, there is a rotation frequency wherein the vibration of the disk 501 increases abruptly.

This is a resonance phenomenon that occurs when a frequency having an integral multiple of the rotation frequency of the disk 501 coincides with the resonance frequency of the disk 501. All solid objects usually have resonance frequencies depending on the material and shape; in the case when these solid objects are rotated or vibrated, it has been designed that the above-mentioned resonance frequency does not coincide with the integral multiple of the rotation frequency or the vibration frequency.

However, just as in the case of the disk drive apparatus, the resonance phenomenon is sometimes inevitable in the case when the head 503 is accurately positioned at a predetermined position while the disk 501 is rotated at high speed, or in the case when the rotation frequency of the disk is provided with a constant range.

Furthermore, since the rotation frequency of the disk 501 was low in the conventional disk drive apparatus, the centrifugal force X occurring on the disk 501 was small, and the force B, i.e., a component of the centrifugal force X, for attempting to bend the disk was small. Therefore, although the disk 501 resonated even in the conventional disk drive apparatus, the amplitude thereof was small, whereby this problem did not become apparent. However, because of the increase in the rotation speed of the disk 501 in recent years, the problem of the vibration of the disk 501 has become apparent as a problem to be solved.

The disk 501 has inherent vibration modes (forms) depending on the elastic modulus of the material thereof and the shape thereof, such as thickness, diameter and the like. As the vibration modes, "two-division mode," "four-division mode," "six-division mode" and "eight-division mode" are available for example. These vibration modes will be described below.

Figure 45:
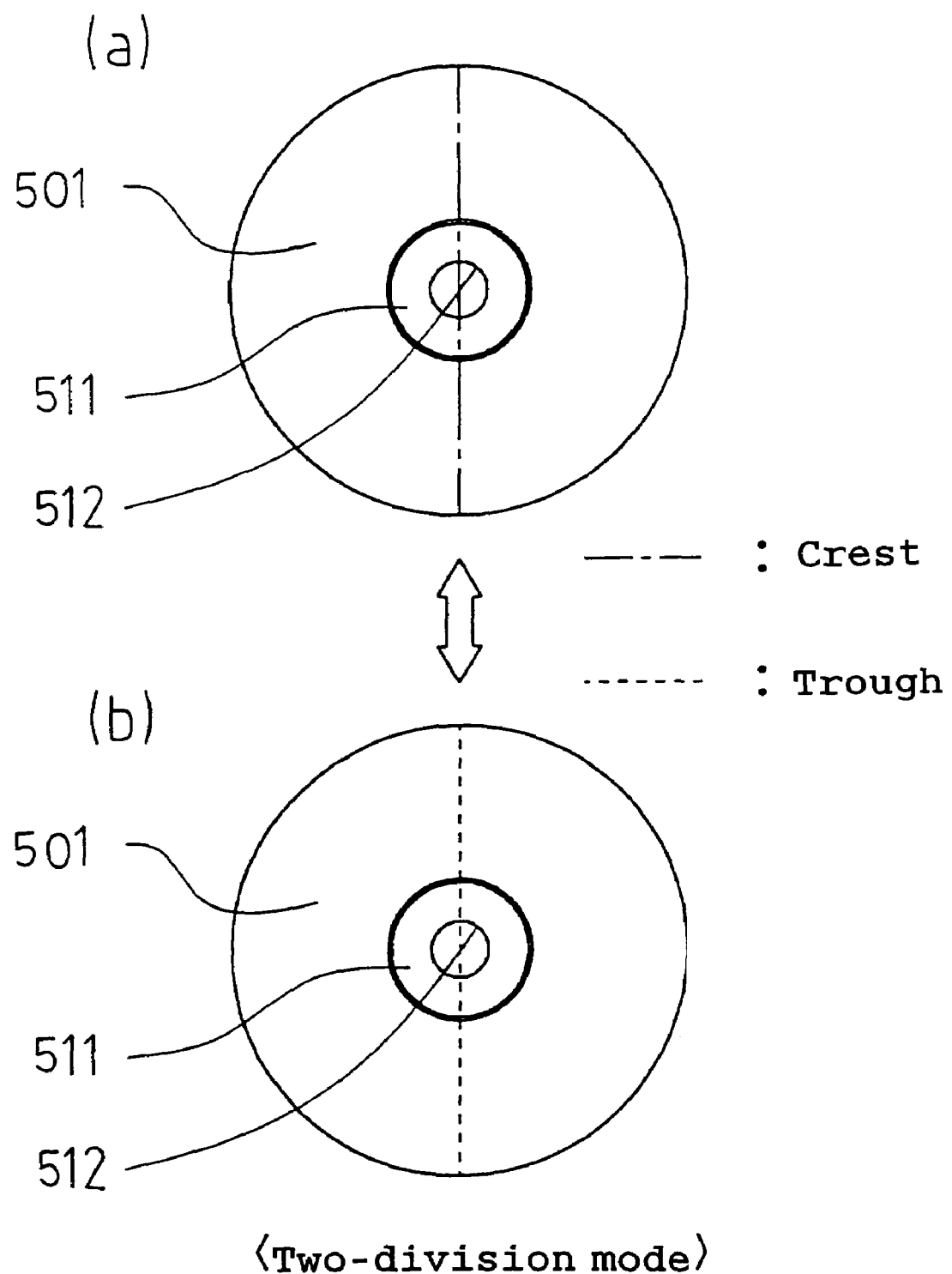
FIG. 45 is a plan view showing the two-division mode of the vibration of the disk 501 of the conventional disk drive apparatus.

FIG. 45 is a plan view showing the disk 501 and illustrating the case when the disk 501 vibrates in the "two-division mode," the simplest vibration mode, wherein the resonance frequency is the lowest among the resonance frequencies. As shown in FIG. 45, when the disk 501 is rotated, the vibration in the "two-division mode" occurs on the disk 501. In FIG. 45, the chain line indicated on the disk 501 shown in (a) represents the position of the crest of the vibration; and the broken line indicated on the disk 501 shown in (b) represents the position of the trough of the vibration. As described above, the vibration in the "two-division mode" is defined as vibration wherein the disk 501 vibrates while the conditions shown in (a) and (b) of FIG. 45 occur alternately.

Figure 46:
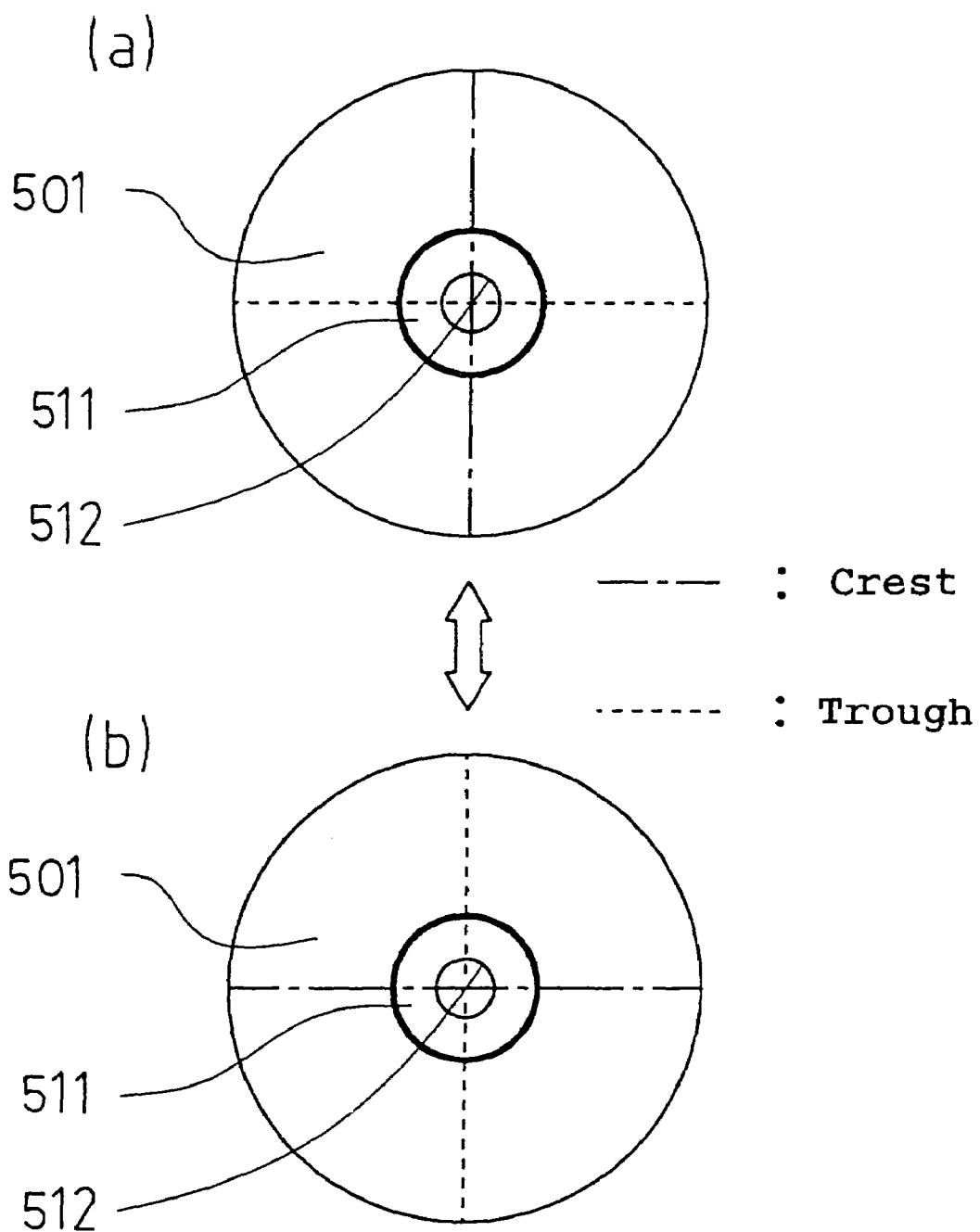
FIG. 46 is a plan view showing the four-division mode of the vibration of the disk 501 of the conventional disk drive apparatus.
Figure 47:
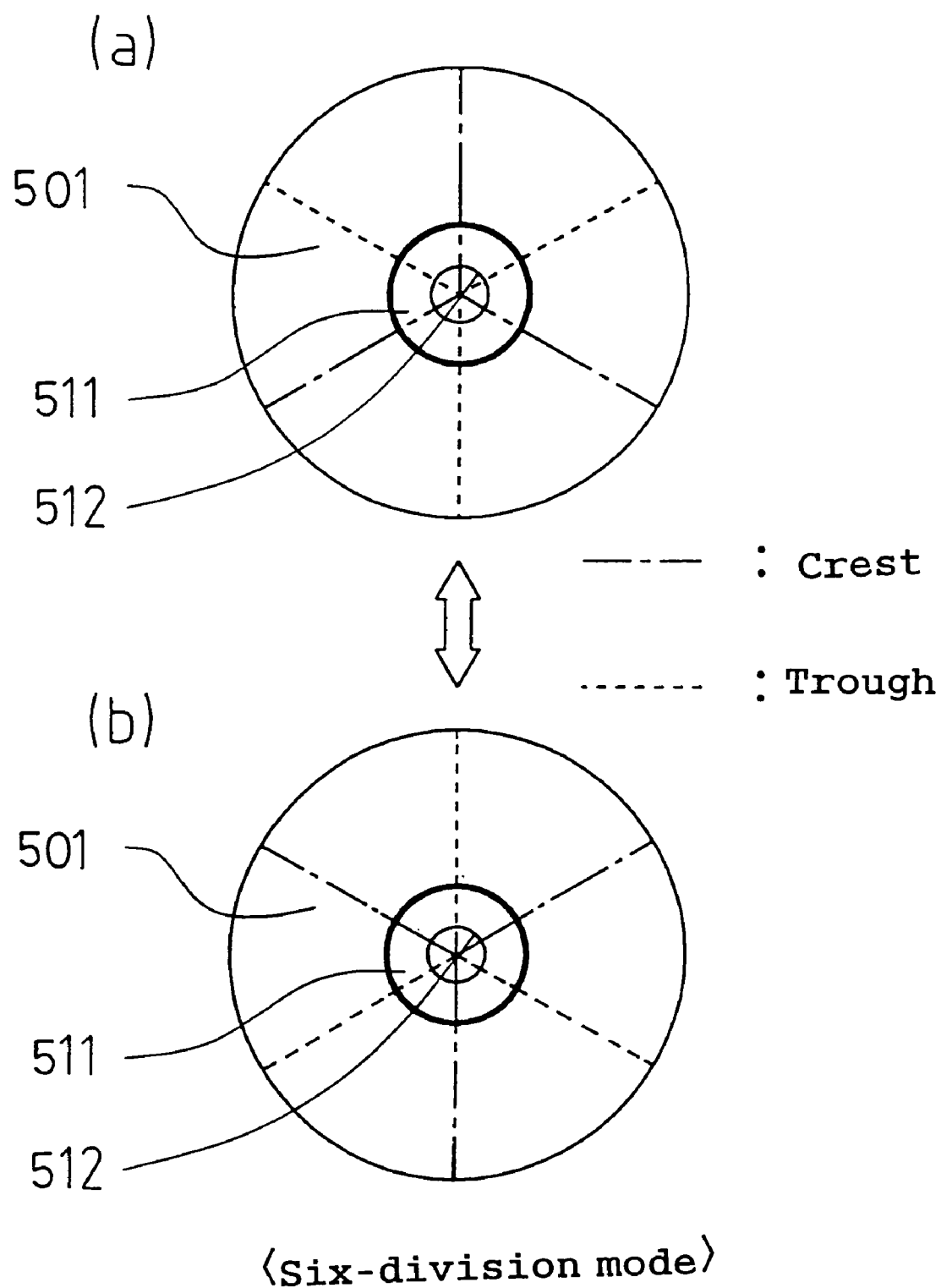
FIG. 47 is a plan view showing the six-division mode of the vibration of the disk 501 of the conventional disk drive apparatus.
Figure 48:
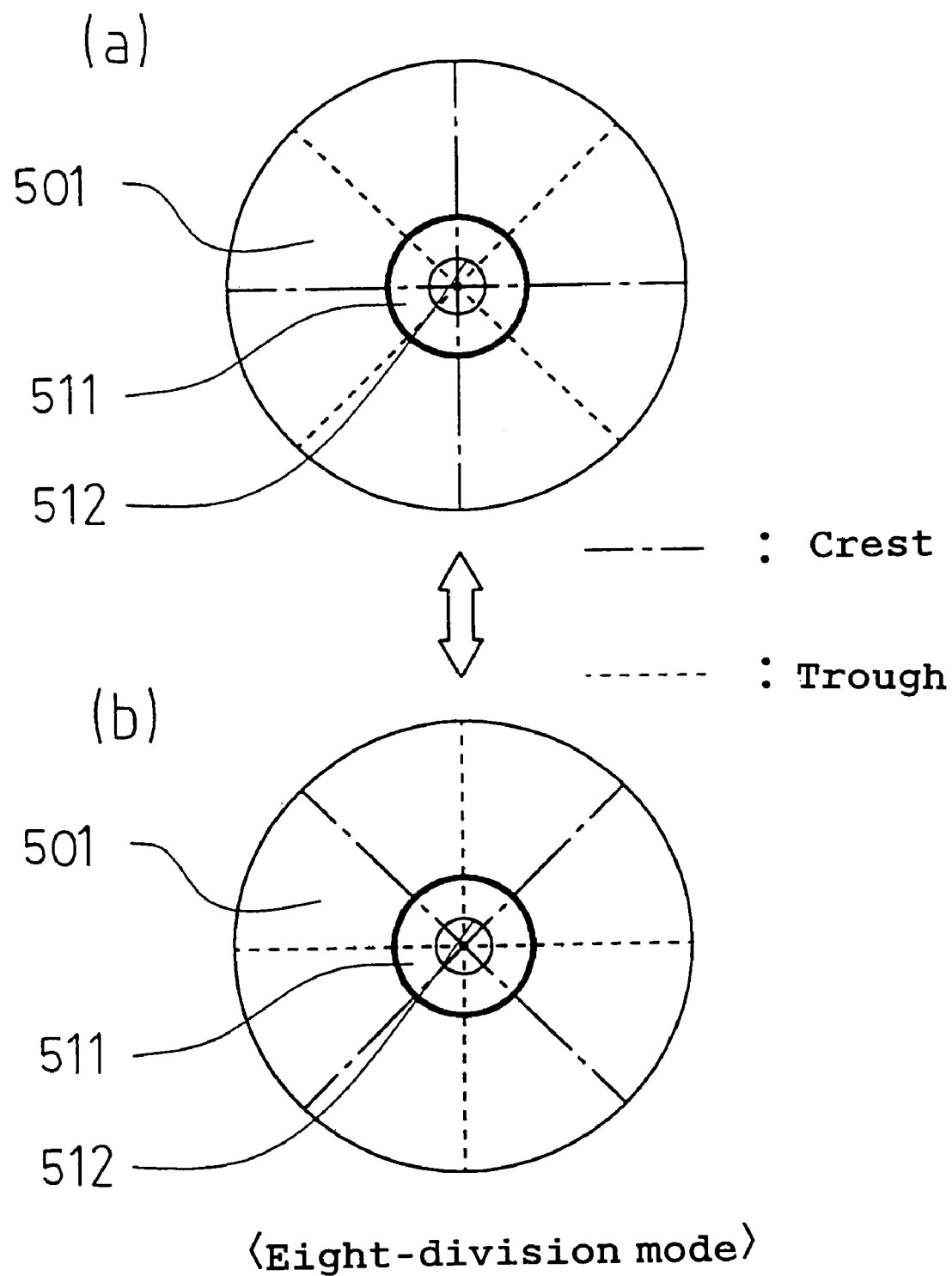
FIG. 48 is a plan view showing the eight-division mode of the vibration of the disk 501 of the conventional disk drive apparatus.

FIG. 46 is a plan view showing the disk 501 and illustrating the case when the disk 501 vibrates in the "four-division mode." As shown in FIG. 46, just as in the case of the above-mentioned FIG. 45, the disk 501 vibrates in the "four-division mode" while the conditions shown in (a) and (b) of FIG. 46 occur alternately. Similarly, FIG. 47 is a plan view showing the disk 501 and illustrating the condition wherein the disk 501 vibrates in the "six-division mode," and FIG. 48 is a plan view showing the disk 501 and illustrating the condition wherein the disk 501 vibrates in the "eight-division mode."

In the case when the disk 501 rotates and the disk 501 vibrates, and the crest and trough of the vibration occur alternately in the radial direction thereof, the disk 501 vibrates in a vibration mode, such as the "two-division mode," "four-division mode," "six-division mode" and "eight-division mode" shown in FIGS. 45 to 48. When the disk 501 vibrates, it vibrates in a specific vibration mode depending on the resonance frequency inherent in the disk 501. In reality, the disk 501 has higher resonance frequencies, and more complicated vibration modes are present; however, since the amplitudes in such modes are small, the modes are omitted in the description of the present invention.

Figure 49:
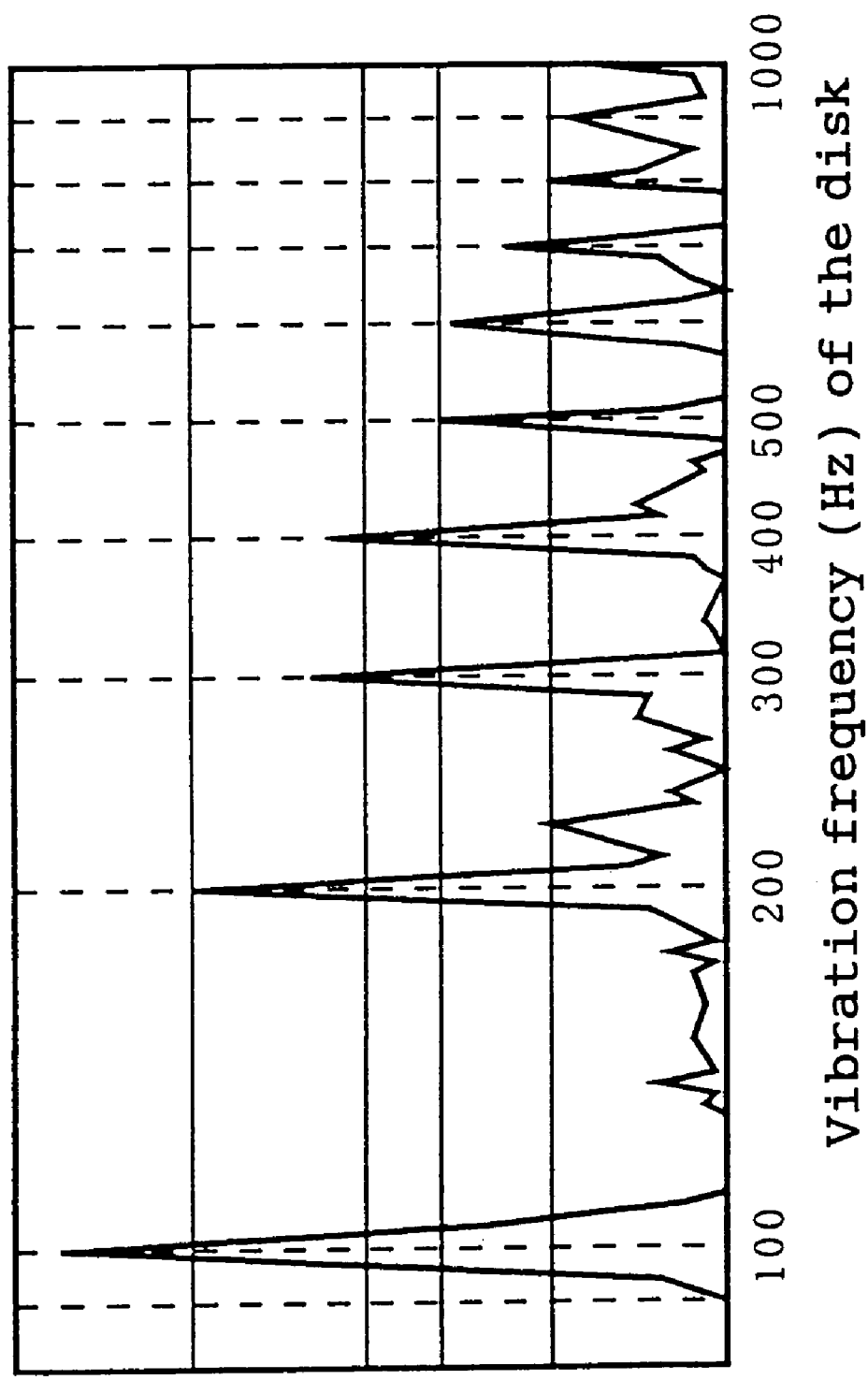
FIG. 49 is a graph showing the result of the vibration analysis of the disk 501 of the conventional disk drive apparatus.

FIG. 49 is a graph showing the result of the vibration analysis of the disk of the conventional disk drive apparatus. In this vibration analysis, the disk 501 was rotated at a rotation frequency of 100 Hz. The result of the vibration analysis is described; for example, the vibration of the disk 501 in the case when the disk 501 was rotated at a rotation frequency coincident with the resonance frequency in the "two-division mode" was subjected to a Fourier transform so that the vibration of the disk 501 was divided depending on frequency. In FIG. 49, the ordinate represents the amplitude (dB) of the disk, and the abscissa represents the vibration frequency (Hz) of the disk 501.

As shown in FIG. 49, the vibration condition of the disk 501 in the conventional disk drive apparatus has discrete extreme values at specific vibration frequencies. In the graph shown in FIG. 49, vibration peaks are present at the resonance frequencies in the vibration modes of the "two-division mode," "four-division mode," "six-division mode" and "eight-division mode," in the order from the discrete extreme values at the smaller vibration frequencies on the abscissa.

As shown in FIG. 49, the amplitude is larger as the resonance frequency is lower; in the conventional disk drive apparatus, the head 503 has been designed so that it follows the vibration of the disk 501. As described above, the disk drive apparatus is controlled so that the vibration of the disk 501 can be canceled by the following of the head 503; therefore, in the case when the resonance frequency of the disk 501 is low, the head 503 can cancel the amplitude of the disk 501 almost 100%. However, as the resonance frequency becomes higher to the "four-division mode," "six-division mode" and "eight-division mode," it becomes difficult for the head 503 to follow the vibration of the disk 501, thereby causing adverse effects on the recording and reproduction of data.

Furthermore, even if the head 503 was able to follow the vibration of the disk 501, the vibration of the disk 501 became causes of the induction of the malfunction of other disk drive apparatuses, the occurrence of noise and the shortened service life of bearings, as described in the columns of the above-mentioned prior art; therefore, it was necessary to reduce the vibration itself of the disk 501 as low as possible.

The above-mentioned tilting of the turntable 582 is not the only cause of the vibration of the disk 501. The vibration is also caused by the face deflection of the disk 501, the eccentricity due to the displacement between the outermost periphery and the clamp hole 512 of the disk 501, and the like.

By minutely observing the vibration of the disk 501, the inventors have found a new cause governing the vibration of the disk 501, other than the problems having been examined up to now. The new cause is the flatness of the disk holding face 547 of the clamper 581 for holding the clamp area 511 of the disk 501.

Figure 50:
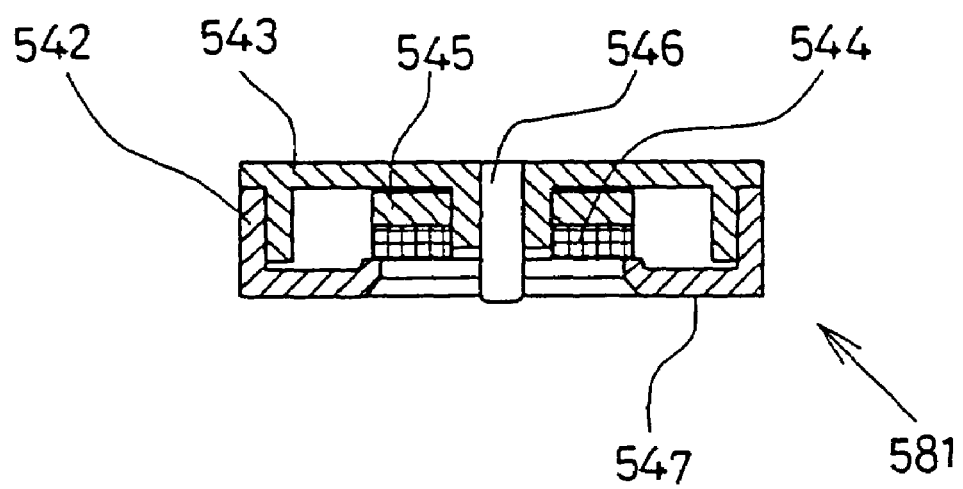
FIG. 50 shows a side sectional view of the clamper 581(a) of the conventional disk drive apparatus and a reverse-side view (b) of the clamper 581 showing the face of the clamper 581 making contact with the disk 501.
Figure 50:
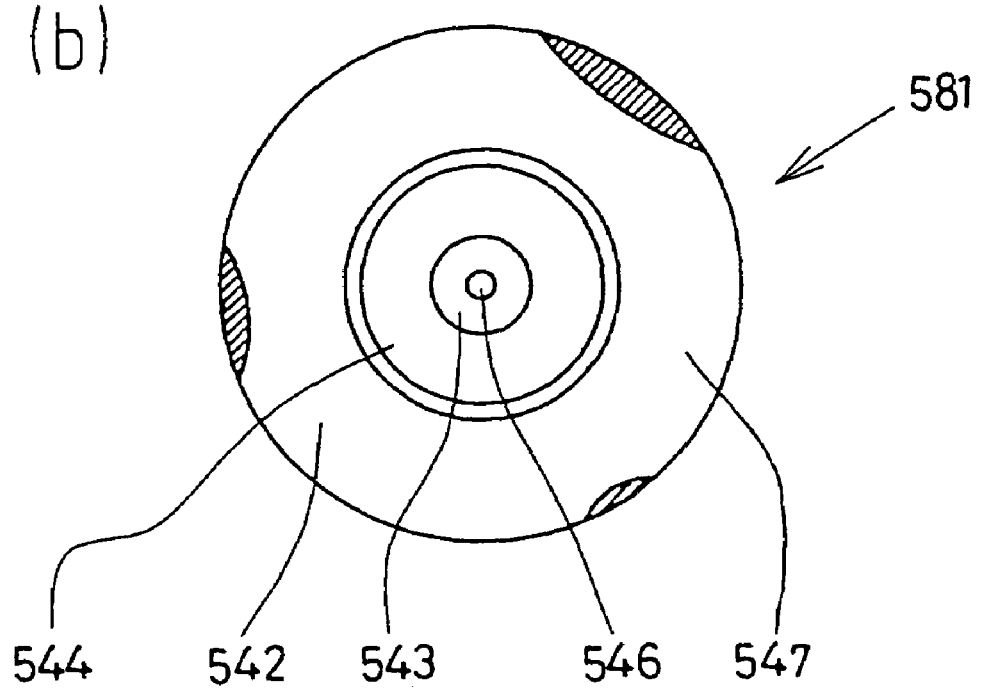

Although the disk holding face 547 of the clamper 581 looks flat at a glance, it has minute unevenness in the case of resin mold products used generally. When the disk holding face 547 of the clamper 581 having this unevenness was ground slightly with sandpaper formed to have the shape of a flat face, it was able to detect such three worn portions as shown in (b) of FIG. 50. (a) of FIG. 50 is a side sectional view of the clamper 581 of the conventional disk drive apparatus, and the (b) of FIG. 50 is a reverse-side view showing the disk holding face 547 of the clamper 581 of FIG. 50. The worn portions indicated by the diagonally shaded areas in (b) of FIG. 50 show the fact that three convex portions were formed on the disk holding face 547 because of a distortion at the time of molding, and that when the disk 501 was held on the turntable 582, the disk 501 was held by using only the three portions, instead of the entire face of the clamp area 511 of the disk 501.

Figure 51:
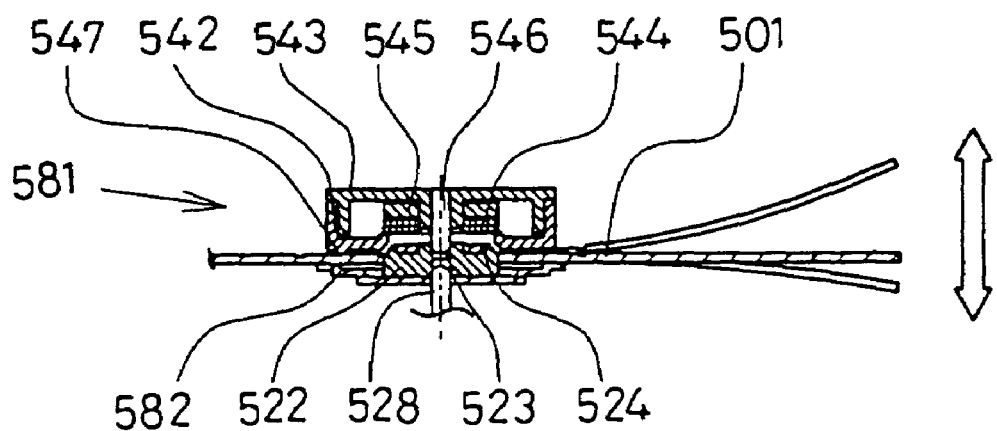
FIG. 51 is a side sectional view showing the difference in the vibration of the disk 501 depending on the difference in the face of the clamper 581 of the conventional disk drive apparatus making contact with the disk 501.
Figure 51:
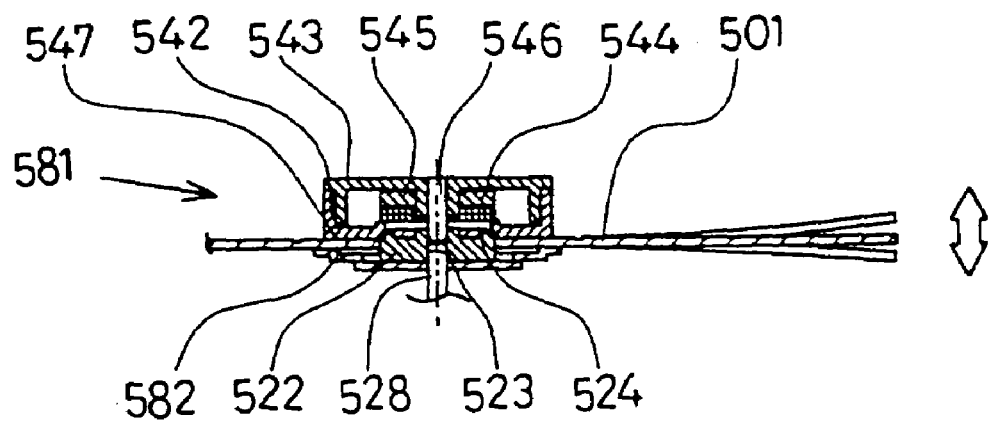

FIG. 51 is a sectional view schematically showing the degree of freedom of the disk 501 in the upward/downward direction in the case when the disk 501 can be held securely between the clamper 581 and the turntable 582, and in the case when it cannot be held securely.

In (a) of FIG. 51, the clamp area 511 of the disk 501 is not held with the disk holding face 547 of the clamper 581; therefore, the disk 501 is in a condition wherein it is deformable in the upward direction in the range from the outermost periphery of the disk 501 to the position wherein the disk 501 makes contact with the boss 522.

In (b) of FIG. 51, the clamp area 511 of the disk 501 is held with the disk holding face 547 of the clamper 581; therefore, the disk 501 is in a condition wherein it is deformable in the upward direction in the range from the outermost periphery of the disk 501 to the position of the outermost periphery of the disk holding face 547.

When these two conditions are compared, the disk 501 shown in (a) of FIG. 51 has a wider deformable range than the disk 501 shown in (b) of FIG. 51, whereby the amplitude amount of the disk 501 is larger in the upward/downward direction.

When consideration is taken just as in the case of the above-mentioned clamper 581, it can be imagined that the flatness of the face of the turntable 582 supporting the disk 501 is also a major factor governing the vibration of the disk 501.

A condition similar to the unevenness that occurs because of the distortion of the clamper 581 at the time of molding also occurs even when litter or dust gets into the space between the clamper 581 and the disk 501. In the case when, after the disk 501 is mounted on the turntable 582, foreign substances, such as hair and the like, drop by chance on the disk 501, the clamper 581 is placed over it to hold the disk 501, and the disk 501 is rotated at high speed, the disk 501 vibrates vigorously, just as in the case when the disk 501 is held with the clamper 581 having unevenness. This is a problem that occurs not only in the space between the clamper 581 and the disk 501 but also in the space between the turntable 582 and the disk 501 in the case when foreign substances, such litter, dust and the like, get into the space.

In view of the above-mentioned findings and considerations related thereto, the 14th embodiment and 15th to 19th embodiments described later in accordance with the present invention each provide a disk drive apparatus capable of carrying out stable recording/reproduction by reducing vibration occurring from the disk in the case of high speed rotation of the disk, capable of reducing vibration and noise discharged to the outside of the disk drive apparatus while maintaining high data transfer rate, and capable of extending the service lives of the bearings of the spindle motor.

14th Embodiment

A disk drive apparatus in accordance with a 14th embodiment of the present invention will be described below referring to the accompanying drawings FIGS. 52 to 58.

Figure 52:
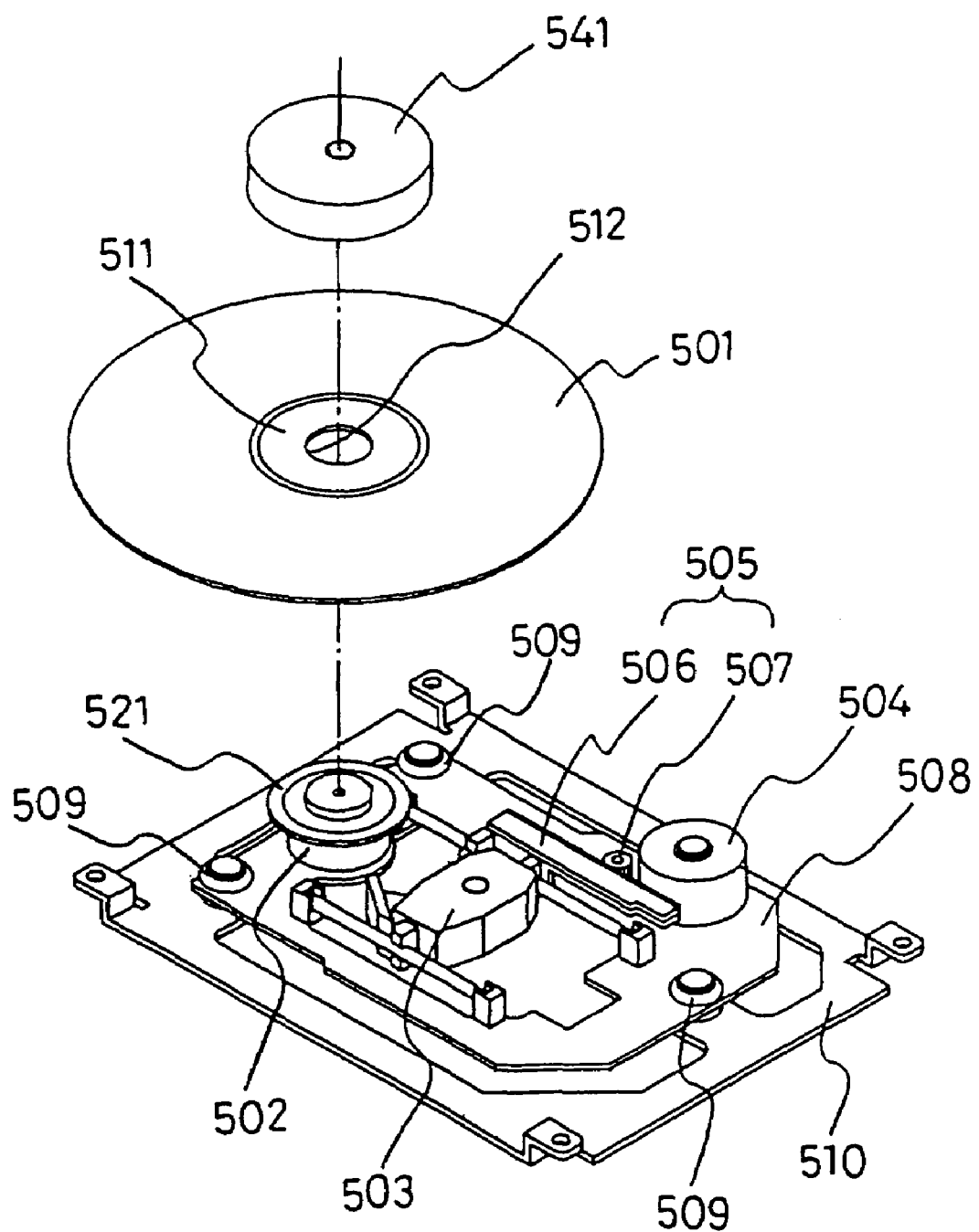
FIG. 52 is a perspective view showing a condition wherein the disk 501 is mounted on the disk drive apparatus of the 14 embodiment of the present invention, and secured with a clamper 541.
Figure 53:
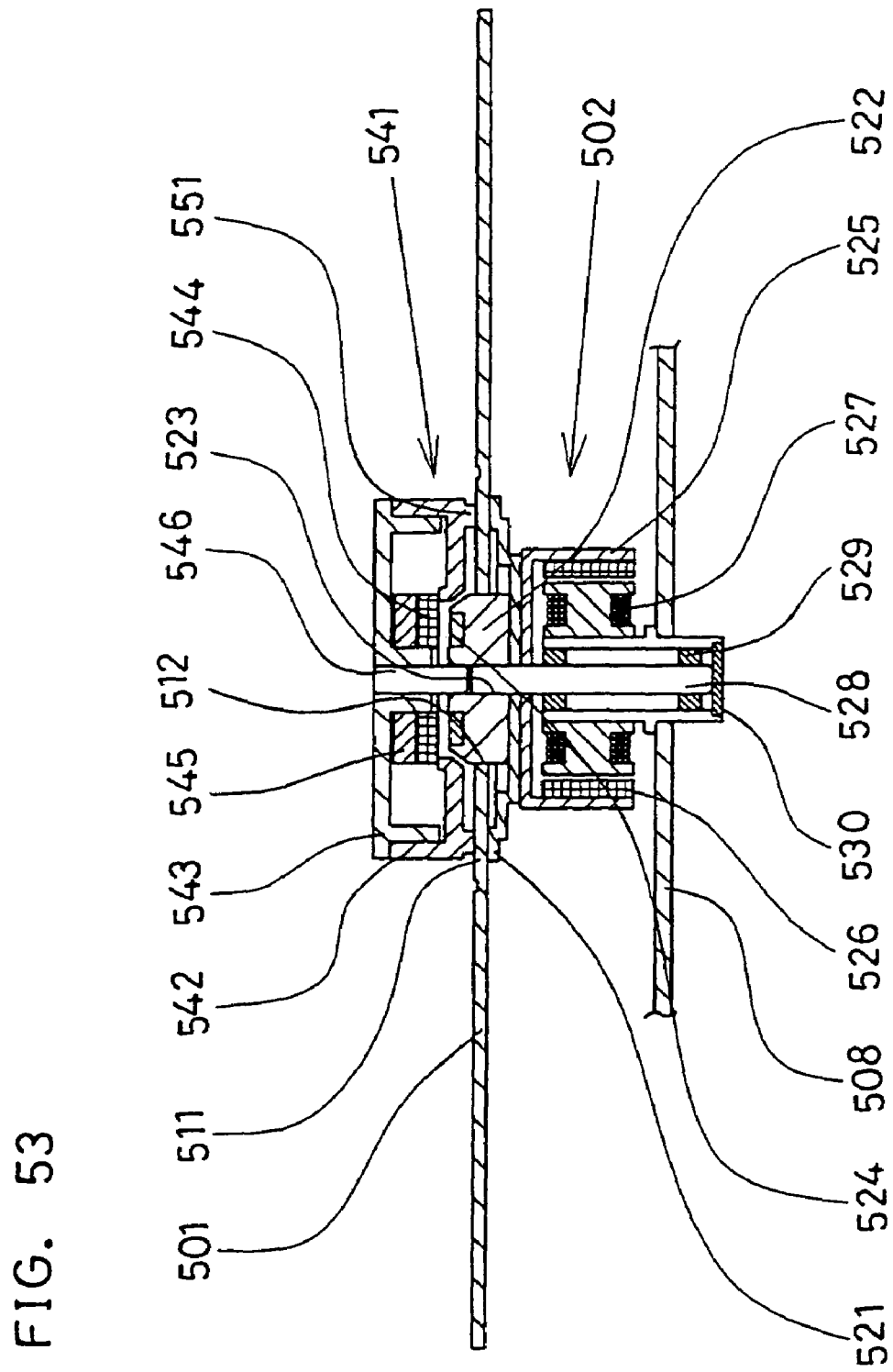
FIG. 53 is a side sectional view showing the vicinity of the spindle motor 502 of the disk drive apparatus in accordance with the 14th embodiment of the present invention.
Figure 54:
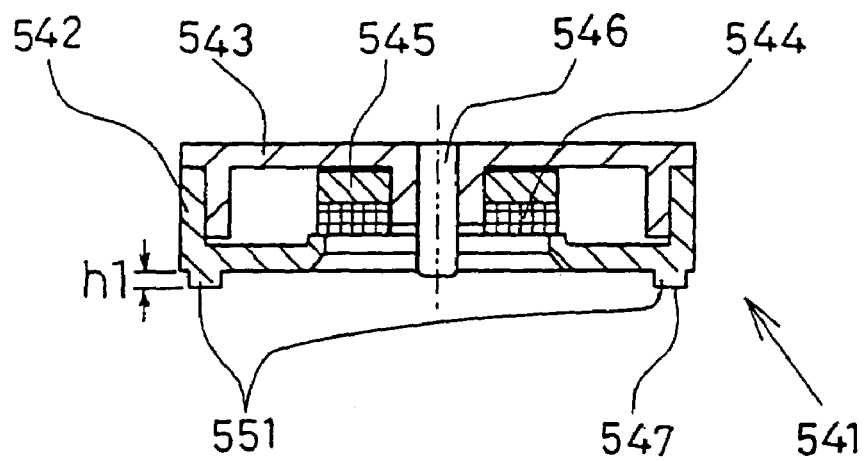
FIG. 54 shows a side sectional view (a) and a reverse-side view (b) showing the clamper 541 of the disk drive apparatus in accordance with the 14th embodiment of the present invention.
Figure 54:
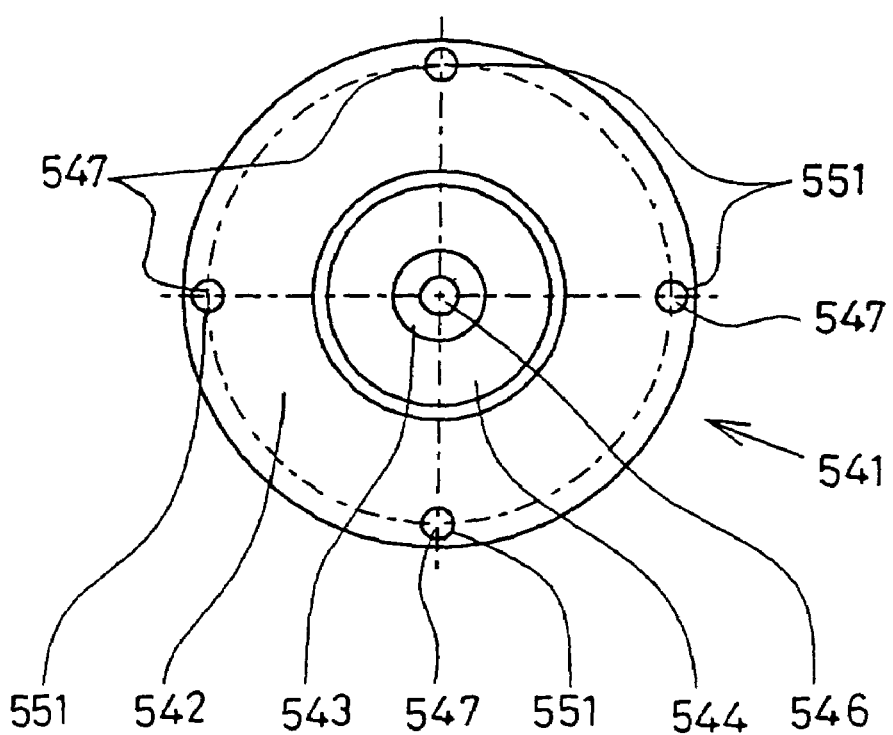

FIG. 52 is a perspective view showing a condition wherein a disk 501 is mounted on the disk drive apparatus of the 14 embodiment of the present invention, and held with a clamper 541. FIG. 53 is a side sectional view showing the vicinity of a spindle motor 502 in the disk drive apparatus of the 14th embodiment. FIGS. 54 are a side sectional view (a) and a reverse-side view (b) showing the clamper 541 of the disk drive apparatus of the 14th embodiment. As shown in (b) of FIG. 54, plural clamper projections 551 are disposed on the reverse-side face of the clamper 541.

Referring to FIG. 52, the disk 501 is mounted on a turntable 521 and secured with a clamper 541, and then rotated by a spindle motor 502. A head 503 reads data recorded on the disk 501 or writes data on the disk 501. A traverse mechanism 505, comprising a rack 506, a pinion 507 and the like, converts the rotation motion of a traverse motor 504 into a linear motion, and transmits it to the head 503. The head 503 is moved in the radial direction of the disk 501 by this traverse mechanism 505. The spindle motor 502, the traverse motor 504 and the traverse mechanism 505 are mounted on a sub-base 508. Vibration and impact transmitted from outside the device to the sub-base 508 are dampened by insulators 509 (elastic bodies), and the sub-base 508 is mounted on a main base 510 via these insulators 508.

The disk drive apparatus of the 14th embodiment is configured so as to be built in a computer or the like via a frame (not shown) installed on the main base 510.

FIG. 53 is a side sectional view showing the vicinity of the spindle motor 502 of the disk drive apparatus of the 14th embodiment. The spindle motor 502 has a rotor 525 integrally secured to the spindle shaft 528 and a rotor magnet 526 disposed inside the rotor 525, and a coil 527 is provided so as to be opposed to the rotor magnet 526. The spindle shaft 528 is rotatably supported by radial bearings 529 and a thrust bearing 530. The stationary portion of the spindle motor 502 is secured to the sub-base 508.

The turntable 521 made of metal is secured to the spindle motor shaft 528 and rotatably supports the clamp area 511 of the disk 501. On the turntable 521, a boss 522 to be fitted into the clamp hole 512 of the disk 501 is formed integrally. By fitting the clamp hole 512 of the disk 501 on the boss 522, the disk 501 is aligned.

In the face (the upper face in FIG. 53) of the boss 522 opposite to the clamper 541, a positioning hole 523 is formed. In addition, a ring-shaped, opposed yoke 524 is embedded and secured onto the upper face of the boss 522.

As shown in FIG. 53, the clamper 541 made of resin has a disk holder 542 opposed to the upper face of the mounted disk 501 and a magnet holder 543. A flat face is formed on the reverse-side face of the disk holder 542. A center projection 546, which is fitted into the positioning hole 523 provided in the boss 522 of the turntable 521 so that the turntable 521 and the clamper 541 have the same center position, is secured to the magnet holder 543. In addition, a magnet 544 and a back yoke 545 are secured inside the magnet holder 543.

In the disk drive apparatus of the 14 embodiment configured as describe above, in a condition wherein the disk 501 is held between the clamper 541 and the turntable 521, the clamp hole 512 fits on the boss 522, whereby the disk 501 is mounted on the turntable 521. In addition, at this time, the disk 501 is held by the magnetic attraction acting between the magnet 544 accommodated in the clamper 541 and the opposed yoke 524 secured to the turntable 521. The disk 501 held in this way is rotated integrally with the turntable 521 and the clamper 541 by the rotation operation of the spindle motor 502.

In the disk drive apparatus of the 14th embodiment, as shown in FIGS. 54(a) and (b), four cylindrical clamper projections 551 are formed on the reverse-side face of the disk holder 542 constituting the reverse-side face of the clamper 541. The clamper projections 551 are disposed on a circle around the center axis of the center projection 546 of the magnet holder 543, and provided at positions wherein the clamper projections 551 can securely hold the clamp area 511 of the disk 501. In the 14th embodiment, the clamper projections 551 are formed at positions 15 mm away from the rotation center. Furthermore, as shown in (b) of FIG. 54, the four clamper projections 551 are provided at positions wherein the circumference is divided into four equal portions, that is, positions wherein the circumference is divided at intervals of 90 degrees. The difference (flatness) in height (h1) among the clamper projections 551 is within 40 µm. In the case when the difference (flatness) in height between the bumps and dips on the disk mounting face of the turntable 521 is sufficiently smaller than 40 µm (the flatness in the clamper projections 551), the disk 501 is securely held between the four clamper projections 551 and the turntable 521.

In the case when the disk 501 is held between the four clamper projections 551 and the turntable 521 as described above, the vibration of the disk 501 in the "six-division mode" shown in the above-mentioned FIG. 47 is reduced to a nearly undetectable condition. If the disk 501 is held between the turntable 521 and three clamper projections at three positions divided at intervals of 120 degrees, the deformable range at the clamp area 511 of the disk 501 is extended, and the vibration in the "six-division mode" is apt to occur abruptly.

In the case when the clamper 541 is processed so as to comply with mass-production, injection-molded products made of resin are used usually. In this case, when the radius of the clamp area 511 of the disk 501 is about 15 mm from its center, the flatness of the disk holding face 547 of the clamper 541 becomes about 100 µm. Since the disk holding face 547 of the clamper 541 virtually appears to be smooth, it is misunderstood that the disk 501 has been held between the turntable 521 and the clamper 541 having a completely flat plane. However, in the case of the clamper 541 distorted at the time of molding, unevenness is caused on the disk holding face 547, and the disk 501 is inevitably held at the three portions as described in the prior art. The condition wherein the three portions are not disposed at uniformly divided intervals of 120 degrees as shown in FIG. 50 is undesirable. Because, if even one secured section extending 120 degrees or more is present between the disk 501 and the turntable 521, the vibration in the "six-division mode" shown in FIG. 47 occurs partially on the disk 501, and vibration and noise of the disk drive apparatus become significant.

Furthermore, if the three portions for holding the disk 501 as described above are disposed extremely unequally, and if one section is not secured between the disk 501 and the turntable 531 at an interval of 180 degrees or more, the vibration in the four-division mode shown in FIG. 46 occurs partially.

Figure 55:
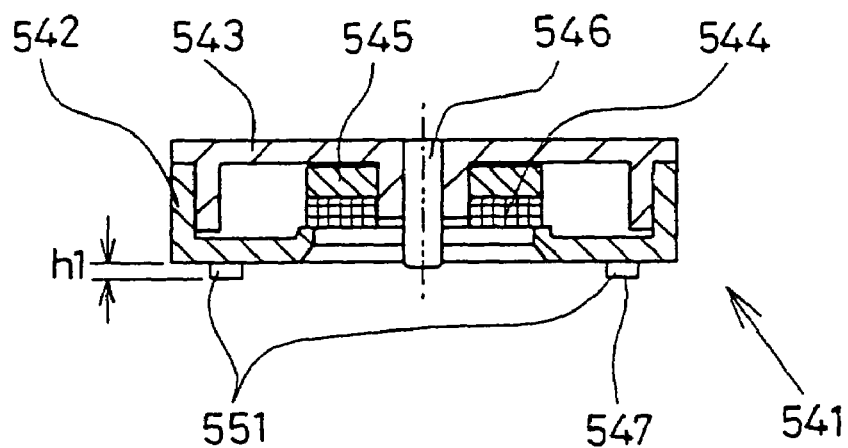
FIG. 55 shows a side sectional view (a) and a reverse-side view (b) showing another clamper 541 of the disk drive apparatus in accordance with the 14th embodiment of the present invention.
Figure 55:
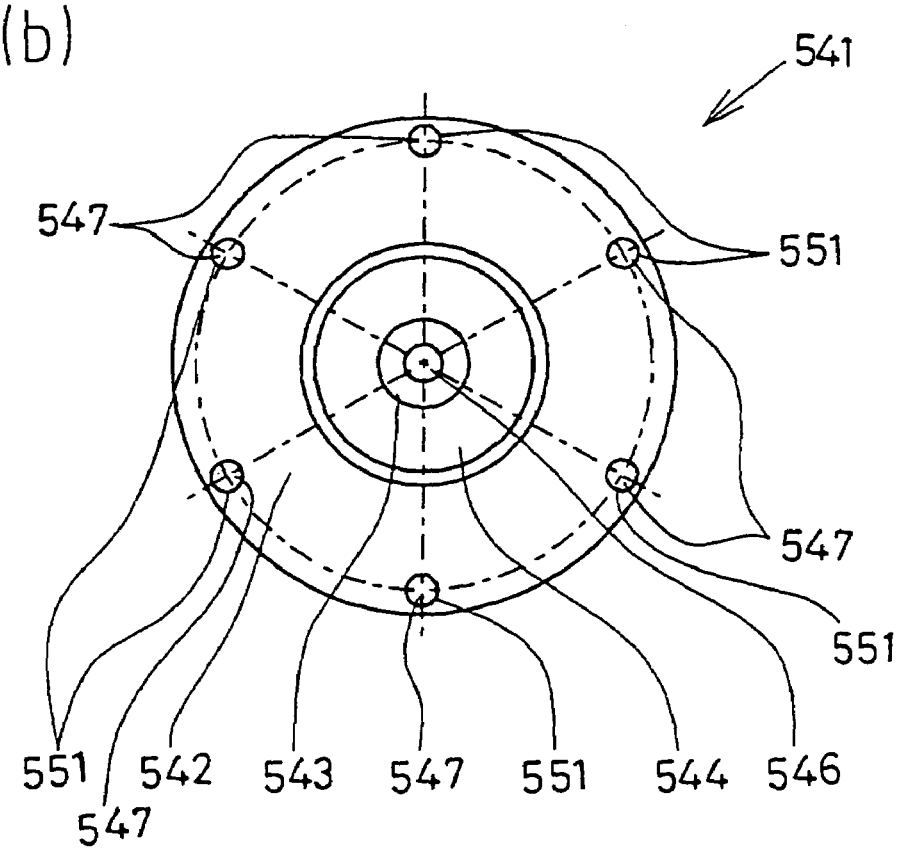

FIGS. 55 are a side sectional view (a) and a reverse-side view (b) showing another concrete example of the clamper 541 of the disk drive apparatus of the 14th embodiment.

In FIG. 55, six cylindrical clamper projections 551 are formed on a disk holder 542 constituting the reverse-side face of the clamper 541. The clamper projections 551 are formed at positions on a circle around the center axis of the center projection 546 of the magnet holder 543, and at positions wherein the clamper projections 551 can securely hold the clamp area 511 of the disk 501. Furthermore, as shown in (b) of FIG. 55, the six clamper projections 551 are provided at positions wherein the same circumference is divided into six equal portions, that is, positions wherein the circumference is divided at intervals of 60 degrees.

The difference (flatness) in height (h1) among the clamper projections 551 is within 40 μm. In the case when the difference (flatness) in height between the bumps and dips on the disk mounting face of the turntable 521 is sufficiently smaller than the flatness in the clamper projections 551, the disk 501 is securely fixed with the six clamper projections 551 on the turntable 521.

By fixing the disk 501 on the turntable 521 with the clamper projections 551 disposed at the six positions as described above, the vibration of the disk 501 can be made lower than that in the case when the clamper projections 551 are disposed at four positions.

In the case when the number of the clamper projections 551 is four, the disk 501 is held at four positions at intervals of 90 degrees; therefore, one deformable section of the disk 501 has 90 degrees. Therefore, the vibration of the disk 501 in the "eight-division mode" is apt to occur abruptly. However, in the case when the number of the clamper projections 551 is six, one deformable section of the clamp area 511 of the disk 501 has 60 degrees. Therefore, the vibration of the disk 501 in the "eight-division mode" is reduced to a nearly undetectable condition.

Figure 56:
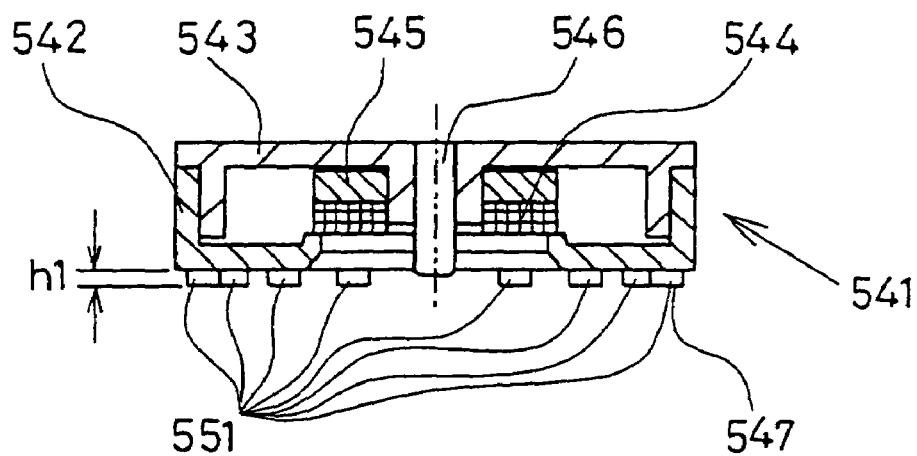
FIG. 56 shows a side sectional view (a) and a reverse-side view (b) showing another clamper 541 of the disk drive apparatus in accordance with the 14th embodiment of the present invention.
Figure 56:
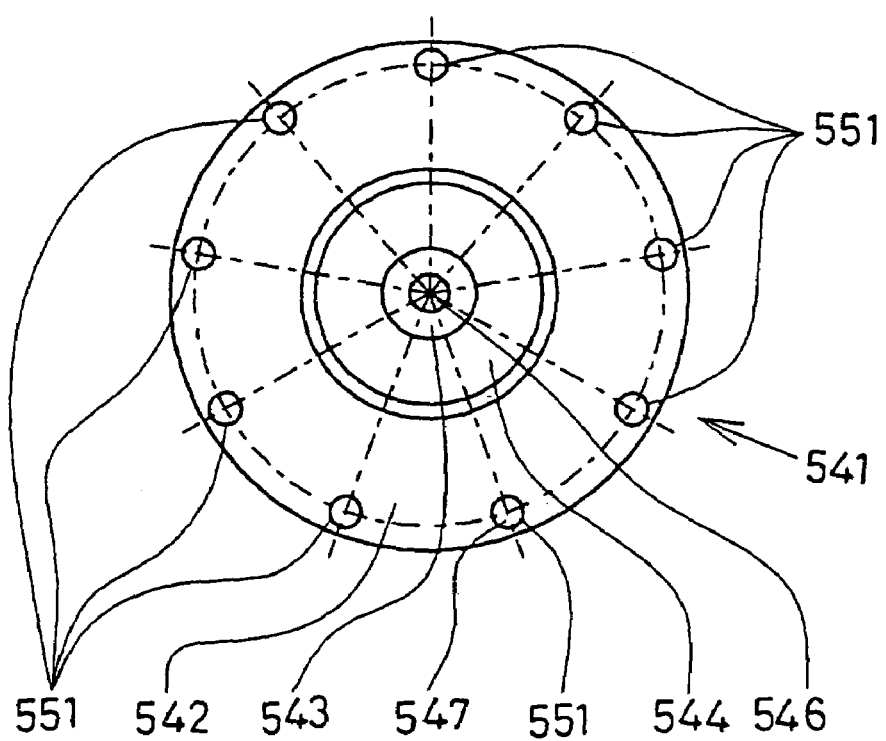

FIGS. 56(*a*) and (*b*) are a side sectional view and a reverse-side view showing still another concrete example of the clamper 541 of the disk drive apparatus of the 14th embodiment.

In FIG. 56, nine cylindrical clamper projections 551 are formed on a disk holder 542 constituting the reverse-side face of the clamper 541. The clamper projections 551 are formed at positions on a circle around the center axis of the center projection 546 of the magnet holder 543. These positions are positions wherein the clamper projections 551 can securely hold the clamp area 511 of the disk 501. Furthermore, as shown in (b) of FIG. 56, the nine clamper projections 551 are provided at positions wherein the same circumference is divided into nine equal portions, that is, positions wherein the circumference is divided at intervals of 40 degrees.

The difference (flatness) in height (h1) among the clamper projections 551 is within 40 μm. In the case when the difference in height between the bumps and dips on the disk mounting face of the turntable 521 is sufficiently smaller than the flatness in the clamper projections 551, the disk 501 is securely held between the nine clamper projections 551 and the turntable 521.

By fixing the disk 501 on the turntable 521 with the nine clamper projections 551, the vibration of the disk 501 can be made further lower than that in the case when the six clamper projections 551 are used. This is because the vibration of the disk 501 in higher vibration modes can be reduced.

Furthermore, in the case when even one of the clamper projections 551 is lost because of improper molding of the disk holder 542, when the number of the clamper projections 551 is six for example, the deformable range section in the clamp area 511 of the disk 501 extends from 60 degrees to 120 degrees. In this case, the vibration of the disk 501 in the "six-division mode" occurs as described above. However, when the number of the clamper projections 551 is nine, even when one of the clamper projections 551 is lost because of improper molding of the disk holder 542, the deformable range section in the clamp area 511 of the disk 501 has only 80 degrees. Therefore, just as in the case when the number of the clamper projections 551 is six, the vibration of the disk 501 in the "eight-division mode" is reduced to a nearly undetectable condition.

In the conventional disk drive apparatus, in the case when the disk holding face of the clamper has no clamper projections, when the disk 501 is mounted on the turntable, the disk 501 is fixed in some cases in a condition wherein foreign substances, such as minute litter, dust and the like, attached to the clamp area 511 are caught between the disk 501 and the clamper and the clamper is actually tilted. In such a case, in the clamp area 511 of the disk 501, the deformable range section not held between the clamper and the turntable becomes wider, the disk 501 has a higher possibility of vibrating in the "four-division mode," "six-division mode" and "eight-division mode."

However, in the disk drive apparatus of the 14th embodiment of the present invention, when the diameter of the clamper projections 551 is about 1 to 2 mm, the disk 501 can be fixed sufficiently; therefore, minute litter, dust and the like attached to the clamp area 511 are less likely to overlap with the positions at which the clamper projections 551 hold the disk 501, thereby being less likely to be affected by litter, dust and the like.

Even if litter attaches by chance to the tips of the clamper projections 551, since the surface areas of the tips of the clamper projections 551 are small, when litter attaches to the disk 501 and the disk 501 is removed, the litter is highly likely to be discharged together with the disk 501, whereby the disk drive apparatus of the 14th embodiment has a passive self-cleaning function.

Furthermore, since the clamper projections 551 each have a constant height (100 μm for example), this is effective in preventing the holding of the disk from becoming unstable due to foreign substances, such as litter and the like, which have attached to the reverse-side face of the disk holder 542 and the surface of the clamp area 511 of the disk 501 making contact therewith and are not larger than the height (h1) of the clamper projections 551.

Figure 57:
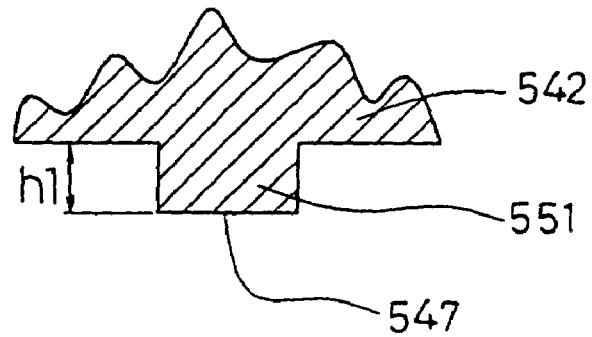
FIG. 57 is a partially enlarged view showing the shapes of the clamper projections 551 provided on the clamper 541 of the disk drive apparatus in accordance with the 14th embodiment of the present invention.
Figure 57:
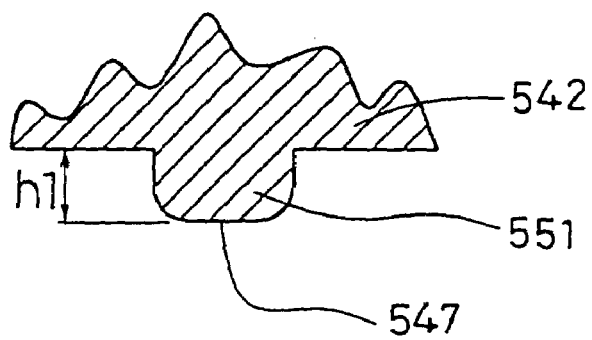
Figure 57:
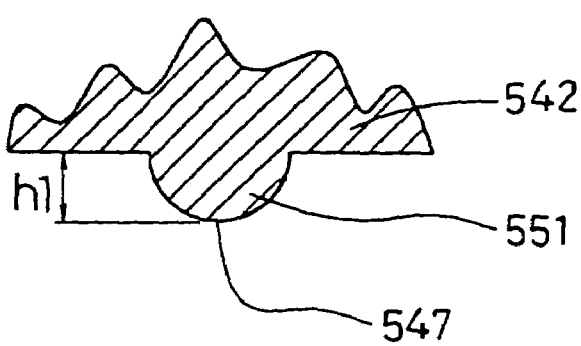
Figure 57:
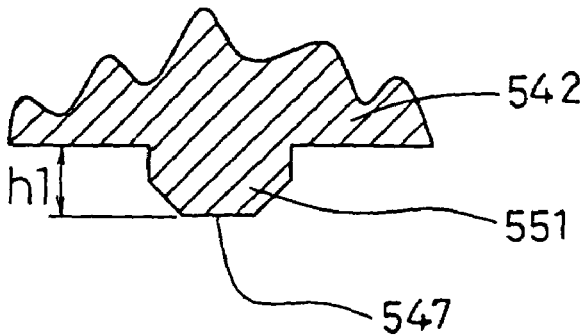

FIG. 57 is a view showing the shapes of the clamper projections 551 in the disk drive apparatus of the 14th embodiment. (a) of FIG. 57 is a side sectional view showing the shape of a cylindrical clamper projection 551. To enhance the above-mentioned effect further, by thinning the tips of the clamper projections 551 as shown in FIGS. 57(*b*), (*c*) and (*d*), the surface areas of the tips of the clamper projections 551 are reduced, and the probability of attaching of litter is reduced further.

Figure 58:
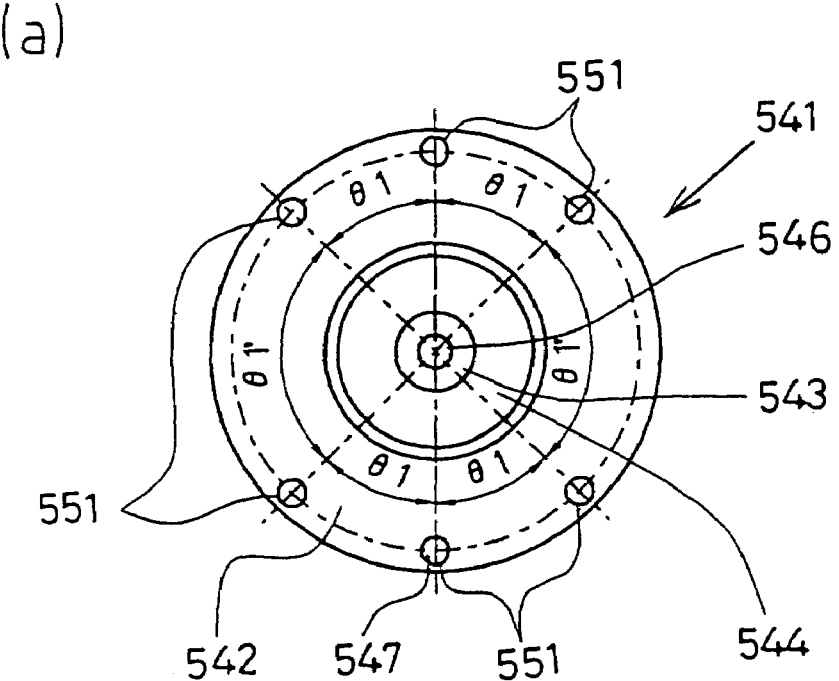
FIG. 58 is a reverse-side view showing the dispositions of the clamper projections 551 provided on another clamper 541 of the disk drive apparatus in accordance with the 14th embodiment of the present invention.
Figure 58:
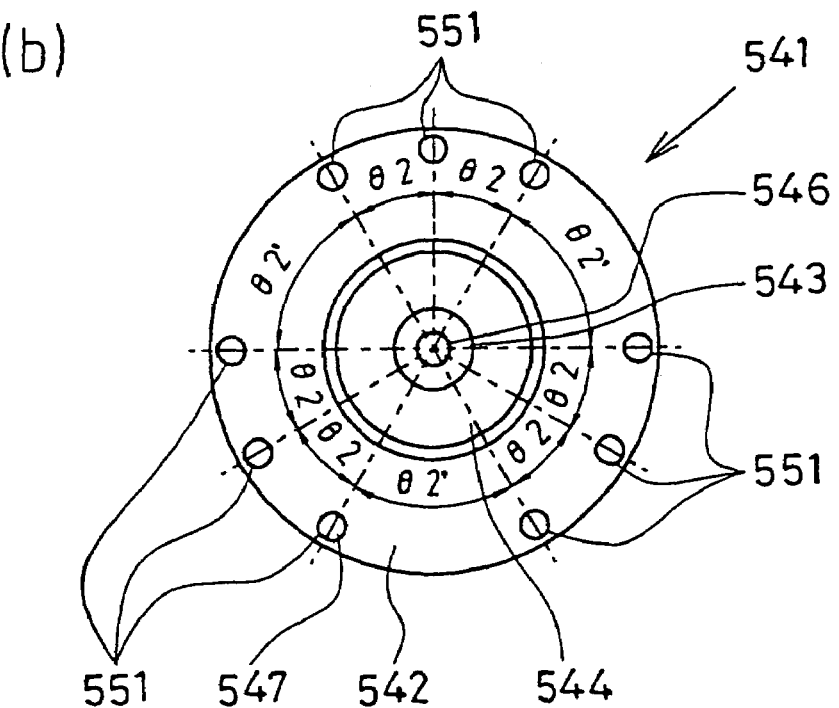

FIG. 58 is a reverse-side view showing yet still another concrete example of the clamper 541 in the disk drive apparatus of the 14th embodiment.

The plural clamper projections 551 shown in FIG. 58 are not disposed at equal intervals of a central angle; for example, in the clamper 541 shown in (a) of FIG. 58, six clamper projections 551 are disposed nonuniformly. If the maximum angle θ1' between the adjacent projections 551 is 90 degrees or less as shown in (a) of FIG. 58, the vibration of the disk 501 in the "eight-division mode" does not occur.

In the clamper 541 shown in (b) of FIG. 58, nine clamper projections 551 are disposed at intervals of nonuniform center angles. If the maximum angle θ2' between the adjacent clamper projections 551 is 120 degrees or more, the vibration of the disk 501 in the "six-division mode" occurs. Although it is not necessary at all to nonuniformly provide the clamper projections 551, when the pin gates for injection molding interfere with the positions of the clamper projections 551 in the case of molding the clamper 541 by injection molding, it is desired that the positions of the clamper projections 551 should be dislocated to optimum positions in accordance with the above-mentioned way of thinking. As a result, it is possible to obtain an effect similar to that obtained in the case when the clamper projections 551 are disposed uniformly.

In the disk drive apparatus of the 14th embodiment, the clamper projections 551 are disposed on a circumference; however, if the clamper projections 551 can be disposed so that they can securely hold the clamp area 511 of the disk 501, the effect of reducing the vibration of the disk 501 has no significant difference, even if the radii from the center projection 546 secured to the center of the magnet holder 543 have slightly different values.

In the disk drive apparatus of the 14th embodiment, if the difference (flatness) in height (h1) among the clamper projections 551 are within 40 μm, the clamper projections 551 can securely hold the clamp area 511 of the disk 501. If the flatness of the clamper projections 551 can be set desirably within 20 μm, the disk 501 can be held more securely between the clamper 541 and the turntable 521, whereby the vibration in the case when the disk 501 is rotated at high speed can be reduced further.

In the conventional disk drive apparatus, the disk holding face 547 of the clamper is formed to have a flat face. Therefore, even if an attempt is made to correct its metal mold so that the difference (flatness) between the bumps and dips on the disk holding face 547 is within 40 μm, the flatness is obtained by not removing the bumps but by grinding the other portions so that they are aligned with the heights of the bumps. This results in grinding the entire face of the disk holding face 547 again; when the movement of the edge of the tool used for the grinding is taken into consideration, it is very difficult to obtain the flatness within 40 μm by grinding the metal mold. In addition, when the changes in molding conditions, thermal expansion after molding and the like are taken into consideration, it is impossible in reality to carry out molding at the flatness of the disk holding face 547 of the clamper within 40 μm by using only the metal mold.

On the other hand, in the disk drive apparatus of the 14th embodiment, it is very easy to obtain the difference (flatness) in height (h1) among the clamper projections 551 within 40 μm, even if the quantity thereof is relatively large. The heights (h1) of the clamper projections 551 are measured, and three clamper projections 551 are selected in the decreasing order of the heights (h1) of the clamper projections 551. Then, the metal mold should only be modified so that the heights (h1) of the remaining clamper projections 551 are aligned with the plane formed by the three clamper projections 551. The range of deformation due to the changes in molding conditions and thermal expansion after molding, a problem to be solved in the case of the flat face, can be approximately estimated. Therefore, it is also possible to dispose the clamper projections 551 at positions wherein they are less affected except for the range of their deformations.

In the disk drive apparatus of the 14th embodiment, the cases wherein the numbers of the clamper projections 551 are 4, 6 and 9 have been described in succession. However, in the disk drive apparatus of the present invention, the numbers of the clamper projections 551 are not limited to 4, 6 and 9; even if the number may be 5, 7, 8, 10 or more, the effect of reducing the vibration of the disk 501 can be obtained without problems. In holding the disk 501 between the turntable 521 and the clamper 541, the deformable range of the disk 501 can be limited as the number of the clamper projections 551 is larger, whereby the effect of reducing the vibration of the disk 501 is high. However, in the control of the processing accuracy of the metal mold for obtaining the flatness, it is regarded that the optimum number of the clamper projections 551 is determined automatically depending on the number and cost of the disk drive apparatuses planned to be produced.

In the disk drive apparatus of the 14th embodiment, the embodiment has been described such that the shape of the clamper projections 551 is cylindrical, or such that the horizontal sectional shape thereof, made thinner at the tip, is circular. However, in the disk drive apparatus of the present invention, the horizontal sectional shape of the clamper projections 551 is not required to be circular; it is possible to set any desired sectional shapes, such as a triangular shape, a square shape, an elliptic shape and the like. However, when metal mold processing is taken into consideration, the cylindrical shape is the simplest and convenient when changing the height (h1) of the clamper projections 551.

In the disk drive apparatus of the 14th embodiment, the height (h1) of the clamper projections 551 can be determined as desired. However, the height (h1) of the clamper projections 551 should preferably be set at about 1/10 to 1/20 of the thickness thereof in order to have a shape not affected by distortion at the time of injection molding of resin. For example, when the diameter of the clamper projections 551 is 2 mm, the height becomes 100 μm at 1/20; and when the diameter of the clamper projection 551 is 1 mm, the height becomes 100 μm at 1/10. With this kind of height, the clamper projections 551 can sufficiently prevent trouble caused at the time when foreign substances having a thickness of hair are caught.

The disk drive apparatus of the 14th embodiment is configured so that the magnet 544 and the back yoke 545 are accommodated in the clamper 541, and so that the opposed yoke 524 is embedded in the boss 522 of the turntable 521. However, in the disk drive apparatus of the present invention, even if the magnet 544 and the back yoke 545 are accommodated in the boss 522 of the turntable 521, and even if the opposed yoke 524 is accommodated in the clamper 541, the effect of reducing the vibration in the case when the disk 501 is rotated at high speed remains unchanged.

As described above, in accordance with the configuration of the disk drive apparatus of the 14th embodiment, by disposing four or more clamper projections 551 on the disk holding face of the clamper 541, the vibration of the disk 501 can be reduced securely. Therefore, in the disk drive apparatus of the 14th embodiment, the vibration of the disk 501 can be reduced, even when the disk 501 is mounted on the turntable 521 having a face deflection and rotated at high speed, and even when the disk 501 having a face deflection and thereby unbalanced significantly is rotated at high speed.

Therefore, stable recording/reproduction can be attained without reducing data transfer rate. In addition, in accordance the disk drive apparatus of the 14th embodiment, vibration and noise to the outside of the disk drive apparatus can be reduced; furthermore, it is possible to attain a disk drive apparatus in which the spindle motor 502 thereof has a long service life.

15th Embodiment

Next, a disk drive apparatus in accordance with a 15th embodiment of the present invention will be described referring to the accompanying drawing FIG. 59.

Figure 59:
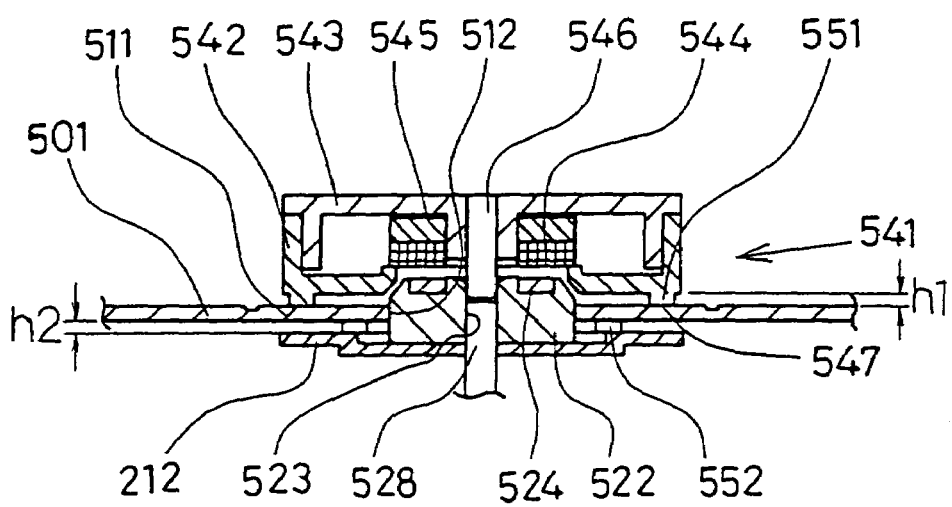
FIG. 59 shows a side sectional view (a) and a reverse-side view (b) showing the vicinity of the clamper 541 of the disk drive apparatus in accordance with the 15th embodiment of the present invention.
Figure 59:
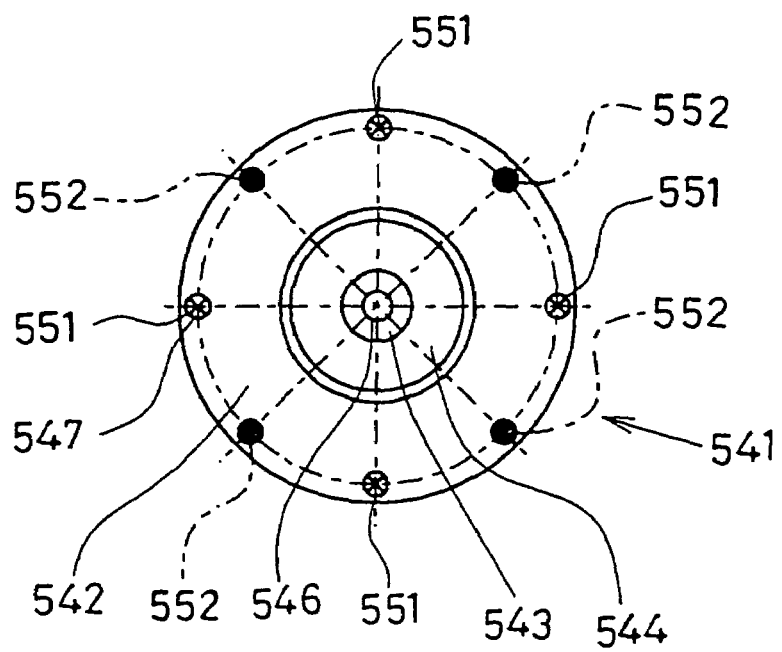

FIGS. 59 are a side sectional view (a) showing the vicinity of the clamper 541 of the disk drive apparatus of the 15th embodiment of the present invention and a reverse-side view of the clamper 541. In the reverse-side view of the clamper 541 in (b) of FIG. 59, the positions of turntable projections 552 formed on a turntable 212 are shown by diagonally shaded areas. In the 15th embodiment, the elements having functions substantially identical to those of the elements of the disk drive apparatus of the 14th embodiment shown in the above-mentioned FIGS. 52 to 58 are represented by the same numeral codes, and the descriptions for the preceding embodiment are applied, thereby omitting overlap descriptions.

As shown in (a) of FIG. 59, the turntable 212 on which a disk 501 is mounted is secured to a spindle motor shaft 528 and rotatably supports the clamp area 511 of the disk 501. On the turntable 212, a boss 522 to be fitted into the clamp hole 512 of the disk 501 is formed integrally. By fitting the disk 501 on the boss 522, the disk 501 is positioned. In addition, at the center of the face of the boss 522, opposite to the clamper 541, a positioning hole 523 is formed, and a ring-shaped, opposed yoke 524 is embedded and secured to the boss 522.

As shown in (a) of FIG. 59, the clamper 541 made of resin has a disk holder 542 opposed to the upper face of the mounted disk 501 and a magnet holder 543. A flat face is formed on the reverse-side face of the disk holder 542. A center projection 546, which is fitted into the positioning hole 523 provided in the boss 522 of the turntable 212 so that the turntable 212 and the clamper 541 have the same center position (coaxial), is secured to the magnet holder 543. In addition, a magnet 544 and a back yoke 545 are secured inside the magnet holder 543.

In the disk drive apparatus of the 15 embodiment configured as describe above, in a condition wherein the disk 501 is held between the clamper 541 and the turntable 212, the clamp hole 512 of the disk 501 fits on the boss 522 of the turntable 212, whereby the disk 501 is mounted on the turntable 212. At this time, the disk 501 is held by the magnetic attraction acting between the magnet 544 accommodated in the clamper 541 and the opposed yoke 524 secured to the boss 522.

The disk 501 held in this way is rotated integrally with the turntable 212 and the clamper 541 by the rotation operation of the spindle motor 502.

In the disk drive apparatus of the 15th embodiment, as shown in (b) of FIG. 59, four cylindrical clamper projections 551 are formed on the disk holder 542 constituting the reverse-side face of the clamper 541 made of resin. The clamper projections 551 are disposed on a circle around the center axis of the center projection 546 of the magnet holder 543, and formed at positions wherein the clamper projections 551 can securely hold the clamp area 511 of the disk 501. Furthermore, as shown in (b) of FIG. 59, the four clamper projections 551 are provided at positions wherein the same circumference is divided into four equal portions, that is, positions wherein the circumference is divided at intervals of 90 degrees. The difference (flatness) in height (h1) among the clamper projections 551 is within 40 μm.

As shown in (a) of FIG. 59, in the disk drive apparatus of the 15th embodiment, the cylindrical turntable projections 552 are formed on the upper face of the turntable 212 made of resin. In (b) of FIG. 59, the positions of the turntable projections 552 formed on the turntable 212 on the reverse-side face of the clamper 541 are shown by diagonally shaded areas. In other words, four turntable projections 552 are formed on the turntable 212 on a circle around the positioning hole 523 of the spindle motor 502. The positions wherein the turntable projections 552 are formed are positions wherein the turntable projections 552 can securely hold the clamp area 511 of the disk 501. As shown in (b) of FIG. 59, the four turntable projections. 552 are provided at positions wherein the same circumference is divided into four equal portions, that is, positions wherein the circumference is divided at intervals of 90 degrees. The difference (flatness) in height (h2) among the turntable projections 552 is within 40 μm.

In the 15th embodiment, if the difference (flatness) in height (h1) among the clamper projections 551 is within 40 μm, and if the difference (flatness) in height (h2) among the turntable projections 552 is within 40 μm, the disk 501 is securely held between the clamper 541 and the turntable 212 at totally eight positions on the upper and lower faces thereof.

In the disk drive apparatus of the 15th embodiment, when the disk 501 is mounted on the turntable 212, the disk 501 is raised toward the clamper 541 together with a sub-base 508 to which the spindle motor 502 is secured. As a result, the disk 501 is held between the clamper 541 and the turntable 212. At this time, with respect to the positioning among the clamper 541, the disk 501 and the turntable 212, there is no restriction regarding the positions in the rotation direction, except that the centers of these are aligned with the center of the spindle motor shaft 528, whereby they are positioned at any given positions. Even in this kind of case, the clamper 541 prevents the deformation of the disk 501 in the upward direction in the "six-division mode" of the disk 501. Furthermore, the turntable 212 prevents the deformation of the disk 1 in the downward direction in the "six-division mode" of the disk 501.

Therefore, in the disk drive apparatus of the 15th embodiment, the deformation of the disk 501 in the upward and downward directions in the "six-division mode" of the disk 501 is prevented, whereby in the case when the disk 501 is rotated at high speed, the vibration of the disk 501 in the "six-division mode" can be reduced to a nearly undetectable condition.

Furthermore, in the case when the disk drive apparatus of the 15th embodiment is a disk drive apparatus in which the clamper 541 can be secured manually to the turntable 212 to hold the disk 501, the vibration in the case when the disk 501 is rotated at high speed can be reduced further by aligning the rotational positions of the clamper projections 551 with those of the turntable projection 552, by accurately disposing the clamper projections 551 on the turntable projection 552, and by securing the clamper 541 to the turntable 521.

In the disk drive apparatus of the 15th embodiment, if the difference (flatness) in height (h1) among the clamper projections 551 is within 40 μm, the clamp area 511 of the disk 501 can be held securely with four or more clamper projections 551. Desirably, if the flatness at the clamper projections 551 can be made within 20 μm, more secure holding can be attained between the clamper and the turntable 212, whereby the vibration in the case when the disk 501 is rotated at high speed can be reduced further.

In the disk drive apparatus of the 15th embodiment, it has been described that if the difference (flatness) in height (h2) among the turntable projections 552 is within 40 μm, the turntable projections 552 can securely hold the clamp area 511 of the disk 501. However, desirably, if the flatness at the turntable projections 552 can be made within 20 μm, more secure holding can be attained between the clamper 541 and the turntable, whereby the vibration in the case when the disk 501 is rotated at high speed can be reduced further.

In the disk drive apparatus of the 15th embodiment of the present invention, when the diameters of the clamper projections 551 and the turntable projections 552 are about 1 to 2 mm, the disk 501 can be fixed sufficiently; therefore, the positions wherein foreign substances, such as minute litter, dust and the like, attach to the clamp area 511 are less likely to overlap with the positions at which the clamper projections 551 and the turntable projections 552 hold the disk 501, thereby being configured so as to be less likely to be affected by litter, dust and the like. Even if litter attaches by chance to the tips of the clamper projections 551 or the turntable projections 552, since the surface areas of these tips are small, in the case when litter attaches to the disk 501 and the disk 501 is removed, the litter is discharged together with the disk 501, thereby having a passive self-cleaning function.

To enhance the above-mentioned effect further, by thinning the tips of the clamper projections 551 and the turntable projections 552 as shown in the above-mentioned FIGS. 57(b), (c) and (d), the surface areas of the tips of the clamper projections 551 and the turntable projections 552 are reduced, and the probability of attaching of litter is reduced further.

In the disk drive apparatus of the 15th embodiment, the embodiment has been described such that the shapes of the clamper projections 551 and the turntable projections 552 are cylindrical, or such that the horizontal sectional shapes thereof, made thinner at the tips, are circular. However, in the present invention, the horizontal sectional shapes of the clamper projections 551 and the turntable projections 552 are not required to be circular; it is possible to set any desired sectional shapes, such as a triangular shape, a square shape, an elliptic shape and the like.

However, when metal mold processing is taken into consideration, the cylindrical shape is the simplest and convenient when changing the height of the clamper projections 551 and the height (h2) of the turntable projections 552.

In the disk drive apparatus of the 15th embodiment, it has been described that the number of the clamper projections 551 and the number of the turntable projections 552 are four respectively. However, in the present invention, just as in the case of the disk drive apparatus of the-above-mentioned 14th embodiment, the vibration in the case when the disk 501 is rotated at high speed can be reduced further as the number is increased to 6, 9 or more.

In addition, in the disk drive apparatus of the 15th embodiment, it has been described that the number of the clamper projections 551 and the number of the turntable projections 552 are the same, that is, four, respectively. However, the number of the clamper projections 551 is not required to be the same as the number of the turntable projections 552; even if the numbers are independent of each other, it is possible to obtain an effect of reducing the vibration in the case when the disk 501 is rotated at high speed.

In the disk drive apparatus of the 15th embodiment, it has been described that the turntable 212 is made of resin; however, a similar effect can be obtained even if turntable projections made of resin are integrally formed on a turntable made of metal (by outsert molding for example).

The disk drive apparatus of the 15th embodiment is configured so that the magnet 544 and the back yoke 545 are accommodated in the clamper 541, and so that the opposed yoke 524 is accommodated in the boss 522 of the turntable 212. However, even if the magnet 544 and the back yoke 545 are accommodated in the boss 522 of the turntable 212, and even if the opposed yoke 524 is accommodated in the clamper 541, the effect of reducing the vibration in the case when the disk 501 is rotated at high speed remains unchanged.

Furthermore, since the turntable projections 552 each have a constant height (100 μm for example), this is effective in preventing the holding of the disk from becoming unstable due to foreign substances, such as litter and the like, which have attached to the disk mounting face of the turntable 212 and the surface of the clamp area 511 of the disk 501 making contact therewith and are not larger than the height (h2) of the turntable projections 552.

As described above, in accordance with the configuration of the disk drive apparatus of the 15th embodiment, by disposing four or more clamper projections 551 on the disk holding face of the clamper 541, and by disposing four or more turntable projections 552 on the disk mounting face of the turntable 212, the vibration of the disk 501 can be reduced securely. Therefore, in the disk drive apparatus of the 15th embodiment, the vibration of the disk 501 can be reduced, even when the disk 501 is mounted on the turntable 212 having a face deflection and rotated at high speed, or even when the disk 501 having a face deflection and thereby unbalanced significantly is rotated at high speed.

As a result, in the disk drive apparatus of the 15th embodiment, stable recording/reproduction can be attained without reducing data transfer rate. In addition, in accordance the 15th embodiment, vibration and noise discharged to the outside of the disk drive apparatus can be reduced, and it is possible to attain a disk drive apparatus in which the spindle motor 502 thereof has a long service life.

16th Embodiment

Next, a disk drive apparatus in accordance with a 16th embodiment of the present invention will be described referring to the accompanying drawings FIG. 60 and 61.

Figure 60:
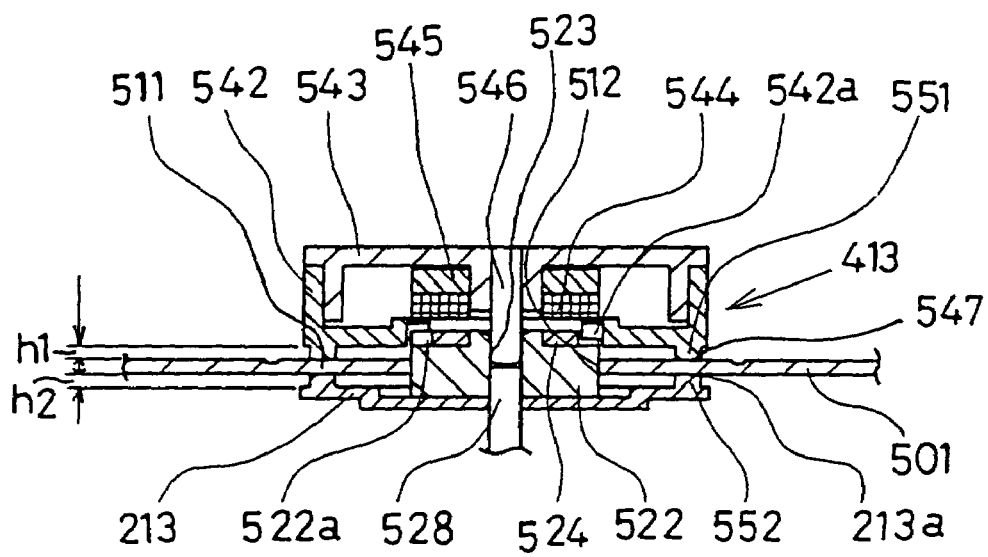
FIG. 60 shows a side sectional view (a) and a reverse-side view (b) showing the vicinity of the clamper 413 of the disk drive apparatus in accordance with the 16th embodiment of the present invention.
Figure 60:
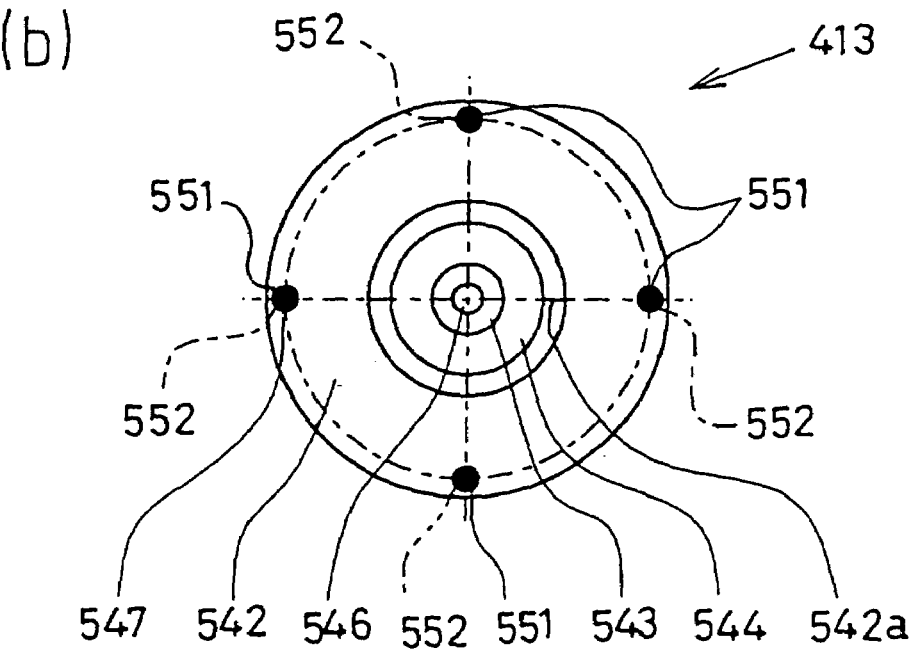

FIGS. 60 are a side sectional view (a) showing the vicinity of the clamper 413 of the disk drive apparatus of the 16th embodiment of the present invention and a reverse-side view (b) of the clamper 413.

In the reverse-side view of the clamper 413 in (b) of FIG. 60, the positions of turntable projections 552 formed on a turntable 213 are shown by diagonally shaded areas, and the clamper projections 551 and the turntable projections 552 are formed at the same positions in the direction parallel with the spindle motor shaft. FIG. 61 is a perspective view showing a positioning mechanism in the disk drive apparatus of the 16th embodiment. In FIGS. 61, (a) is a perspective view showing the clamper 413 with its reverse-side face turned upward, and (b) is a perspective view showing the turntable 213.

In the 16th embodiment, the elements having functions substantially identical to those of the elements of the disk drive apparatuses of the 14th and 15th embodiments shown in the above-mentioned FIGS. 52 to 59 are represented by the same numeral codes, and the descriptions for the preceding embodiments are applied, thereby omitting overlap descriptions.

As shown in (a) of FIG. 60, the turntable 213 on which a disk 501 is mounted is secured to a spindle motor shaft 528 and rotatably supports the clamp area 511 of the disk 501. On the turntable 213, a boss 522 to be fitted into the clamp hole 512 of the disk 501 is formed integrally. By fitting the disk 501 on the boss 522, the disk 501 is positioned. In addition, at the center of the face of the boss 522, opposite to the clamper 413, a positioning hole 523 is formed, and a ring-shaped, opposed yoke 524 is embedded and secured to the boss 522.

As shown in (a) of FIG. 60, the clamper 413 made of resin has a disk holder 542 opposed to the upper face of the mounted disk 501 and a magnet holder 543. A flat face is formed on the reverse-side face of the disk holder 542. A center projection 546, which is fitted into the positioning hole 523 provided in the boss 522 of the turntable 213 so that the turntable 213 and the clamper 541 are made coaxial, is secured to the magnet holder 543. In addition, a magnet 544 and a back yoke 545 are secured inside the magnet holder 543.

In the disk drive apparatus of the 16 embodiment configured as describe above, in a condition wherein the disk 501 is held between the clamper 413 and the turntable 213, the clamp hole 512 of the disk 501 fits on the boss 522, whereby the disk 501 is mounted on the turntable 213. At this time, the disk 501 is held by the magnetic attraction acting between the magnet 544 accommodated in the clamper 413 and the opposed yoke 524 secured to the boss 522. The disk 501 held in this way is rotated integrally with the turntable 213 and the clamper 413 by the rotation operation of the spindle motor 502.

In the view of the reverse-side face of the clamper 413 in (b) of FIG. 60, the positions of the turntable projections 552 formed on the turntable 213 are shown together with those of the clamper projections 551.

As shown in (b) of FIG. 60, In the disk drive apparatus of the 16th embodiment, four cylindrical clamper projections 551 are formed on the reverse-side face of the disk holder 542 constituting the reverse-side face of the clamper 413 made of resin. The positions wherein the clamper projections 551 are formed are on a circle around the center axis of the center projection 546 of the magnet holder 543, and these are positions wherein the clamper projections 551 can securely hold the clamp area 511 of the disk 501. Furthermore, the clamper projections 551 are disposed at positions wherein the circumference of the circle is divided into four equal portions, that is, positions wherein the circumference is divided at intervals of 90 degrees. The difference (flatness) in height (h1) among the clamper projections 551 is within 40 µm.

As shown in (a) of FIG. 60, in the disk drive apparatus of the 16th embodiment, the four cylindrical turntable projections 552 are formed on the disk mounting face of the turntable 213 made of resin. The positions wherein the turntable projections 552 are formed are on a circle around the positioning hole 523 of the spindle motor 502, and positions wherein the turntable projections 552 can securely hold the clamp area 511 of the disk 501. Furthermore, the turntable projections 552 are disposed at positions wherein the circumference of the circle is divided into four equal portions, that is, positions wherein the circumference is divided at intervals of 90 degrees. The difference (flatness) in height (h2) among the turntable projections 552 is within 40 µm.

If the difference in height (h1) among the clamper projections 551 is within 40 µm, and if the difference in height (h2) among the turntable projections 552 is within 40 µm as described above, the disk 501 is securely held between the clamper 413 and the turntable 213 at totally eight positions on the upper and lower faces thereof.

In the disk drive apparatus of the 16th embodiment, when the disk 501 is mounted on the turntable 213, the disk 501 is raised toward the clamper 413 together with a sub-base 508 to which the spindle motor 502 is secured. As a result, the disk 501 is held between the clamper 413 and the turntable 213.

Figure 61:
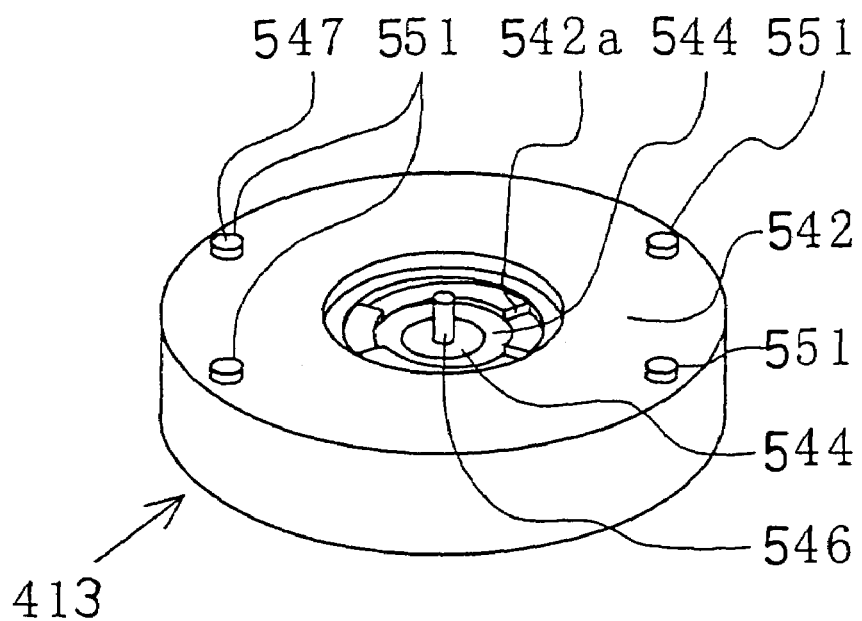
FIG. 61 is a perspective view showing the positioning mechanism of the disk drive apparatus in accordance with the 16th embodiment of the present invention.
Figure 61:
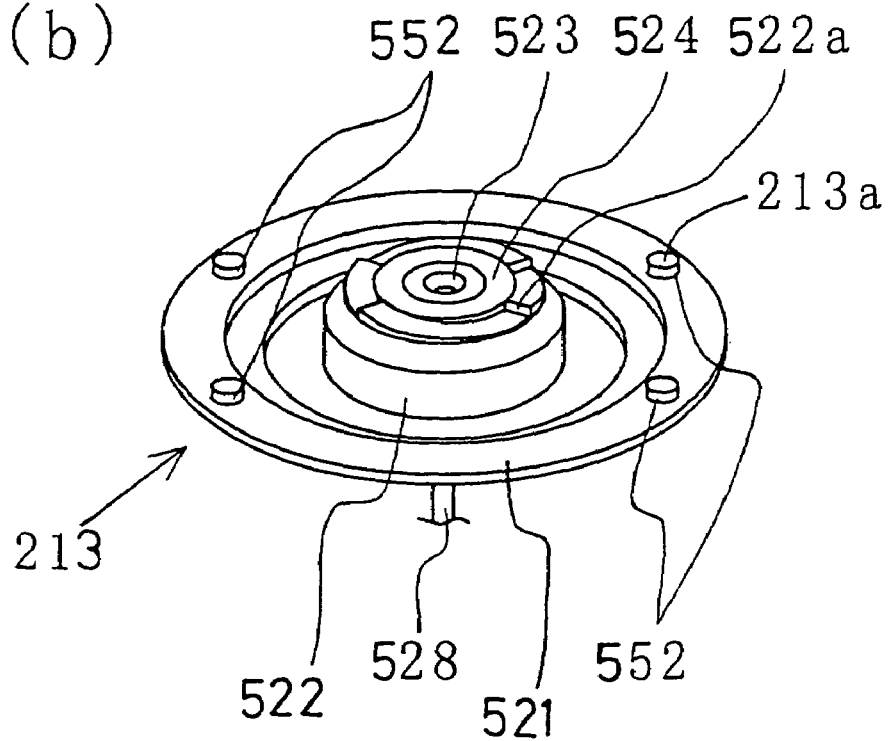

As shown in (b) of FIG. 61, in the disk drive apparatus of the 16th embodiment, engagement portions 522a having steps as many as the turntable projections 552 at angles corresponding to the rotational positions of the turntable projections 552 are formed On the upper face of the boss 522.

On the other hand, as shown in (a) of FIG. 61, engagement portions 542a having steps at positions corresponding to the engagement portions 522a of the boss 522 are formed on the disk holder 542 of the clamper 413. The clamper projections 551 as many as the turntable projections 552 are provided at angles corresponding to the rotational positions of the engagement portions 542a of the disk holder 542. In the clamper 413 of (a) of FIG. 61, the reverse-side face of the clamper 413 is turned upward for convenience of explanation.

The steps of the engagement portions 522a of the boss 522 engage and the steps of the engagement portions 542a of the clamper 413, formed as described above, engage each other when holding the disk 501, whereby the clamper projections 551 and the turntable projections 552 are always disposed at the same angles and on the same circle in the rotation direction. Therefore, the clamper projections 551 and the turntable projections 552 always securely hold the upper and lower faces of the disk 501 at the same positions. As a result, in the disk drive apparatus of the 16th embodiment, in the case when the disk 501 is rotated at high speed, the vibration of the disk 501 in the "six-division mode" can be reduced further than that in the case when the clamper projections 551 are dislocated from the turntable projections 552.

In the disk drive apparatus of the 16th embodiment, if the difference (flatness) in height (h1) among the clamper projections 551 is within 40 µm, the clamp area 511 of the disk 501 can be held securely with the clamper projections 551. Desirably, if the flatness at the clamper projections 551 can be made within 20 µm, the disk 501 can be held still more securely between the clamper 413 and the turntable 213, whereby the vibration in the case when the disk 501 is rotated at high speed can be reduced further.

In the disk drive apparatus of the 16th embodiment, if the difference (flatness) in height (h2) among the turntable projections 552 is within 40 µm, the four or more turntable projections 552 can securely hold the clamp area 511 of the disk 501. Desirably, if the flatness at the turntable projections 552 can be made within 20 µm, the disk 501 can be held still more securely between the clamper 413 and the turntable 213, whereby the vibration in the case when the disk 501 is rotated at high speed can be reduced further.

In the disk drive apparatus of the 16th embodiment of the present invention, when the diameters of the clamper projections 551 and the turntable projections 552 are about 1 to 2 mm, the disk 501 can be fixed sufficiently; therefore, the positions wherein foreign substances, such as minute litter, dust and the like, attach to the clamp area 511 are less likely to overlap with the positions at which the clamper projections 551 and the turntable projections 552 hold the disk 501, thereby being configured so as to be less likely to be affected by foreign substances, such as litter, dust and the like.

Even if litter attaches by chance to the tips of the clamper projections 551 and the turntable projections 552, since the surface areas of these tips are small, in the case when litter attaches to the disk 501 and the disk 501 is removed, the litter is discharged together with the disk 501, thereby having a passive self-cleaning function.

To enhance the above-mentioned effect further, by thinning the tips of the clamper projections 551 and the turntable projections 552 as shown in the above-mentioned FIGS. 57(*b*), (*c*) and (*d*), the surface areas of the tips of the clamper projections 551 and the turntable projections 552 are reduced, and the probability of attaching of litter is reduced further.

In the disk drive apparatus of the 16th embodiment, the embodiment has been described such that the shapes of the clamper projections 551 and the turntable projections 552 are cylindrical, or such that the horizontal sectional shapes thereof, made thinner at the tips, are circular. However, in the present invention, the horizontal sectional shapes of the clamper projections 551 and the turntable projections 552 are not required to be circular; it is possible to set any desired sectional shapes, such as a triangular shape, a square shape, an elliptic shape and the like.

However, when metal mold processing is taken into consideration, the cylindrical shape is the simplest and convenient when changing the height of the clamper projections 551 and the height (h2) of the turntable projections 552.

In the disk drive apparatus of the 16th embodiment, it has been described that the number of the clamper projections 551 and the number of the turntable projections 552 are four respectively. However, in the present invention, just as in the case of the disk drive apparatus of the above-mentioned 14th embodiment, the vibration in the case when the disk 501 is rotated at high speed can be reduced still further as the number is increased to 6, 9 or more.

In the disk drive apparatus of the 16th embodiment, it has been described that the turntable 213 is made of resin; however, a similar effect can be obtained even if turntable projections made of resin are integrally formed on a turntable made of metal (by outsert molding for example).

The disk drive apparatus of the 16th embodiment is configured so that the magnet 544 and the back yoke 545 are accommodated in the clamper 413, and so that the opposed yoke 524 is accommodated in the boss 522 of the turntable 213. However, even if the magnet 544 and the back yoke 545 are accommodated in the boss 522 of the turntable 213, and even if the opposed yoke 524 is accommodated in the clamper 413, the effect of reducing the vibration in the case when the disk 501 is rotated at high speed remains unchanged.

In addition, in the disk drive apparatus of the 16th embodiment, it has been described that the number of the engagement portions 542*a* of the clamper 413 and the number of the engagement portions 522*a* of the turntable 213 are the same as the number of the clamper projections 551 and the number of the turntable projections 552, that is, four, respectively. However, the number of the engagement portions 542*a* of the clamper 413 is not required to be the same as the number of the clamper projections 551, and the number of the engagement portions 522*a* of the turntable 213 is not required to be the same as the number of the turntable projections 552. If the positions of the clamper projections 551 are aligned with those of the turntable projections 552 at least at four positions by the engagement portions 542*a* of the clamper 413 and the engagement portions 522*a* of the turntable 213, it is possible to obtain an effect of reducing vibration in the case when the disk 501 is rotated at high speed, even if either the clamper projections 551 or the turntable projections 552 have extra projections.

As described above, in accordance with the configuration of the disk drive apparatus of the 16th embodiment, by disposing the four or more clamper projections 551 on the disk holding face of the clamper 413, by disposing the four or more turntable projections 552 on the disk mounting face of the turntable 213, and by allowing the clamper projections 551 and the turntable projections 552 to hold the upper and lower faces of the disk 501 at substantially the same positions, the vibration of the disk 501 can be reduced securely. Therefore, in the disk drive apparatus of the 16th embodiment, the vibration of the disk 501 can be reduced, even if the disk 501 is mounted on the turntable 213 having a face deflection and rotated at high speed, or even if the disk 501 having a face deflection and thereby unbalanced significantly is rotated at high speed. Therefore, in the disk drive apparatus of the 16th embodiment, stable recording/reproduction can be attained without reducing data transfer rate. In addition, in accordance the disk 16th embodiment, vibration and noise discharged to the outside of the disk drive apparatus can be reduced, and it is possible to attain a disk drive apparatus in which the spindle motor 502 thereof has a long service life.

17th Embodiment

Next, a disk drive apparatus in accordance with a 17th embodiment of the present invention will be described referring to the accompanying drawings FIGS. 62 to 64.

Figure 62:
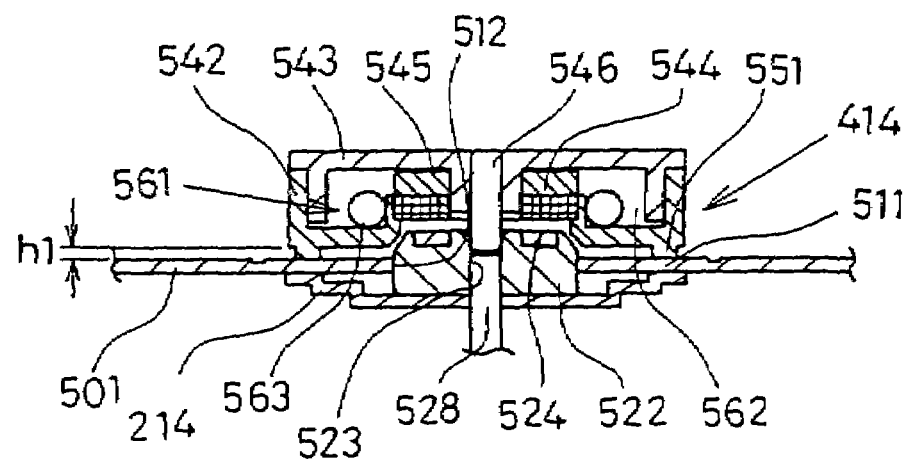
FIG. 62 shows side sectional views showing the vicinity of the clamper 414 of the disk drive apparatus in accordance with the 17th embodiment of the present invention, showing conditions at rest (a) and at the time of rotation (b).
Figure 62:
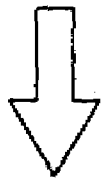
Figure 62:
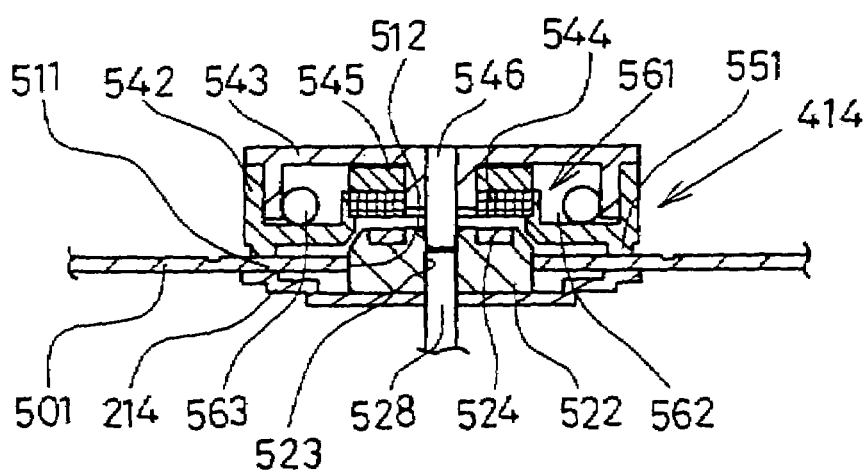
Figure 63:
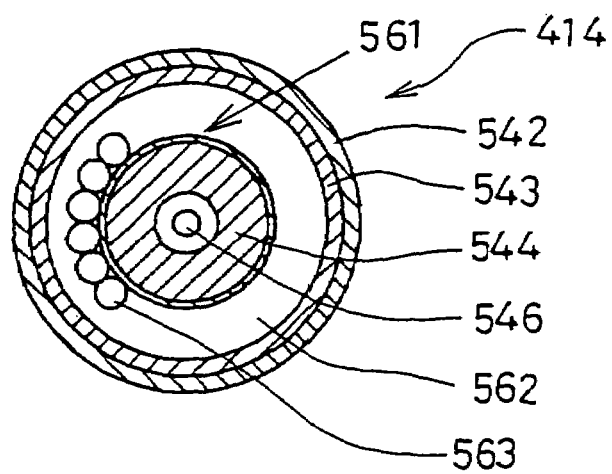
FIG. 63 shows plan sectional views showing the clamper 541 of the disk drive apparatus in accordance with the 17th embodiment of the present invention, showing conditions at rest (a) and at the time of rotation (b) and (c).
Figure 63:
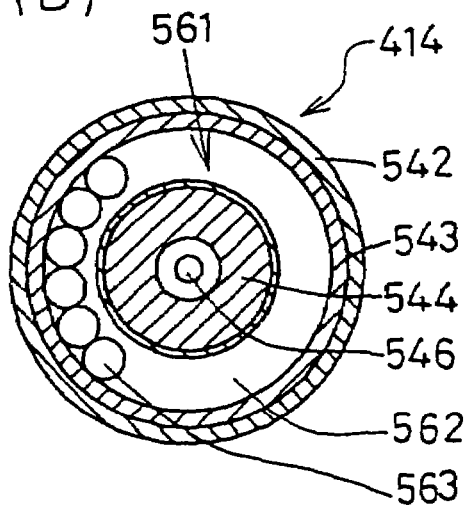
Figure 63:
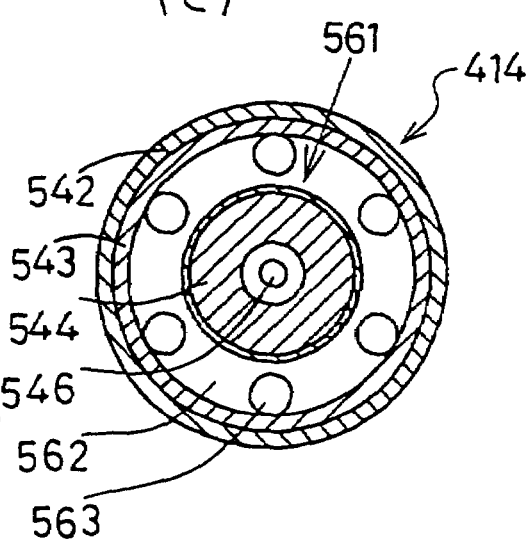

FIG. 62 is a side sectional view showing the vicinity of the clamper 414 of the disk drive apparatus of the 17th embodiment of the present invention. FIG. 63 is a plan sectional view showing the operation of the clamper 414 of the disk drive apparatus of the 17th embodiment. FIG. 64 is a side sectional view showing the vicinity of the clamper 414 of the disk drive apparatus of the 16th embodiment. The elements having functions substantially identical to those of the elements of the disk drive apparatuses of the 14th to 16th embodiments shown in the above-mentioned FIGS. 52 to 61 are represented by the same numeral codes, and the descriptions for the preceding embodiments are applied, thereby omitting overlap descriptions.

The clamper 414 is provided with a center projection 546 to be fitted into the positioning hole 523 formed on the boss 522 of a turntable 214 in order to align the disk 501; and in the vicinity thereof, a ring-shaped magnet 544 and a back yoke 545 are secured. Four clamper projections 551 making contact with the disk 501 are formed on the reverse-side face (the lower face in FIG. 62) of the clamper 414.

In the disk drive apparatus of the 17th embodiment, a ring-shaped track portion 562 having a ring-shaped space is formed inside the clamper 414. In this ring-shaped track portion 562, a plurality (six for example) of magnetic balls 563 are accommodated so as to be movable. As shown in FIGS. 62 and 63, the ring-shaped track portion 562 is a hollow space formed outside the ring-shaped magnet 544 and the back yoke 545 secured around the center projection 546 disposed at the center of the clamper 414, and is provided so as to be coaxial with the center projection 546. The ring-shaped track portion 562 formed as described above and the plural balls 563 accommodated in this ring-shaped track portion 562 form a balancer 561, the balancer 561 is formed so as to be integral with the clamper 414.

When the disk 501 is at rest, the magnetic balls 563 are attracted by the magnet 544 ((a) of FIG. 62). When the disk 501 is rotated, the balls 563 accommodated in the ring-shaped track portion 562 of the clamper 414 rotating integrally with the disk 501 are separated from the magnet 544 by centrifugal forces, and roll along the inner wall face of the outer periphery of the ring-shaped track portion 562 ((b) of FIG. 62).

In the disk drive apparatus of the 17th embodiment, insulators (elastic bodies) 509 having low rigidity are used to connect the sub-base 508 shown in the above-mentioned FIG. 52 to a main base 510. The mechanical vibration (the primary resonance frequency in the direction parallel with the recording face of the disk 501) of the sub-base 508 due to the deformations of the insulators 509 is set lower than the rotation frequency of the disk 501. More specifically, the rotation frequency of the disk 501 is set at about 100 Hz; the primary resonance frequency of the vibration of the sub-base 508 in the movement direction of the head 503 (FIG. 52) and that of the vibration of the sub-base 508 in the direction perpendicular thereto are set at about 60 Hz.

In the disk drive apparatus of the 17th embodiment configured as described above, the balancer 561 is installed to improve the imbalance of the disk 501 and to stabilize the high-speed rotation of the disk 501.

The imbalance of the disk 501 occurs due to nonuniformity caused at the time of molding, such as eccentricity of the clamp hole 512 in the disk 501, nonuniform thickness of the disk 501 or the like. In the present invention, when these nonuniform factors of the disk 501 are united and defined as an imbalance amount, the vibration amount of the disk at the time when the disk 501 is rotated becomes larger as the imbalance amount of the disk 501 is larger.

In the disk drive apparatus of the 17th embodiment, in the case when the disk 501 mounted on the turntable 214 is rotated, and for example in the case when the disk 501 having a large imbalance amount is rotated at 100 Hz, the sub-base 508 whirls at the rotation frequency of the disk 501 while the insulators 509 are deformed by centrifugal force. At this time, since the resonance frequency of the sub-base 508 is smaller than the rotation frequency, the direction of the centrifugal force of the disk 501 is nearly opposite to the displacement direction of the sub-base 508.

The whirling center axis of the disk 501 rotating over the sub-base 508 is disposed between the center of gravity of the disk 501 and the rotation center axis of the spindle motor 502. In other words, when the balancer 561 is taken as the central element, the centrifugal force on the balls 563 inside the balancer 561 acts in the direction nearly opposite to the centrifugal force of the disk 501. Therefore, the imbalance due to the eccentricity of the disk 501 is cancelled by the amount of the weights of the balls 563. Accordingly, when compared with a case without the balancer 561, the imbalance amounts of the disk 501 mounted on the turntable 214 and the clamper 414 are reduced. When the imbalance amount of the disk 501 is balanced with the imbalance amount of the balancer 561, it is possible to obtain a condition apparently similar to that obtained when a disk 501 having no imbalance is mounted on the turntable 214 and rotated.

Therefore, in the disk drive apparatus of the 17th embodiment, the disk 501, the spindle motor 502 and the sub-base 508 do not vibrate, whereby stable data recording/reproduction can be carried out. In addition, vibration and noise to the outside of the disk drive apparatus can be reduced, and the spindle motor 502 can have a long service life.

In the balancer 561 of the disk drive apparatus of the 17th embodiment, the plural balls 563 are accommodated inside the clamper 414. As shown in FIG. 63, in the case of the disk 501 having a large imbalance amount, the balls 563 concentratedly gather on the side opposite to the imbalance of the disk 501 ((b) of FIG. 63). On the other hand, in the case of a disk 501 having no imbalance, the balls 563 are arranged at equal intervals on the inner wall face of the outer periphery of the ring-shaped track portion 562, whereby the balls 563 themselves do not cause imbalance ((c) of FIG. 63). In addition, in the case when the imbalance amount of the disk 501 is an intermediate amount therebetween, the balls 563 are disposed at intermediate positions corresponding thereto. For this reason, the balancer 561 can cope with disks 501 having various imbalance amounts.

Figure 64:
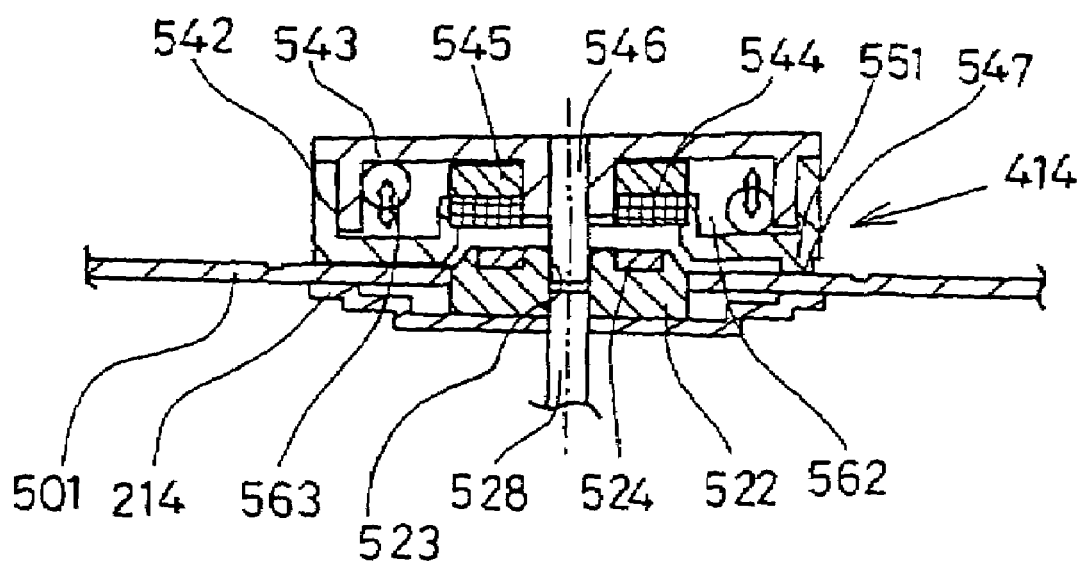
FIG. 64 is a side sectional view showing the vicinity of the clamper 414 of the disk drive apparatus in accordance with the 17th embodiment of the present invention.

FIG. 64 is a side sectional view showing the vicinity of the clamper 414 in the case when the disk holding face of the clamper 414 has unevenness. In the case shown in FIG. 64, rattling occurs between the disk 501 and the clamper 414. In addition, the movement of the balls 563 of the balancer 561 becomes irregular, and the balls 563 roll while moving up and down, just as jumping on the inner wall face of the outer periphery of the ring-shaped track portion 562. Because of the vibration due to the up/down movement of the balls 563, the balls 563 cannot smoothly roll along the inner wall face of the outer periphery of the ring-shaped track portion 562. Therefore, in the above-mentioned condition, in the case when the disk 501 is rotated at high speed, the imbalance cannot be cancelled sufficiently by using only the balancer 561. As a result, even if only the balancer 561 is provided, the vibration due to the imbalance of the disk 501 cannot be reduced sufficiently in some cases. On the other hand, in the case when a disk 501 having no imbalance is rotated at high speed, the balls 563 of the balancer 561 do not roll smoothly along the inner wall face of the outer periphery of the ring-shaped track portion 562, whereby an imbalance occurs on the contrary at the spindle motor 502, resulting in increasing the vibration of the disk 501 and the entire disk drive apparatus.

In addition, in the clamper having no clamper projections in the conventional disk drive apparatus, even when no rattling occurs between the clamper and the disk 501, the disk 501 is held at three positions, whereby the disk 501 is apt to vibrate in the "six-division mode." Even if the above-mentioned balancer 561 is provided for this kind of conventional disk drive apparatus, the movement of the balls 563 of the balancer 561 becomes irregular because of the vibration in the "six-division mode," and the balls 563 roll while moving up and down, just as jumping on the inner wall face of the outer periphery of the ring-shaped track portion 562. Therefore, in the conventional disk drive apparatus, even when no rattling occurs between the clamper and the disk 501 the balls 563 cannot roll on the inner wall face of the outer periphery of the ring-shaped track portion 562, thereby increasing the vibration of the disk 501 and the entire disk drive apparatus.

To solve this kind of problem, in the disk drive apparatus of the 17th embodiment of the present invention, the rattling between the disk 501 and the clamper 414 can be canceled by providing the four clamper projections 551 on the disk holding face 547 of the clamper 4. Therefore, the balls 563 can smoothly roll along the inner wall face of the outer periphery of the ring-shaped track portion 562, whereby the effect of canceling the imbalance of the disk 501 can be obtained sufficiently.

In addition, in the disk drive apparatus of the 17th embodiment, since the four or more clamper projections 551 are provided, the vibrations in the "six-division mode" and the "eight-division mode" can be reduced, and the balls 563 can smoothly roll inside the ring-shaped track portion 562, whereby the effect of canceling the imbalance of the disk 501 can be obtained sufficiently.

In the disk drive apparatus of the 17th embodiment, the difference (flatness) in height (h1) among the clamper projections 551 is within 40 μm. Within this range, the disk 501 is securely held between the four clamper projections 551 and the turntable 214. Desirably, if the flatness at the clamper projections 551 can be made within 20 μm, the disk 501 can be held still more securely between the clamper projections and the turntable 214, whereby the vibration in the case when the disk 501 is rotated at high speed can be reduced. In addition, in the disk drive apparatus of the 17th embodiment, the effect of the balancer 561 is combined additionally, and the imbalance of the disk 501 can be canceled, whereby the vibration of the disk 501 can be reduced further.

In the disk drive apparatus of the 17th embodiment, it has been described that the shape of the clamper projections 551 is cylindrical; however, in the present invention, the horizontal sectional shape of the clamper projections 551 is not required to be circular; it is possible to set any desired sectional shapes, such as a triangular shape, a square shape, an elliptic shape and the like. Furthermore, a similar effect can be obtained even if the tips of the clamper projections 551 are made thinner, just as in the case of the above-mentioned 14th embodiment.

In the disk drive apparatus of the 17th embodiment, the clamper projections 551 provided only on the side of the clamper 414 have been taken as an example and explained; however, the effect of the balancer 561 can also be obtained sufficiently when the disk 501 is held securely on a stable flat face by providing the four or more turntable projections 552 on the turntable 214.

In the disk drive apparatus of the 17th embodiment, the balls 563 are used in the balancer 561; however, the balls 563 are not necessarily required to be magnetic bodies; if they are made of a material having a weight capable of canceling the imbalance due to the eccentricity of the disk 501, the shape thereof is not limited to the shape of a ball; a similar effect can be obtained even if the shape is cylindrical, cubic, disk-like or plate-like. Furthermore, the material is not limited to a magnetic material; a similar effect can also be obtained even if the material is nonmagnetic metal, resin, ceramics or fluid having a high specific weight.

The disk drive apparatus of the 17th embodiment is configured so that the magnet 544 and the back yoke 545 are accommodated in the clamper 414, and so that the opposed yoke 524 is accommodated in the boss 522 of the turntable 214. However, even if the magnet 544 and the back yoke 545 are accommodated in the boss 522 of the turntable 214, and even if the opposed yoke 524 is accommodated in the clamper 414, the effect of reducing the vibration in the case when the disk 501 is rotated at high speed remains unchanged.

As described above, in accordance with the configuration of the disk drive apparatus of the 17th embodiment, by disposing the four or more clamper projections 551 on the disk holding face of the clamper 414, and by movably accommodating the plurality (six for example) of balls 563 in the ring-shaped track portion 562 inside the clamper 414, the imbalance due to the eccentricity, nonuniform thickness and the like of the disk 501 can be canceled, whereby the vibration of the disk 501 can be reduced securely. Therefore, in the disk drive apparatus of the 17th embodiment, the vibration of the disk 501 can be reduced in the case when the disk 501 is mounted on the turntable 214 having a face deflection and rotated at high speed, and when the disk 501 having a face deflection and thereby unbalanced significantly is rotated at high speed. Furthermore, in the disk drive apparatus of the 17th embodiment, even if the disk 501 having a large imbalance amount is mounted and rotated at high speed, the vibration of the disk 501 can be reduced. Therefore, in the disk drive apparatus of the 17th embodiment, stable recording/reproduction can be attained without reducing data transfer rate. In addition, in accordance the disk drive apparatus of the 17th embodiment, vibration and noise discharged to the outside of the disk drive apparatus can be reduced, and the spindle motor 502 can attain a long service life.

18th Embodiment

Next, a disk drive apparatus in accordance with an 18th embodiment of the present invention will be described referring to the accompanying drawings FIGS. 65 to 68.

Figure 65:
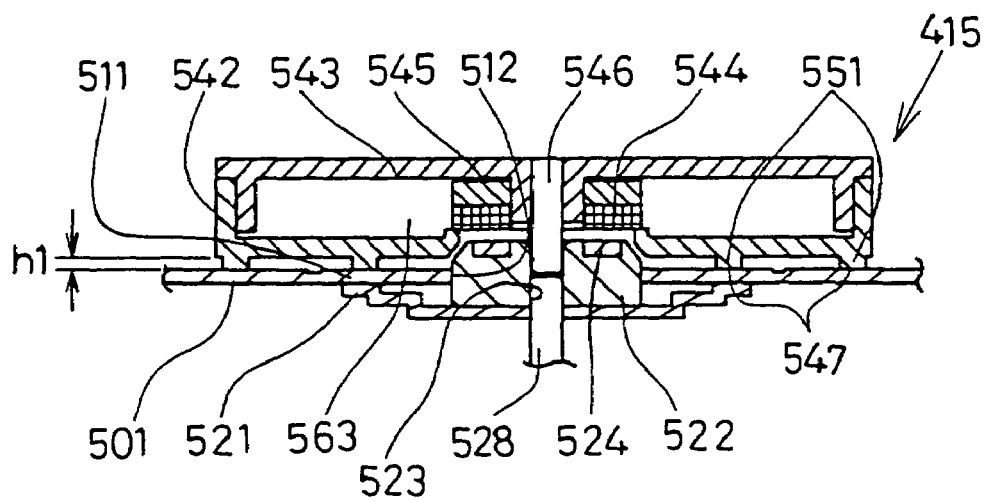
FIG. 65 shows a side sectional view (a) and a reverse-side view (b) showing the vicinity of a clamper 415 of the disk drive apparatus in accordance with the 18th embodiment of the present invention.
Figure 65:
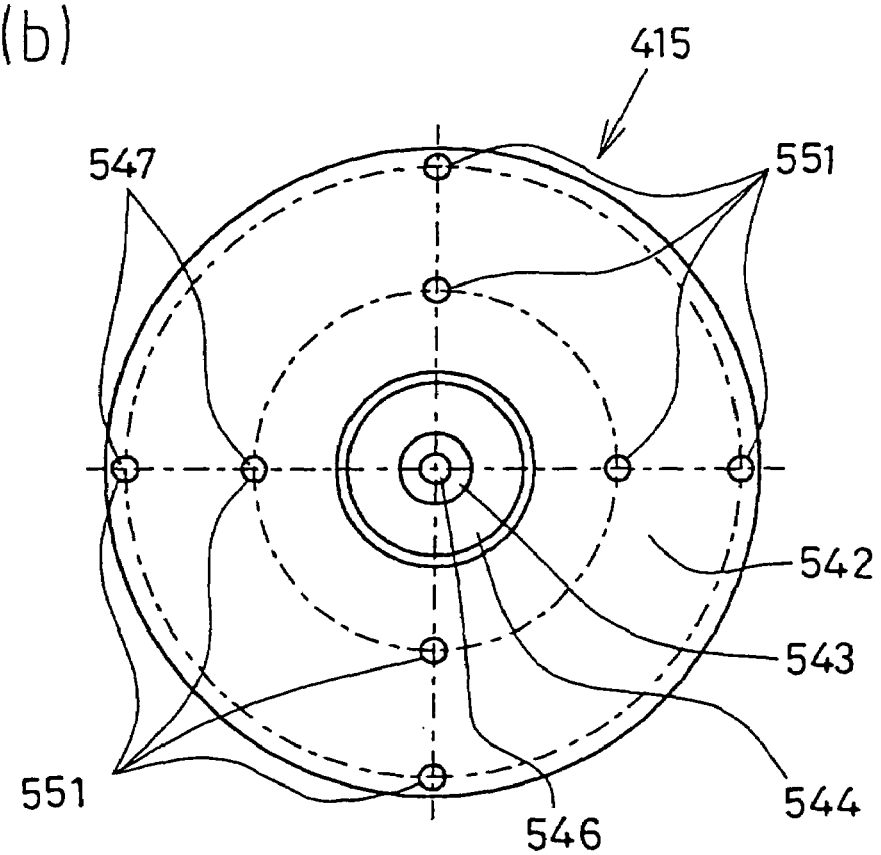
Figure 66:
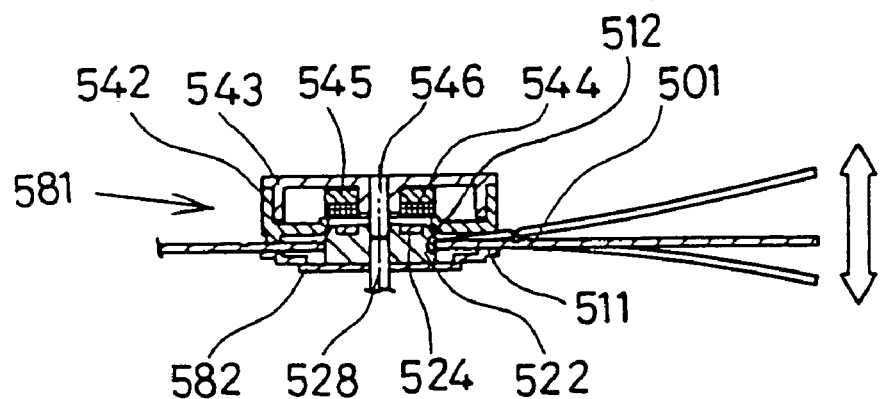
FIG. 66 is a side sectional view showing the magnitude of disk deformation and vibration depending on the disk securing method of the clamper in the disk drive apparatus.
Figure 66:
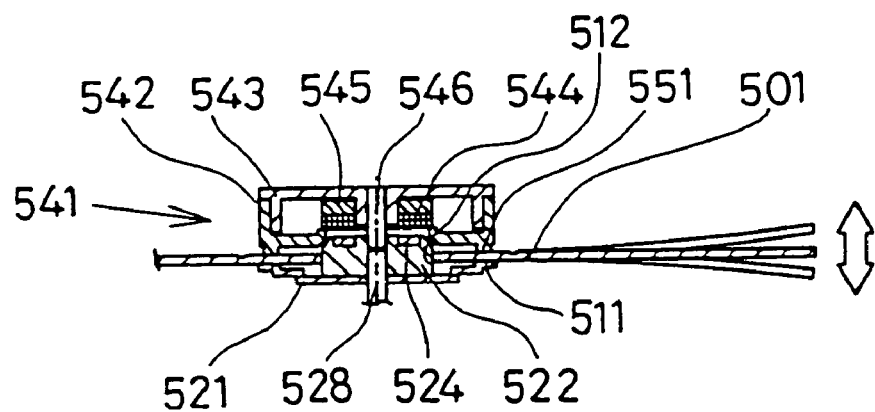
Figure 66:
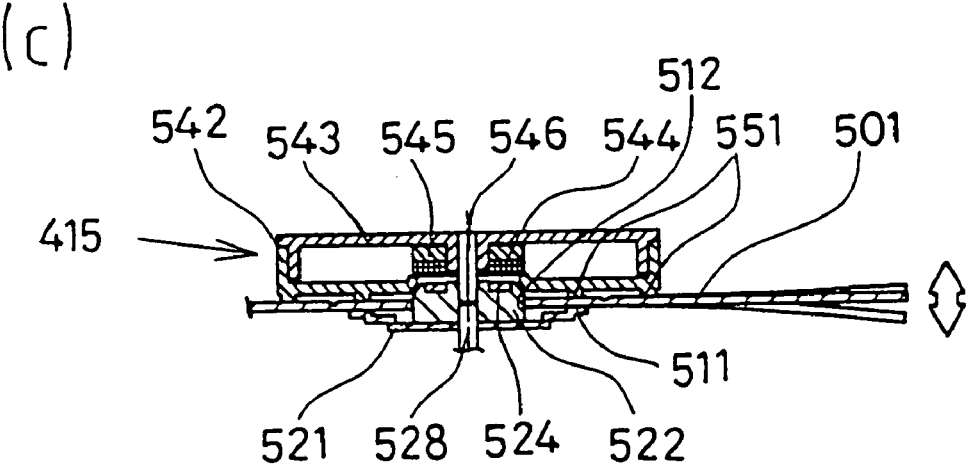
Figure 67:
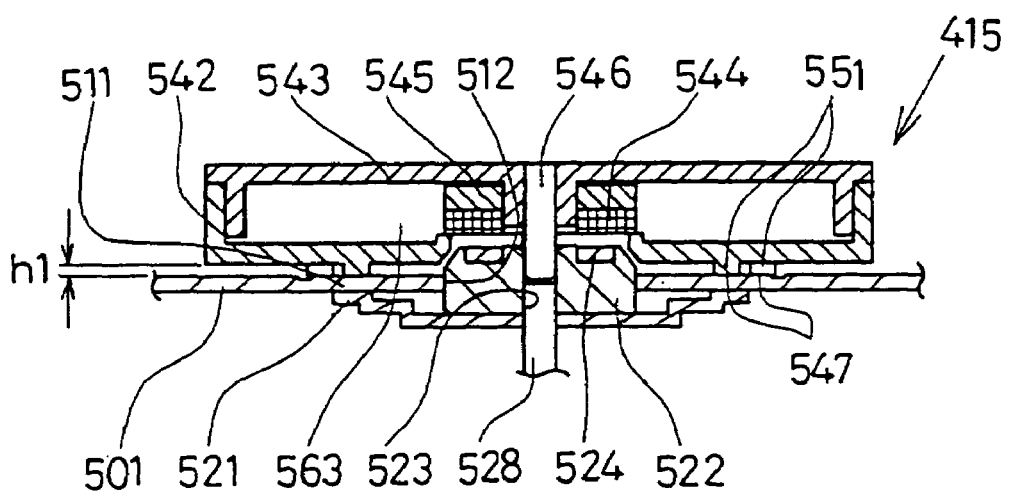
FIG. 67 shows a side sectional view (a) and a reverse-side view (b) showing the vicinity of another clamper 415 of the disk drive apparatus in accordance with the 18th embodiment of the present invention.
Figure 67:
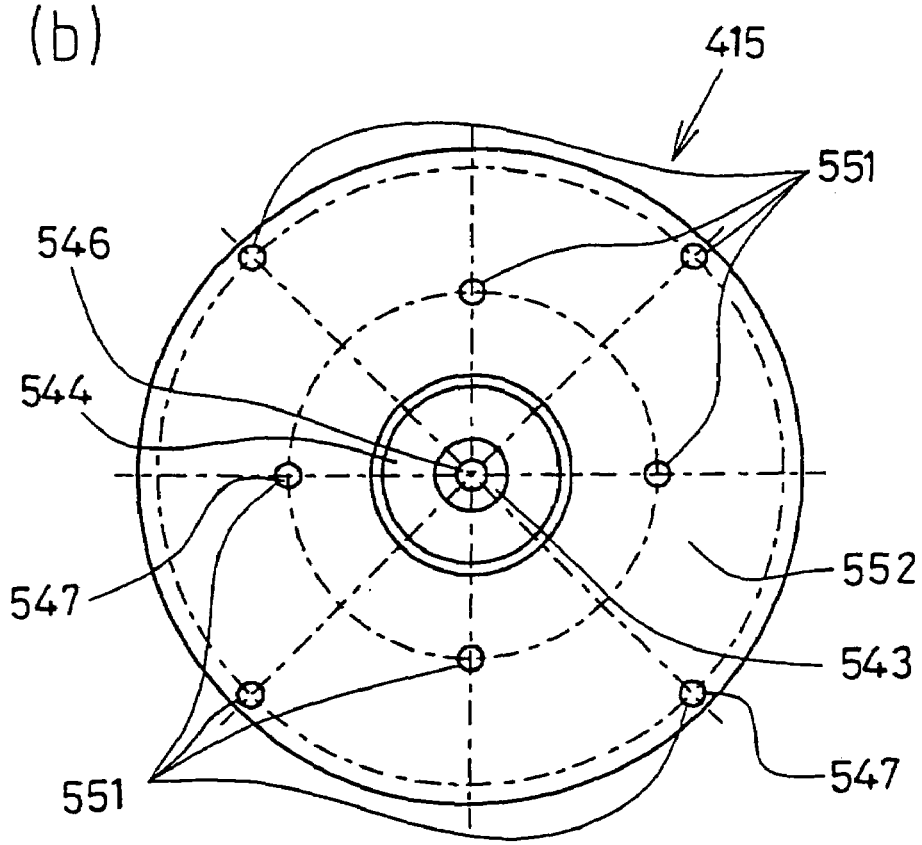
Figure 68:
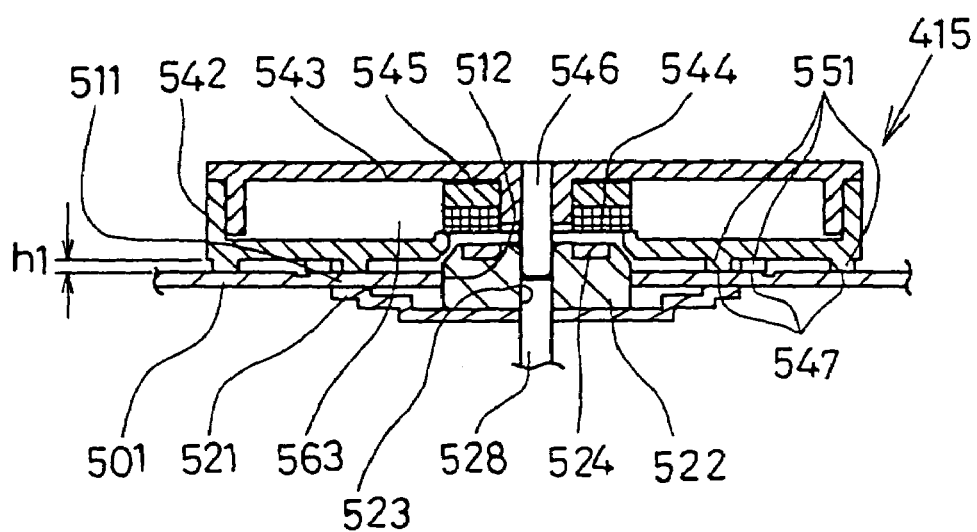
FIG. 68 shows a side sectional view (a) and a reverse-side view (b) showing the vicinity of another clamper 415 of the disk drive apparatus in accordance with the 18th embodiment of the present invention.
Figure 68:
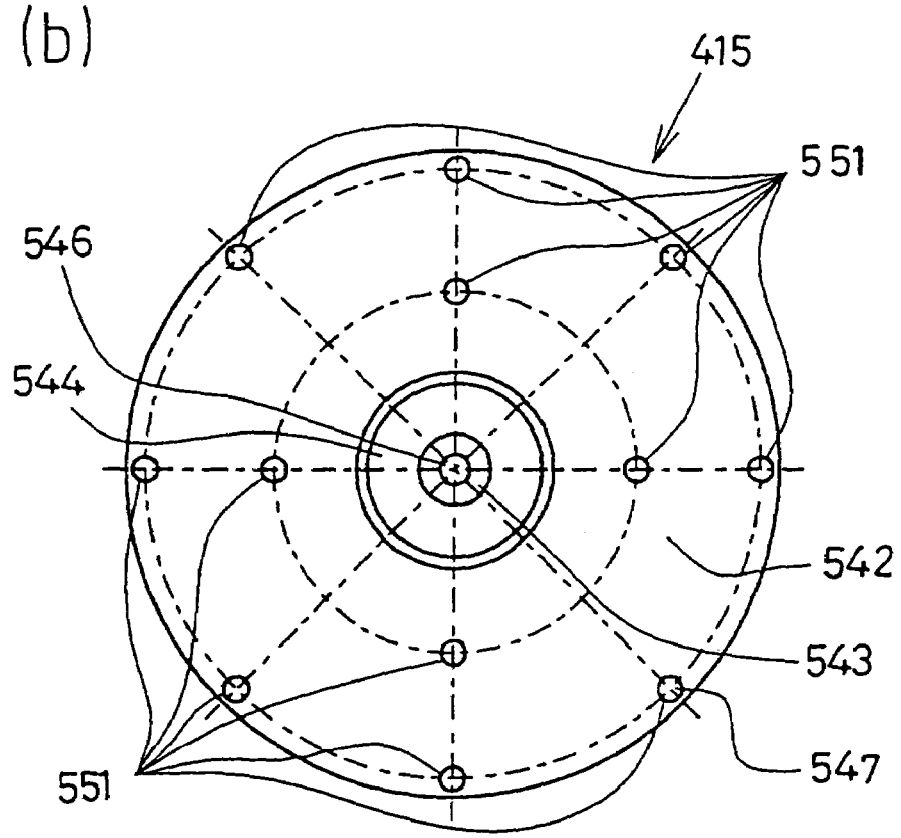

FIGS. 65 are a side sectional view (a) showing the vicinity of a clamper 415 of the disk drive apparatus of the 18th embodiment of the present invention and a reverse-side view (b) of the clamper 415. FIG. 66 is a side sectional view showing the vicinity of the clamper and illustrating the vibration condition of the disk 501 in the case when the clamper projections 551 are provided. FIGS. 67 and 68 are side sectional views (a) showing the vicinity of another clamper of the disk drive apparatus of the 18th embodiment of the present invention, and the reverse-side views (b) of the clamper. The elements having functions substantially identical to those of the elements of the disk drive apparatus of the 14th to 17th embodiments shown in the above-mentioned FIGS. 52 to 64 are represented by the same numeral codes, and the descriptions for the preceding embodiments are applied, thereby omitting overlap descriptions.

In FIG. 65, the turntable 521 is secured to the spindle motor shaft 528 and rotatably supports the clamp area 511 of the disk 501. On the turntable 521, a boss 522 to be fitted into the clamp hole 512 of the disk 501 is formed integrally. By fitting the disk 501 on the boss 522, the disk 501 is positioned. In addition, at the center of the face (the upper face in (a) of FIG. 65) of the boss 522, opposite to the clamper 415, a positioning hole 523 is formed. Furthermore, an opposed yoke 524 is embedded and secured to the boss 522.

At the clamper 415, a center projection 546, which is fitted into the positioning hole 523 provided in the turntable 521 so that the turntable 521 and the clamper 415 are set at the same center position, is secured to a magnet holder 543. A magnet 544 and a back yoke 545 are secured around the center projection 546. A flat face is formed on the reverse-side face of the disk holder 542 constituting the reverse-side face of the clamper 415.

In the disk drive apparatus of the 18 embodiment configured as describe above, in a condition wherein the disk 501 is held between the clamper 415 and the turntable 521, the clamp hole 512 of the disk 501 fits on the boss 522, whereby the disk 501 is mounted on the turntable 521. In addition, at this time, the disk 501 is held by the magnetic attraction acting between the magnet 544 accommodated in the clamper 415 and the opposed yoke 524 secured to the turntable 521. The disk 501 held in this way is rotated integrally with the turntable 521 and the clamper 415 by the rotation operation of the spindle motor 502.

As shown in FIGS. 65(a) and (b), in the disk drive apparatus of the 18th embodiment, the eight cylindrical clamper projections 551 are formed on the disk holder 542 on the reverse-side face of the clamper 415 made of resin. The positions wherein the clamper projections 551 are formed are on two concentric circles around the center projection 546 of the magnet holder 543; four pieces are formed on each circle. The clamper projections 551 on the inner circle are formed at positions wherein the clamper projections 551 can securely hold the clamp area 511 of the disk 501. The outer circle on which the clamper projections 551 are disposed is provided outside the clamp area 511 and inside the outer periphery of the disk 501.

Furthermore, the clamper projections 551 disposed on the inner circle and those on the outer circle are disposed at positions wherein the circumference of each circle is divided into four equal portions, that is, positions wherein the circumference is divided at intervals of 90 degrees. The difference (flatness) in height (h1) among the clamper projections 551 is within 40 µm. If the difference in height (h1) among the clamper projections 551 is within 40 µm as described above, and if the difference (flatness) in height between the bumps and dips on the disk mounting face of the turntable 521 is sufficiently smaller than the flatness in the clamper projections 551, the disk 501 is securely held between the four clamper projections 551 and the turntable 521.

In the disk drive apparatus of the 18th embodiment, when the disk 501 is mounted on the turntable 521, the disk 501 is raised toward the clamper 415 together with a sub-base 508 to which the spindle motor 502 is secured. As a result, the disk 501 is held between the clamper 415 and the turntable 521. At this time, with respect to the positioning among the clamper 415, the disk 501 and the turntable 521, there is no restriction regarding the positions in the rotation direction, except that the centers of these are aligned with the center of the spindle motor shaft 528, whereby they are positioned at any given positions. Even in this kind of case, the clamper 415 prevents the deformation of the disk 501 in the upward direction in the "six-division mode" of the disk 501. Furthermore, the turntable 521 prevents the deformation of the disk 1 in the downward direction in the "six-division mode" of the disk 501.

Therefore, in the disk drive apparatus of the 18th embodiment, the deformation of the disk 501 in the upward and downward directions in the "six-division mode" is prevented, whereby in the case when the disk 501 is rotated at high speed, the vibration of the disk 501 in the "six-division mode" can be reduced to a nearly undetectable condition.

In the disk drive apparatus of the 18th embodiment, if the difference (flatness) in height (h2) among the turntable projections 552 is within 40 µm, they can securely hold the clamp area 511 of the disk 501. Desirably, if the flatness at the turntable projections 552 can be made within 20 µm, the disk 501 can be held still more securely between the clamper 415 and the turntable, whereby the vibration in the case when the disk 501 is rotated at high speed can be reduced further.

In the disk drive apparatus in accordance with the prior art, as shown in (a) of FIG. 66, in the case when the clamp area 511 of the disk 501 cannot be held by the conventional clamper 581, the range from the outermost periphery to the clamp hole 512 of the disk 501 is deformable in the upward direction of the disk 501. Therefore, in the case when the disk 501 is rotated at high speed, the amplitude amount of the vibration of the disk 501 becomes large, since the deformable range of the disk 501 in the upward/downward direction is wide.

In the disk drive apparatus of the above-mentioned 14th embodiment, the clamp area 511 can be held securely as shown in (b) of FIG. 66, whereby the range from the outermost periphery to the clamp area 511 of the disk 501 is deformable in the upward/downward direction of the disk 501. Therefore, in the case when the disk 501 is rotated at high speed, the deformable range in the upward/downward direction of the disk 501 is made narrower than the case of holding by using the conventional clamper 581, whereby the vibration amount of the disk 501 can be made less than that in the conventional disk drive apparatus.

In addition, in the disk drive apparatus of the 18th embodiment, the clamp area 511 of the disk 501 is held securely, and the clamper projections 551 disposed on the outer circle limit the deformation of the disk 501 in the upward direction as shown in (c) of FIG. 66. Therefore, the disk 501 cannot deform in the up/down direction only in the range from the outermost periphery of the disk 501 to the outer circles of the clamper projections 51. Therefore, the deformable range in the upward/downward direction of the disk 501 is made narrower than that in the case of the clamper 541 of the disk drive apparatus of the 14th embodiment, whereby the amplitude amount of the vibration in the case when the disk 501 is rotated at high speed can be reduced further.

FIGS. 67 and 68 are side sectional views (a) showing the vicinities of other clampers of the disk drive apparatus of the 18th embodiment of the present invention, and the reverse-side views (b) of the clamper.

In the disk drive apparatus shown in (b) of FIG. 67, regarding the circumferential dispositions of the clamper projections 551, the four projections on the inner circle are disposed 45 degrees dislocated from the four projections on the outer circle. Even if the clamper projections 551 are disposed in this way, the effect of reducing the vibration in the case when the disk 501 is rotated at high speed is not changed significantly.

Furthermore, in the disk drive apparatus shown in (b) of FIG. 68, four clamper projections 551 are formed at equal intervals on the inner circle, and eight are formed at equal intervals on the outer circle. By disposing the clamper projections 551 in this way, the vibration in the case when the disk 501 is rotated at high speed can be reduced still further.

Even if the clamper projections 551 are disposed so that the projections on the inner circle for holding the disk 501 at the clamp area 511 of the disk 501 are dislocated in the rotation direction of the disk 501 from the projections disposed on the outside thereof on the outer circle for restricting the deformation of the disk 501 in the upward direction, or even if the number of the clamper projections 551 is increased, the vibration of the disk 501 rotated at high speed can be reduced still further than the vibration in the case when the clamper projections 551 are disposed only on the inner circle.

In the disk drive apparatus of the 18th embodiment, it has been described that the shape of the clamper projections 551 is cylindrical; however, in the present invention, the horizontal sectional shape of the clamper projections 551 is not required to be circular; it is possible to set any desired sectional shapes, such as a triangular shape, a square shape, an elliptic shape and the like.

Furthermore, in the disk drive apparatus of the 18th embodiment, an effect similar to that of the 14th embodiment can be obtained even if the tips of the clamper projections 551 are made thinner, just as in the case of the 14th embodiment. For example, provided that the clamper projections 551 on the inner circle and the clamper projections 551 on the outer circle are disposed at the same positions in the rotation direction with respect to the rotation direction of the disk 501, the shapes of the clamper projections 551 can be simplified by integrating the areas between the clamper projections 551 so as to form an elliptic or rectangular shape.

In the disk drive apparatus of the 18th embodiment, the clamper projections 551 are provided only on the side of the clamper 415; however, by providing the four or more turntable projections 552 on the turntable 521 and by securely holding the stable flat face of the disk 501, it is possible to obtain an effect of still further reducing the vibration in the case when the disk 501 is rotated at high speed.

The disk drive apparatus of the 18th embodiment is configured so that the magnet 544 and the back yoke 545 are accommodated in the clamper 415, and so that the opposed yoke 524 is accommodated in the boss 522 of the turntable 521. However, even if the magnet 544 and the back yoke 545 are accommodated in the boss 522 of the turntable 521, and even if the opposed yoke 524 is accommodated in the clamper 415, the effect of reducing, the vibration in the case when the disk 501 is rotated at high speed remains unchanged.

As described above, in accordance with the configuration of the disk drive apparatus of the 18th embodiment, by disposing the four or more clamper projections 551 on the disk holding face of the clamper 415, and by additionally disposing the four or more clamper projections 551 outside the clamp area of the disk 501, the vibration of the disk 501 can be reduced securely. Therefore, in the disk drive apparatus of the 18th embodiment, the vibration of the disk 501 can be reduced even when the disk 501 is mounted on the turntable 521 having a face deflection and rotated at high speed, and even if the disk 501 having a face deflection and thereby unbalanced significantly is rotated at high speed. Therefore, in the disk drive apparatus of the 18th embodiment, stable recording/reproduction can be attained without reducing data transfer rate. In addition, in accordance the disk drive apparatus of the 18th embodiment, vibration and noise discharged to the outside of the disk drive apparatus can be reduced, and the spindle motor 502 can attain a long service life.

19th Embodiment

Figure 69:
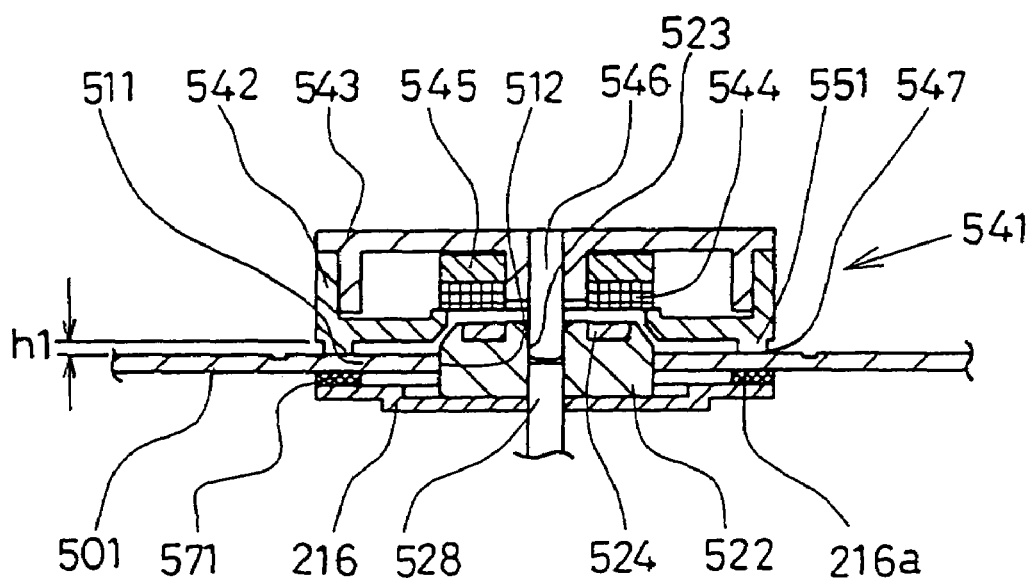
FIG. 69 shows a side sectional view (a) of the vicinity of a clamper 541 and a reverse-side view (b) of the clamper 541, showing the positional relationship between the dispositions of the clamper projections 551 provided on the clamper 541 of the disk drive apparatus in accordance with the 19th embodiment of the present invention and a turntable-use rubber sheet 571 stuck to the turntable 216.
Figure 69:
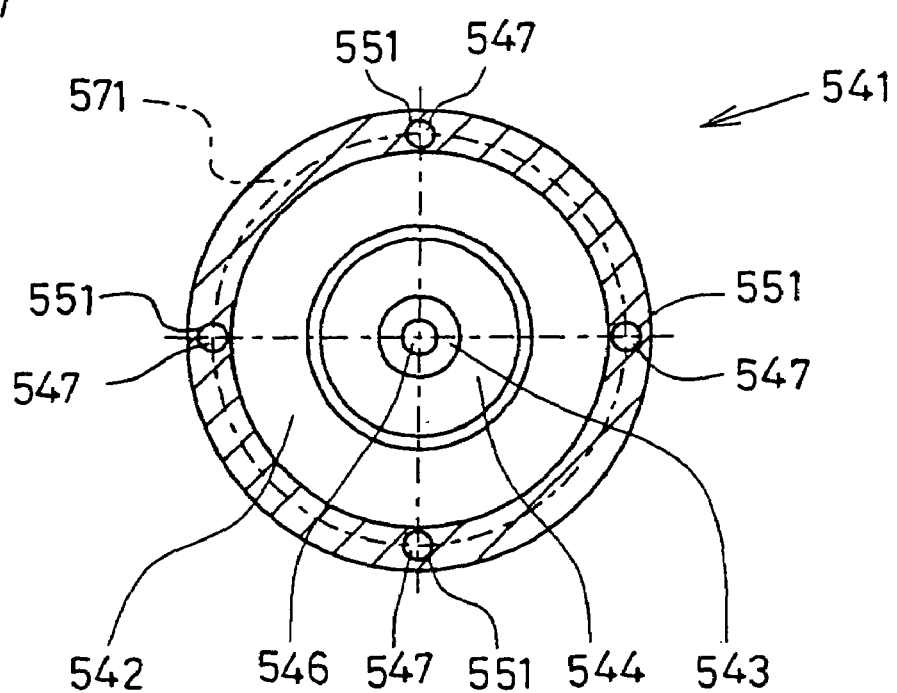
Figure 70:
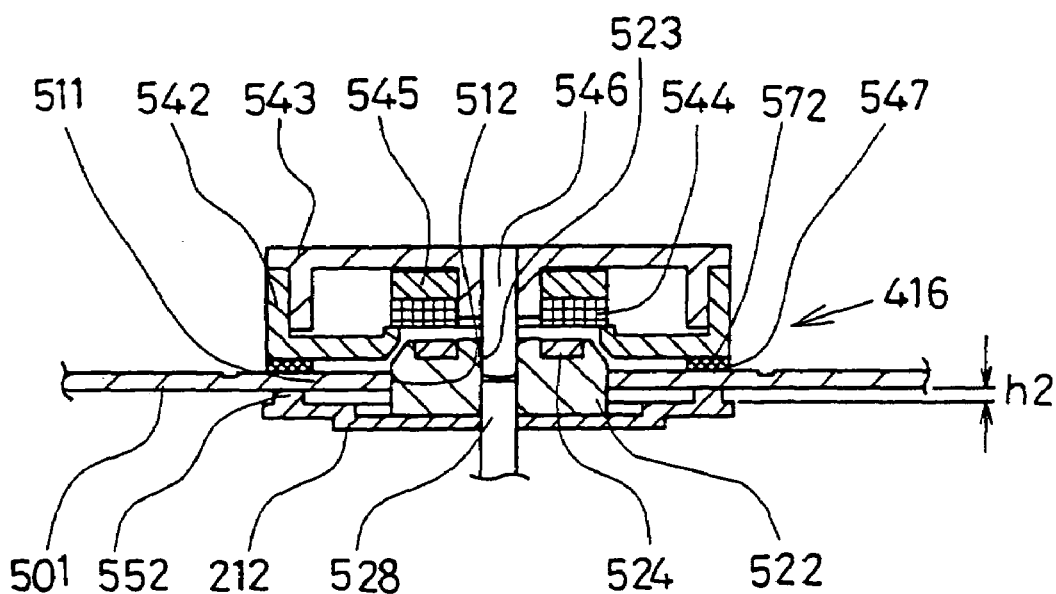
FIG. 70 shows a side sectional view (a) of the vicinity of another 416 clamper 416 and a reverse-side view (b) of the clamper 416, showing the positional relationship between a clamper-use rubber sheet 572 stuck to the clamper 416 of the disk drive apparatus in accordance with the 19th embodiment of the present invention and the dispositions of the clamper projections 552 provided on the turntable 212.
Figure 70:
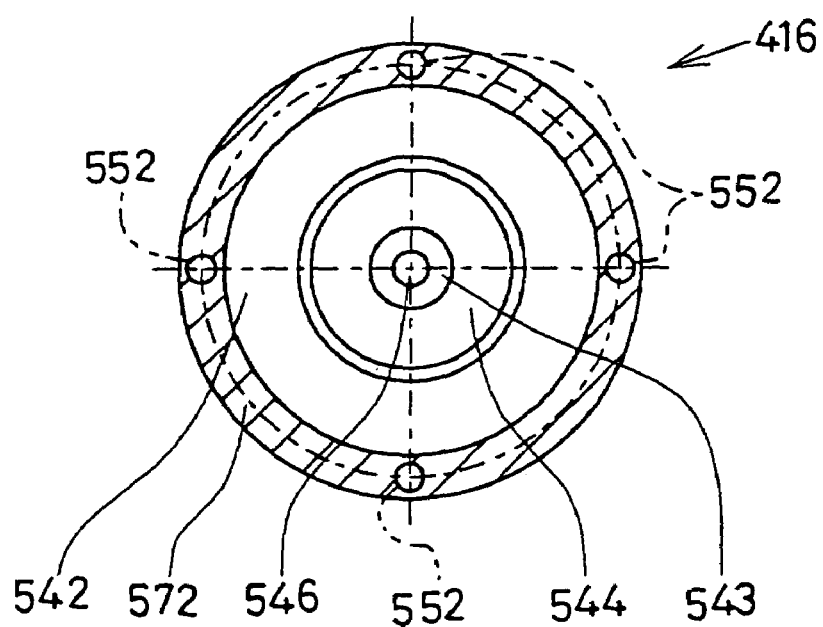
Figure 71:
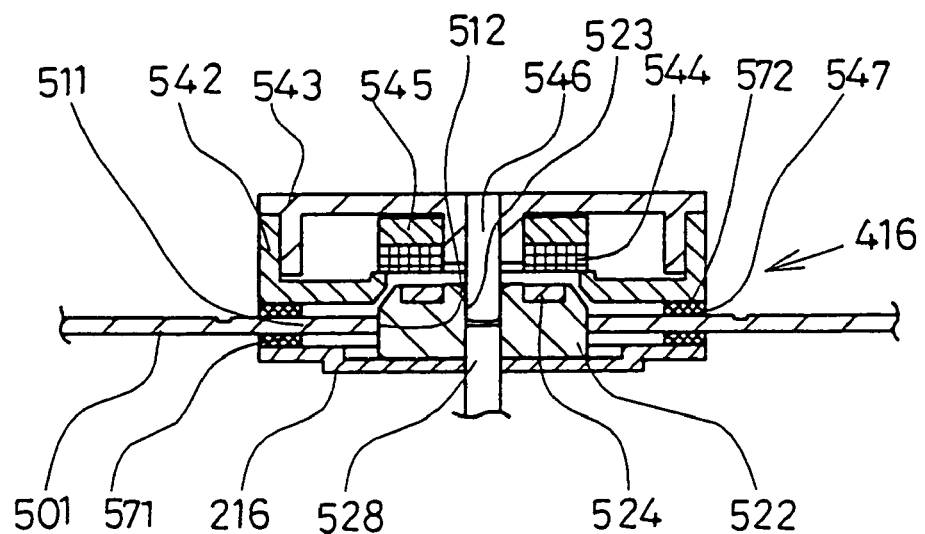
FIG. 71 shows a side sectional view (a) of the vicinity of another 416 clamper 416 and a reverse-side view (b) of the clamper 416, showing the positional relationship between the clamper-use rubber sheet 572 stuck to the clamper 416 of the disk drive apparatus in accordance with the 19th embodiment of the present invention and the turntable-use rubber sheet 571 stuck to the turntable 216.
Figure 71:
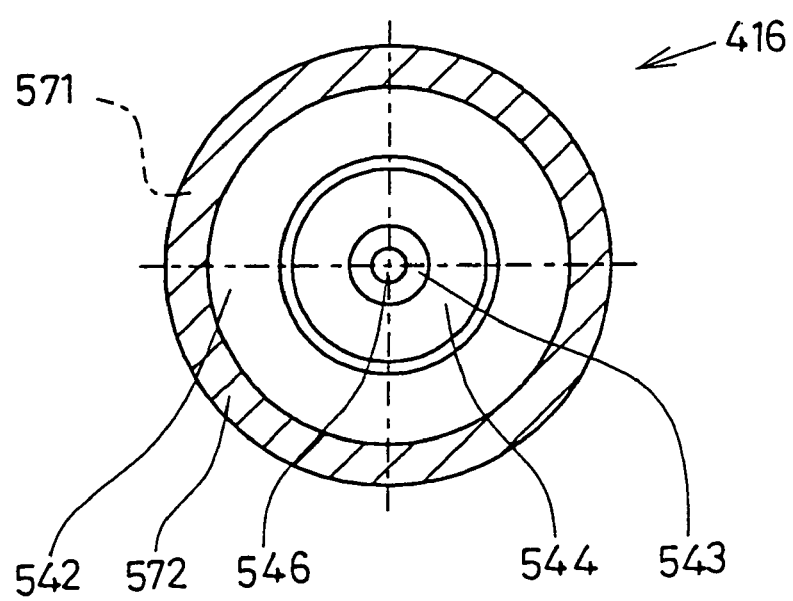

A disk drive apparatus in accordance with a 19$^{th}$ embodiment is shown in FIGS. 69–71. The disk drive apparatus shown in FIG. 69 comprises a turntable provided with a ring-shaped rubber sheet stuck to a disk mounting face thereof on which a disk used as a recording medium is mounted and a clamper having four or more projections, each of which has predetermined height, which are arranged at positions wherein a circumference is divided at equal intervals, the tips of which are substantially on the same plane, and holding the disk between the projections and the ring-shaped rubber sheet, wherein the differences between the heights of the projections of the clamper are within 40 µm.

The disk drive apparatus shown in FIG. 70 comprises a turntable having four or more projections each of which has predetermined height, which are arranged at positions wherein a circumference is divided at equal intervals, and the tips of which are substantially on the same plane, for supporting a mounted disk by using the four or more projections and a clamper provided with a ring-shaped sheet stuck to a disk mounting face thereof for holding the disk between the ring-shaped sheet and the projections of the turntable, wherein the differences between the heights of the projections of the turntable are within 40 µm.

FIGS. 69 are a side sectional view (a) showing the vicinity of the clamper 541 of the disk drive apparatus of the 19th embodiment of the present invention and a reverse-side view (b) of the clamper 541. In (b) of FIG. 69, a turntable-use rubber sheet 571 stuck to a turntable 216 is shown by a diagonally shaded area, together with the clamper projections 551 provided on the reverse-side face of the clamper 541, whereby their positional relationship is shown.

FIGS. 70 and 71 are side sectional views (a) showing the vicinities of other clampers of the disk drive apparatus of the 19th embodiment of the present invention, and the reverse-side views (b) of the clamper. The elements having functions substantially identical to those of the elements of the disk drive apparatus of the 14th to 18th embodiments shown in the above-mentioned FIGS. 52 to 68 are represented by the same numeral codes, and the descriptions for the preceding embodiments are applied, thereby omitting overlap descriptions.

In (a) of FIG. 69, the turntable 216 is secured to the spindle motor shaft 528, and the ring-shaped turntable-use rubber sheet 571 is stuck to the disk mounting face 216a of the turntable 216, opposite to the clamp area 511 of the disk 501. Therefore, the turntable 216 is configured to rotatably support the clamp area 511 of the disk 501 via the turntable-use rubber sheet 571.

A boss 522 fitted into the clamp hole 512 of the disk 501 is formed integrally with the turntable 216. By fitting the clamp hole 2 of the disk 501 on the boss 522, the disk 501 is positioned. Furthermore, a positioning hole 523 is formed at the center of the face (the upper face in (a) of FIG. 69) of the boss 522, opposite to the clamper 541. In addition, an opposed yoke 524 is embedded and secured in the boss 522.

A center projection 546 fitted into the positioning hole 523 provided in the turntable 216 and used to securely hold the turntable 216 and the clamper 541 at the same center position is secured to the magnet holder 543. Around this center projection 546, a magnet 544 and a back yoke 545 are secured. A flat face is formed on the lower face of the disk holder 542 constituting the reverse-side face of the clamper 541.

In the disk drive apparatus of the 19th embodiment configured as described above, when the disk 501 is held between the clamper 541 and the turntable 521 via the turntable-use rubber sheet 571, the clamp hole 512 is fitted on the boss 522, and the disk 501 is mounted on the turntable 216. At this time, the disk 501 is held by the magnetic attraction acting between the magnet 544 accommodated in the clamper 541 and the opposed yoke 524 secured to the turntable 216. The disk 501 being held in this way is rotated integrally with the turntable 216 and the clamper 541 by the rotation operation of the spindle motor 502.

As shown in (b) of FIG. 69, in the disk drive apparatus of the 19th embodiment, the four cylindrical clamper projections 551 are formed on the reverse-side face of the disk holder 542 constituting the reverse-side face of the clamper 541 made of resin. The clamper projections 551 are formed on a circle around the center projection 546 of the magnet holder 543, and provided at positions wherein the clamper projections 551 can securely hold the clamp area 511 of the disk 501. The clamper projections 551 are disposed at positions wherein the circumference of the circle around the center projection 546 is divided into four equal portions, that is, positions wherein the circumference is divided at equal intervals of 90 degrees.

The difference (flatness) in height (h1) among the clamper projections 551 is within 40 µm. Within this range, the disk

501 is securely held between the four clamper projections 551 and the turntable 216 via the turntable-use rubber sheet 571.

In the disk drive apparatus of the 19th embodiment, the disk 501 is mounted on the turntable 521 via the turntable-use rubber sheet 571 of the turntable 216 made of metal. The difference (flatness) in height between the bumps and dips on the disk mounting face 216a depends on the processing method for the turntable 521. In the case of the turntable 216 formed by cutting rod-like aluminum or brass for example, a flatness within 20 μm can be attained easily; however, this processing takes a long time, resulting in high cost. On the other hand, the turntable 216 formed by stamping a metal sheet can be attained at low cost; however, it is difficult to reduce the flatness of the disk mounting face 216a to 100 μm or less. When the turntable 216, the disk mounting face 216a of which has a low flatness as described above, is used, it eventually hold the disk 501 at three points.

If the flatness of the turntable 216 is 100 μm or more, even if the four clamper projections 551 are provided to limit the deformable range on the side of the clamper 541 of the disk 501, the deformable range on the side of the turntable 216 is large. Therefore, in the case when the disk 501 is rotated at high speed, significant vibration in the "six-division mode" occurs at the disk 501 as shown in the above-mentioned FIG. 47, whereby the vibration and noise at the disk drive apparatus become vigorous.

To solve this problem, the turntable-use rubber sheet 571 is stuck to the turntable 216 in the disk drive apparatus of the 19th embodiment, whereby the unevenness on the turntable 216 made of a metal sheet can be absorbed.

The turntable-use rubber sheet 571 having a rubber hardness of 20 to 80 degrees for example is formed to have a thickness of 0.1 to 1.0 mm depending on the rubber hardness. If the clamp area 511 of the disk 501 is about 30 mm in diameter, it is easy to perform molding so that one turntable-use rubber sheet 571 has an unevenness of 100 μm or less in thickness. This turntable-use rubber sheet 571 is stuck to the turntable 216 with an adhesive or double-sided tape. Since the turntable-use rubber sheet 571 has the elasticity of rubber, the unevenness of the turntable 216, about 100 μm, can be easily absorbed by the deformation of the turntable-use rubber sheet 571.

In the case when the disk 501 is mounted on the turntable 216 to which this kind of turntable-use rubber sheet 571 is stuck, the deformation of the disk 501 toward the turntable 216 is limited. Since the turntable-use rubber sheet 571 has the elasticity of rubber, the turntable-use rubber sheet 571 deforms slightly at the outermost periphery thereof. However, since the compression stress of the rubber rises abruptly, deformation does not occur at all on the inner peripheral side of the turntable-use rubber sheet 571. Therefore, the disk 501 is completely restricted over the entire 360-degree circumference inside the clamp area 511. Therefore, even if the disk 501 is rotated at high speed, the disk 501 does not cause vibration in the "six-division mode," the "eight-division mode" or the like.

As described above, in the disk drive apparatus of the 19th embodiment, by sticking the turntable-use rubber sheet 571 to the turntable 216, the large unevenness of the turntable 216 made of a metal sheet can be absorbed. In addition, in the disk drive apparatus of the 19th embodiment, in the case when the turntable-use rubber sheet 571 is stuck to the turntable 216 formed by cutting aluminum or brass, the unevenness of the turntable 216 can be more absorbed than in the case of the turntable 216 made of a metal sheet. Therefore, in the disk drive apparatus of the 19th embodiment, the vibration of the disk 501 in the case when the disk 501 is rotated at high speed can be reduced significantly.

In the disk drive apparatus of the 19th embodiment, if the difference (flatness) in height (h1) among the clamper projections 551 is within 40 μm, the clamp area 511 of the disk 501 can be securely held by the four or more clamper projections 551. Desirably, if the flatness at the clamper projections 551 can be made within 20 μm, the disk 501 can be held more securely between the turntable 216 and the clamper 541, whereby the vibration in the case when the disk 501 is rotated at high speed can be reduced further securely.

In the disk drive apparatus of the 19th embodiment, it has been described that the shape of the clamper projections 551 is cylindrical; however, in the present invention, the horizontal sectional shape of the clamper projections 551 is not required to be circular; it is possible to set any desired sectional shapes, such as a triangular shape, a square shape, an elliptic shape and the like. Furthermore, an effect similar to that of the 14th embodiment can be obtained when the tips of the clamper projections 551 are made thinner, just as in the case of the above-mentioned 14th embodiment.

The disk drive apparatus of the 19th embodiment is configured so that the four clamper projections 551 are provided on the side of the clamper 541, and so that the turntable-use rubber sheet 571 is stuck to the turntable 216, whereby the disk 501 is completely restricted over the entire 360-degree circumference inside the clamp area 511. However, even if the device is configured so that four turntable projections 552 are formed on the turntable 212 and so that a clamper-use rubber sheet 572 is stuck to the clamper 416, the disk 501 can also be held securely. With this configuration, the vibration of the disk 501 in the case when the disk 501 is rotated at high speed can be reduced.

Furthermore, as shown in FIGS. 70(*a*) and (*b*), even if the device is configured so that the turntable-use rubber sheet 571 is stuck to the turntable 216 and so that a clamper-use rubber sheet 572 is stuck to the clamper 416, the disk 501 can also be held securely. With this configuration, the vibration of the disk 501 in the case when the disk 501 is rotated at high speed can be reduced.

In the disk drive apparatus of the 19th embodiment, it has been described that the number of the clamper projections 551 shown in FIG. 69 and the number of the turntable projections 552 shown FIG. 70 are four, respectively. However, the present invention is not limited to this quantity; just as in the case of the disk drive apparatus of the above-mentioned 14th embodiment, the vibration in the case when the disk 501 is rotated at high speed can be reduced still further as the quantity increases to six, nine or more.

In the disk drive apparatus of the 19th embodiment, the balancer 561 in the 17th embodiment shown in FIG. 62 is not mounted; however, by mounting the balancer 561 on the clampers 541 and 416 shown in FIGS. 69, 70 and 71, the imbalance during rotation due to the eccentricity of the disk 501 can be canceled. Furthermore, by mounting the balancer 561 on the clampers 541 and 416, the effect of reducing the vibration in the "six-division mode," the "eight-division mode" and the like in the case when the disk 501 is rotated at high speed is not hindered.

In the disk drive apparatus of the 19th embodiment, in FIGS. 69, 70 and 71, the turntable-use rubber sheet 571 and the clamper-use rubber sheet 572 have the shape of a ring-shaped sheet; however, even if the rubber sheet is divided into plural sheets, if the rubber sheets have the same thickness, a similar effect can be obtained.

The disk drive apparatus of the 19th embodiment is configured so that the magnet 544 and the back yoke 545 are accommodated in the clampers 541 and 416, and so that the opposed yoke 524 is accommodated in the bosses 522 of the turntables 521 and 216. However, even if the magnet 544 and the back yoke 545 are accommodated in the bosses 522 of the turntables 521 and 216, and even if the opposed yoke 524 is accommodated in the clampers 541 and 416, the effect of reducing the vibration in the case when the disk 501 is rotated at high speed remains unchanged.

As described above, in the disk drive apparatus of the 19th embodiment, by using a configuration wherein the turntable-use rubber sheet 571 is stuck to the disk mounting face of the turntable 216 or a configuration wherein the clamper-use rubber sheet 572 is stuck to the disk holding face of the clamper 416, the vibration of the disk 501 can be reduced securely. Therefore, in the disk drive apparatus of the 19th embodiment, even when the disk 501 is mounted on the turntable 521 having a face deflection and rotated at high speed, and even if the disk 501 having a face deflection and thereby unbalanced significantly is rotated at high speed, the vibration of the disk 501 can be reduced. Therefore, in the disk drive apparatus of the 19th embodiment, stable recording/reproduction can be attained without reducing data transfer rate. In addition, in accordance the disk drive apparatus of the 19th embodiment, vibration and noise discharged to the outside of the disk drive apparatus can be reduced, and the spindle motor 502 can attain a long service life.

As described above, in accordance with the disk drive apparatuses of the 14th to 19th embodiments of the present invention, the four or more projections are formed on the disk holding face of the clamper and the disk mounting face of the turntable to hold the clamp area of the disk. Therefore, the disk drive apparatuses of the 14th to 19th embodiments have an effect of reducing the vibration of the disk in the case when the disk having a face deflection and an imbalance during rotation is rotated at high speed.

With this effect, in accordance with the present invention, even if the disk is rotated at high speed, stable data recording/reproduction can be attained, whereby a disk drive apparatus capable of carrying out high-rate data transfer can be attained.

Furthermore, in accordance with the present invention, the vibration of the disk and the noise due to the vibration, discharged to the outside of the disk drive apparatus, can be reduced significantly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The present invention is provided for personal computers, game machines, video reproduction machines, devices (set-top boxes) for utilizing information from networks, satellite broadcasting, etc., and the like, and used to record and reproduce data by rotating a disk used as a recording medium.

The invention claimed is:

1. A disk drive apparatus comprising:
a turntable provided with a ring-shaped rubber sheet stuck to a disk mounting face thereof on which a disk used as a recording medium is mounted; and
a clamper having four or more projections each of which has predetermined height, which are arranged at positions wherein a circumference is divided at equal intervals, the tips of the projections being substantially on the same plane, and holding said disk between said projections and said ring-shaped rubber sheet, wherein the differences between the heights of said projections of said clamper are within 40 µm.

2. A disk drive apparatus comprising:
a turntable having four or more projections each of which has predetermined height, which are arranged at positions wherein a circumference is divided at equal intervals, and the tips of the projections substantially on the same plane, for supporting a mounted disk by using said four or more projections; and
a clamper provided with a ring-shaped rubber sheet stuck to a disk mounting face thereof for holding said disk between said ring-shaped rubber sheet and said projections of said turntable, wherein the differences between the heights of said projections of said turntable are within 40 µm.

* * * * *